(12) United States Patent
Davies et al.

(10) Patent No.: US 12,304,434 B2
(45) Date of Patent: May 20, 2025

(54) METHOD FOR OPTIMIZING A RESOURCE REQUIREMENT FOR A CLEANING PROCESS, CLEANING METHOD, USE OF A CONTROL QUANTITY, CLEANING SYSTEM AND MOTOR VEHICLE

(71) Applicant: KAUTEX TEXTRON GmbH & Co. KG, Bonn (DE)

(72) Inventors: Chris Davies, Cardiff Wales (GB); Stephen Llion, Holyhead Wales (GB); Axel Barkow, Hurth (DE); Daniel Dreschers, Hurth (DE)

(73) Assignee: KAUTEX TEXTRON Gmbh & Co. KG, Bonn (DE)

( * ) Notice: Subject to any disclaimer, the term of this patent is extended or adjusted under 35 U.S.C. 154(b) by 249 days.

(21) Appl. No.: 17/786,925

(22) PCT Filed: Dec. 17, 2019

(86) PCT No.: PCT/EP2019/085812
§ 371 (c)(1),
(2) Date: Jun. 17, 2022

(87) PCT Pub. No.: WO2021/121568
PCT Pub. Date: Jun. 24, 2021

(65) Prior Publication Data
US 2023/0347850 A1    Nov. 2, 2023

(51) Int. Cl.
*B60S 1/48*    (2006.01)
*B60S 1/58*    (2006.01)

(52) U.S. Cl.
CPC ............. *B60S 1/485* (2013.01); *B60S 1/58* (2013.01)

(58) Field of Classification Search
CPC .. B60S 1/481; B60S 1/485; B60S 1/56; B60S 1/58
See application file for complete search history.

(56) References Cited

U.S. PATENT DOCUMENTS

| | | |
|---|---|---|
| 10,173,646 B1 | 1/2019 | Rice et al. |
| 2014/0009616 A1 | 1/2014 | Nakamura |
| 2016/0207504 A1 | 7/2016 | Sasaki |
| 2018/0200745 A1 | 7/2018 | Dudar |
| 2018/0290631 A1 | 10/2018 | Rice et al. |
| 2018/0334140 A1 | 11/2018 | Ghannam |
| 2018/0370496 A1* | 12/2018 | Sykula ............ B60S 1/56 |

(Continued)

FOREIGN PATENT DOCUMENTS

| | | |
|---|---|---|
| CN | 207328393 | 5/2018 |
| CN | 108778858 | 11/2018 |

(Continued)

OTHER PUBLICATIONS

Chinese Office Action mailed Nov. 8, 2022 for Chinese Patent Application 201980103518.9, a foreign counterpart to U.S. Appl. No. 17/786,982 6 pages.

(Continued)

*Primary Examiner* — Douglas Lee
(74) *Attorney, Agent, or Firm* — Lee & Hayes, P.C.

(57) ABSTRACT

A method for optimizing a resource requirement for a cleaning process of a surface of a motor vehicle. Moreover, the method further relates to a cleaning method, a use of a control quantity, a cleaning system, and a motor vehicle.

20 Claims, 19 Drawing Sheets

(56) References Cited

U.S. PATENT DOCUMENTS

Figure 1:
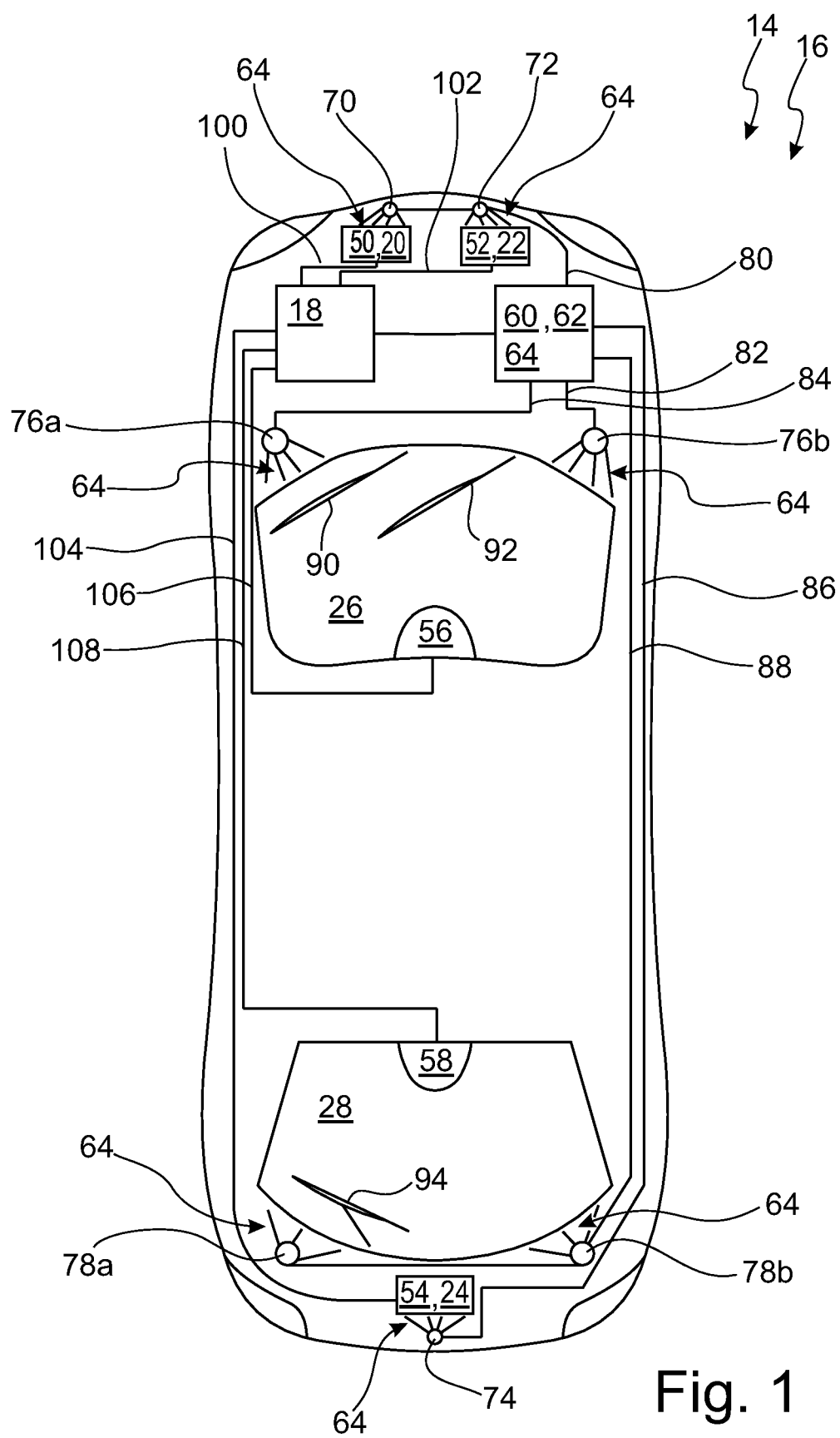

| | | |
|---|---|---|
| 2019/0009752 A1 | 1/2019 | Rice et al. |
| 2019/0106085 A1 | 4/2019 | Bacchus et al. |
| 2019/0248337 A1 | 8/2019 | Kolanowski et al. |
| 2019/0248340 A1 | 8/2019 | Chen |
| 2019/0322245 A1 | 10/2019 | Kline |
| 2019/0351461 A1 | 11/2019 | Kim et al. |
| 2022/0289147 A1 | 9/2022 | Louis |
| 2023/0015440 A1 | 1/2023 | Davies |
| 2023/0015463 A1 | 1/2023 | Davies |
| 2023/0096709 A1 | 3/2023 | Davies |
| 2023/0347849 A1 | 11/2023 | Davies |

FOREIGN PATENT DOCUMENTS

| | | |
|---|---|---|
| CN | 108778858 A | 11/2018 |
| CN | 109109821 | 1/2019 |
| CN | 109263609 | 1/2019 |
| CN | 109606318 | 4/2019 |
| CN | 109641571 A | 4/2019 |
| CN | 109689446 | 4/2019 |
| CN | 110167815 A | 8/2019 |
| CN | 110341654 | 10/2019 |
| DE | 3825178 | 2/1990 |
| DE | 10307216 | 9/2004 |
| DE | 102009040993 | 3/2011 |
| DE | 102015210312 A1 | 12/2016 |
| DE | 102017213019 A1 | 1/2019 |
| EP | 0891273 A1 | 1/1999 |
| EP | 0932533 | 8/1999 |
| EP | 1449728 | 8/2004 |
| EP | 3860887 | 8/2021 |
| GB | 201800616 | 2/2018 |
| GB | 2570156 | 7/2019 |
| JP | 2006347294 A | 12/2006 |
| JP | 2007240186 A | 9/2007 |
| JP | 2014-011785 A | 1/2014 |
| JP | 2014011785 | 1/2014 |
| JP | 2015131616 A | 7/2015 |
| JP | 2016132380 | 7/2016 |
| JP | 2019509924 | 4/2019 |
| JP | 2019-104364 B1 | 6/2019 |
| JP | 2022-547672 B1 | 11/2022 |
| WO | WO2019/073975 A1 | 4/2019 |
| WO | WO2019073975 | 4/2019 |
| WO | WO2019/0116607 A1 | 6/2019 |
| WO | WO2019/116607 A1 | 6/2019 |
| WO | WO 2018230255 | 4/2020 |
| WO | WO 2019049381 | 9/2020 |
| WO | WO 2019181766 | 3/2021 |

OTHER PUBLICATIONS

Chinese Office Action mailed Nov. 18, 2022 for Chinese Patent Application 201980103538.6, a foreign counterpart to U.S. Appl. No. 17/786,831, 7 pages.
Japanese Notice of Reasons for Rejection for corresponding Japanese patent application No. 2022-537175 dated Jul. 10, 2023, 7 pages.
Japanese Notice of Reasons for Rejection for corresponding Japanese Patent Application No. 2022-537174, dated Jul. 10, 2023, 8 pages.
Japanese Notice of Reasons for Rejection for corresponding Japanese Patent Application No. 2022-537178, dated Jul. 10, 2023, 11 pages.
Japanese Notice of Reasons for Rejection for corresponding JP Patent Application No. 2022-537173 dated Jul. 31, 2023, 3 pages.
Chinese Office Action for corresponding China Patent Application No. 201980103537.1 dated Dec. 1, 2022, 9 pages.
PCT Search Report for corresponding PCT Application No. PCT/EP2019/085815 dated Sep. 9, 2020, 5 pages.
PCT Search Report for corresponding PCT Application No. PCT/EP2019/085813 dated Sep. 11, 2020, 3 pages.
PCT Search Report for corresponding PCT Application No. PCT/EP2019/0851818 dated Sep. 11, 2020, 3 pages.
PCT Search Report for corresponding PCT Application No. PCT/EP2019/085817 dated Sep. 11, 2020, 3 pages.
Japanese Office Action for corresponding Japanese Patent Application No. 2022-537173 dated Jan. 15, 2024, 8 pages.
Decision of Rejection issued in Japanese Application No. 2022-537173, dated Jan. 4, 2024, 8 pages.
Decision of Rejection issued in Japanese Application No. 2022-537174, dated Jan. 9, 2024; 21 pages.
Notice of Reasons for Rejection issued to Japanese Application No. 2022-537178, dated Jan. 9, 2024, 19 pages.
Notice of Reasons for Rejection issued to Japanese Application No. 2022-537175, dated Jul. 6, 2023, 7 pages.
Machine Translation of Xu's reference (CN-207328393-U), 2018, 16 pgs.
Office Action for U.S. Appl. No. 17/786,785, mailed on Nov. 7, 2024, Davies, "Method for Indirectly Deriving a Systematic Dependence for a System Behaviour of a System Component of a Cleaning System, Diagnosing Method, Method for Selecting a Resolution Strategy, Use of a Resolution Strategy, Cleaning Method, Cleaning System and Motor Vehicle", 16 pages.
PCT International Preliminary Report on Patentability for corresponding PCT Application No. PCT/EP2019/085817 dated Jun. 30, 2022, 8 pages.
PCT International Preliminary Report on Patentability for corresponding PCT Application No. PCT/EP2019/085815 dated Jun. 30, 2022, 11 pages.
PCT International Preliminary Report on Patentability for corresponding PCT Application No. PCT/EP2019/085813 dated Jun. 30, 2022, 7 pages.
PCT International Preliminary Report on Patentability for corresponding PCT Application No. PCT/EP2019/085812 dated Jun. 30, 2022, 6 pages.
PCT International Preliminary Report on Patentability for corresponding PCT Application No. PCT/EP2019/085818 dated Jun. 30, 2022, 7 pages.
Office Action for U.S. Appl. No. 17/778,886, mailed on Dec. 5, 2024, Davies, "Method for Determining a Cleaning Strategy for Cleaning a Surface to be Cleaned of a Motor Vehicle, Cleaning Method, Use of a Cleaning Strategy, Cleaning System and Motor Vehicle", 17 Pages.

* cited by examiner

METHOD FOR OPTIMIZING A RESOURCE REQUIREMENT FOR A CLEANING PROCESS, CLEANING METHOD, USE OF A CONTROL QUANTITY, CLEANING SYSTEM AND MOTOR VEHICLE

This Application claims priority to PCT Application No. PCT/EP2019/085812, filed Dec. 17, 2019, the contents of which is incorporated herein by reference.

The present invention relates to a method for optimizing a resource requirement for a cleaning process, cleaning method, use of a control quantity, cleaning system and motor vehicle. In particular, the present invention relates to a cleaning method, a method for indirectly deriving a systematic dependence for a system behaviour of a cleaning system of a motor vehicle, particularly preferably for a system behaviour of a cleaning process of a surface of the motor vehicle, a method for optimizing a resource requirement for a cleaning process of a surface of a motor vehicle, a method for determining a cleaning strategy for cleaning a surface to be cleaned of a motor vehicle, a method for indirectly deriving a systematic dependence for a system behaviour of a system component of a cleaning system of a motor vehicle, a method for diagnosing a deviation between an actual system behaviour and an expected system behaviour of a system component of a cleaning system of a motor vehicle, a method for selecting a resolution strategy, a use of a selected resolution strategy, a method for indirectly deriving a systematic dependence for a system behaviour of a soiling process of a surface of a motor vehicle, a use of a dependency table and/or a systematic dependence to determine an expected availability at a distance or an operating time of the motor vehicle yet to be covered, a use of a dependency table and/or a systematic dependence to determine an expected distance or an operating time of the motor vehicle yet to be covered when reaching a threshold of availability, a use a dependency table and/or a systematic dependence for optimizing a resource requirement for a cleaning process of a surface of a motor vehicle, a use of a dependency table and/or a systematic dependence to determine a cleaning strategy for cleaning a surface to be cleaned of a motor vehicle, a use a dependency table and/or a systematic dependence to determine a necessary expected gain in availability, a use a systematic dependence derived by a method for indirectly deriving a systematic dependence for a resource efficient cleaning of at least one surface of a motor vehicle, a use a control quantity setpoint derived by a method for optimizing a resource requirement for a cleaning process of a surface of a motor vehicle for a resource efficient cleaning of at least one surface of a motor vehicle, a use a cleaning strategy derived by a method for determining a cleaning strategy for cleaning a surface to be cleaned of a motor vehicle, for a resource efficient cleaning of at least one surface of a motor vehicle, a cleaning system and a motor vehicle.

The number of sensors being installed in a motor vehicle has also risen as a result of the recent steady expansion of driver assistance systems.

In many modern motor vehicles, sensors support the driver of a motor vehicle within the framework of safety functions, for example in the recognition of obstacles, preferably also in the recognition of pedestrians, and/or within the framework of semi-autonomous or autonomous motor vehicle operation.

For functional sensor operation and thus also for the continued operation of these safety functions and/or for (partially) autonomous vehicle operation, these sensors are dependent on a surface that is not excessively dirty, so that the increase in the number of sensors has also been accompanied by an increase in the need for cleaning.

Cleaning the sensor surfaces requires resources such as water, detergents, energy, etc., but these can only be stored or carried in the vehicle to a limited extent. As a result, there is an increasing demand for a resource-saving cleaning process.

In addition, the increase in the number of sensors installed in a motor vehicle has led to a situation in which some data can be acquired redundantly by several sensors, although the failure of one sensor usually also leads to the failure of a driver assistance system.

If resources are to be conserved, the question arises as to which cleaning strategy can maintain the functionality of the driver assistance systems for as long as possible without having to refill cleaning resources and/or which sensors can possibly be neglected during cleaning or cleaned with fewer resources.

Thus, the decision making process of cleaning the appropriate sensor adequately is becoming more complex. There are many influences that determine an adequate clean and how this is achieved.

State of the art cleaning of the front and/or rear windscreen of motor vehicles is known, in particular with a windscreen wiper, whereby a cleaning fluid may also be applied to the front and/or rear windscreen.

A device for controlling a wiping and/or rinsing system for windscreens is already known from document EP 0 932 533 A1. A sensor device measures the wetting or contamination of the windscreen. The wiping and/or rinsing system is switched on when wetting or soiling of the windscreen is detected, as well as when an ignition key is pressed or reverse gear is engaged. This ensures that when the vehicle is started and when reverse gear is engaged, a clear view through the vehicle windows is ensured as a precaution. Depending on the degree of wetting and/or the degree of soiling, a time period can also be specified for which the wiping and/or rinsing system is switched on.

DE 103 07 216 A1 discloses a process for operating a washer/wiper system for a motor vehicle windscreen using at least one windscreen wiper, a washer unit for spraying cleaning fluid onto the windscreen, an electronic control unit, at least one windscreen wiper motor, and a conveying pump for windscreen cleaning fluid. The wiper speed during the cleaning process is adaptively controlled by the electronic control unit depending on the driving condition and/or environmental input parameters.

DE 10 2009 040 993 A1 reveals a device for operating a wiping and/or rinsing system for a windscreen of a vehicle, having a control device for controlling a cleaning process of the wiping and/or rinsing system, in which the windscreen of the vehicle can be subjected to a cleaning fluid of the rinsing system and/or a wiper of the wiping system can be moved in contact with the windscreen relative thereto, wherein the control means is adapted to determine a degree of contamination and/or a degree of wetting of the disc depending on at least one detected information and to set at least one specific parameter of the cleaning process depending on the determined degree of contamination and/or the degree of wetting, wherein the control means is adapted to determine the degree of contamination and/or the degree of wetting of the disc during the cleaning process and to adjust the at least one specific parameter depending on the degree of contamination and/or the degree of wetting during the cleaning process, wherein a predetermined plurality of value combinations for at least two specific parameters of the cleaning process are stored in the control means and the control means is adapted to select a value combination from the plurality of value combinations depending on the degree of contamination and/or the degree of wetting and to adjust the at least two specific parameters according to the selected value combination.

The invention is based on the task of providing the state of the art with an improvement or an alternative.

According to a first aspect of the invention, the task is solved by a cleaning method for a resource efficient cleaning, preferably resource-saving cleaning, of at least one surface of a motor vehicle, wherein the motor vehicle exhibits a cleaning system and at least one sensor, wherein the sensor is operatively connected to one surface, wherein the cleaning method exhibits at least one cleaning process, wherein the cleaning process is adapted to clean one surface and exhibits a cleaning period comprising a start time and an end time, wherein the cleaning system exhibits an electronic control unit, a cleaning fluid distribution system, preferably comprising at least one fluid reservoir, at least one nozzle, and at least one cleaning fluid line, wherein the sensor is adapted to detect at least one measured quantity, preferably an availability of the sensor, a process quantity, preferably a humidity and/or a temperature in the vicinity of the motor vehicle and/or a rainfall and/or a snowfall quantity and/or a coordinate of the motor vehicle, and/or a control quantity, and to transmit the measured quantity to the electronic control unit, wherein the nozzle is adapted to bring a cleaning fluid into operative connection with the surface, wherein the electronic control unit is adapted to control and/or regulate the cleaning process by means of at least one control quantity of the cleaning process, wherein a resource requirement of the cleaning process depends on a control quantity setpoint, characterized in that the electronic control unit controls the resource efficient cleaning, preferably resource-saving cleaning, depending on a dependency table exhibiting at least two data sets, preferably exhibiting at least 50 data sets, particularly preferably exhibiting at least 200 data sets, wherein each data set exhibits at least one input quantity of the cleaning system, preferably a process quantity, preferably a humidity and/or a temperature in the vicinity of the motor vehicle and/or a rainfall and/or a snowfall quantity and/or a coordinate of the motor vehicle, and/or a control quantity and/or a vehicle type and/or an availability of the sensor, and at least one output quantity of the cleaning system, preferably the resource requirement of the cleaning process and/or the availability of the sensor, stored in an ordered manner with reference to one another, and/or the electronic control unit controls the resource efficient cleaning, preferably resource-saving cleaning, depending on a systematic dependence for a system behaviour of the cleaning system, particularly for the system behaviour of the cleaning process of the surface of the motor vehicle, between an input quantity of the cleaning system, preferably the at least one control quantity of the cleaning process and/or the at least one process quantity, preferably a humidity and/or a temperature in the vicinity of the motor vehicle and/or a rainfall and/or a snowfall quantity and/or a coordinate of the motor vehicle, and/or a vehicle type and/or an availability of the sensor, and an output quantity of the cleaning system, preferably the resource requirement of the cleaning process and/or the availability of the sensor, in particular depending on a systematic dependence derived by a method for indirectly deriving a systematic dependence for a system behaviour of a cleaning system of a motor vehicle according to the second aspect of the invention, and/or the electronic control unit controls the resource efficient cleaning, preferably resource-saving cleaning applying a control quantity setpoint, particularly preferably applying a control quantity setpoint derived by a method according to the third aspect of the invention, and/or the electronic control unit controls the resource efficient cleaning, preferably resource-saving cleaning applying a cleaning strategy, particularly preferably applying a cleaning strategy derived by a method according to the fourth aspect of the invention, and/or the cleaning method comprises a process step for indirectly deriving a systematic dependence for a system behaviour of a system component of a cleaning system of a motor vehicle, preferably a process step for indirectly deriving a systematic dependence according to the fifth aspect of the invention, and/or the cleaning method comprises a process step for diagnosing a system behaviour of a system component of a cleaning system of a motor vehicle, preferably a process step for diagnosing a system behaviour of a system component of a cleaning system according to the first alternative of the sixth aspect of the invention, and/or the cleaning method comprises a process step for diagnosing a deviation between an actual system behaviour and an expected system behaviour of a system component of a cleaning system of a motor vehicle, preferably a process step for diagnosing a deviation between an actual system behaviour and an expected system behaviour of a system component of a cleaning system according to the second alternative of the sixth aspect of the invention, and/or the cleaning method comprises a process step for selecting a resolution strategy, preferably a process step for selecting a resolution strategy according to the seventh aspect of the invention, and/or the cleaning method comprises a process step for using of a selected resolution strategy, preferably a process step for using of a selected resolution strategy according to the eighth aspect of the invention, and/or the cleaning method comprises a process step for indirectly deriving a systematic dependence for a system behaviour of a soiling process of a surface of a motor vehicle, preferably a process step for indirectly deriving a systematic dependence according to the ninth aspect of the invention, and/or the cleaning method comprises a process step for using—
a dependency table exhibiting at least two data sets, preferably exhibiting at least 50 data sets, particularly preferably exhibiting at least 200 data sets, wherein each data set exhibits at least one input quantity of the soiling process, in particular the distance travelled by the motor vehicle between the first availability and the second availability and/or the operating time by covering the distance travelled by the motor vehicle between the first availability and the second availability, and/or a driving speed of the motor vehicle, preferably a course of the driving speed along the route between the first availability and the second availability, and/or a process quantity, preferably a humidity, particularly preferably a course of the humidity along the route between the first availability and the second availability, and/or a temperature in the vicinity of the motor vehicle, particularly preferably a course of the temperature along the route between the first availability and the second availability, and/or a rainfall, particularly preferably a course of the rainfall along the route between the first availability and the second availability, and/or a snowfall quantity, particularly preferably a course of the snowfall quantity along the route between the first availability and the second availability, and/or a vehicle type and/or a coordinate of the motor vehicle, preferably the coordinate of the motor vehicle along the route between the first availability and the second availability, and/or the first availability of the sensor, and the evaluated change of availability, stored in an ordered manner with reference to one another, and/or a systematic dependence for a system behaviour of a soiling process of a surface of a motor vehicle, preferably derived by a method for indirectly deriving a systematic dependence according to the ninth aspect of the invention, for a resource efficient cleaning, preferably resource-saving cleaning, of at least one surface of a motor vehicle, to/for determine an expected availability at a distance or an operating time of the motor vehicle yet to be covered, preferably according to the tenth aspect of the invention, and/or determine an expected distance or an expected operating time of the motor vehicle yet to be covered when reaching a threshold of availability, preferably according to the eleventh aspect of the invention, and/or optimizing a resource requirement for a cleaning process of a surface of a motor vehicle, in particular by applying a method for optimizing a resource requirement for a cleaning process of a surface of a motor vehicle according to the third aspect of the invention, and/or determine a cleaning strategy for cleaning a surface to be cleaned of a motor vehicle, in particular by applying a method for determining a cleaning strategy for cleaning a surface to be cleaned of a motor vehicle according to the fourth aspect of the invention, and/or determine a necessary expected gain in availability, whereby the sum of the actual availability and the necessary expected gain in availability is sufficient to achieve a distance or an operating time yet to be covered by the motor vehicle in such a way that a threshold of availability is not exceeded, preferably according to the fourteenth aspect of the invention.

The following terms are explained in more detail:

First of all, it should be expressly pointed out that in the context of this patent application indefinite articles and figures such as "one", "two", etc. should normally be understood as "at least" information, i.e. "at least one . . . ", "at least two . . . ", etc., unless it is expressly apparent from the respective context or it is obvious or technically mandatory for the person skilled in the art that only "exactly one . . . ", "exactly two . . . ", etc. can be meant.

In the context of this patent application, the term "in particular" should always be understood as meaning that this term introduces an optional, preferential feature. The expression is not to be understood as "namely".

A "cleaning method" is a method of cleaning at least one surface or component of a surface of a motor vehicle, in which impurities are to be reduced or removed. Preferably, the cleaning method is carried out automatically or semi-automatically, whereby the driver of the motor vehicle can preferably select a cleaning mode in an automatic cleaning method and, if necessary, is requested to replenish resources required for the cleaning method.

In particular, a cleaning procedure may be carried out and/or started manually, in particular by the driver of a motor vehicle.

Particularly preferred, it is also conceivable that the cleaning method may be carried out automatically during the operation of the vehicle and/or outside the operating time of the vehicle in order to clean at least one component of a surface of the vehicle and may therefore run autonomously, apart from replenishing any resources required.

Cleaning is understood as the use of cleaning means for cleaning such as water, air, detergent and/or a wiping element and/or a mechanical cleaning element and/or a vibration-based cleaning element and/or an ultrasonic-based cleaning element to clean a surface. In particular, cleaning does not mean achieving an absolutely clean surface, but the use of cleaning means to reduce the contamination of a surface.

A "cleaning fluid" is any fluid that can be used as a cleaning means, preferably water, air, a cleaning agent or the like.

A cleaning method preferentially uses one or more "cleaning processes", whereby a cleaning process concerns the cleaning of one surface. Each cleaning process exhibits a "cleaning period" in which at least one cleaning means is brought into operative connection with the corresponding surface, whereby a cleaning period exhibits a "start time" and an "end time".

Among other things, an end time of a cleaning process should also be understood as the end time of a valuation phase of a cleaning process, in particular in the case in which a valuation of the cleaning process is also carried out during the execution of a cleaning process, the point of valuation and the cleaning process have a common start time but any deviating end times, preferably the end time of the valuation period ends before the end time of the cleaning process. In any case, the term end time refers to the end time of a cleaning process and/or the end time of an evaluation process of the cleaning process, depending on the question under consideration.

Among other things, it should be specifically considered that a single cleaning process leads to several data sets in the context of the evaluation of the cleaning process, whereby the different data sets preferably differ only by the end time of the evaluation of the cleaning process.

A "surface" is a surface element of a motor vehicle. A preferred term for a surface is a windshield and/or a rear window and/or a side window of a motor vehicle. Furthermore, a surface is preferably understood as a surface element behind which a sensor is arranged. Another preferred term for a surface is a part of the surface of a motor vehicle, which is visible from the outside, in particular also including a hidden surface such as a part of a wheel arch liner in a wheel arch of a motor vehicle.

A surface can also be understood as a surface element which is located inside a motor vehicle, preferably in the interior of the motor vehicle and/or in the engine compartment of the motor vehicle.

A "vehicle" or "motor vehicle" is understood as a self-propelled vehicle, commonly wheeled, that does not operate on rails and is used for the transportation of people or cargo.

Preferably, a motor vehicle propulsion is provided by an engine or motor, usually an internal combustion engine or an electric motor, or some combination of the two, such as hybrid electric vehicles and plug-in hybrids.

A "cleaning system" is a system that provides all the structural elements required for the cleaning method and therefore also for the physical cleaning process.

The cleaning system preferably comprises a cleaning fluid distribution system and other electrical and/or electronic components.

A "cleaning fluid distribution system" means a system designed to provide a cleaning fluid on a surface of a motor vehicle to be cleaned.
Preferably, a cleaning fluid distribution system exhibits at least one "cleaning fluid line" which is adapted to convey a cleaning fluid, in particular from a pump and/or a cleaning fluid reservoir to a nozzle.

A "nozzle" is a device through which the cleaning fluid can leave the cleaning system and which is designed to bring the cleaning fluid into an interaction, preferably an operative connection, with the surface to be cleaned.

Preferably the nozzle is a device designed to control the direction or characteristics of the cleaning fluid as it exits the cleaning fluid distribution system.

Preferably, the nozzle exhibits an actuating means which is designed to influence the direction in which the cleaning fluid leaves the cleaning fluid distribution system.

Preferably, the nozzle exhibits a second actuating means which is designed to influence the characteristic with which the cleaning fluid leaves the cleaning fluid distribution system, preferably the speed of the cleaning fluid.

Preferably a cleaning fluid distribution system is equipped with an "electric pump", which is designed to pump a cleaning fluid.

A cleaning fluid distribution system comprises a "cleaning fluid reservoir" which is designed to store a cleaning fluid in the motor vehicle. The electric pump is preferably integrated into the cleaning fluid reservoir.

The electric pump is preferably connected to the cleaning fluid reservoir and the nozzle, preferably by means of a "cleaning fluid line", which is designed to guide the cleaning fluid.

The electronic components of a cleaning system could preferably include an electronic control unit and/or a data processing system. It is also possible that the data processing system is integrated into the electronic control unit.

An "electronic control unit" (ECU) is any embedded system in automotive electronics that controls one or more of the electrical systems or subsystems in a vehicle.

The electronic control unit is preferably set up to carry out the cleaning method, particularly preferably a cleaning method according to the first aspect of the invention, and/or to carry out a method for indirectly deriving a systematic dependence, preferably a systematic dependence for a system behaviour of a cleaning system of a motor vehicle, particularly preferably for a system behaviour of a cleaning process of a surface of the motor vehicle, particularly preferably a method for indirectly deriving a systematic dependence according to the second aspect of the invention, and/or to carry out a method for indirectly deriving a systematic dependence for a system behaviour of a system component of a cleaning system of a motor vehicle, particularly preferably a method for indirectly deriving a systematic dependence according to the fifth aspect of the invention, and/or to carry out a method for indirectly deriving a systematic dependence for a system behaviour of a soiling process of a surface of a motor vehicle, particularly preferably a method for indirectly deriving a systematic dependence according to the ninth aspect of the invention, and/or to carry out a method for optimizing a resource requirement for a cleaning process of a surface of a motor vehicle, particularly preferably a method for optimizing a resource requirement according to a first and/or second alternative of the third aspect of the invention, and/or to carry out a method for determining a cleaning strategy for cleaning a surface to be cleaned of a motor vehicle, particularly preferably a method for determining a cleaning strategy according to the fourth aspect of the invention, and/or to carry out a method for diagnosing a deviation between an actual system behaviour and an expected system behaviour of a system component of a cleaning system of a motor vehicle, particularly preferably a method for diagnosing a deviation between an actual system behaviour and an expected system behaviour according to a sixth aspect of the invention, and/or to carry out a method for selecting a resolution strategy, particularly preferably a method for selecting a resolution strategy according to the seventh aspect of the invention, and/or to use a selected resolution strategy, particularly preferably to use a selected resolution strategy according to the eighth aspect of the invention, and/or to use a dependency table and/or a systematic dependence to determine an expected availability at a distance or an operating time of the motor vehicle yet to be covered, particularly preferably to use a dependency table and/or a systematic dependence according to the tenth aspect of the invention, and/or to use a dependency table and/or a systematic dependence to determine an expected distance or an operating time of the motor vehicle yet to be covered when reaching a threshold of availability, particularly preferably to use a dependency table and/or a systematic dependence according to the eleventh aspect of the invention, and/or to use a dependency table and/or a systematic dependence for optimizing a resource requirement for a cleaning process of a surface of a motor vehicle, particularly preferably to use a dependency table and/or a systematic dependence according to the twelfth aspect of the invention, and/or to use a dependency table and/or a systematic dependence to determine a cleaning strategy for cleaning a surface to be cleaned of a motor vehicle, particularly preferably to use a dependency table and/or a systematic dependence according to the thirteenth aspect of the invention, and/or to use a dependency table and/or a systematic dependence to determine a necessary expected gain in availability, particularly preferably to use a dependency table and/or a systematic dependence according to the fourteenth aspect of the invention, and/or to use a systematic dependence derived by a method for indirectly deriving a systematic dependence for a resource efficient cleaning of at least one surface of a motor vehicle, particularly preferably to use a systematic dependence according to the fifteenth aspect of the invention, and/or to use a control quantity setpoint derived by a method for optimizing a resource requirement for a cleaning process of a surface of a motor vehicle for a resource efficient cleaning of at least one surface of a motor vehicle, particularly preferably to use a control quantity setpoint according to the fifteenth aspect of the invention, and/or to use a cleaning strategy derived by a method for determining a cleaning strategy for cleaning a surface to be cleaned of a motor vehicle, for a resource efficient cleaning of at least one surface of a motor vehicle, particularly preferably to use a cleaning strategy according to the fifteenth aspect of the invention, and/or to be part of a cleaning system according to the sixteenth aspect of the invention, and/or to be part of a motor vehicle according to the seventeenth aspect of the invention, described here.

Furthermore, the electronic control unit is preferably equipped with all structural electronic elements required for the execution of the cleaning method presented here, preferably the cleaning method according to the first aspect of the invention.

Particularly preferred, the electronic control unit comprises a data processing system.

A "data processing system" is a combination of electronic components and electronic processes that for a set of inputs produces a defined set of outputs. The inputs and outputs are interpreted as data.

Preferably, a data processing system is a system that enables the organized handling of data volumes with the aim of obtaining information about these data volumes and/or changing these data volumes.

Preferably, a data processing system exhibits a "data acquisition system".

A "sensor" or "detector" is a technical component which can qualitatively or as a "measured quantity" quantitatively measure certain physical or chemical properties and/or the material composition of its environment. These quantities are measured by means of physical or chemical effects and converted into an analogue or digital electrical signal.

Preferably a sensor exhibits an electronic data processing unit, which is equipped to process the quantity detected by the sensor, in particular to a quantity derived from the original measured quantity.

Specifically, it should be considered that such a data processing unit can determine the state of contamination of a surface operatively connected to the sensor, preferably it should be able to determine the availability of a sensor, and/or the intensity of rain and/or the intensity of snowfall and/or the intensity of condensation and/or the intensity of hail on the basis of a measured quantity detected by a sensor.

Preferably such an electronic data processing unit forms a unit with the sensor or is part of an electronic control unit of a motor vehicle.

A data processing unit of this type is preferably set up to process the quantities recorded by several sensors.

The current value of the measured quantity is an "actual or current measured quantity value" and/or a "current or actual measured quantity value".

In particular, a sensor is also to be understood as a virtual sensor. A "virtual sensor" maps the data of one or more recorded measured quantities with an imaging function to a certain physical or chemical property and/or the material composition of the environment qualitatively or quantitatively. A sensor can therefore be both a physical sensor or a virtual sensor, which qualitatively or quantitatively records a quantity and/or a condition of the surrounding environment. In other words, a virtual sensor determines a quantity, in particular a measured quantity, a control quantity or a process quantity, by means of a mathematical prescription.

Preferably, a sensor is understood as an optical sensor.

Preferably, an optical sensor is understood as a camera and/or a lidar and/or a radar and or an ultrasonic sensor.

An optical sensor can preferably determine a brightness level, or in other words a light intensity level.

In particular, it should be considered that by evaluating a light intensity level, an availability of the sensor can be determined, preferably in comparison with a light intensity level of a second sensor whose field of view overlaps the field of view of the sensor.

In particular, a sensor also includes a temperature sensor, a pressure sensor, a voltage sensor, a current consumption sensor, a radar sensor, an ultrasonic sensor, a flow rate sensor and the like.

A "measured value" is the current or in other words actual value of a "measured quantity". A "measured quantity setpoint" is the default value for a measured quantity. Preferably, a measured quantity is any quantity that can be measured or otherwise determined in such a way that the measured value of the measured quantity can be further processed electronically. In particular, a measured quantity is understood to be a control quantity, a process quantity or a quantity that describes the availability of a sensor.

Preferably a measured quantity is a vehicle speed.

Preferably, the measured value of a measured quantity can be determined experimentally and/or numerically. In the case of an experimental investigation of the measured value of a measured quantity, an experimental investigation of an entire motor vehicle, preferably in the laboratory or during regular motor vehicle operation, or of a module or a component within the framework of a module test bench, could be considered. In a numerical investigation the measured value of a measured quantity, numerical analysis within the framework of a physical model and/or a numerical simulation should be considered, whereby the entire vehicle or a module or component can also be considered separately.

A measured quantity can also be understood as a quantity that represents data, whereby this is also referred to as a "data representing measured quantity". Data are preferably retrievable data, preferably wirelessly available data, preferably the weather in the vicinity and/or on the planned route and/or the current coordinate or actual coordinate of the motor vehicle. Furthermore, it is preferable to consider data as a sensor type, a vehicle type, a date of the last inspection of a sensor and/or the cleaning system and/or the vehicle and/or the like.

Measured value, measured quantity and measured quantity setpoint are not to be understood as purely scalar quantities or values but whenever this appears technically reasonable, a measured value, a measured quantity and a measured quantity setpoint should be understood as a vectorial quantity with a plurality of values for the respective dimensions of the vectorial quantity.

A "vehicle type" is the concrete configuration of a vehicle. In particular, a vehicle type provides information about which surfaces a vehicle exhibits, how these surfaces are shaped, and which sensor is hidden behind which surface.

A "process value" is the current value of a "process quantity". A "process quantity setpoint" is the default value for a "process quantity". Preferably, a process quantity is to be understood as a quantity which is suitable to influence the cleaning process and the cleaning result, but which cannot itself be influenced.

Preferably, a process quantity and/or a process quantity setpoint and/or a process value is not a purely scalar quantity or value, but rather a vectorial quantity with a plurality of values for the respective dimensions of the vectorial quantity.

Preferably a process quantity is a vehicle speed.

Preferably a process quantity is a system related process quantity, which relates to the behaviour of the system, preferably the behaviour of the cleaning system, which is preferably described by a systematic dependence. In other words, a system related process quantity has a dependence on a control quantity of the system.

Preferably a process quantity is an environmental process quantity, which relates to the surrounding environment, preferably the environment surrounding the motor vehicle. Examples for an environmental process quantity are ambient temperature in the vicinity of the motor vehicle, humidity in the vicinity of the motor vehicle, air pressure in the vicinity of the motor vehicle, a current amount of rain and/or snowfall, etc.

Among others, a process quantity is understood as an ambient temperature in the vicinity of the motor vehicle and/or a humidity in the vicinity of the motor vehicle and/or an actual solar radiation and/or a surface temperature of the surface to be cleaned.

A process quantity is preferably a quantity that occurs in a cleaning system or around the cleaning system and that can be influenced at least indirectly by an input quantity.

Preferably, a process quantity is an electric current, a power consumption, a flow pressure, a time of operation, a fill level signal, a reaction time, a sensing time, a signal of a leaking through sensor, a signal of a flow gauge, a number of actuations, a spray pattern, a heat monitoring signal, a signal of a debris sensor, a signal of a check valve, a signal of a drip sensor, a signal of a distance sensor and/or a signal of a force sensor.

A "control quantity setpoint" is the default value for an actuator which is set up to adjust a "control quantity". The current value of the control quantity is an "actual control quantity value".

Preferably, a control quantity is to be understood as a quantity which is suitable to influence the cleaning process and the cleaning result, and which is adjusted to control the cleaning method and/or the cleaning process, preferably which is controlled to influence the cleaning method and/or the cleaning process.

Preferably, a control quantity and/or a control quantity setpoint and/or a control value is not a purely scalar quantity or value, but rather a vectorial quantity with a plurality of values for the respective dimensions of the vectorial quantity.

Preferably and in case of a control system, a control quantity setpoint is understood as a default value for an actuator which is set up to adjust a control quantity.

Among others, a control quantity is understood as a type of cleaning fluid, in particular water and/or air, and/or a type of cleaning agent and/or a proportion of cleaning agent in the cleaning fluid and/or a temperature of the cleaning fluid and/or a pressure of the cleaning fluid when leaving the nozzle and/or a flow rate of the cleaning fluid and/or a duration of the cleaning process and/or the number of cycles of a cleaning process and/or a current consumption of the fluid pump and/or the voltage of the fluid pump.

Particularly preferred, a control of the control quantity is to pursue an objective, preferably the objective of resource-efficient, preferably resource-saving, cleaning of at least one surface of a motor vehicle.

Preferably, the control of a control quantity pursues a multi-criteria objective, whereby a paretooptimal goal achievement is aimed at, preferably a resource-efficient, particularly preferably resource-saving, cleaning of at least one surface of a motor vehicle at one or more boundary conditions.

An "availability" of a technical system is a measure of the extent to which a system can fulfil its task.

According to a conceivable variant, an availability specifies whether a system can fulfill its task or not by means of two acceptable states.

Preferably a surface in the first state is not too dirty and in the second state too dirty than the surface from the point of view of a sensor and/or from the point of view of the driver of the motor vehicle fulfils its task or not.

According to a preferred variant, an availability also specifies the characteristic value according to which a system can fulfill its task.

Particularly preferred, availability can assume values in a range exhibiting an interval, whereby one interval limit on reaching means that the system can fully fulfill its requirements, and the other interval limit on reaching means that the system can no longer fulfill its requirements.

If the availability value ranges between the interval limits, the system can still fulfill its requirements, but under more difficult conditions. In particular, the value of availability reflects the degree of contamination of the surface of the motor vehicle, preferably the degree of contamination of the surface, preferably the surface of a sensor, particularly preferably the degree of contamination of the surface of an optical sensor and/or the driver of the motor vehicle.

Since, as a rule, it can be assumed that the degree of contamination of a surface increases with the operating time of a motor vehicle until cleaning, the availability, if reproduced within an interval, can preferably be interpreted as a measure of how long the technical system, preferably the sensor, has already fulfilled its requirements and/or how long the technical system, preferably the sensor, can still fulfill its requirements, at least in part, until it must be cleaned in order to be able to fulfill its requirements again.

Availability may also preferably have values outside these interval limits. An availability that is higher than the value of the interval limit above which the associated sensor can fully fulfill its requirements indicates that the sensor can fully fulfill its requirements. An availability that is smaller than the value of the interval limit from which the associated sensor can no longer fulfill its requirements indicates that the sensor can no longer fulfill its requirements. In other words, the surface in an operative connection with the sensor must then be cleaned by means of a cleaning process so that the availability can increase again, especially to a value at which the sensor can fulfill at least part of its original tasks again, wherein the surface can also be cleaned by a passive cleaning process, such as rain and/or snowfall.

It is expressly pointed out that the availability of a surface should be understood to mean both the availability of a surface for the not too severely impaired operation of a sensor and the availability of a surface, preferably the degree of purity of a surface, in particular of a windscreen and/or of a rear window and/or of the like, for a not too severely restricted view of the driver of the motor vehicle.

An "actual availability" or in other words current availability is the availability that prevails at the current time.

An "expected availability" is to be understood as an estimated availability, preferably at a certain distance yet to be covered and/or a certain operating time of the vehicle still to be run through.

An expected availability can preferably be determined with an estimation procedure, preferably according to the tenth aspect of the invention, on the basis of the current and/or planned conditions, in particular the operating conditions of the motor vehicle, whereby the expected availability represents the availability at a still to be passed point of the travel route of the motor vehicle.

A "threshold of availability" is to be understood as a threshold value of an availability. Preferably, the attainment of a threshold of availability requires that the surface, which is in an operative connection to the sensor whose availability is considered here, should be cleaned.

An "expected gain in availability" is the estimated gain in the availability of a sensor if the surface operatively connected to the corresponding sensor is cleaned, preferably with a defined cleaning process, especially preferably with a cleaning process defined by a control quantity setpoint.

An expected gain in availability or in other words a necessary expected gain in availability can preferably be derived according to the fourteenth aspect of the invention.

Depending on the situation, a "change of availability" can be understood as a "gain in availability" and a "loss of availability". In any case, a change of availability is to be understood as a change in the availability of a sensor that is operatively connected to a surface.

A "resource" is a source or supply from which a benefit is produced and it has some utility.

Preferably, a resource is understood here as something that can be used to clean the surface of a vehicle. Specifically, a cleaning fluid and/or a cleaning agent and/or energy and/or a wiping element, preferably a wiping element that can be replaced as required, should be considered here.

A "resource requirement" is to be understood as the need for a resource that is required for a cleaning process, in particular for a cleaning process with a defined control quantity setpoint.

"Resource efficient cleaning" means that the cleaning of the surface to be cleaned is optimised in such a way that the ratio of cleaning benefit to cleaning effort is taken into account. In other words, a resource efficient cleaning method requires that a control quantity for a cleaning process is selected according to the fact that maximum cleaning success can be achieved with minimum effort.

A control quantity setpoint for resource efficient cleaning can preferably be derived by a method for optimizing a resource requirement for a cleaning process of a motor vehicle, preferably by a method according to the third aspect of the invention.

A "resource-saving cleaning" is understood to mean that the cleaning of the surface to be cleaned is optimised in accordance with the overriding cleaning objective to be achieved, preferably a cleaning objective can lie in the fact that a defined quantity of safety functions of a motor vehicle does not fail due to contamination of a surface, in particular not due to contamination of a sensor surface, or due to contamination-induced impairment of a sensor function. A preferred cleaning objective may also be that an autonomy level of a motor vehicle does not have to be abandoned due to contamination of a surface, in particular due to contamination of a sensor surface, or due to contamination-induced impairment of a sensor function.

A cleaning strategy for resource-saving cleaning can preferably be derived by a method for determining a cleaning strategy for cleaning a surface to be cleaned of a motor vehicle, preferably by a method according to the fourth aspect of the invention.

"Control" is understood as the monitoring and possible adjustment of an input quantity in order to achieve an objective, whereby an adjustment of an input quantity occurs in particular in response to the occurrence of a disturbance quantity.

A "disturbance quantity" is an output quantity whose output quantity value deviates from the desired output quantity value.

Preferably, a disturbance quantity is an availability.

Preferably, control means the specification of a control quantity setpoint to achieve a specific objective, in particular to carry out a cleaning method for a resource efficient cleaning, preferably resource-saving cleaning, of at least one surface of a motor vehicle.

Preferably, control is understood as executing a cleaning method, preferably a cleaning method according to the first aspect of the invention.

The term "regulate" refers to an automated interaction between the continuous acquisition of a measured quantity and the control of a system depending on a specification for the measured quantity. In particular, a continuous comparison of the measured quantity and the specification for the measured quantity takes place.

An "operating condition" of a motor vehicle is the condition of the current use of the motor vehicle.

An active operating condition is preferably understood to mean that the motor vehicle is being used to achieve a goal by means of active operation of the motor vehicle, preferably to cover a distance between a starting point and a planned end point.

Preferably, passive operation means that the motor vehicle is currently parked.

A "system" is understood as an entity of connected elements that form a common whole through relationship, connection, interrelation and/or interaction.

A "system behaviour" is understood as an observable change of a state or a value of a quantity of a state of a system. Preferably, such an observable change of a state or a value of state quantity of the system takes place as a function of a change of a value of an input quantity.

A "dependence", in particular a "systematic dependence", describes the relationship of the dependence of one thing on another, preferably the dependence between of an output quantity of a system on an input quantity of the system. By varying one thing, a causal variation of the other can be achieved. A functional dependence in the mathematical sense is not necessary in this context of a systematic dependence, but possible.

Preferably a systematic dependence is understood as a description, preferably a mathematical description, of the system behaviour of a system, preferably a description of the system behaviour of a cleaning system.

It should be expressly pointed out that a systematic dependence should not only be understood as a dependency between purely scalar values of an input quantity and purely scalar values of an output quantity, but if applicable also as a multidimensional dependency between the corresponding number of input quantities considered for the systematic dependence with the respective associated values and the output quantities dependent on them with the respective associated values.

A "dependency table" is understood as a list of individual experiences regarding the system behavior, preferably the system behavior of the cleaning system, in the form of data sets, wherein each data set exhibits at least one input quantity, preferably an input quantity of the cleaning system, and at least one output quantity, preferably an output quantity of the cleaning system, stored in an ordered manner with reference to one another.

Preferably the experiences about the system behaviour are based on single documented cleaning processes, which have been collected preferably under laboratory conditions and/or on the real motor vehicle and/or during the real motor vehicle operation and/or on the basis of a numerical model, which shall represent the considered system behaviour.

Among other things, a dependency table can thus be advantageous for already documented experiences to be applied again at a later point in time, in particular by selecting an associated input quantity from the list of data sets within the dependency table depending on an output quantity to be achieved.

In other words, a dependency table makes it possible on the one hand that the experience values stored there can always be retrieved and processed again, especially for the control of a cleaning process, whereby the input quantities from the dependency table are used to control a cleaning process at least if technically sensible and possible in the sense of a control quantity setpoint.

On the other hand, the data sets contained in a dependency table can be used as data points for the derivation of a systematic dependence, especially according to a second and/or fifth and/or ninth aspect of the invention.

An "input quantity" is defined as a quantity with the help of which a targeted intervention in the control or regulating system of a system, preferably a cleaning system, takes place. Its instantaneous value is an "input quantity value".

Preferably an input quantity is not to be understood as a purely scalar quantity or value but whenever this appears technically reasonable, an input quantity value and an input quantity should be understood as a vectorial input quantity with a plurality of values for the respective dimensions of the vectorial input quantity.

Preferred is an input quantity a control quantity and/or a data representing measured quantity, particularly preferred the weather in the vicinity and/or on the planned route and/or the current coordinate of the motor vehicle.

Preferably, in the case of a control system, an input variable is measured by a numerical sensor in such a way that the measured variable corresponds to the default value of the control system.

Preferably, the input quantity contains further data, in particular data that provide information about the current position of the motor vehicle and/or the planned route of the motor vehicle and/or the covered route of the motor vehicle and/or the expected weather, in particular the local weather at the respective locations of the pre-planned route of the motor vehicle, in particular, humidity and/or solar radiation and/or temperature and/or rainfall and/or snowfall.

Preferably a value of an input quantity can be understood as a pressure of a cleaning fluid.

Preferably, an input quantity value can be understood as a temperature of a cleaning fluid.

Preferably, an input quantity value can be understood as a mixture of a cleaning fluid, in particular the quantity of one or more additives.

Preferably, the value of an input quantity can be understood to include, but is not limited to, a characteristic of a spray pattern, especially an oscillating spray pattern and/or a continuous spray pattern and/or a pulse-spray pattern and/or an alignment of spray or spray pattern to the surface to be cleaned.

An "output quantity" is a quantity resulting from a system, especially a cleaning system. Its instantaneous value is an "output quantity value".

Preferably, an output quantity is not to be understood as a purely scalar quantity or value but whenever this appears technically reasonable, an output quantity value and an output quantity should be understood as a vectorial output quantity with a plurality of values for the respective dimensions of the vectorial output quantity.

Preferably, the value of the output quantity depends on the reaction of a system to an input quantity. The reaction of the system to an input quantity is determined by the system behaviour and can be described by the systematic dependence of the system.

Preferred is an output quantity a system related process quantity and/or a resource requirement of a cleaning process and/or an availability, preferably the availability of a surface of a sensor and/or the availability of a surface, preferably the degree of purity of a surface, in particular of a windscreen and/or of a rear window and/or of the like.

A "data acquisition system" is used to record physical quantities. Depending on the sensor used, it may preferably have an analog-to-digital converter and a measured quantity memory or data memory. The data acquisition system can preferably be set up to acquire several measured variables at the same time.

An "electronic data processing and evaluation unit" is an electronic unit that deals with data volumes in an organised manner, with the aim of obtaining information about or modifying such data volumes. Preferably, the data is recorded in data sets, processed by man or machine according to a specified procedure and output as a result.

A "database" is a system for electronic data management. A preferred task of the database is to store large amounts of data efficiently, consistently and permanently and to provide required subsets of the stored data in different, demand-oriented representation types for users and application programs.

Preferably, a database contains a dependency table.

Preferably, a database contains a systematic dependence.

Preferably, a database can be local or decentralized, especially in a data cloud.

Preferably, a remotely managed database can be accessed via wireless data transfer so that data can be received from the remotely managed database and data can be transferred to a remotely managed database.

Preferably, a database exhibits functions with which the database can manage itself.

Preferably a database is part of a working memory of an electronic data processing and evaluation unit.

Among other things, it is conceivable that a database will delete a previously existing data set when a new data set is entered, in particular using a dependency table. Preference could be given to deleting the data set that exhibits the greatest Euclidean distance to a statistical mean of the other data sets. Preference could be given to deleting the data set that shows the greatest deviation from a systematic dependence between the data.

A "data set" is understood as a group of continuously connected data fields, whereby a data field preferably exhibits the value of an input quantity and/or the value of an output quantity.

Preferably, a data set exhibits the first and the second parameter of a method according to the second aspect and/or the fifth aspect and/or the ninth aspect of the invention.

An "algorithm" is an unambiguous instruction to solve a problem or a class of problems. Preferably, the algorithm consists of a finite number of defined individual steps. Thus, the individual steps can be implemented in a computer program for execution, but can also be formulated in human language. Preferably an algorithm supports a problem solution, because a certain input, preferably an input of data sets, can be converted into a certain output by means of an algorithm.

A "curve" is understood as a two-dimensional, three-dimensional or multidimensional relationship between variables. Preferably the systematic dependence can be in the form of an (n+i)-dimensional curve of m-th order, taking account for an n-dimensional input quantity and an i-dimensional output quantity.

Preferably, a curve is the image of a continuous function from an interval to a topological space.

A "coefficient of determination" is understood as the proportion of the variance in the dependent variable that is predictable from the independent variable.

Preferably, the coefficient of determination provides a measure of how well observed outcomes are replicated by the model, based on the proportion of total variation of outcomes explained by the model.

A "regression analysis" is understood as a set of statistical processes for estimating the relationships among variables. It includes many techniques for modeling and analyzing several variables, when the focus is on the relationship between a dependent variable and one or more independent variables. Preferably, regression analysis helps one understand how the typical value of the dependent variable changes when any one of the independent variables is varied, while the other independent variables are held fixed.

Preferably, regression analysis is understood as one of the following analytical models: linear regression, simple regression, polynomial regression, generalized linear model, binomial regression or nonlinear regression or the like.

An "optimization process" is understood as maximizing or minimizing a function by systematically choosing input values from within an allowed set and computing the value of the function.

A "self-learning optimization method" is a class of algorithms that can also be classified under the generic term "machine learning". A corresponding algorithm is characterized by the fact that it learns on the one hand from examples and on the other hand can generalize the learned knowledge. Thus such an algorithm generates knowledge from experience.

"Optimization" means any process aimed at finding an optimal value, in particular the optimal value of an input quantity, by maximizing the degree of achievement of a goal, in particular by minimizing or maximizing a corresponding objective function and/or by selecting the value of an input quantity that is known to enable or indicate the best achievement of the goal.

In particular, it should be expressly noted that optimization does not necessarily imply that the exact optimal value of an input quantity is found.

A "distance" is understood as the distance between two points which has been or will be covered by the motor vehicle or which is planned to be covered.

Preferably, the distance is the shortest distance between two points that can be covered by a motor vehicle.

Preferably, the distance is the fastest connection of two points that can be covered by a motor vehicle.

Preferably, the route planning which establishes a distance is carried out with the help of a navigation system.

An actual availability can be "sufficient to bridge a distance to the next cleaning process" if it can be used to cover an upcoming or planned distance before the next cleaning process without falling below a predefined threshold of availability. In other words, the available availability in this case is in all probability sufficient so that the planned distance can be covered to the next cleaning process with the motor vehicle without losing the functionality of a sensor linked to the corresponding available area.

An "expected distance of the motor vehicle to be covered when reaching a threshold of availability" is the expected distance that can be covered by the motor vehicle until a predefined threshold of availability is reached.

An "operating time" is the duration of a period of use of the motor vehicle which has already elapsed or is pending or planned.

An actual availability can be "sufficient to bridge an operating time to the next cleaning process" if it can be used to cover an operating time pending or planned before the next cleaning process without falling below a predefined threshold of availability. In other words, the availability available in this case is in all probability sufficient so that the planned operating time can be covered by the motor vehicle until the next cleaning process without losing the functionality of a sensor linked to the corresponding available area.

An "expected operating time of the motor vehicle to be covered when reaching a threshold of availability" is the expected operating time that can be covered by the motor vehicle until a predefined threshold of availability is reached.

A "coordinate" is a geographical position of a motor vehicle on earth, which can be an already passed coordinate, an actual or current coordinate or a coordinate on a planned route.

Preferably, a coordinate can also be understood as the course of a coordinate on an already completed or planned route.

A "cleaning strategy" is a plan of how a cleaning system will behave in every conceivable situation. The cleaning strategy therefore completely describes the behaviour of the cleaning system.

Preferably, the cleaning strategy contains when and with what intensity which surface is to be cleaned.

Preferably a cleaning strategy exhibits a control quantity setpoint for each selected sensor.

Preferably a cleaning strategy depends on one or more influencing factors, especially on the actual availability of a sensor.

A "cleaning mode" or also "actual cleaning mode" is a mode of operation of the cleaning system. By selecting a cleaning mode, the manufacturer of a motor vehicle and/or the driver can influence which driver assistance system should not fail due to contamination of a sensor, whereby a selected cleaning mode can also include that no cleaning should take place. This can directly influence the availability of a driver assistance system.

Since a cleaning mode determines whether a driver assistance system or how many driver assistance systems are to be protected against failure due to excessive soiling by cleaning measures, the selection of a cleaning mode also determines the number of "selected sensors" for which a threshold of availability should not be undershot, so that the "selected sensor" can also be indirectly influenced.

Thus a selected cleaning mode also determines the resource consumption of a cleaning system or in other words the expected remaining range of the motor vehicle with the available cleaning resources.

Preferably, there can be one or more cleaning modes, whereby one or more cleaning modes can be selected at the same time.

Preferably a first cleaning mode has the meaning "fully autonomous motor vehicle operation", which means that the cleaning system takes all necessary cleaning measures to ensure that an autonomous operation of the motor vehicle does not fail due to a contamination of a sensor of the motor vehicle.

Preferably a second cleaning mode has the meaning "comfortable motor vehicle operation" which means that the cleaning system takes all necessary cleaning measures in order not to let a comfortable operation of the motor vehicle fail due to a contamination of a sensor of the motor vehicle. This includes, among other things, that the cleaning system maintains the functionality of the driver assistance systems distance maintenance, lane keeping, parking assistant, parking assistant and/or trailer assistant by means of all necessary cleaning measures.

Preferably a third cleaning mode has the meaning "motor vehicle operation which is as safe as possible" which means that the cleaning system takes all necessary cleaning measures to ensure that the safe operation of the motor vehicle does not fail due to contamination of a sensor of the motor vehicle. This includes, among other things, that the cleaning system maintains the functionality of the driver assistance systems pedestrian recognition and/or road user recognition by means of all necessary cleaning measures.

Preferably a fourth cleaning mode has the meaning "best possible range" which means that the cleaning system only takes those cleaning measures which are prescribed by law for the operation of the motor vehicle.

The cleaning mode "best possible range" is preferably used to achieve the best possible range of the motor vehicle with the available cleaning resources.

A "system component" is understood as any component of a cleaning system. It should be expressly pointed out that a system component can be understood as a complete cleaning system as well as a single assembly of the cleaning system and a single component of the cleaning system.

In particular, the term system component is used in the context of a diagnosis of a cleaning system. Since every physical component of the cleaning system can also be diagnosed by means of at least one diagnostic means, the term system component refers in particular to the component or assembly or the cleaning system which is the object of an observation and/or analysis related to the diagnosis.

An "electric current" can flow in an electric circuit under certain conditions. Furthermore, an electrical circuit can have a consumer, in particular a consumer that enables a useful application, preferably in the form of a system component. A consumer can have a "power consumption", which stands for the demand of energy by the consumer.

A consumer, which enables an electrical application, needs energy to do its work. In concrete terms, it is conceivable that a consumer may have varying power consumption for the same work performed. The reason for this can be different operating conditions, in particular a different ambient temperature, and/or ageing effects of the consumer.

Preferably, an electrical current signal indicates information about an electrical flux, an electrical transients, electrical noise, electrical noise and the like.

A "fluid pressure" is the pressure in a fluid, in particular in a cleaning fluid, whereby the fluid pressure is composed of a static and a dynamic component. A local fluid pressure can be measured locally, especially with a pressure sensor.

A "time of operation" is the individual operating time of a system component.

A "fill level signal" is understood as information that directly describes the value of a filling level in a storage container and indirectly the quantity of a substance stored.

A "reaction time" is generally understood to be a period of time between action and reaction, in particular the time between a measure and an effect of the measure.

A "sensing time" is the time in which a change in a signal can be perceived, in particular the time between the start of a change in the level of a storage tank and the end of a change in the level of a storage tank.

A "signal of a flow gauge" is a piece of information provided by a flow gauge that provides information about the amount of liquid flowing through a channel in a given unit of time, in particular the amount of cleaning liquid flowing through the channel.

A "signal of a leaking through sensor" is information provided by a leaking through sensor that provides information about the presence of a leak and/or the quantity of a leak liquid flow. In particular, a leaking through sensor could include a sensor attached to a coupling of two fluid channels.

The "number of actuations" is the number of uses of a system component. In particular, the number of pumping operations already carried out with a pump or the number of heating operations already carried out with a heater could be taken into account.

A "spray pattern" is a pattern that a cleaning fluid leaves on the surface to be cleaned after leaving a wash nozzle.

A "heat monitoring signal" is understood as information provided by a heat monitoring system that provides information about the temperature of a surface and/or the heat flow over a surface.

A "signal of a debris sensor" is understood as information provided by a debris sensor that provides information about the quantity and/or type of foreign bodies in a cleaning system.

A "signal of a check valve" is understood as a piece of information provided by a check valve that indicates the position of a check valve.

A "signal of a drip sensor" is understood as information provided by a drip sensor that indicates the presence of a liquid and/or the amount of a liquid and/or the rain intensity and/or the snow intensity.

A "signal of a distance sensor" is understood as information provided by a distance sensor that indicates the distance between the sensor and an object detected by the sensor.

A "signal of a force sensor" is understood as information provided by a force sensor that indicates the presence and/or magnitude of an existing force.

An "actual system behaviour" is an observable system behaviour of a system component of a cleaning system for a motor vehicle. Preferably the actual system behaviour can be monitored and/or determined by means of a measuring system. Preferably the actual system behaviour can be described by an actual output quantity, which is preferably determined by the measuring system, preferably by sensors.

It should be expressly pointed out that an actual output quantity can be understood as a scalar and a vector quantity. If the actual output quantity has only one parameter, it is a scalar quantity. If the actual output quantity has several parameters, in particular a course of a parameter over time, the actual output quantity is a vector quantity.

Preferably, an actual output quantity is designed to describe the system behaviour of a system component, preferably with all parameters that are relevant for the characterization of the system behaviour.

An expected system behaviour is the system behaviour of a system component of a cleaning system for a motor vehicle, which is expected on the basis of empirical values. Analogous to the actual system behaviour and the actual output quantity, the expected system behaviour can be described with an "expected output quantity".

It should be explicitly pointed out that the expected output quantity can also be a scalar or vector quantity analogous to the actual output quantity.

A "deviation" is the difference between an expected output quantity and an actual output quantity. Thus the deviation can also be a scalar or vector quantity. Preferably the deviation exhibits the dimensionality of the actual output quantity.

In particular, a deviation can exhibit a system-typical measurement error. In particular, this system-typical measurement error can vary in size according to any dimension of the deviation, whereby the size of the measurement error can depend in particular on the measurement system used to determine the output quantity.

If the deviation is in the range of the specified measurement error, a numerical deviation is present, but in this case the actual system behaviour preferably does not deviate from the expected system behaviour.

The system behaviour of a system component of a cleaning system for a motor vehicle can be subject to a measurement error and further fluctuations and/or deviations which may lie within an expected range. These expected uncritical deviations and/or fluctuations can be different for each dimension of the output quantity.

A "temporal course", in particular a temporal course of a deviation, is a data series as a function of time, in particular a data series with data of a deviation.

A data series can consist of at least two, preferably at least 10 and preferably at least 20 data points distributed over time.

Preferably, the data points have an equidistant time distance to each other.

Preferably, the time interval between the data points increases. Especially preferred is the time distance of the data points proportional to one by the logarithm from time.

A "step response" is an output signal of a system, in particular an output signal of a system component of a cleaning system, which reacts to the planned change of an input quantity. Preferably it can be used advantageously for the characterization of linear time-invariant systems. Preferably, the temporal course of a step response can be used to draw conclusions about the attenuation present in the system, whereby it can be advantageously determined, for example, whether, in particular, a blocking of a flow channel for cleaning fluid is present or not.

A "drift" is a systematic deviation that continuously changes in one direction.

Preferably a drift of the output signal of a system component can enable a statement about an ageing phenomenon of the system component. A drift can be used in particular to determine how long the system component can still be used. In particular, a drift can be used to analyse when the system component should be replaced in order to avoid failure of the system component.

Overall, a system behaviour of a system component preferably deviates from the tolerated system behaviour only when the output quantity exceeds an "upper threshold quantity" and/or falls below a "lower threshold quantity", taking into account any measurement errors and expected uncritical fluctuations.

It should be expressly pointed out that an upper threshold quantity and/or a lower threshold quantity can be a scalar or vector quantity just like the expected output quantity or the actual output quantity or the deviation. Preferably an upper threshold quantity and/or a lower threshold quantity exhibits the dimension of the output quantity.

Preferably, this is a non-tolerated deviation if an output quantity exceeds an upper threshold quantity in one dimension or falls below a lower threshold quantity in one dimension.

Preferably the upper threshold value and the lower threshold value can depend on the input quantity, since the system behaviour of a system component depends on the input quantity in some cases, whereby in some cases also an expected system behaviour of a system component and/or a reversible range of the actual output quantity can depend on the input quantity.

By "diagnosing" is generally understood a comparison between an observed and an expected system behaviour of a system component of a cleaning system.

In particular, "diagnosing" means a process that monitors an output quantity and determines whether or not the system behaviour of the observed system component deviates from the expected system behaviour in a tolerable range, in particular by comparing the output quantity with an upper threshold quantity and/or a lower threshold quantity.

Likewise, a non-tolerated deviation of an actual system behaviour can preferably be evaluated on the basis of a percentage limit value depending on the expected output quantity.

Diagnosing can preferably also be understood as a characterization of a possible deviation. This characterisation can preferably be carried out on the basis of the temporal course of an output quantity.

A "diagnosing signal" preferably describes the result of a method for diagnosing a system behaviour of a system component of a cleaning system of a motor vehicle.

Among other things, a diagnostic signal can indicate that the actual system behavior fully corresponds to an expected system behavior.

A diagnosing signal can also indicate that the actual system behavior does not correspond to an expected system behavior, whereby the diagnosing signal preferably also contains in which form and on the basis of which components of the output quantity the actual system behavior does not correspond to the expected system behavior.

A "present diagnostic signal" is understood as a diagnostic signal which is currently present and for which a resolution strategy is searched.

A "resolution strategy" is understood as a procedure, which according to available empirical values is suitable for eliminating a deviation between an actual system behaviour of a system component and an expected system behaviour of this system component of the cleaning system.

A "soiling process" is understood as the accumulation of contamination and/or pollution on a surface.

A "soiling condition" is understood as the current state of contamination and/or contamination on a surface.

A "first availability" is understood as a first state of an availability. A "second availability" is understood to be a second state of availability, where time has elapsed between a first availability and a second availability.

Preferably, a motor vehicle has travelled between a first availability and a second availability.

Preferably, a motor vehicle has increased its operating time between a first availability and a second availability.

Due to the increase in the number of driver assistance systems, the number of sensors in a vehicle has also increased, in particular the number of sensors with an optical operating principle. In particular, sensors with an optical active principle depend on the fact that the part of the surface of a motor vehicle which is in an active connection with a sensor, in particular in an active connection with a sensor with an optical active principle, may only exhibit an upper limit of contamination.

If the contamination of this part of the surface of the motor vehicle is above this maximum contamination, the functionality of the sensor can no longer be guaranteed to a sufficiently high degree, whereby the functionality of the driver assistance system is also influenced by the contamination condition.

The consequence of this is that the maintenance of the functionality of a driver assistance system requires cleaning of the surface being in an active connection with a respective sensor delivering data for a driver assistance system, which has also increased with the increasing number of sensors.

For this cleaning effort sufficient cleaning resources are needed, especially cleaning fluid and electricity. An increase in the need for cleaning therefore also increases the need for cleaning fluid, which must be stored in a motor vehicle to clean the relevant surfaces. This leads to an increasing space requirement for a cleaning fluid reservoir and furthermore to an increased weight of the motor vehicle.

Neither additional weight nor additional space requirements for system components are desirable.

For this reason, a specific cleaning method for resource efficient cleaning, preferably resource-saving cleaning, of at least part of the surface of a motor vehicle is proposed here.

Resource efficient cleaning means that the cleaning of the surface to be cleaned is optimised in such a way that the ratio of cleaning effect to cleaning expenditure is taken into account. In other words, resource-efficient cleaning requires that a control quantity for a cleaning process is selected in such a way that maximum cleaning success can be achieved with minimum effort, whereby the control quantity setpoint at least indirectly determines the amount of resources that a cleaning process requires to clean a surface.

A resource-saving cleaning is understood to mean that the cleaning of the surface to be cleaned is optimised in accordance with the overriding cleaning objective to be achieved, preferably a cleaning objective can lie in the fact that a defined quantity of safety functions of a motor vehicle does not fail due to contamination of a surface, in particular not due to contamination of a sensor surface, or due to contamination-induced impairment of a sensor function. A preferred cleaning objective may also be that an autonomy level of a motor vehicle does not have to be abandoned due to contamination of a surface, in particular due to contamination of a sensor surface, or due to contamination-induced impairment of a sensor function.

The cleaning method proposed here uses a cleaning system of a motor vehicle and plans and/or optimises and/or executes individual cleaning processes, whereby each individual cleaning process concerns the cleaning of an individual partial surface of a motor vehicle through the use of cleaning means, in particular cleaning fluid and the like.

Each cleaning process also exhibits a time span in which the cleaning process is executed, whereby the cleaning process exhibits a start time and an end time of this time span.

The cleaning system exhibits an electronic control unit, a cleaning fluid distribution system, preferably comprising at least one fluid reservoir, at least one nozzle, and at least one cleaning fluid line connecting the cleaning fluid reservoir and the wash nozzle.

The cleaning success is recorded at least partially automatically within the scope of the cleaning method proposed here, in that the sensor, which is in an active connection with the surface to be cleaned, is preferably capable of or is arranged to forward an availability of the sensor to the cleaning system, wherein the availability of the sensor at least indirectly represents a measure of the cleaning state of the surface, which is in an active connection with the sensor.

Furthermore, it is suggested that the cleaning system can access or have available information on the availability of a sensor and thus on the cleaning status of a surface to be cleaned in an active connection with the sensor.

Furthermore, a sensor may be arranged to detect a process quantity, in particular a humidity and/or a temperature in the vicinity of the motor vehicle and/or a rainfall and/or a snowfall quantity.

The cleaning system may have further sensors or be connected to further sensors which can provide the cleaning system with a measured quantity, in particular a process quantity and/or a control quantity. In this way, the temperature or the rain quantity or the like can also be made available to the cleaning system by other sensors. This also includes the transmission of corresponding data to the cleaning system, which the motor vehicle can retrieve via a wireless data connection if necessary.

In particular, the cleaning system can also be provided with the coordinates of the motor vehicle and or a control value of a control quantity.

In particular, a cleaning method should be considered which uses information about the system behaviour of a cleaning system and/or which can provide this information itself, in particular by means of a dependency table and/or a systematic dependence, in particular by means of a dependency table and/or a systematic dependence according to the second aspect of the invention.

It is understood that the advantages of a dependency table and/or a systematic dependence according to the second aspect of the invention, as described in the second aspect of the invention, directly extend to a cleaning method according to the first aspect of the invention, which applies a dependency table and/or a systematic dependence according to the second aspect of the invention and/or carries out a procedure for deriving a dependency table and/or a systematic dependence according to the second aspect of the invention.

Furthermore, a cleaning method is proposed which controls the resource efficient cleaning, preferably resource-saving cleaning applying a control quantity setpoint, particularly preferably applying a control quantity setpoint derived by a method according to the third aspect of the invention.

It is understood that the advantages of a control quantity setpoint according to the third aspect of the invention, as described in the third aspect of the invention, directly extend to a cleaning method applying such control quantity setpoint according to the first aspect of the invention.

In addition, a cleaning method is proposed which controls the resource efficient cleaning, preferably resource-saving cleaning applying a cleaning strategy, particularly preferably applying a cleaning strategy derived by a method according to the fourth aspect of the invention.

It is understood that the advantages of a cleaning strategy according to the fourth aspect of the invention, as described in the fourth aspect of the invention, directly extend to a cleaning method applying such cleaning strategy according to the first aspect of the invention.

In particular, a cleaning method should be considered which uses information about the system behaviour of a system component of a cleaning system and/or which can provide this information itself, in particular by means of a dependency table and/or a systematic dependence, in particular by means of a dependency table and/or a systematic dependence according to the fifth aspect of the invention.

It is understood that the advantages of a dependency table and/or a systematic dependence according to the fifth aspect of the invention, as described in the fifth aspect of the invention, directly extend to a cleaning method according to the first aspect of the invention, which applies a dependency table and/or a systematic dependence according to the fifth aspect of the invention and/or carries out a procedure for deriving a dependency table and/or a systematic dependence according to the fifth aspect of the invention.

In particular, a cleaning method should also be considered which comprises a process step for diagnosing a system behaviour of a system component of a cleaning system of a motor vehicle, preferably a process step for diagnosing a system behaviour of a system component of a cleaning system according to the first alternative of the sixth aspect of the invention.

It is understood that the advantages of a method diagnosing a system behaviour of a system component of a cleaning system according to the first alternative of the sixth aspect of the invention, as described in the first alternative of the sixth aspect of the invention, directly extend to a cleaning method which comprises such process step for diagnosing a system behaviour of a system component of a cleaning system of a motor vehicle according to the first aspect of the invention.

In particular, a cleaning method should also be considered which comprises a process step for diagnosing a deviation between an actual system behaviour and an expected system behaviour of a system component of a cleaning system of a motor vehicle, preferably a process step for diagnosing a deviation between an actual system behaviour and an expected system behaviour of a system component of a cleaning system of a motor vehicle according to the second alternative of the sixth aspect of the invention.

It is understood that the advantages of a method diagnosing a deviation between an actual system behaviour and an expected system behaviour of a system component of a cleaning system of a motor vehicle according to the second alternative of the sixth aspect of the invention, as described in the second alternative of the sixth aspect of the invention, directly extend to a cleaning method which comprises such process step for diagnosing a deviation between an actual system behaviour and an expected system behaviour of a system component of a cleaning system of a motor vehicle according to the first aspect of the invention.

A cleaning method is also proposed, which comprises a process step for selecting a resolution strategy, preferably a process step for selecting a resolution strategy according to the seventh aspect of the invention.

It is understood that the advantages of a method for selecting a resolution strategy, preferably a method for selecting a resolution strategy according to the seventh aspect of the invention, as described in the seventh aspect of the invention, directly extend to a cleaning method applying such method for selecting a resolution strategy according to the first aspect of the invention.

Furthermore, a cleaning method should be considered, comprising a process step for using of a selected resolution strategy, preferably a process step for using of a selected resolution strategy according to the eighth aspect of the invention.

It is understood that the advantages of a method for using of a selected resolution strategy, preferably a process step for using of a selected resolution strategy according to the eighth aspect of the invention, as described in the eighth aspect of the invention, directly extend to a cleaning method applying such method for using of a selected resolution strategy according to the first aspect of the invention.

In particular, a cleaning method should be considered which uses information about the system behaviour of a soiling process of a surface of a motor vehicle and/or which can provide this information itself, in particular by means of a dependency table and/or a systematic dependence, in particular by means of a dependency table and/or a systematic dependence according to the ninth aspect of the invention.

It is understood that the advantages of a dependency table and/or a systematic dependence according to the ninth aspect of the invention, as described in the ninth aspect of the invention, directly extend to a cleaning method according to the first aspect of the invention, which applies a dependency table and/or a systematic dependence according to the ninth aspect of the invention and/or carries out a procedure for deriving a dependency table and/or a systematic dependence according to the ninth aspect.

In particular, within the cleaning method proposed here, one should consider using a dependency table and/or a systematic dependence according to the ninth aspect of the invention, to determine an expected availability at a distance or an operating time of the motor vehicle yet to be covered, preferably according to the tenth aspect of the invention, and/or to determine an expected distance or an expected operating time of the motor vehicle yet to be covered when reaching a threshold of availability, preferably according to the eleventh aspect of the invention, and/or for optimizing a resource requirement for a cleaning process of a surface of a motor vehicle, in particular by applying a method for optimizing a resource requirement for a cleaning process of a surface of a motor vehicle according to the third aspect of the invention, and/or to determine a cleaning strategy for cleaning a surface to be cleaned of a motor vehicle, in particular by applying a method for determining a cleaning strategy for cleaning a surface to be cleaned of a motor vehicle according to the fourth aspect of the invention, and/or to determine a necessary expected gain in availability, whereby the sum of the actual availability and the necessary expected gain in availability is sufficient to achieve a distance or an operating time yet to be covered by the motor vehicle in such a way that a threshold of availability is not exceeded, preferably according to the fourteenth aspect of the invention.

It is understood that the advantages of using a dependency table and/or a systematic dependence according to the ninth aspect of the invention, to determine an expected availability at a distance or an operating time of the motor vehicle yet to be covered, preferably according to the tenth aspect of the invention, and/or to determine an expected distance or an expected operating time of the motor vehicle yet to be covered when reaching a threshold of availability, preferably according to the eleventh aspect of the invention, and/or for optimizing a resource requirement for a cleaning process of a surface of a motor vehicle, in particular by applying a method for optimizing a resource requirement for a cleaning process of a surface of a motor vehicle according to the third aspect of the invention, and/or to determine a cleaning strategy for cleaning a surface to be cleaned of a motor vehicle, in particular by applying a method for determining a cleaning strategy for cleaning a surface to be cleaned of a motor vehicle according to the fourth aspect of the invention, and/or to determine a necessary expected gain in availability, whereby the sum of the actual availability and the necessary expected gain in availability is sufficient to achieve a distance or an operating time yet to be covered by the motor vehicle in such a way that a threshold of availability is not exceeded, preferably according to the fourteenth aspect of the invention, as described in the ninth and/or tenth and/or eleventh and/or twelfth and/or thirteens and/or fourteenth aspect of the invention, directly extend to a cleaning method using such dependency table and/or such systematic dependence as described above according to the first aspect of the invention.

In an expedient embodiment the electronic control unit controls and/or regulates the resource efficient cleaning, preferably resource-saving cleaning, depending on an actual measured quantity value, preferably an actual availability of the sensor which is operatively connected to the surface to be cleaned.

Here it is now specifically proposed, among other things, that the cleaning method should be implemented in a regulated manner.

In other words, the cleaning method should not only be controlled according to a specification, but should also be applied within the framework of a regulation.

The cleaning method should be regulated as a function of a measured quantity, in particular as a function of the availability of the sensor whose surface is in an active connection with it and is currently being cleaned by means of a cleaning process as part of the cleaning method.

In other words, it is concretely proposed to regulate each individual cleaning process carried out within the scope of the cleaning method on the basis of the availability of the associated sensor.

This is an advantage in that it is possible to react to deviations in the cleaning result according to the situation by feedback of information on the current cleaning status, in particular by means of availability of the associated sensor.

This allows an effective cleaning process to be aborted earlier than planned, thus saving additional resources and preventing over-cleaning of a surface to be cleaned.

Furthermore, it can be advantageously achieved that a less effective than expected cleaning process can be carried out longer than planned, whereby a resource-optimal cleaning result can be achieved advantageously with an overall evaluation, even if additional resources have to be used for this individual cleaning process, resources can still be saved in total.

Preferably the cleaning method starts a cleaning process as soon as a predefined threshold of availability for the sensor is reached, which is in an active connection with the surface to be cleaned by the cleaning process, preferably if the respective surface is not currently excluded from cleaning by means of the cleaning strategy.

Here it is proposed that a cleaning process, especially a cleaning process pre-planned by means of a control quantity setpoint, is started depending on the occurrence of a triggering condition, especially as soon as a predefined threshold of availability for the sensor is reached.

In this way, it can be advantageously achieved that resources for cleaning can be saved, since a cleaning process never starts earlier than is technically necessary.

Furthermore, it is proposed that the cleaning method starts a cleaning process if the availability of a sensor is less than a predefined threshold of availability for the sensor or close to a predefined threshold of availability for the sensor.

Among other things, this can be advantageous for the cleaning method to start a cleaning process even after a malfunction of the cleaning system and/or after a replenishment of previously insufficient cleaning resources, in particular to start an overdue cleaning process.

In particular, it should preferably be considered that the cleaning method described here is applied for all surfaces in active connection with a sensor and/or for the surfaces in active connection with a sensor required/selected according to the current cleaning mode and/or for the surfaces in active connection with a sensor required/selected according to a preselected future cleaning mode.

Expediently the cleaning method forces a change in a cleaning mode if it is not realistic to achieve the planned route with the currently selected cleaning mode.

If the pre-planned destination can no longer be reached with the pre-selected cleaning mode, it is proposed to change the cleaning mode in such a way that the cleaning mode with which the pre-planned route can still be carried out without further necessary changes to the cleaning mode is re-selected, whereby the cleaning mode can be selected which, subject to compliance with the above condition, enables the driver to have the most comfortable possible driving experience.

The advantage of this is that a planned destination can be reached with the available resources for cleaning under the most comfortable conditions possible for the driver, without having to replenish cleaning resources during a service stay.

In particular, it should preferably be considered that the cleaning method described here is applied for all surfaces in active connection with a sensor and/or for the surfaces in active connection with a sensor required/selected according to the current cleaning mode and/or for the surfaces in active connection with a sensor required/selected according to a preselected future cleaning mode.

In an expedient embodiment the cleaning method goes over to keeping only a sensor absolutely necessary for manual driving sufficiently available by carrying out a corresponding cleaning process, if a cleaning resource has reached a reserve level.

A kind of reserve strategy is proposed here as a measure of the last moment, whereby in the case in which the attainment of a pre-planned destination without service maintenance is endangered and whereby the cleaning mode was not adapted to a lower level of cleaning resource consumption at an early stage, that the cleaning mode is changed by the cleaning system to such an extent that only the sensors that are absolutely necessary for manual driving remain sufficiently available.

Optionally it is proposed to take this measure as late as possible, so that with the last available cleaning resources the destination of the travel route can just be reached.

The advantage of this is that the driver can only be forced to intervene more in the driving of the motor vehicle as late as absolutely necessary.

Furthermore, it is proposed as a modification according to a further optional embodiment to moisten the surface which is only in an effective connection with an unnecessary sensor from time to time with a spray of a cleaning fluid.

In this way, it can be advantageously achieved that a surface that is not in an active connection with one of the necessary sensors does not dry out, thus advantageously preventing the incrustation of the contamination present on this surface. In this way it can be advantageously achieved that another cleaning process aimed at the direct cleaning of the surface can get by with less cleaning resources, since it does not have to remove an encrusted layer of dirt in a short time, but rather an already soaked or pre-soaked dirt.

In other words, no cleaning process is proposed here in particular, which is aimed at the immediate cleaning of the surface, but a cleaning process, which makes it easier for a later cleaning process aimed at the immediate cleaning of the surface to achieve a better cleaning result, in particular a higher gain of availability, with less resource expenditure.

In combination, a more efficient cleaning process can thus be made possible.

In particular, it should preferably be considered that the cleaning method described here is applied for all surfaces in active connection with a sensor and/or for the surfaces in active connection with a sensor required/selected according to the current cleaning mode and/or for the surfaces in active connection with a sensor required/selected according to a preselected future cleaning mode.

Optionally, the cleaning method exhibits a cleaning process which is adapted to moisten a surface to be cleaned.

Here a cleaning method is proposed, which exhibits a cleaning process, which is designed for moistening a surface to be cleaned.

The cleaning method should preferably exhibit two cleaning processes, whereby the first cleaning process according to a time perspective is designed to only moisten the surface so that any encrusted dirt on the surface to be cleaned is softened. This is an advantage in that it is easier to dissolve the contamination in a subsequent cleaning process.

The second cleaning process according to a time perspective is designed to reduce or remove the previously softened dirt by using cleaning means.

Furthermore, it should be specifically considered that a cleaning process set up to clean a surface to be cleaned is preceded by a number of cleaning processes, each of which is intended to moisten the surface to be cleaned. These cleaning processes, which are set up to humidify the surface, can take place during the active and/or passive operating state of the motor vehicle.

In this way, the drying of dirt on a surface to be cleaned can be advantageously prevented.

It is therefore particularly conceivable that a surface of the motor vehicle to be cleaned can also be moistened in a parked state by means of a cleaning process.

The advantage is that the overall resource efficiency can be improved when cleaning a surface to be cleaned.

In particular, it should preferably be considered that the cleaning method described here is applied for all surfaces in active connection with a sensor and/or for the surfaces in active connection with a sensor required/selected according to the current cleaning mode and/or for the surfaces in active connection with a sensor required/selected according to a preselected future cleaning mode.

In an optional embodiment the cleaning method exhibits a cleaning process which is adapted to start upon a change in an operating condition of the motor vehicle.

Here it is suggested that the cleaning method is adapted to start a cleaning process when an operating condition of the motor vehicle changes.

Preferably, it should be considered that the cleaning method starts a cleaning process when the motor vehicle is started, i.e. at the transition from the passive to the active operating state of the motor vehicle, so that the availability of a sensor at the start of the journey can be improved, in particular in such a way that a sensor achieves a minimum availability for functional sensor operation.

Furthermore, it should also be considered that a cleaning method with a change in the cleaning mode by starting a cleaning process is designed to achieve a minimum availability for functional sensor operation for all sensors required in the newly selected cleaning mode.

The advantage of this is that the cleaning method can react to changes in the operating status of the motor vehicle depending on the situation.

In particular, it should preferably be considered that the cleaning method described here is applied for all surfaces in active connection with a sensor and/or for the surfaces in active connection with a sensor required/selected according to the current cleaning mode and/or for the surfaces in active connection with a sensor required/selected according to a preselected future cleaning mode.

According to a second aspect of the invention, the task is solved by a method for indirectly deriving a systematic dependence for a system behaviour of a cleaning system of a motor vehicle, particularly for a system behaviour of a cleaning process of a surface of the motor vehicle, for cleaning of at least one surface of the motor vehicle, preferably a resource efficient cleaning, particularly preferably a resource-saving cleaning, whereby an output quantity depends on an input quantity by means of the system behaviour of the system, exhibiting the following steps:

Determine the input quantity as a first parameter of the method by means of at least one sensor;

Determine the output quantity as a second parameter of the method, preferably by means of at least one sensor;

Digitalize where necessary and record the determined first and second parameters by a data processing system, whereby the data processing system exhibits an electronic data processing and evaluation system and a database;

Store the determined first and second parameters in an ordered manner with reference to one another in the database as a data set of a dependency table;

Derive the systematic dependence between the first and second parameters by means of the electronic data processing and evaluation system from at least two data sets of the dependency table stored in the database, preferably from at least 50 data sets of the dependency table, particularly preferably from at least 200 data sets of the dependency table, whereby the electronic data processing and evaluation unit accesses the data sets of the dependency table and determines the systematic dependence from the data sets by means of an algorithm; and Preferably store the derived systematic dependence in the database and/or the electronic data processing and evaluation unit and/or an electronic control unit.

Previously, it was common practice for the surfaces of a vehicle to be cleaned either at the driver's request, at predetermined intervals or automatically when contamination was detected.

With the increasing number of sensors in a motor vehicle and the increased safety aspects resulting from the possibilities offered by driver assistance systems through to autonomous driving, the relevance of cleaning the surfaces of a motor vehicle, in particular the surfaces superimposed on a sensor, has increased significantly.

A surface superimposed on a sensor is defined in particular as the outermost surface of a motor vehicle which covers a sensor, in particular a windscreen, a rear window, a camera lens and/or a sensor cover.

As a consequence of the increased need for cleaning, the need for resources to clean the corresponding surfaces has also increased.

This brings the need for new cleaning strategies into focus, which should achieve a resource efficient cleaning, preferably a resource-saving cleaning, so that fewer resources have to be provided for the necessary cleaning processes.

Thus, the connection between the cleaning success of a cleaning process and the resulting resource requirement becomes the attention of the considerations, especially with the objective of being able to carry out cleaning as efficiently as possible or even better resource-saving.

Preferably, the cleaning success of a cleaning process can be evaluated on the basis of the availability of a sensor before and after a cleaning process.

The cleaning success is influenced among other things by a different process quantity of the cleaning process, among others by the air humidity and/or the air temperature and/or the rainfall quantity and/or the snowfall quantity and/or the actual solar radiation and/or the temperature of the surface to be cleaned.

Furthermore, the cleaning success is also influenced by the speed at which the motor vehicle is travelling during the cleaning process and the type of the motor vehicle. The vehicle type provides information on how many surfaces are to be cleaned, where the surfaces to be cleaned are located on the motor vehicle and how they are oriented in relation to the direction of movement of the motor vehicle.

In addition, there is a large number of conceivable cleaning processes which differ in the choice of the respective different control quantity.

The control quantity decides when, for how long and in what form which resource and/or which cleaning means is used to get the respective surface cleaned.

The resource requirements of a cleaning process can, among other things, be determined directly or indirectly depending on the control quantity of the cleaning process.

When implementing resource efficient cleaning, preferably resource-saving cleaning, the concrete question arises as to which control quantity can be used for which vehicle type, which process quantity and under which resource requirement to achieve which cleaning success.

As already explained above, a large number of influencing quantities could be taken into account which influence the result and the resource requirements of the cleaning process, thus increasing the complexity of the question considered here.

In the recent past it has been shown more and more often that the manifold possibilities to influence the cleaning process in their complexity and due to the possible overlapping of the individual effects among each other increasingly leave the range in which a resource-efficient cleaning lies in the range of the intuitively comprehensible.

A resource-saving cleaning in the sense of a resource-optimized cleaning strategy is even more complex to handle.

As a consequence, not only the effort involved in designing a cleaning system and a cleaning strategy has increased massively, but also the resources required, since successful cleaning must be guaranteed while guaranteeing a certain level of safety, and this goal can be achieved primarily by expanding the use of resources.

In this respect, the objective of resource efficient cleaning, preferably resource-saving cleaning, of the surfaces to be cleaned of a motor vehicle is currently a highly discussed topic, in particular, because the comprehensive system behavior between input quantities and output quantities is not determined.

This kind of necessary information is complex to obtain and requires a lot of effort to obtain.

Deviating from the above, a method for indirectly deriving a systematic dependence for the system behaviour of the cleaning system of the motor vehicle between an input quantity of the system and an output quantity of the system is proposed here, whereby the output quantity depends on the input quantity by means of the system behaviour of the system.

Preferably, the input quantity exhibits the control quantity of the cleaning method.

Preferably, the input quantity exhibits a pressure of a cleaning fluid and/or a temperature of a cleaning fluid and/or a mixture of a cleaning fluid, in particular the quantity of one or more additives, and/or a characteristic of a spray pattern, particularly whether a spray pattern is an oscillating spray pattern and/or a continuous spray pattern and/or a pulse-spray pattern, and/or an alignment of a spray pattern to the surface to be cleaned.

Preferably, the input quantity exhibits the process quantity.

Preferably, the output quantity is the cleaning success of the cleaning method, which can be evaluated in particular by the difference between the availability of a sensor before and after cleaning the corresponding surface covering the sensor, in particular by the gain in availability.

Furthermore, it is suggested that the output quantity should show the resource requirement of the cleaning method. The resource requirement can be determined indirectly, especially as a function of the control quantity, or directly on the basis of corresponding measured values.

Preferably it is suggested that the systematic dependence describes the system behaviour of the cleaning process of the surface of the motor vehicle, for cleaning of at least one surface of the motor vehicle.

The procedure proposed here, in which
first for a discrete cleaning process the input quantity is determined as a first parameter, the output quantity is determined as a second parameter, a data processing system records the determined first and second parameter and stores them in an ordered manner with reference to one another in the database as a single dataset for a discrete cleaning process,
and then the systematic dependence between the first and second parameters is systematically derived from a plurality of data sets, in particular using a plurality of data sets from a dependency table by means of an algorithm.

It goes without saying that the first part of the procedure, in which the first and second parameters are recorded, must first be carried out several times in order to obtain a larger number of data sets for the derivation of the systematic dependence, unless existing data can be used.

The corresponding data sets can be collected directly during cleaning processes carried out on the vehicle, especially during normal vehicle operation.

Furthermore, such data sets can also be determined and/or derived from experiments in the laboratory.

In a further variant it is conceivable that a data set is determined by means of a numerical model, which represents a corresponding purification process.

In particular, such data sets are stored in a dependency table and thus collected in the form of empirical values.

From these empirical values, the systematic dependence proposed here can be derived with the method proposed here. This systematic dependence can then be used to select or determine the optimal or resource-saving cleaning process.

Preferably the systematic dependence is determined on the basis of at least 2 data sets, preferably on the basis of at least 50 data sets, further preferred on the basis of at least 200 data sets and especially preferred on the basis of at least 1000 data sets.

It should be pointed out that the above values for the number of data sets should not be understood as sharp limits, but rather should be able to be exceeded or fallen below on an engineering scale without leaving the described aspect of the invention. In simple terms, the values are intended to provide an indication of the size of the number of data sets proposed here.

By means of the systematic dependence gained in this way, it is advantageously possible that not only the cleaning processes already carried out can be evaluated and reproduced, but also new cleaning processes can be devised on the basis of a systematic analysis of the data, whereby, among other things, the objective of further reducing resource requirements can be pursued. This can be achieved by interpolation between the available data sets. Furthermore, it is conceivable that a curve will be generated from the data sets obtained, in particular with a regression method, which enables a continuous and differentiable systematic relationship between the input quantities and the output quantities of the cleaning process.

Preferably, the input quantity is determined by means of at least one sensor.

Optionally, the output quantity is determined by means of at least one sensor.

Expediently, the data processing system exhibits an electronic data processing and evaluation system and a database.

If necessary, it is suggested that the data processing system digitalizes the determined first and second parameters, so that the recorded values, in particular the values determined by a sensor, can be managed in a digital database and processed electronically.

The systematic dependence between an input quantity and an output quantity, preferably a resource requirement, developed according to the proposed procedure, describes the system behaviour of the cleaning system.

Thus it is concretely conceivable that for each surface to be cleaned a respective systematic dependence is derived which takes into account the part of the control quantity which is in an effective connection with the corresponding surface, and whereby the systematic dependence describes the cleaning success as well as the resource requirement as a function of this part of the control quantity as well as possibly also as a function of the process quantity, preferably by means of a continuous and differentiable systematically determined curve, which reflects the interdependencies of the quantities.

In other words, for a plurality of surfaces to be cleaned, a plurality of systematic dependencies can be derived, in particular the number of surfaces to be cleaned on a vehicle corresponds to the number of derived systematic dependencies.

Optionally, a systematic dependence can be in the form of an (n+i)-dimensional curve of m-th order, taking account for an n-dimensional input quantity and an i-dimensional output quantity.

Such systematic dependence can be used in many ways. Thus it is conceivable, among other things, that a comparison of the input quantity could be used to find the control quantity with which the surface in question can be cleaned particularly efficiently in terms of resources. Furthermore, it could be specifically considered that in the comparison of the ratios of cleaning success and resource requirements, the control quantity is sought with which a special resource-saving cleaning of the corresponding surface is possible.

Preferably, the input quantity exhibits the amount of cleaning fluid used to clean the surface to be cleaned.

Preferably, the input quantity exhibits the time period in which the cleaning fluid is applied to the surface to be cleaned.

Preferably, the input quantity exhibits a cleaning means, especially a wiping element, with which the surface to be cleaned is treated.

Preferably, the input quantity exhibits the time in which the cleaning means is used.

Preferably, the input quantity exhibits the type of the motor vehicle considered for the systematic dependence.

Preferably, the input quantity exhibits a quantity of cleaning fluid with which the surface to be cleaned is soaked before the surface to be cleaned is later processed with a cleaning means. Further preferably, the input quantity also exhibits the time during which the surface to be cleaned is soaked until it is later processed with the cleaning means.

Preferably, the input quantity exhibits the amount of cleaning fluid used to clean the surface to be cleaned and/or the time period in which the cleaning fluid is applied to the surface to be cleaned and/or a cleaning means, especially a wiping element, with which the surface to be cleaned is treated and/or the time in which the cleaning means is used and/or the type of the motor vehicle considered for the systematic dependence and/or a quantity of cleaning fluid with which the surface to be cleaned is soaked before the surface to be cleaned is later processed with a cleaning means and/or the time during which the surface to be cleaned is soaked until it is later processed with the cleaning means.

The continuous specification of the systematic dependence results in an advantageous design of the procedure and the possibility to check the robustness of the systematic dependence. Thus, it can be quantified whether the systematic dependence is a regularity or a tendency with certain probabilities that can be grasped by the continuous precision.

Another advantage of the procedure described here is that an almost unlimited number of parameters can be stored with reference to each other and used to derive a systematic dependence, preferably an (n+i)-dimensional systematic dependence.

An operator of an appropriate cleaning system is naturally limited in his ability to map an (n+i)-dimensional systematic dependence, in particular for the decision regarding the specification of a control quantity within his brain. In particular by the constantly increasing complexity of corresponding cleaning systems and by the increasing number of detectable influencing quantities an operator nowadays often already reaches the limits of his natural limitation of his comprehension ability. A systematic dependence is not subject to such a limitation and thus advantageous.

According to that, with a suitable implementation of the proposed procedure, complex correlations between the parameters of the procedure can be mapped. This applies in particular to dependencies with a large number of related quantities, which can show various correlations to each other.

Advantageously, the aspect of the invention presented here can achieve that the system behaviour of a cleaning system with all its relevant interdependencies can be mapped, so that a wealth of experience about the proper and resource efficient cleaning of a surface of a vehicle type is created.

In particular, it can be recorded or derived with which resource efficient cleaning a single surface of a vehicle type can be cleaned efficiently under given environmental conditions and a given initial contamination of the respective surface.

It should be expressly pointed out that the result of a cleaning process does not have to be the complete cleaning of a surface. In particular, it should be specifically considered that the cleaning success of a surface is only so small that it remains functional for the sensor hidden behind it.

This applies in particular to the front and rear windows of a motor vehicle, which after completion of a cleaning process are cleaned at least to such an extent that the sensor behind the windscreen, preferably the driver of the motor vehicle in the interior of the same, can operate through the front and rear windows in such a way that safe driving operation does not fail due to soiling of the front and/or rear windows.

In this way, cleaning resources can be advantageously saved by using a cleaning method that makes use of such systematic dependence, whereby a further distance can be safely driven by the motor vehicle with the same initial conditions on existing cleaning resources and/or whereby the motor vehicle weight can be reduced, since fewer resources have to be used for the same distance to be covered and/or whereby the associated fluid tank of the motor vehicle can be designed smaller for a cleaning fluid, whereby installation space within the motor vehicle can be saved.

Expediently, the input quantity exhibits at least one measured quantity, preferably a process quantity and/or a control quantity.

It is suggested here that the input quantity exhibits a measured quantity.

If the input quantity lacks exhibiting a measured quantity, a systematic dependence could conceivably also be dependent on default values of the control quantity within the framework of a control system.

But, by using a measured quantity, the accuracy of the systematic dependence can be advantageously increased.

Preferably such a measured quantity is a control quantity, so that a systematic dependence between the output quantity and the control quantity of a cleaning process of a surface of a motor vehicle to be cleaned can be derived and thus later also be used for the cleaning of the corresponding surface, in particular for the control and/or regulation of a cleaning process for the surface to be cleaned.

Furthermore, it is suggested that the input quantity exhibits a process quantity, so that a systematic relationship between the output quantity and the process quantity, preferably the air humidity and/or the air temperature and/or the actual solar radiation and/or the temperature of the surface to be cleaned, can be derived during a cleaning process of a surface of a motor vehicle to be cleaned and thus later also be used for the optimal cleaning of the corresponding surface.

The advantage of this is that the accuracy of a derived systematic dependence can be increased and at the same time a multitude of influencing factors from the area of control quantity and/or process quantity can be taken into account.

Preferably, the input quantity exhibits a driving speed of the motor vehicle.

The driving speed of a motor vehicle may influence a cleaning process of a surface to be cleaned, in particular the distribution of a cleaning fluid on the surface to be cleaned and/or the displacement of a cleaning fluid on the surface to be cleaned by the relative airstream and/or evaporation of a cleaning fluid on the surface to be cleaned, whereby the effective exposure time in which a cleaning fluid may dissolve contaminants may also be influenced.

If the input quantity contains the driving speed, the influence of the driving speed can also be taken into account for the optimal cleaning of the surface to be cleaned using the systematic dependence derived here.

In a preferred embodiment, the input quantity exhibits a humidity, in particular a current humidity in the vicinity of the motor vehicle, and/or a temperature in the vicinity of the motor vehicle, in particular a current temperature in the vicinity of the motor vehicle and/or a rainfall quantity, in particular a current rainfall quantity in the vicinity of the motor vehicle, and/or a snowfall quantity, in particular a current snowfall quantity in the vicinity of the motor vehicle, and/or a coordinate of the motor vehicle.

It has been shown that air humidity and air temperature are important factors influencing the cleaning success of a cleaning process on a surface to be cleaned.

For this reason, it is proposed here that the systematic dependence on these particularly relevant influencing factors for a resource efficient cleaning is derived.

It has also been shown that rain and/or snow can make the cleaning process more resource-efficient. In particular, rain and/or snow can cause deposited dirt to become detached or at least softened and thus easier to dissolve, thus saving cleaning fluid.

Provided that the effective temperature and/or the effective humidity and/or the effective amount of rain and/or the effective amount of snow are taken into account when deriving the systematic dependence, these data can also be taken into account when evaluating a purification process.

In particular, it is conceivable that the current environmental conditions are also taken into account when selecting a cleaning process, in particular specified by a control quantity setpoint, so that an optimally resource-saving and/or resource-efficient cleaning process can be selected and carried out.

Furthermore, it is conceivable that the current coordinate of the vehicle is also taken into account, especially when statistically considering an expected temperature and/or an expected humidity and/or an expected amount of rain and/or an expected amount of snow. Thus it is concretely conceivable that the expected environmental conditions are determined on the basis of the current coordinate of the vehicle and that an optimal resource-saving and/or resource-efficient cleaning process is selected on the basis of the expected environmental conditions and the systematic dependence and implemented for the cleaning of a surface to be cleaned.

The advantage of this is that important influencing factors can be systematically taken into account when cleaning a surface to be cleaned and can thus also be taken into account in the resource efficient cleaning, preferably resource-saving cleaning, of a surface in the future, saving resources and increasing the operational safety of the motor vehicle.

In an optional embodiment, the input quantity exhibits a vehicle type.

The vehicle type provides information about a large number of different influencing factors that affect the cleaning process of a part of the surface of a motor vehicle. These include, among others, the position at which a surface to be cleaned is installed and/or the size of a surface to be cleaned and/or the cleaning means with which the surface to be cleaned can be cleaned and/or the degree of contamination to be expected and/or the type of contamination to be expected and/or the exposure of the surface to be cleaned to the airstream and/or the exposure of the surface to be cleaned to the sunlight and/or the number of surfaces to be cleaned.

Furthermore, the vehicle type provides information about the respective installed function type of a sensor and/or a respective installed sensor type, in particular about all different function types of sensors and/or sensor types located on the motor vehicle, including an assignment to the location where the respective sensor is installed.

It is proposed here to consider these influencing factors when deriving the systematic dependence.

The advantage of this is that influencing factors associated with the vehicle type can be taken into account for the systematic dependence and can therefore also be applied individually for each vehicle type in the future in the interest of resource efficient cleaning.

Expediently, the input quantity exhibits an availability of the sensor.

The availability of a sensor is a quantity that can ultimately provide information about how heavily a sensor is soiled.

Particularly preferred, availability can assume values in an interval, whereby one interval limit on reaching means that the system can fully fulfill its requirements, and the other interval limit on reaching means that the system can no longer fulfill its requirements.

If the availability value ranges between the interval limits, the system can still fulfill its requirements, but under more difficult conditions. In particular, the value of availability reflects the degree of contamination of the surface of the motor vehicle, preferably the degree of contamination of the surface, preferably the surface of a sensor, particularly preferably the degree of soiling of the surface of an optical sensor and/or the degree of soiling of a window through which the driver of the motor vehicle looks, in particular the degree of soiling of the windscreen and/or the rear window, and/or the degree of soiling of a headlamp and/or a rear-headlamp.

It turned out that the availability of a sensor before the cleaning process of a surface has an influence on the cleaning success with the same control quantity but different availabilities before the cleaning process.

It can be advantageously achieved by the aspect proposed here that the availability of the sensor can be taken into account as an influencing factor for the derived systematic dependence.

Preferably, the output quantity exhibits an availability of the sensor and or a gain in availability due to the cleaning process.

The aspect of the invention proposed here makes it possible to determine the cleaning success of a cleaning process, in particular by comparing the availability of the sensor before and after the cleaning process, which is called the gain in availability.

In other words, gain in availability is the difference between the availability immediately after completion of the cleaning process and the availability immediately before the cleaning process.

Thus, the success of the cleaning process, preferably the gain in availability, can be quantified advantageously by the aspect proposed here.

This enables for future cleaning processes in an advantageous way, that the control quantity can be determined by means of the systematic dependence on the availability of the sensor prior to the cleaning process with which on the one hand a resource efficient cleaning of the surface to be cleaned can be carried out and on the other hand a desired availability of the sensor after the cleaning process can be achieved.

It should also be specifically considered that a selected cleaning process, which is specified by the selection of the control quantity, does not necessarily clean the availability of the sensor up to the upper limit of the determinability of the availability of the sensor, but only as far as it is necessary under a function-relevant and/or safety-relevant aspect.

Furthermore, it is conceivable that a number of cleaning processes, specified by their respective control quantity, can be carried out one after the other in order to achieve optimum cleaning in terms of resource efficiency and/or the functionality of the sensor and/or a safety aspect for the motor vehicle.

It should be specifically considered that such a sequence of cleaning steps is already defined before the first cleaning process.

Furthermore, it is conceivable that between the cleaning processes of a cleaning sequence for a surface, the availability of the respective sensor will be re-evaluated and that the control quantity for the subsequent cleaning process will be determined depending on the availability of the respective sensor achieved in the meantime.

Overall, it can be advantageously achieved that the cleaning of one or more surfaces of a motor vehicle can run autonomously or at least partially autonomously.

In an expedient embodiment, the output quantity exhibits a resource requirement of the cleaning process of the surface of the motor vehicle, preferably the resource requirement is determined depending on a control quantity setpoint for the cleaning process of the surface.

This can be advantageous in that the resource requirements of a cleaning process can be taken into account when using the systematic dependence, among others when selecting the optimum cleaning process represented by a control quantity setpoint for the current initial condition from which a cleaning of a surface to be cleaned is to be optimized.

In a preferred embodiment, the systematic dependence is determined by means of a regression analysis.

Here it is suggested to use a regression algorithm as algorithm for the indirect derivation of a systematic dependence.

An algorithm which has already been tested in a large number of applications and which can be optimally selected and/or adapted according to the system behaviour considered here can thus be advantageously applied so that a systematic dependence of high quality can be determined.

Expediently, the systematic dependence is determined in form of a curve, preferably a curve and a coefficient of determination of the curve.

The advantage of this is that the systematic dependence is indicated by a curve as a function of an input quantity of the cleaning process; in particular, this curve has no gaps, so that a clear assignment between a control quantity and an output quantity can be achieved, in particular a continuous and differentiable dependency between an input quantity and an output quantity, so that the dependency is ideally adapted for an optimization, in particular an optimization of the resource requirement.

Preferably, a curve is continuous and differentiable, so that it can be advantageously achieved that by using the systematic dependence in the control range of a control quantity, a control quantity suitable for the requirements of a cleaning process can be determined, without this leading to discontinuities in the adjustment range or to an undifferentiable change in the influence of a variation of a control quantity.

The evaluation of a coefficient of determination from the determined data and the curve determined by means of a regression model provides an indication for the precision of the systematic dependence, assuming that a sufficient number of data sets is available. It can be advantageously evaluated how meaningful a correlation between an input quantity of the cleaning process and an output quantity is and how well existing or recorded data can be reproduced. In addition, in the case of a large coefficient of determination, the curve also allows statements to be made about the margins of existing data. It is conceivable, for example, that data can be supplemented numerically and/or extrapolated at the margins of existing data.

In an optional embodiment, the systematic dependence is determined by means of an optimization process.

Here it is suggested that the parameters of a systematic dependence are determined by means of an optimization procedure, especially by means of a minimization procedure, which minimizes the cumulated deviation of the empirical values considered by data sets from the systematic dependence. In this way, it is advantageously possible to determine a systematic dependence which can be derived in an optimal way, in particular with a minimum cumulated deviation from the initial experience values.

Preferably, the parameters of the systematic dependence are determined by maximizing the resulting coefficient of determination.

Preferably, the systematic dependence is determined by means of a self-learning optimization method.

Among other things, it is proposed to use an algorithm that exhibits the characteristics of an algorithm from the class of machine learning. Thus, the algorithm is able to derive a systematic dependence between the input quantity and the output quantity.

The advantage of this is that the complex task of indirectly deriving a systematic dependence by using self-learning optimization methods does not have to be laboriously adapted by humans to new conditions. Thus, time and money can be saved in the indirect derivation of systematic dependence.

The quality of the derived systematic dependence can be improved by the aspect proposed here, since an optimization procedure endeavors to determine the optimal systematic dependence even in a multi-criteria environment and under a variety of boundary conditions.

In this way, it is also conceivable that an optimization can be carried out under a plurality of equal objectives and/or boundary conditions (multi criteria optimization). In particular, a plurality of required resources can be minimized while simultaneously maximizing a gain in availability. In particular, a class of algorithms is considered which can determine a Paretooptimum and/or a Paretofront. In particular, a class of algorithms in the area of simplex methods and/or evolutionary strategies and/or evolutionary optimization algorithms and/or the like are suggested here for deriving a systematic dependence.

Expediently, the systematic dependence is derived using data sets from an already existing database.

The advantage of this is that data from an existing database can also be used to derive a systematic dependence. Thus, it can be achieved that empirical values do not have to be collected at a specific motor vehicle first and transferred into data of a database and later into a systematic dependence. In this way, existing data and empirical values can be used to ensure direct operation of the cleaning system of a motor vehicle on the basis of the systematic dependence.

In an optional embodiment, the already existing database is continuously expanded.

Advantageously, it can be achieved that the number of derivable systematic dependencies increases over time.

Furthermore, it can be advantageously achieved that the accuracy of a systematic dependence can increase due to the larger number of empirical values known by means of data sets.

In an expedient embodiment, a new data set replaces the data set which deviates most from the derived systematic dependence.

In particular, the fact that the experience value is exchanged with the largest Euclidean distance to systematic dependence should be taken into account.

Advantageously, it can be achieved that the systematic dependence becomes more and more precise over time, which can be expressed by an increase in the coefficient of determination.

Furthermore, this can have the advantage that even weakly correlating systematic dependencies can be better identified over time.

It should be noted that the subject-matter of the second aspect can be advantageously combined with the subject-matter of the first aspect of the invention, either individually or cumulatively in any combination.

According to a first alternative of a third aspect of the invention, the task is solved by a method for optimizing a resource requirement for a cleaning process of a surface of a motor vehicle, whereby a sensor is operatively connected to the surface, whereby the method uses data from a dependency table for a system behaviour of a cleaning system of the motor vehicle, preferably for a system behaviour of a cleaning process of at least one surface, preferably a resource efficient cleaning, particularly preferably a resource-saving cleaning, whereby the dependency table exhibits data sets each exhibiting an input quantity of the cleaning system and an output quantity of the cleaning system, whereby the output quantity depends on the input quantity by means of the system behaviour of the system, preferably the dependency table for the system behaviour of the cleaning system between at least one control quantity of the cleaning process, an availability of the sensor at a start time of the cleaning process and an availability of the sensor at an end time of the cleaning process, wherein the resource requirement of the cleaning process depends on the control quantity, exhibiting the following steps:

Access the data of the dependency table from a database and/or an electronic data processing and evaluation unit and/or an electronic control unit;

Derive a difference between the availability of the sensor at an end time of the cleaning process and the availability of the sensor at a start time of the cleaning process for each data set of the dependency table;

Derive a ratio of that difference to the respective resource requirement for each data set of the dependency table;

Select the control quantity of the data set exhibiting the highest value of that ratio; and Preferably store that control quantity as a control quantity setpoint in the database and/or the electronic data processing and evaluation unit and/or the electronic control unit.

The increasing number of vehicle assistance systems requires an increasing number of sensors installed in an engine vehicle. Since these sensors mainly detect an optical signal, they are dependent on the fact that the surface through which the optical signal is detected, which is operatively connected to the sensor, is sufficiently clean. The degree of cleanliness is individually defined by the individual sensor by the fact that it can receive and/or process the respective optical signal to be processed at least predominantly interference-free.

Thus, the surface in an active connection with the sensor must be cleaned from time to time by the use of cleaning means. This also applies to the majority of sensors that do not operate with an optical signal, as the signal transmission of these sensors can also be impaired by contamination.

It should therefore be expressly pointed out that this aspect of the invention can affect not only optical sensors but all sensors on a motor vehicle, at least those which are in an active connection to a surface of the motor vehicle.

Each cleaning process is linked to a resource requirement, which must be provided by the motor vehicle.

So far it is known that a cleaning process is initiated manually, preferably by the driver of the motor vehicle.

The increasing number of vehicle assistance systems and thus also the increasing number of sensors installed in a motor vehicle has recently increased, which is why the need for resources to be kept available has also increased significantly.

Due to the increase in sensors, the control effort for the necessary number of cleaning processes has also increased, which is why semi-automated or automated cleaning of the relevant surfaces is also desirable.

An advantageously automatable procedure for minimizing the consumption of resources for the cleaning of surfaces that are effectively connected to the relevant sensors is now proposed, in particular by carrying out each individual cleaning process preferably resource-efficient, especially resource-saving, so that the consumption of resources and thus also the resource requirement of at least one cleaning means can be reduced advantageously.

Each cleaning process is defined by at least one parameter, in particular an input quantity, particularly preferably by a control quantity. The amount of cleaning fluid applied to a surface to be cleaned could be considered as a respective input quantity or at the same time a respective control quantity.

Preference should also be given to the fact that a cleaning liquid is applied in several phases to a surface to be cleaned, preferably in a first phase a comparatively small quantity by means of which any contamination can be softened and in a second phase a second quantity by means of which the softened contamination can be washed off the surface. The way in which a cleaning agent is used, in particular the amount of cleaning fluid, has a direct influence on the resource requirements for a single cleaning process.

It should be noted that this aspect considers not only the amount of cleaning fluid required for a cleaning process, but also the amount of energy used for cleaning, the wear of wiping elements and/or comparable resources required for a cleaning process.

Each cleaning process is subject to a system behaviour, whereby the system behaviour depends on at least one parameter, preferably an input quantity, particularly preferably a control quantity, and within the framework of an output quantity also enables a statement to be made about the result of a cleaning process, in particular about the resource requirement used or to be used in the sense of a planning as well as about the cleaning success, particularly preferably by means of an availability.

Thus, a system behaviour is preferably defined by at least one input quantity and at least one output quantity, whereby the at least one output quantity depends on the at least one input quantity.

In the case of an input quantity, the size of the surface that is operatively connected to a sensor and therefore to be cleaned could also be considered.

Preference could also be given to the position of a surface to be cleaned in the context of an input quantity. Thus a difference for a resource efficient, especially preferred resource-saving, cleaning method can result from whether a surface to be cleaned can be found at the front or at one side or at the back or at the bottom or at the top of a motor vehicle.

Furthermore, an input quantity could also include a type of contamination, in particular whether it is an encrusted deposit of dirt and/or dust or a layer of sludge or snow or the like. It should also be borne in mind that the operating location and operating history of a motor vehicle allow a statistical expectation for the type of contamination of a surface, especially in combination with the weather report. In other words, the scope of an input quantity could also include the weather conditions as well as an operating location and/or an operating history, which can be evaluated by a coordinate of the motor vehicle and, if necessary, other retrievable data, in particular data retrievable from a data network.

When evaluating the cleaning success of a cleaning process, it could preferably be remembered that the success is thought of as the difference between the availability of the corresponding surface to be cleaned before and after the cleaning process.

Differently defined cleaning processes can be evaluated on the basis of their system behaviour consisting of at least one input quantity and at least one output quantity.

If there are empirical values for a number of defined cleaning processes, a resource efficient, particularly preferred resource-saving, cleaning can be selected specifically on the basis of the existing empirical values for the respective contamination situation.

A respective empirical value consists of at least one input quantity, in particular a control quantity, and at least one output quantity, in particular a gain in availability, determinable from the difference between the availability before cleaning and after cleaning the surface to be cleaned.

In this context, it could be specifically considered that the control quantity which has produced an optimal resource efficient, especially preferred resource-saving, cleaning according to the existing experience is selected on the basis of the existing contamination situation, in particular the available availability, and that the corresponding control quantity is reproduced within the framework of a cleaning procedure. During the reproduction, a control quantity or a controlled cleaning process can be considered in particular.

Possible empirical values can preferably consist of experience gained on a motor vehicle, in particular the specific motor vehicle, and/or of empirical values from experience gained on reference vehicles and/or experience generated on the basis of a numerical model and/or experience generated on the basis of laboratory tests.

The empirical values taken into consideration for the selection of a resource-efficient, particularly resource-saving, cleaning process preferably relate to the respective experiences gained on the basis of the surface to be cleaned which is now also to be cleaned or at least the cleaning of which is now to be evaluated.

When storing collected empirical values, the data could be stored in a dependency table.

Preferably a dependency table can be extended by new empirical values.

A dependency table can be read out preferentially.

Preferably a dependency table can be stored in a database and/or an electronic data processing and evaluation unit and/or an electronic control unit.

Preferably a dependency table shows the possibility to store intermediate results for the evaluation of a cleaning process in an orderly way.

Preferably a dependency table allows the selection of a concrete experience value by means of data mining methods known in the state of the art.

In other words, it is suggested here that the resource consumption for the cleaning of a surface selected for cleaning is optimised on the basis of the system behaviour of the cleaning process, so that a better cleaning result can be achieved advantageously with a lower resource input, in particular depending on the current initial situation.

The optimal control quantity setpoint corresponds to the control quantity of the experience value for a defined cleaning process that promises the resource-optimal cleaning of the surface to be cleaned according to the proposed procedure. If a corresponding optimum experience value has been selected, the optimum control quantity setpoint can be taken from the corresponding input quantity.

The method proposed here is designed to optimize the cleaning of a surface that is interrelated with a sensor and produces a control quantity setpoint optimized for the individual surface to be cleaned.

Preferably, the procedure can be performed sequentially for a number of surfaces to be cleaned, which is advantageous in that a control quantity setpoint can be defined sequentially for each surface of the motor vehicle to be cleaned.

This could be achieved by the following steps:
Access the data of the dependency table from a database and/or an electronic data processing and evaluation unit and/or an electronic control unit, whereby the collected expected values can be called advantageously and processed in the next step;
Derive a difference between the availability of the sensor at an end time of the cleaning process and the availability of the sensor at a start time of the cleaning process for each data set of the dependency table, which advantageously determines a gain in availability for each stored experience value;
Derive a ratio of that difference to the respective resource requirement for each data set of the dependency table, whereby an efficiency of a cleaning process can be advantageously defined by the ratio of expected resource requirements and expected cleaning success;
Select the control quantity of the data set exhibiting the highest value of that ratio, whereby the most resource-efficient control quantity can be selected on the basis of existing empirical values; and
Preferably store that control quantity as a control quantity setpoint in the database and/or the electronic data processing and evaluation unit and/or the electronic control unit, so that the specific control quantity setpoint can be retrieved and applied advantageously within the framework of a downstream cleaning process.

According to a second alternative of a third aspect of the invention, the task is solved by a method for optimizing a resource requirement for a cleaning process of a surface of a motor vehicle, wherein a sensor is operatively connected to the surface, whereby the method uses a systematic dependence for a system behaviour of a cleaning system of the motor vehicle, preferably a systematic dependence according to the second aspect of the invention, preferably for a system behaviour of a cleaning process of at least one surface, preferably a resource efficient cleaning, particularly preferably a resource-saving cleaning, whereby the systematic dependence exhibits data sets each exhibiting an input quantity of the cleaning system and an output quantity of the cleaning system, whereby the output quantity depends on the input quantity by means of the system behaviour of the system, preferably the systematic dependence for the system behaviour of the cleaning system between at least one control quantity of the cleaning process, an availability of the sensor at a start time of the cleaning process and an availability of the sensor at an end time of the cleaning process, wherein the resource requirement of the cleaning process depends on the control quantity, exhibiting the following steps:
Access the systematic dependence from a database and/or an electronic data processing and evaluation unit and/or an electronic control unit;
Derive a course of a difference between the availability of the sensor at an end time of the cleaning process and the availability of the sensor at a start time of the cleaning process for a course of the systematic dependence;
Derive a course of a ratio of that course of difference to a course of the respective resource requirement for the course of the systematic dependence;
Select the control quantity which belongs to the point in the course of that ratio exhibiting the highest value of that ratio; and
Preferably store that control quantity as a control quantity setpoint in the database and/or the electronic data processing and evaluation unit and/or the electronic control unit.

According to the above first alternative of the third aspect of the invention, discrete empirical values are used for the procedure for optimizing a resource requirement for a cleaning process, preferably for a resource efficient cleaning, particularly preferably a resource-saving cleaning.

The resolution of an input quantity, in particular a control quantity, in the range of the possible expression of an input quantity depends on the number of usable empirical values and the distribution of these usable empirical values in the range of the possible expression of the input quantity.

In a different way, it is proposed here to map the system behaviour of a cleaning process by means of a systematic dependence, preferably by means of a systematic dependence according to the second aspect of the invention.

Preferably a systematic dependence exhibits data sets, where each data set exhibits an input quantity of the cleaning process and an output quantity of the cleaning process. Among other things, it is conceivable that a systematic dependence is represented by a defined number of data sets and a defined distribution in the range of the possible input quantity.

This allows advantageously that the data sets of the systematic dependence were derived from empirical values in such a way that in the sense of the objective of a resource efficient cleaning, particularly preferably a resource-saving cleaning, an optimal number of data sets and an optimized distribution of the data sets resulted in the range of the possible expression of the input quantity.

As far as it concerns concrete data sets in the context of systematic dependence, which are defined by input quantity and output quantity, these can be proceeded preferentially also according to the procedural steps after the first alternative of the third aspect.

Alternatively, it is also conceivable that a systematic dependence is given by its mathematical description. In this case the systematic dependence consists of a curve, which describes the dependence between the at least one input quantity and the at least one output quantity.

Particularly preferably, a systematic dependence in the form of a curve over the complete definition range of the curve describes a dependence of at least one output quantity of at least one input quantity.

The preferred definition range of the curve is at least as large as the range of the possible expression of the input quantity.

Also in the case where a systematic dependence is defined by a curve, it can be said that the systematic dependence exhibits data sets each exhibiting at least one input quantity of the cleaning system and at least one output quantity of the cleaning system. In particular, because individual data sets can be read from its curve, for example by calculating an output quantity for a grid of an input quantity.

Preferably the systematic dependence has at least one control quantity as input quantity.

Preferably the systematic dependence has a dependency between an availability of the sensor at a start time of the cleaning process and an availability of the sensor at an end time of the cleaning process, which allows a gain in availability to be determined.

It can be advantageously achieved by using a systematic dependence that a mathematical method can be used to determine an extreme value of the system behavior when searching for an optimal control quantity, especially if the systematic dependence is continuous and differentiable in the form of a curve.

Further it can be reached by this alternative advantageously that in the comparison to the first alternative of the third aspect of the invention a better optimum can be determined for the control quantity setpoint, so that in the comparison advantageously still more resource savings can be made possible.

This is on the one hand due to the fact that by the process of the determination of the systematic dependence, in particular the determination after the second aspect of the invention, measurement inaccuracies and fluctuations in the system behavior can be smoothed, whereby preferably from a discrete description by means of discrete empirical values a continuous thus steady and differentiable representation of the systematic dependence is produced, whereby a greater degree of accuracy of the mapping of the system behaviour can be achieved.

Furthermore, the optimization result can be improved by selecting an optimal control quantity setpoint also from those areas which are optimal from a mathematical point of view but for which there are currently no empirical values available.

Here it is concretely proposed that the resource consumption for the cleaning of a surface selected for cleaning is optimised on the basis of the system behaviour of the cleaning process, so that a better cleaning result can be achieved advantageously with a lower resource input, in particular depending on the current initial situation and using a systematic dependence according to the second aspect of the invention.

The method proposed here is designed to optimize the cleaning of a surface that is interrelated with a sensor and produces a control quantity setpoint optimized for the individual surface to be cleaned.

Preferably, the procedure can be performed sequentially for a number of surfaces to be cleaned, which is advantageous in that a control quantity setpoint can be defined sequentially for each surface of the motor vehicle to be cleaned.

It is understood that the procedural steps following the second alternative of the third aspect should be slightly modified from the first alternative of the third aspect:

In particular, a dependency table in a database and/or an electronic data processing and evaluation unit and/or an electronic control unit is not accessed, but rather a corresponding systematic dependence, in particular a systematic dependence according to the second aspect of the invention.

Furthermore, it is also understood that preferably no discrete data points are used for the calculation, but that the respective mathematical operations are preferably carried out with the entire curve over the entire course of the curve. This can preferably be done analytically or in defined steps by means of discretization.

In addition, it is understood that the advantages of systematic dependence are exploited and the data set is not selected from the documented empirical values, which promises the optimal resource-saving cleaning of the surface to be cleaned, but instead the extreme point in the course of the systematic dependence, at least the extreme point in the area in which the control quantity can be adapted. In particular, it is understood that the selected control quantity setpoint can be located at the edge of the range by adjusting the control quantity.

It should be expressly pointed out that the systematic dependence considered here is not limited in its dimensionality and can have any number of dimensions of an input quantity and any number of dimensions of an output quantity.

Preferably,
the dependency table and/or the systematic dependence exhibits a dependency to a process quantity, preferably a humidity and/or a temperature in the vicinity of the motor vehicle and/or a rainfall and/or a snowfall quantity and/or a coordinate of the motor vehicle; and
wherein, prior to the selection of the control quantity, the data sets taken into account in the selection of the control quantity from the dependency table and/or the area of the systematic dependence taken into account in the selection of the control quantity are first restricted to an area which deviates from the respective process quantity, preferably a current humidity and/or a forecast humidity along the planned itinerary and/or a current temperature in the vicinity of the motor vehicle and/or a forecast temperature along the planned itinerary and/or a current rainfall and/or a forecast rainfall along the planned itinerary and/or a current snowfall quantity and/or a forecast snowfall quantity along the planned itinerary and/or a coordinate of the motor vehicle and/or a forecast coordinate of the motor vehicle along the planned itinerary, by less than 20%, preferably deviates by less than 10% and particularly preferably deviates by less than 5%.

Here it is specifically proposed that the optimization of the control quantity setpoint, in other words the minimization of the resource requirement for cleaning a single surface of a motor vehicle to be cleaned, also takes at least one process quantity into account.

It goes without saying that the cleaning success of a cleaning process carried out after a long period of drizzle is different than if the cleaning process defined by the identical control quantity is carried out on a hot summer day with intense sunshine, at least taking into account the same previous degree of soiling and the same type of soiling.

In other words, a resource-optimal cleaning process also depends on at least one process quantity, which is why it could be taken into account when optimizing the optimal control quantity setpoint.

The same can be achieved if the empirical values stored in a dependency table are initially dependent on the process quantity, preferably the process quantity concerned. The same applies when using a systematic dependence, in particular a systematic dependence after the second aspect of the invention, which must also have a dependency on the process quantity, preferably the process quantity concerned, so that what is suggested here can be taken into account accordingly in the optimization.

For consideration within the optimization it is proposed that the number of experience values from the dependency table taken into account when selecting the optimal control quantity setpoint and/or the range of systematic dependence be limited to a range which does not deviate by more than 20% from the currently prevailing process quantity or the process quantity expected according to the weather forecast at the time of the planned cleaning process, preferably deviates by less than 10% and particularly preferably deviates by less than 5%.

By this way of limitation it can be achieved that no experiences from a cleaning process made in sunshine are transferred to a pending cleaning in snowfall. In other words, it can be achieved that only experiences from a situation which essentially corresponds to the impending cleaning situation are transferred to the respective situation. Among other things, the mapping accuracy between the selected control quantity expected to be optimal and the result achieved during the cleaning process can be advantageously improved.

A process quantity is preferably understood as the weather on the pre-planned route. The decision on an optimal control quantity setpoint could also depend on whether weather conditions are reached on the preplanned route that require less resources for cleaning, in particular rain and/or snowfall. In this way, it can be advantageously achieved that the total resources required for cleaning can be advantageously reduced by including the expected weather conditions in the decision on the control quantity setpoint, which can also include the cleaning time. This is among others also suggested by the inclusion of a process quantity.

It should be pointed out that the above values for the considered area of the process quantity should not be understood as sharp limits, but rather should be able to be exceeded or fallen below on an engineering scale without leaving the described aspect of the invention. In simple terms, the values are intended to provide an indication of the size of the considered process quantity regime proposed here.

Expediently,
the dependency table and/or the systematic dependence exhibits a dependency to the availability of the sensor at the start time of the cleaning process; and
wherein prior to the selection of the control quantity, the data sets taken into account in the selection of the control quantity from the dependency table and/or the area of the systematic dependence taken into account in the selection of the control quantity are first restricted to an area which deviates from the actual availability of the sensor and/or an expected availability of the sensor at a point on the planned route by less than 20%, preferably deviates by less than 10% and particularly preferably deviates by less than 5%,
in particular by applying a method for determining an expected availability at a distance or an operating time of the motor vehicle yet to be covered, preferably according to the tenth aspect of the invention.

It is suggested here to include the availability of the sensor in an active connection with the surface to be cleaned in the optimization of the control quantity setpoint.

Measured by a gain in availability, a cleaning process defined by a control quantity results in different cleaning successes with different initial soiling of the surface. Preferably, better cleaning results result for a more heavily soiled initial situation than for a less heavily soiled surface, whereby a comparable resource requirement is required in each case, since cleaning is carried out with the identical control quantity in each case.

In this respect, the contamination at the beginning of a cleaning process can influence the resource efficiency of a cleaning process.

A consideration of the initial contamination situation of a surface to be cleaned, in particular evaluated by an availability of the sensor at the start time of the cleaning process, is made possible by the fact that the empirical values stored in a dependency table first have a dependency on the availability of the sensor at the start time of the cleaning process. The same applies when using a systematic dependence, especially a systematic dependence after the second aspect of the invention, which must also have a dependency on the availability of the sensor at the start time of the cleaning process, so that this can be considered accordingly in the optimization.

When considering an availability of the sensor at the start time of the cleaning process, the same applies as has already been done for considering a process quantity. Here, too, the range of empirical values considered for the optimization from a dependency table and/or the range of systematic dependence will be limited to a range which deviates from the actual availability of the sensor by less than 20%, preferably deviates by less than 10% and particularly preferably deviates by less than 5%.

Due to the resulting limitation, it can be advantageously achieved that only experiences from situations that essentially coincide with the forthcoming cleaning situation are transferred to these situations.

Among other things, the mapping accuracy between the selected control quantity expected to be optimal and the result achieved during the cleaning process can be advantageously improved.

Furthermore, it should be specifically considered here, among other things, that in the preliminary planning of an upcoming cleaning process, an expected availability of the sensor at the time of carrying out the cleaning process is estimated in advance, in particular with a procedure according to the tenth aspect of the invention.

Thus, depending on the distance to be covered by the motor vehicle until the cleaning process or on the operating time to be covered by the motor vehicle until the cleaning process, an expected availability of the sensor can first be determined, on the basis of which the limitation of the empirical values from the dependency table and/or the area of systematic dependence can be carried out.

The planning accuracy of a cleaning process can be improved advantageously, whereby the resource requirement for the cleaning of a surface connected to a sensor can also be reduced advantageously.

It should be pointed out that the above values for the considered area of the availability of the sensor at the start time of the cleaning process should not be understood as sharp limits, but rather should be able to be exceeded or fallen below on an engineering scale without leaving the described aspect of the invention. In simple terms, the values are intended to provide an indication of the size of the considered availability of the sensor at the start time of the cleaning process proposed here.

Optionally,
- the dependency table and/or the systematic dependence exhibits a dependency to the availability of the sensor at the start time of the cleaning process;
- wherein prior to the selection of the control quantity, the data sets taken into account in the selection of the control quantity from the dependency table and/or the area of the systematic dependence taken into account in the selection of the control quantity are first restricted to an area where the availability of the sensor at the start time of the cleaning process is less than or equal to the actual availability of the sensor; and
- wherein the availability of the sensor at the start time of the cleaning process associated with the selected control quantity is additionally saved with the selected control quantity as the control quantity setpoint.

Contrary to the above, it is now proposed to optimise a cleaning process with regard to its resource efficiency in such a way that at the time of optimisation a decision is also made on the condition which must be fulfilled for the cleaning process to be started, in particular on an availability of the sensor which is to be achieved for the cleaning process to be started.

In other words, a pre-planned cleaning process shall be started by a cleaning method, in particular by a cleaning method according to the first aspect of the invention, if a predetermined availability of the sensor at start time of the cleaning process is achieved by the process proposed here.

The proposed method is made possible by the fact that the empirical values stored in a dependency table first have a dependency on the availability of the sensor at the start time of the cleaning process. The same applies when using a systematic dependence, especially a systematic dependence after the second aspect of the invention, which must also have a dependency on the availability of the sensor at the start time of the cleaning process, so that this can be considered accordingly in the optimization.

At the same time, in addition to the control quantity setpoint, the optimum availability of the sensor at the start time is also selected or determined from the input quantity of the selected optimum empirical value or the optimum point of systematic dependency.

After the sensor, which is in an effective connection with the surface to be cleaned, already exhibits an actual availability value, only optimal cleaning processes can be selected by means of this method, which either start immediately because the resource-optimal cleaning process within the scope of the physically possible already lies on the currently reached limit of availability of the sensor, or start in the future with a defined availability of the sensor at start time, since this must first be achieved by additional contamination of the surface to be cleaned.

By storing the selected control quantity setpoint together with the availability of the sensor at the start time of the cleaning process, the cleaning method can start the cleaning process by reaching the determined optimal availability of the sensor at the start time of the cleaning process.

The resource requirement of the cleaning process can thus be further reduced in an advantageous way, since the procedure proposed here selects the cleaning process that is most resource-efficient within the framework of what is still possible.

In a preferred embodiment, prior to the selection of the control quantity, the data sets taken into account in the selection of the control quantity from the dependency table and/or the area of the systematic dependence taken into account in the selection of the control quantity are first limited to an area that an expected gain in availability is not more than 20% above the availability with which a current itinerary of the motor vehicle can be carried out without unintentional impairment of sensor functionality and/or until a threshold of availability is reached, preferably not more than 10% and particularly preferably not more than 5%, in particular by applying a method for determining an expected gain in availability, preferably according to the fourteenth aspect of the invention, whereby the sum of the current availability and the expected gain in availability is sufficient to achieve a distance or an operating time to be covered by the motor vehicle in such a way that a threshold of availability is not exceeded.

Motor vehicles, in addition to active motor vehicle operation, in particular when the motor vehicle is used to cover a distance, also contaminate in passive motor vehicle operation when the motor vehicle is parked at a point, in particular when the motor vehicle is exposed to the weather unprotected.

With regard to the use of resources for the cleaning of a motor vehicle, it could be resource inefficient if the motor vehicle or a part thereof is cleaned shortly before the end of the planned operation of the motor vehicle, in particular if it is likely before the next active operation that the motor vehicle will be heavily polluted by the passive operation of the motor vehicle, so that at least one cleaning process must be started at the beginning of the next operation of the motor vehicle in order to restore the availability of a driver assistance system.

In other words, possible over-cleaning could be prevented before the end of active vehicle operation in order to save both advantageous and holistic resources for cleaning. The procedure proposed here makes this possible.

Alternatively, there is provision for a modification according to a further optional embodiment to moisten the surface which is only in an effective connection with an unnecessary sensor from time to time with a spray of a cleaning fluid.

In this way, it can be advantageously achieved that a surface that is not in an active connection with one of the necessary sensors does not dry out, thus advantageously preventing the incrustation of the contamination present on this surface. In this way it can be advantageously achieved that another cleaning process aimed at the direct cleaning of the surface can get by with less cleaning resources, since it does not have to remove an encrusted layer of dirt in a short time, but rather an already soaked or pre-soaked dirt.

In other words, no cleaning process is proposed here in particular, which is aimed at the immediate cleaning of the surface, but a cleaning process, which makes it easier for a later cleaning process aimed at the immediate cleaning of the surface to achieve a better cleaning result, in particular a higher gain of availability, with less resource expenditure.

In combination, a more efficient cleaning process can thus be made possible.

To this end, the empirical values from the dependency table or the area of the system behaviour mapped by the systematic dependence that can be selected by the procedure are limited to an area, so that an expected gain in availability is not more than 20% above the availability with which a current itinerary of the motor vehicle can be carried out without unintentional impairment of sensor functionality and/or until a threshold of availability is reached, preferably not more than 10% and particularly preferably not more than 5%.

Preferably, the expected gain in availability for each evaluated cleaning process can be determined by applying the method according to the fourteenth aspect of the invention.

Thus, it can be advantageously achieved that the cleaning process selected by the method does not lead to a significant over-cleaning of the surface in an active connection with the sensor on the one hand, and that on the other hand, with a certain degree of safety before reaching the target, no post-cleaning is necessary to maintain the driver assistance systems.

In this way, resources can be saved for the cleaning of surfaces that are effectively connected to a sensor.

It should be pointed out that the above values for the considered area of the expected gain in availability of the sensor due to the cleaning process should not be understood as sharp limits, but rather should be able to be exceeded or fallen below on an engineering scale without leaving the described aspect of the invention. In simple terms, the values are intended to provide an indication of the size of the considered expected gain in availability of the sensor due to the cleaning process proposed here.

Method for optimizing a resource requirement for a cleaning process of a surface of a motor vehicle according to one of the claims 1 to 6, characterized in that prior to the selection of the control quantity, the data sets taken into account in the selection of the control quantity from the dependency table and/or the area of the systematic dependence taken into account in the selection of the control quantity are first limited to an area that an expected gain in availability is sufficient to bridge a distance or an operating time to the next cleaning process without falling below a threshold of availability and not more than 20% above the gain in availability necessary to bridge the distance or the operating time to the next cleaning process without falling below a threshold of availability, preferably not more than 10% and particularly preferably not more than 5%,
in particular by applying a method for determining an expected distance or an expected operating time of the motor vehicle yet to be covered when reaching a threshold of availability, preferably by applying a method according to the eleventh aspect of the invention,
in particular by applying a method for determining an expected gain in availability, preferably by applying a method according to the fourteenth aspect of the invention, whereby the sum of the current availability and the expected gain in availability is sufficient to achieve a distance or an operating time to be covered by the motor vehicle in such a way that a threshold of availability is not exceeded.

In some situations of motor vehicle operation it is advantageous, especially if the cleaning resources currently still available are particularly scarce, if only minimally invasive cleaning processes are carried out, so that there is a good chance that the next intermediate goal and/or the next opportunity for replenishing cleaning resources can still be achieved with the existing cleaning resources.

In particular, it is conceivable that an autonomous motor vehicle operation can be maintained until the next filling station with the minimal use of cleaning means that is just necessary. Even if the minimally invasive cleaning processes proposed here are not optimally resource-efficient in the sense of the highest possible increase in availability with minimum use of cleaning agents, the available resources are nevertheless optimally efficiently used in the sense of achieving the goal of the vehicle operator, who in particular still wants to reach the next intermediate destination of his journey by means of autonomous driving.

This can be achieved by prior to the selection of the control quantity, the data sets taken into account in the selection of the control quantity from the dependency table and/or the area of the systematic dependence taken into account in the selection of the control quantity are first limited to an area that an expected gain in availability is sufficient to bridge a distance or an operating time to the next cleaning process without falling below a threshold of availability and not more than 20% above the gain in availability to bridge the distance or the operating time to the next cleaning process without falling below a threshold of availability, preferably not more than 10% and particularly preferably not more than 5%.

In other words, here the solution space is limited by two sides.

It should be specifically remembered that before selecting the control quantity setpoint, an expected distance or an expected operating time of the motor vehicle yet to be covered when reaching a threshold of availability is preferably determined by means of a procedure according to the eleventh aspect of the invention.

Furthermore, it should be specifically considered that before the control quantity setpoint is selected, an expected gain in availability is also determined during the execution of a cleaning process by means of a procedure according to the fourteenth aspect of the invention.

The advantage of this is that the selection of a cleaning process can be made in such a way that the motor vehicle can optimally achieve the minimum goal defined by the driver with the available resources.

It should be pointed out that the above values for the considered area of the expected gain in availability of the sensor due to the cleaning process should not be understood as sharp limits, but rather should be able to be exceeded or fallen below on an engineering scale without leaving the described aspect of the invention. In simple terms, the values are intended to provide an indication of the size of the considered expected gain in availability of the sensor due to the cleaning process proposed here.

In a preferred embodiment, a first control quantity and a second control quantity are selected, wherein a respective first control quantity setpoint and a respective second control quantity setpoint define a first and a second cleaning process for a sequence of cleaning processes, the second cleaning process being performed after completion of the first cleaning process.

Here it is concretely proposed to divide a cleaning process of a surface to be cleaned into two or more individual cleaning processes of a together planned sequence.

A first cleaning process is defined by a first control quantity setpoint and a second cleaning process by a second control quantity setpoint.

It should also be considered that both control quantity setpoints contain conditions which trigger the respective cleaning processes within the scope of the cleaning method, especially within the scope of a cleaning method according to the first aspect of the invention. In particular, a temporal distance between the individual cleaning processes, a spatial distance or the achievement of a defined triggering availability is considered.

The advantage is that resources for cleaning can be saved if several cleaning processes are more resource-efficient than a single cleaning process. It was surprisingly found out that this could appear in some constellations of the respective input quantity or the respective input quantities.

Optionally, the method being carried out in series or in parallel for a plurality of surfaces to be cleaned, in particular for two, three, four, five or more surfaces to be cleaned.

So far, the procedure has only been described to the extent that the cleaning process to be carried out is only optimised for one surface at a time.

Here it is specifically proposed that the procedure be applied to a large number of surfaces to be cleaned, in particular sequentially or in parallel.

Expediently the control quantity is selected by means of a multi-criteria optimization procedure.

Here it is concretely suggested that the selection of an optimal cleaning process is carried out with the aid of a multi-criteria optimisation procedure.

Such a procedure is particularly suitable if different resources are to be optimised simultaneously and independently of each other.

Preference should be given to the fact that a special washing lotion can also be used in addition to a cleaning liquid.

By using a multi-criteria optimization method, it can be advantageously achieved that the different resources can be equally advantageously considered resource-efficient in the decision based on a developing Paretofront.

According to the third aspect of the invention, it is preferably possible to take other influencing variables into account for resource optimization, in particular a device type of the sensor, a temperature of the cleaning fluid, the composition of the cleaning fluid, a speed of movement of a wiping element, a quantity of cleaning fluid, an orientation of the nozzle and the like.

With regard to the temperature of the cleaning fluid, the composition of the cleaning fluid, the speed of movement of the wiping element, the amount of cleaning fluid and/or the orientation of the nozzle, this can also be a control quantity.

It goes without saying that the advantages of systematic dependence, in particular systematic dependence according to the second aspect of the invention, also apply to the use of systematic dependence, in particular the use of systematic dependence proposed here according to the third aspect of the invention.

It should be noted that the subject-matter of the third aspect can be advantageously combined with the subject-matter of the preceding aspects of the invention, either individually or cumulatively in any combination.

According to a fourth aspect of the invention, the task is solved by a method for determining a cleaning strategy for cleaning a surface to be cleaned of a motor vehicle, whereby the surface to be cleaned is selected in dependence of a cleaning mode, whereby a sensor is operatively connected to the surface to be cleaned,
whereby the sensor exhibits an actual availability, whereby the cleaning strategy exhibits a control quantity setpoint defining a cleaning process for the surface to be cleaned, exhibiting the following steps:
Preferably check the actual cleaning mode;
Select the at least one sensor required for the currently selected cleaning mode;
Check the actual availability of each selected sensor;
Determine the control quantity setpoint for resource efficient, preferably resource-saving, cleaning of each surface to be cleaned operatively connected to each selected sensor, in particular by applying a method for optimizing a resource requirement for a cleaning process of a surface of a motor vehicle, preferably by applying a method according to the third aspect of the invention; and
Preferably store the determined control quantity setpoint for resource efficient, preferably resource-saving, cleaning of each surface to be cleaned operatively connected to each selected sensor, particularly preferably store the determined control quantity setpoint in the cleaning strategy, preferably within a database and/or an electronic evaluation and data processing unit and/or an electronic control unit.

If the availability of a sensor falls below a threshold of availability, this may result in limited functionality of the sensor, which may indirectly impair the functionality of at least one driver assistance system.

The third aspect of the invention describes a procedure for optimizing a cleaning process with regard to the consumption of resources for a surface to be cleaned that is in operative connection with a sensor.

The third aspect of the invention is to provide one or more resource-optimal cleaning processes for one or more surfaces to be cleaned.

However, the procedure according to the third aspect of the invention does not take into account whether a particular surface connected to a sensor has to be cleaned at all or, in other words, whether the sensor's availability should be increased by carrying out the cleaning process, preferably by carrying out the cleaning process after the first aspect of the invention, for the current or planned use of the vehicle.

The fourth aspect of the invention is based on the idea that not every sensor is needed at all times for current or planned vehicle operation.

If a surface with a sensor that is currently not required is to be cleaned, cleaning resources are also required for this purpose.

The fourth aspect of the invention makes use of this context to save cleaning resources and makes it possible that only the surface of a motor vehicle is cleaned by a cleaning process, in particular by a cleaning method according to the first aspect of the invention, which, according to a selected cleaning mode, also has an active connection to at least one sensor whose functionality is desired for the current or planned vehicle operation.

This allows advantageously the saving of cleaning resources, especially since it is allowed that the availability of a sensor, whose functionality is currently not needed, may also fall below a threshold of availability.

For this purpose, a cleaning strategy for cleaning a surface to be cleaned of a motor vehicle is determined by means of the procedure proposed here, which determines for the entire motor vehicle, depending on a cleaning mode, whether a surface is to be cleaned and, if a surface is to be cleaned, how, that is, with which cleaning process this surface is to be cleaned, is also determined, preferably by means of the determination of a corresponding control quantity, preferably using a procedure according to the third aspect of the invention.

Depending on a cleaning mode, the surface which is in an active connection to a sensor required for the current use of the vehicle is selected for this purpose and is also reserved for cleaning. In this context, a corresponding sensor can also be referred to as a "selected sensor".

Furthermore, a control quantity setpoint is determined for each selected sensor, preferably control quantity setpoint for resource efficient, preferably resource-saving, cleaning, by applying a method for optimizing a resource requirement for a cleaning process of a surface of a motor vehicle, preferably by applying a method according to the third aspect of the invention.

Preferably, each control quantity setpoint thus determined for each selected sensor is stored in a cleaning strategy.

It goes without saying that a cleaning strategy becomes invalid as soon as the cleaning mode changes. As soon as the cleaning mode is changed, a different cleaning strategy must be applied within the scope of a cleaning method, preferably within the scope of a cleaning method according to the first aspect of the invention, or a new cleaning strategy must be determined according to the proposed procedure.

It is expressly pointed out that a cleaning mode may coincide with a driving mode, but this is not necessarily the case, which is why these terms are used separately here.

Preferably, the assignment of the selected sensors can be taken from an associated list, which can preferably be taken from the database and/or the electronic evaluation and data processing unit and/or the electronic control unit.

Preferably it is suggested that a cleaning strategy can overwrite a command of the motor vehicle and/or the driver as a last minute remedy to clean a surface of a selected sensor whose availability has reached and/or fallen below a threshold of availability.

Furthermore, it is preferred that a clean strategy can provide that it also decides on the cleaning of a sensor which is not a selected sensor, especially if one of the selected sensors has a malfunction.

Preferably, before the control quantity setpoint is determined, a distance and/or an operating time is first determined which the motor vehicle can still cover as a function of the actual availability of the selected sensor until an expected availability then reaches a threshold of availability at which the surface which is operatively connected to the associated sensor is to be cleaned, in particular by applying a method to determine an expected distance or an expected operating time of the motor vehicle yet to be covered when reaching a threshold of availability, preferably by applying a method according to the eleventh aspect of the invention.

To date, the range of a vehicle achievable with the available cleaning resources has not been taken into account when determining a cleaning strategy.

This is precisely what is being proposed here.

When operating a motor vehicle, a distinction can be made between operating modes of the motor vehicle, for example between an active motor vehicle operation, which is characterised by the fact that the motor vehicle completes a driving distance, and a passive motor vehicle operation, in which the vehicle parked waits for the next active motor vehicle operation.

The motor vehicle pollutes both in active and passive motor vehicle operation. For reasons of resource-optimal cleaning of a surface of a motor vehicle, it is specifically proposed that a surface is not over-cleaned, which is characterised by the fact that the surface of a motor vehicle is thoroughly cleaned shortly before reaching the objective of active motor vehicle use.

Instead, it is proposed here that a cleaning process could pursue the goal of cleaning the surface only to such an extent that the availability obtained by the cleaning process is sufficient to achieve the goal of active vehicle operation. For this purpose, an associated control quantity setpoint can be determined in particular by means of a method according to the third aspect of the invention.

A further effect results from the fact that different cleaning modes require different amounts cleaning resources. In particular, a cleaning mode that is designed to maintain autonomous vehicle operation requires more cleaning resources than a cleaning mode that is designed to maintain at least one driver assistance system, which is merely intended to assist the driver in driving the vehicle but does not allow autonomous vehicle operation.

As a result of this, it is proposed here, according to a step before determining the control quantity setpoint, first determine the expected distance and/or the expected operating time which the motor vehicle can still cover as a function of the actual availability of the selected sensor until an expected availability then reaches a respective threshold of availability, preferably by applying a method according to the eleventh aspect;

to check the amount of available cleaning resources according to a further step before determining the control quantity setpoint, in particular with corresponding sensors, particularly preferred with level sensors or the like;

to determine the cleaning strategy with the corresponding control quantity setpoints depending on the currently selected cleaning mode and in connection with this also the resource requirements for the cleaning;

to compare whether sufficient resources are available to meet the resource requirements of this cleaning strategy for reaching the destination; and if this is not the case, preferably to offer the driver a cleaning mode with which he can reach his destination with the available resources and/or to request him to refill corresponding resources, the cleaning strategy offered being achieved by using the selectable cleaning modes in a descending order according to the resource requirement to determine a cleaning strategy until a cleaning strategy is found with which the motor vehicle can still reach his destination without one of the selected sensors reaching an availability which is below an associated threshold of availability.

In this way it can be advantageously achieved that the driver of a motor vehicle in a situation in which the necessary resources according to the selected cleaning mode are not sufficient to reach the destination can decide whether he wants to carry out a service stop to refill the required resources, with which the currently selected cleaning mode can be maintained, or whether he wants to dispense with the availability of driver assistance systems and thus arrive at the destination possibly faster if necessary.

Optionally, the threshold of availability depends on the selected cleaning mode.

Different cleaning modes may have different error tolerances for a selected sensor.

In particular, it could be specifically considered that the fault tolerance for a selected sensor in a cleaning mode which is set up for fully autonomous motor vehicle operation is lower than in a cleaning mode which is set up for motor vehicle operation which does not permit fully autonomous motor vehicle operation.

Here it is proposed that a threshold of availability of each sensor can have different values for different cleaning modes.

In this way it can be advantageously achieved that resources for cleaning can be saved by different thresholds of availability for different cleaning modes.

Expediently, the cleaning mode is read from an electronic control unit.

It is suggested here that a cleaning mode can be read from an electronic control unit. This makes it advantageous that a cleaning mode can be defined in an electronic control unit and used from there in the scope of a cleaning method, especially a cleaning method according to the first aspect of the invention, as well as in the scope of a method for determining a cleaning strategy, especially a method according to the fourth aspect of the invention.

Furthermore, it can be advantageously achieved that a cleaning mode can be defined in an electronic control unit, in particular by the manufacturer of a motor vehicle, so that the manufacturer of a motor vehicle can also influence the cleaning of sensor surfaces, in particular since these are safety-relevant aspects which could also reach into the area of manufacturer liability in the event of a malfunction.

Optionally, the cleaning mode is acquired from a selection means.

The following terms are explained in more detail:

A "selection means" is to be understood as a device with which the cleaning mode can be selected. Preferably, a rotary switch or a selector slide or an electronic input unit or the like could be considered here.

Here it is specifically proposed that the cleaning mode can be taken from a selection means, in particular a selection means, which lies within the direct sphere of influence of the driver of the vehicle, so that the driver can influence the cleaning mode and thus indirectly the cleaning strategy according to his needs by adjusting the selection means.

According to a preferred variant of the embodiment, the cleaning mode is set up to enable fully autonomous motor vehicle operation, wherein each surface which is operatively connected to the sensor relevant for fully autonomous motor vehicle operation is to be cleaned.

It is proposed here that the cleaning mode is set up for a fully autonomous motor vehicle operation.

If a motor vehicle is set up and registered for fully autonomous motor vehicle operation at all, this may preferably mean that all sensors installed on a motor vehicle are selected and thus the availability of all sensors must be guaranteed.

In other words, this can lead to a situation where such a motor vehicle has to cease fully autonomous motor vehicle operation if it falls below a threshold of availability, at least until the corresponding availability is again above the threshold of availability.

For the cleaning system, this means that the availability of a sensor must be prevented from falling below an associated threshold of availability. The same applies as an objective for the cleaning method, in particular the cleaning method according to the first aspect of the invention, and consequently also for the method proposed here for determining a cleaning strategy.

According to another preferred variant of the embodiment, the cleaning mode is set up to enable comfortable motor vehicle operation for a designated driver of the motor vehicle, wherein each surface which is operatively connected to the sensor relevant for comfortable motor vehicle operation is to be cleaned.

The cleaning mode proposed here concerns the comfortable operation of the motor vehicle.

Preferably, this means that the operation is comfortable for the driver of the motor vehicle. Comfortable here does not mean a fully autonomous motor vehicle operation, but a motor vehicle operation characterised by the fact that the driver of the motor vehicle predominantly controls the motor vehicle himself.

A comfortable vehicle operation, however, is understood to mean the functionality of several driver assistance systems that can make driving more comfortable for the driver, in particular a lane departure warning system or a distance warning system or the like.

In other words, it is proposed here that the cleaning system ensures the availability of all selected sensors relevant for the cleaning mode set up to enable comfortable motor vehicle operation with the appropriate cleaning method, in particular with a cleaning method according to the first aspect of the invention.

According to another preferred variant of the embodiment, the cleaning mode is set up to enable motor vehicle operation which is as safe as possible for a designated driver of the motor vehicle, wherein each surfaces which is operatively connected to the sensor relevant for motor vehicle operation which is as safe as possible is to be cleaned.

Here it is proposed that the availability of all sensors required for safety-relevant driver assistance systems is monitored, whereby the method proposed here is set up to ensure that the respective availabilities do not fall below the associated values of the associated thresholds of availability.

According to another preferred variant of the embodiment, the cleaning mode is set up to enable the motor vehicle to have the best possible range, wherein each surfaces which is operatively connected to the sensor relevant for motor vehicle operation with the best possible range is to be cleaned.

The cleaning mode proposed here enables the motor vehicle to achieve maximum range with its remaining cleaning resources.

This is preferably made possible by deactivating all driver assistance systems for active vehicle operation that are not prescribed by law, so that the associated sensors may also be available below any relevant threshold of availability.

In an expedient embodiment, the method being carried out for a plurality of surfaces to be cleaned, in particular for two, three, four, five or more surfaces to be cleaned.

Here it is suggested that the method establishes a cleaning strategy for a plurality of surfaces to be cleaned. This can be done serially or in parallel.

This applies preferentially to all surfaces of a motor vehicle that are in an active connection with a (selected) sensor.

Optionally, the step of determining the control quantity setpoint takes a measured quantity into account, preferably a process quantity, particularly preferably a current humidity and/or a forecast humidity along the planned itinerary and/or a current temperature in the vicinity of the motor vehicle and/or a forecast temperature along the planned itinerary and/or a current rainfall and/or a forecast rainfall along the planned itinerary and/or a current snowfall quantity and/or a forecast snowfall quantity along the planned itinerary.

Here it is provided that a measured quantity is taken into account when determining the cleaning strategy.

This enables a control quantity setpoint to be found, preferably based on the current or expected weather conditions on the pre-planned route, which provides a better relationship between the increase in availability for the individual selected sensor and the cleaning resources used than a control quantity setpoint which did not take a measured quantity into account.

In detail, with the necessary adjustments, what has already been done under the third aspect of the invention applies here.

Preferably, the step of determining the control quantity setpoint takes a vehicle type into account.

In particular, the type of motor vehicle provides information about the built-in cleaning system and the location and orientation of the surfaces intended for cleaning in this context. In detail, this applies with any necessary adjustments, which has already been carried out under the second aspect of the invention.

It is understood that the determination of a control strategy can take into account any resources for the cleaning of one or more surfaces. In particular, it is important to consider that the cleaning system can also cause a resource restriction, which could also be taken into account when determining a cleaning strategy. Preferably, the flow rate of the fluid pump can be considered as a possible boundary condition, which may require that only a certain number of cleaning processes can be carried out in parallel.

Preferably, it is suggested that a selected sensor is cleaned as a last minute remedy by means of a predetermined reserve cleaning process if the respective availability falls below the corresponding threshold of availability.

It should be noted that the subject-matter of the fourth aspect can be advantageously combined with the subject-matter of the preceding aspects of the invention, either individually or cumulatively in any combination.

According to a fifth aspect of the invention, the task is solved by a method for indirectly deriving a systematic dependence for a system behaviour of a system component of a cleaning system of a motor vehicle, wherein the cleaning system is adapted for cleaning of at least one surface of the motor vehicle by means of a cleaning process, preferably adapted for a resource efficient cleaning, particularly preferably adapted for a resource-saving cleaning, whereby an output quantity depends on an input quantity by means of the system behaviour of the system, exhibiting the following steps:

Determine the input quantity as a first parameter of the method by means of at least one sensor;

Determine the output quantity as a second parameter of the method, preferably determined by means of at least one sensor;

Digitalize where necessary and record the determined first and second parameters by a data processing system, whereby the data processing system exhibits an electronic data processing and evaluation system and a database;

Store the determined first and second parameters in an ordered manner with reference to one another in the database as a data set of a dependency table;

Derive the systematic dependence between the first and second parameters by means of the electronic data processing and evaluation system from at least two data sets of the dependency table stored in the database, preferably from at least 50 data sets of the dependency table, particularly preferably from at least 200 data sets of the dependency table, whereby the electronic data processing and evaluation unit accesses the data sets of the dependency table and determines the systematic dependence from the data sets of the dependency table by means of an algorithm; and Preferably store the derived systematic dependence in the database and/or the electronic data processing and evaluation unit and/or an electronic control unit.

Motor vehicles are increasingly equipped with an increasing number of sensors, also due to the increasing importance of driver assistance systems, which depend on the information provided by the sensors.

The majority of these sensors rely on the functionality of a surface that is in an active connection with the individual sensor to avoid excessive contamination.

In addition to the number of sensors, the number of installation locations for sensors on the vehicle is also growing, as is the number of surfaces to be cleaned by a cleaning system that are operatively connected to at least one of these sensors.

Consequently, the complexity of the cleaning system for a motor vehicle is constantly increasing. In particular, the number of nozzles and fluid connections is increasing. This has been accompanied by a steady increase in the number and complexity of valve devices, cleaning fluid pumps and cleaning fluid reservoirs.

In the same measure with the increasing automation of the entire vehicle by sensors, the degree of automation of cleaning systems for motor vehicles has also risen, since the increasing automation of the motor vehicle also requires the increasing automation of individual cleaning processes. After all, a driver of a partially autonomous or autonomously operated motor vehicle cannot be expected to keep an eye on the soiling condition of the relevant surfaces, which are in an interrelationship with the sensors for monitoring and/or regulating driving operation. Therefore, automation through driver assistance systems also requires automation of a cleaning system for a motor vehicle.

In addition to these complexity drivers described above, the networking of the systems with each other plays an increasingly important role.

Overall, both the number of sensors and systems involved and their complexity and degree of networking have risen steadily.

As a result, the susceptibility to errors and the associated maintenance requirements of the system components involved in a cleaning system have increased. The increasing complexity of individual system components as well as the increasing complexity of the entire cleaning system make it difficult to identify possible errors, so that maintenance work on a cleaning system has become more and more time-consuming over time.

Since different system components for a defined cleaning system of a defined motor vehicle can also come from different suppliers, the search for a possible error is made even more difficult.

Even though there are increasing expected values for the maintenance of such cleaning systems, it has recently been shown that these cannot withstand the constantly increasing system complexity and the constantly accelerating need for systematic changes in the area of a cleaning system for a motor vehicle.

Here a method to derive a systematic dependence for the description of the system behaviour for a system component of a cleaning system of a motor vehicle is proposed.

The system behaviour of a system component is a reaction of the system component to a specification for the system component, where the specification for the system component can be described by the input quantity and the reaction of the system component by the output quantity.

In other words, the output quantity of the system component depends on the input quantity by means of the system behaviour.

It is pointed out that a system component of a cleaning system can be understood as a single part of a cleaning system, as well as a single assembly and the whole cleaning system. Especially since each of the above mentioned variants has an individual system behaviour, which can be analysed and the knowledge about the system behaviour can be used advantageously later.

Among other things, it is conceivable that a known system behaviour of a system component, especially a known system behaviour in the form of a systematic dependence derived here, can be used for comparison with an observed system behaviour of this system component. If there is a deviation between the known and thus initially expected system behaviour and the observed system behaviour, this could be an indication that the system component and/or the cleaning system has a conspicuous feature and/or a malfunction and/or a defect.

In this way, the systematic dependence proposed here, which is derived on the basis of empirical values, offers in an advantageous way the possibility to compare an observed behaviour of a system component with an expected value for the system behaviour of the system component described by the systematic dependence and thus to verify whether the system component and/or the cleaning system behaves in accordance with expectations.

Preferably each system component exhibits an individual systematic dependence.

For each system component that is to be diagnosed on the basis of the empirical values translated into a systematic dependence, an individual systematic dependence can preferably be derived according to this aspect of the invention.

The method proposed here can be used to derive systematic dependencies for different system components serially and/or in parallel.

The method proposed here for deriving a systematic dependence from empirical values can be divided into two sections. In the first section, empirical values on the system behaviour of the system component are collected and stored in a dependency table. The input quantity, which leads to an activity of a system component, and the output quantity, which describes the reaction of the system component to the activity caused by the associated input quantity, are stored in an orderly manner within the dependency table.

In the second section of the method, the empirical values collected in the dependency table are further processed into a systematic dependence by means of an algorithm.

It should be expressly pointed out that empirical values can be collected within the framework of this procedure in regular operation of the system component during operation of the motor vehicle in which the system component is installed. Furthermore, it is also conceivable that corresponding empirical values can be collected during operation of the system component in the laboratory or with a numerical simulation using a suitable numerical model and stored in a dependency table.

It goes without saying that the systematic dependence proposed here can only take into account those quantities of an input quantity and those quantities of an output quantity which can be recorded and thus evaluated. In particular, the acquisition of a quantity by means of a sensor based on a physical and/or chemical principle of action should be considered. Furthermore, a determination of a quantity by means of a numerical sensor is also considered, which can record the values in a numerical model or, on the basis of measured quantities, can provide a further quantity that is not measured but can be determined numerically depending on at least one measured quantity.

While the empirical values are discrete experiences for a single input quantity, the advantage of a systematic dependence is that a systematic dependence can reproduce the system behaviour of the system component in a range of the input quantity, in particular can reproduce it continuously and discretizably.

The systematic dependence proposed here is generated on the basis of the sampling points of the collected discrete empirical values by means of an algorithm, whereby it is possible that the systematic dependence at the sampling points defined by the corresponding input quantities may have different output quantities compared to the documented experiences. This can preferably be caused by an averaging of the experiences.

Preferably, an input quantity is understood to be a quantity that is at least indirectly suitable for influencing the system component. It is not necessary that an input quantity can be adjusted directly. An input quantity can also result from the environmental conditions. It is especially conceivable that a low temperature leads to ice formation in the cleaning system, which can also change the system behaviour of a system component.

It should be expressly pointed out that neither the input quantity nor the output quantity according to the aspect proposed here are necessarily limited to quantities that directly affect the system component under consideration or can be determined directly at the system component under consideration. Rather it should be considered that every input quantity and every output quantity can be considered within this aspect, which could have an indirect influence on the system behaviour of the considered system component or which could be influenced indirectly by the system component.

The first section of the procedure proposed here shows the following steps:
Determine the input quantity as a first parameter of the method by means of at least one sensor, wherein in each case an input quantity, which may have a plurality of dimensions and which is indicative of a behaviour of at least one system component, can be advantageously provided for further processing by means of a sensor;
Determine the output quantity as a second parameter of the method, preferably determined by means of at least one sensor, wherein in each case an output quantity, which may have a plurality of dimensions and which describes the system behaviour of a system component as a function of that input quantity which is determined by means of the process step described above, can be provided advantageously by means of a sensor for further processing;
Digitalize where necessary and record the determined first and second parameters by a data processing system, whereby the data processing system exhibits an electronic data processing and evaluation system and a database, wherein the input quantity and the output quantity are advantageously prepared and stored for digital processing; and
Store the determined first and second parameters in an ordered manner with reference to one another in the database as a data set of a dependency table, wherein the previously determined quantities of the method can be stored in an advantageously ordered manner relative to one another in such a way in the dependency table that the output quantity is assigned to the input quantity whose system behaviour of the system component caused by it describes it.

Altogether, the first section of the procedure enables advantageously the generation of a dependency table consisting of empirical values for the system behaviour of the considered system component.

The second section of the procedure proposed here shows the following step:
Derive the systematic dependence between the first and second parameters by means of the electronic data processing and evaluation system from at least two data sets of the dependency table stored in the database, preferably from at least 50 data sets of the dependency table, particularly preferably from at least 200 data sets of the dependency table, whereby the electronic data processing and evaluation unit accesses the data sets of the dependency table and determines the systematic dependence from the data sets of the dependency table by means of an algorithm, whereby in this step the systematic dependence is advantageously derived in a mathematical way by means of a suitable algorithm.

The derived systematic dependence can then be advantageously stored so that it can be recalled for further processing, in particular the systematic dependence is stored in a non-volatile data memory. Preferably it is conceivable that the systematic dependence is stored in a database and/or in an electronic data processing and evaluation unit and/or in an electronic control unit.

Preferably the input quantity exhibits at least one measured quantity, preferably a process quantity and/or a control quantity.

Here it is suggested that the input quantity exhibits a measured quantity, in particular a process quantity and/or a control quantity.

While a control quantity is directly suitable for influencing a cleaning system and thus at least indirectly a system component of the cleaning system, a process quantity is a quantity which at least indirectly depends on a control quantity or which cannot be influenced by the usual means and only exhibits an effect on the system behaviour of a system component.

A process quantity is preferably a quantity which is present in a cleaning system or around the cleaning system and which can be influenced at least indirectly by an input quantity.

It can be advantageously achieved that a dependency table and/or a systematic dependence can have a dependency to a directly measured input quantity, especially to a process quantity and/or a control quantity, whereby important influence quantities for the system behaviour of a system component can be taken into account.

In a preferred embodiment, the output quantity and/or the input quantity exhibits a resource requirement of the cleaning process of the surface of the motor vehicle, preferably a power consumption, preferably the resource requirement is determined depending on a control quantity setpoint for the cleaning process of the surface.

The power consumption is a comparatively easy to determine quantity in combination with a system component of a cleaning system.

The power consumption of a system component can be used comparatively quickly and easily to determine whether a change has occurred for an energy-using system component, since the energy requirements of a system component fluctuate comparatively little under regular conditions.

Thus it can be advantageously achieved that the power consumption can also be taken into account for the description of the system behaviour of the system component, whereby also in the context of a diagnosis of the system component, in particular a diagnosis according to the sixth aspect of the invention, the power consumption required by the system component can be used advantageously for the comparison between the expected system behaviour and the actual system behaviour.

Optionally the output quantity and/or the input quantity exhibits a process quantity, preferably a flow pressure and/or an electric current and/or a time of operation and/or a temperature and/or a fill level signal and/or a reaction time and/or a sensing time and/or a signal of a leaking through sensor and/or a signal of a flow gauge and/or a number of actuations and/or a spray pattern and/or a heat monitoring signal, preferably a heat monitoring signal with reference to a reference area, and/or a signal of a debris sensor and/or a signal of a check valve and/or a signal of a drip sensor and/or a signal of a distance sensor and/or a signal of a force sensor.

In the context of an output quantity and/or an input quantity, a process quantity is also a valuable indicator for assessing the system behaviour of a system component of a cleaning system for a motor vehicle.

In particular, any process quantity should be considered in this context which is preferably easy to determine or which is particularly meaningful.

Specifically, the level signal of a cleaning fluid reservoir could be considered. If the cleaning system is not in active use at the moment, whereby in particular no cleaning fluid pump is actively in operation, and a decrease of the level signal for the cleaning fluid reservoir can be observed nevertheless, this speaks comparatively simply for an undesired leak in the cleaning system, through which cleaning fluid escapes.

Alternatively, the signal of a flow velocity sensor in a flow channel for cleaning fluid could also be considered, in particular by determining the static pressure on the wall of the flow channel for cleaning fluid. If, for example, a cleaning fluid pump is in active operation and all possible valves in the cleaning system are set so that a cleaning fluid should flow through the flow channel for cleaning fluid, and if the signal of the flow velocity sensor does not indicate this, then there is a deviation between the expected and the actual system behaviour. This can have several causes, such as a leak in the cleaning fluid system or an empty cleaning fluid reservoir.

It should be explicitly mentioned that also with regard to the other process quantities cause-effect correlations to the system behaviour occur.

It can thus be advantageously achieved that a process quantity in the form of an output quantity can be included in a dependency table and/or a systematic dependence for the assessment of the system behaviour, whereby the diagnosis of the cleaning system can be improved advantageously in a downstream step.

In an optional embodiment the input quantity exhibits a humidity and/or a temperature in the vicinity of the motor vehicle and/or a rainfall and/or a snowfall quantity.

It has been shown that in particular environmental conditions such as preferably humidity and/or temperature and/or rain and/or snow can have an influence on the system behaviour of a cleaning system, in particular environmental conditions in the direct vicinity of the motor vehicle.

In particular, a low temperature may lead to local freezing within the cleaning system, causing a local flow blockage.

In addition, further dependencies and influences of quantities on each other can be taken into account.

By including the above quantities in the input quantity, the accuracy of the systematic dependence can be advantageously increased.

In an expedient embodiment the input quantity exhibits a vehicle type.

The type of motor vehicle determines the concrete design and arrangement of the individual system components of a cleaning system.

Thus in different constellations and/or arrangements of system components also a different influence of the system behaviour of a first system component can be caused by the system behaviour of a second system component. The vehicle type provides information about the constellation and/or arrangement of the system components of a cleaning system and therefore represents a simple possibility to clearly record corresponding interactions.

In this respect, an interaction between a first system component and a second system component is also determined by the vehicle type.

The inclusion of the vehicle type thus allows an advantageous increase in the mapping accuracy of the systematic dependences proposed here and thus also of the dependency table.

Preferably the input quantity exhibits an availability of the sensor.

If it is suggested here that the input quantity exhibits an availability, this means preferably the availability before starting of a cleaning process using the cleaning system.

The effectiveness of a cleaning process implemented by means of a cleaning system depends not only on other influencing variables but also on the availability of a sensor whose surface is to be cleaned in an active connection with it.

The availability of a sensor is a measure of the degree of soiling of a surface connected to a sensor.

It has been shown that a different availability of a sensor at the beginning of a cleaning process exhibits an influence on the cleaning result. In other words, a possible gain of availability can be different for a cleaning process that is carried out in the same way.

Among other things, it is suggested that the input quantity exhibits the parameters of a cleaning process and/or the output quantity exhibits the gain of availability.

This makes it possible that the system behaviour of the cleaning system and/or a system component of the cleaning system can be evaluated on the basis of the cleaning result, especially depending on the parameters of the cleaning process.

This allows advantageously that the system behaviour of a cleaning system can already be evaluated with the already installed sensors, especially with the sensors for the support of driver assistance systems.

In this way it can be advantageously achieved that for the evaluation of the system behaviour of a system component of the cleaning system no extra sensors necessary only for the evaluation of the cleaning system have to be added.

It should be expressly pointed out that this aspect is particularly related to the second, third, ninth and tenth aspects of the invention. It goes without saying that this aspect is also related to the other aspects of the invention and that mutual relations exist.

Optionally the input quantity exhibits a current coordinate of the motor vehicle.

It has also been shown that the coordinate of a motor vehicle exhibits an influence on the system behaviour of a system component of a cleaning system.

Preferably the weather conditions could be taken into account, which depend on the coordinate of a motor vehicle. In particular, it has been shown that the system behaviour of a system component of a cleaning system depends on temperature and/or humidity and/or solar radiation and/or precipitation and/or snowfall.

According to a comparatively simple procedure, the weather conditions at a coordinate of the motor vehicle correlate with the current latitude on the planet, which can be determined by the coordinate of the motor vehicle.

Thus, it can be advantageously achieved that on the basis of the coordinate of a motor vehicle and on the basis of the correlation to the weather conditions, a related influencing variable on the system behaviour of a system component of a cleaning system can be taken into account, whereby the accuracy of the dependency table and/or the systematic dependence can be improved advantageously for the system behaviour.

According to a more precise approach, it is also suggested that the motor vehicle uses local information about the current and/or predicted weather at its coordinate. Thus, when determining the dependency table and/or the systematic dependence, the influencing variables which are in an effective relationship to the system behaviour of a system component of a cleaning system and which can be determined directly or indirectly by the coordinate of the motor vehicle can be used to improve the mapping accuracy for the predicted system behaviour.

It goes without saying that this aspect is related to the other aspects of the invention and that mutual relations exist.

In a preferred embodiment the output quantity exhibits the availability of the sensor and/or a gain in availability due to the cleaning process.

Here it is suggested that the output quantity exhibits the availability of a sensor and/or the gain of availability due to the use of a cleaning system.

If it is suggested here that the output quantity exhibits an availability, this means preferably the availability after completion of a cleaning process using the cleaning system.

In this way, it can be advantageously determined how the system behaviour of a system component of a cleaning system depends on the cleaning success of a cleaning process performed by a cleaning system. The gain of availability results from the difference between the availability after the cleaning process and the availability before the cleaning process.

In an expedient embodiment the systematic dependence is determined by means of a regression analysis.

Here it is suggested to use a regression algorithm as algorithm for the indirect derivation of a systematic dependence.

An algorithm which has already been tested in a large number of applications and which can be optimally selected and/or adapted according to the system behaviour considered here can thus be advantageously applied so that a systematic dependence of high quality can be determined.

Preferably, the systematic dependence is determined in form of a curve, preferably a curve and a coefficient of determination of the curve.

The advantage of this is that the systematic dependence is indicated by a curve as a function of at least one input quantity for the system behavior of a system component; in particular, this curve has no gaps, so that a clear assignment between an input quantity and an output quantity can be achieved, in particular a continuous and differentiable dependency between an input quantity and an output quantity due to the system behavior of the system component, so that the systematic dependency is ideally adapted for any mathematical methods for the use of the same.

The evaluation of a coefficient of determination from the determined data and the curve determined by means of a regression model provides an indication for the precision of the systematic dependence, assuming that a sufficient number of data sets is available. It can be advantageously evaluated how meaningful a correlation between an input quantity and an output quantity is and how well existing or recorded data can be reproduced. In addition, in the case of a large coefficient of determination, the curve also allows statements to be made about the margins of existing data. It is conceivable, for example, that data can be supplemented numerically and/or extrapolated at the margins of existing data.

Expediently the systematic dependence is determined by means of an optimization process.

Here it is suggested that the parameters of a systematic dependence are determined by means of an optimization procedure, especially by means of a minimization procedure, which minimizes the cumulated deviation of the empirical values considered by data sets from the systematic dependence. In this way, it is advantageously possible to determine a systematic dependence which can be derived in an optimal way, in particular with a minimum cumulated deviation from the initial experience values.

Preferably, the parameters of the systematic dependence are determined by maximizing the resulting coefficient of determination.

Preferably, the systematic dependence is determined by means of a self-learning optimization method.

Among other things, it is proposed to use an algorithm that exhibits the characteristics of an algorithm from the class of machine learning. Thus, the algorithm is able to derive a systematic dependence between the input quantity and a difference in availability due to soiling.

The advantage of this is that the complex task of indirectly deriving a systematic dependence by using self-learning optimization methods does not have to be laboriously adapted by humans to new conditions. Thus, time and money can be saved in the indirect derivation of systematic dependence.

The quality of the derived systematic dependence can be improved by the aspect proposed here, since an optimization procedure endeavors to determine the optimal systematic dependence even in a multi-criteria environment and under a variety of boundary conditions.

In this way, it is also conceivable that an optimization can be carried out under a plurality of equal objectives and/or boundary conditions (multi criteria optimization). In particular, a class of algorithms is considered which can determine a Paretooptimum and/or a Paretofront. In particular, a class of algorithms in the area of simplex methods and/or evolutionary strategies and/or evolutionary optimization algorithms and/or the like are suggested here for deriving the systematic dependence.

Optionally, the systematic dependence is derived using data sets of the dependency table from an already existing database, preferably data sets of an already existing database are accessed previously.

The advantage of this is that data from an existing database can also be used to derive the systematic dependence. Thus, it can be achieved that empirical values do not have to be collected at a specific motor vehicle first and transferred into data of a database and later into a systematic dependence. In this way, existing data and empirical values can be used to derive a systematic dependence on the soiling process without first having to collect empirical values representing the systematic dependence of the soiling process.

In an optional embodiment the already existing database is continuously expanded.

Advantageously, it can be achieved that the number of derivable systematic dependencies increases over time.

Furthermore, it can be advantageously achieved that the accuracy of a systematic dependence can increase due to the larger number of empirical values known by means of data sets.

Expediently, a new data set replaces the data set in the dependency table which deviates most from the derived systematic dependence.

In particular, the fact that the experience value is exchanged with the largest Euclidean distance to systematic dependence should be taken into account.

Advantageously, it can be achieved that the systematic dependence becomes more and more precise over time, which can be expressed by an increase in the coefficient of determination.

Furthermore, this can have the advantage that even weakly correlating systematic dependencies can be better identified over time.

It is also proposed that the output quantity and/or the input quantity exhibits the frequency and/or the speed of the cleaning fluid pump.

This can advantageously improve the dependency table and/or systematic dependence accuracy as it has been found that the frequency and/or the speed of the cleaning fluid pump can influence the system behaviour of a system component.

It is further suggested that the output quantity and/or the input quantity exhibits the dimension of a nozzle and/or the wash fluid type and/or the wash fluid quality.

This can advantageously improve the dependency table and/or systematic dependence accuracy since it has been found that the dimension of a nozzle and/or wash fluid type and/or wash fluid quality can influence the system behaviour of a system component.

It is suggested that the output quantity and/or the input quantity exhibits the pump diaphragm material and/or the hose material.

This can advantageously improve the dependency table and/or systematic dependence accuracy as it has been found that the pump diaphragm material and/or the hose material can influence the system behaviour of a system component.

It should be noted that the subject-matter of the fifth aspect can be advantageously combined with the subject-matter of the preceding aspects of the invention, either individually or cumulatively in any combination.

According to a first alternative of a sixth aspect of the invention, the task is solved by a method for diagnosing a system behaviour of a system component of a cleaning system of a motor vehicle, wherein an output quantity depends on an input quantity by means of the system behaviour of the system component of the cleaning system, wherein exceeding an upper threshold quantity by an actual output quantity and/or falling below a lower threshold quantity by the actual output quantity indicates that an actual system behaviour deviates from an expected system behaviour, exhibiting the following steps:

Preferably determine the input quantity;

Determine the actual output quantity;

Retrieve the upper threshold quantity and/or the lower threshold quantity, preferably depending on the input quantity;

Compare the actual output quantity with the upper threshold quantity and/or the lower threshold quantity;

Preferably calculate a deviation between the actual output quantity and the upper threshold quantity, if the actual output quantity has exceeded the upper threshold quantity, and/or calculate the deviation between the actual output quantity and the lower threshold quantity, if the actual output quantity has fallen below the lower threshold quantity; and Preferably store a diagnostic signal if the actual output quantity exceeds the upper threshold quantity and/or if the actual output quantity falls below the lower threshold quantity.

Here a procedure for the monitoring and diagnosis of a system component of a cleaning system of a motor vehicle is proposed.

The number of system components of a cleaning system and also the number of functions of a cleaning system increase due to the increasing number of driver assistance systems in a motor vehicle.

At the same time, the number of different combinations of different system components on the market to form a cleaning system also increases, with different system components usually being provided by different suppliers.

As a consequence, the complexity of a cleaning system has also increased, as has the need for maintenance to maintain fault-free system operation.

This has increased the need for systematic at least partially automated or automatable approaches for the early detection of a possible error in a system component of a cleaning system.

It was unexpectedly discovered that electrical and mechanical abnormalities in the system behaviour of a system component of a cleaning system are often connected. This finding can be used to evaluate a system component on the basis of mechatronic concepts.

If an evaluation of a cleaning system currently depends predominantly on visual observation, an evaluation of a system component on the basis of mechatronic concepts can advantageously lead to the fact that already existing or with little effort additional electrical signals of a system component of a cleaning system can also be used for the evaluation of possible mechanical faults. Previously, this was only possible through visual inspection by trained personnel.

In particular, a mechanical abnormality in the system behaviour of a system component can often be advantageously identified by at least partially automated observation of the electrical behaviour of a system component. Thus, a multitude of different possible problems in connection with a cleaning system can be detected by monitoring electrical quantities.

In particular, it was unexpectedly determined that the time course of an inrush current of a cleaning fluid pump in the presence of a mechanical blocking of a flow channel for cleaning fluid can show characteristic differences to the time course of the inrush current in the presence of an error-free regular switching on of the cleaning fluid pump, especially in the case of a mechanical blocking of the flow channel until the designated outlet of the cleaning fluid in a nozzle. It can be especially advantageous possible to differentiate between a partial blocking and a full blocking of the flow channel for cleaning fluid.

While the temporal course of the inrush current when the cleaning fluid pump is switched on in the regular case only results in a short overshooting step response, the step response in the presence of a mechanical interlocking can in particular show a temporally more pronounced course in which the current reaches the expected value of a continuous operation of the cleaning fluid pump only with a measurable damping.

The procedure proposed here can preferably be carried out autonomously and can therefore preferably be carried out autonomously within the framework of a self-diagnosis of the cleaning system and report if an abnormal system behaviour of a system component of a cleaning system is diagnosed.

In particular, it should also be considered that the diagnostic procedure proposed here can preferably be activated without the intervention of the driver of the motor vehicle by means of the electronic control unit of the motor vehicle and/or the cleaning system. Furthermore, it should also be considered that the diagnostic procedure proposed here can preferably be activated manually by the driver of the motor vehicle.

The diagnosis proposed here compares the expected behaviour of a system component of a cleaning system with a system behaviour determined during the monitoring of this system component by means of an actual output quantity. This comparison is performed using at least one value of an output quantity.

The expected system behaviour is based in particular on empirical values for the evaluated system component. These empirical values can be based on observations in regular operation of the motor vehicle or in the laboratory or be the result of a numerical model.

If the comparison leads to the result that the monitored system behaviour of the system component corresponds to the expected system behaviour, it is concluded that the system component has no defect and/or no fault and/or the system component is not impaired by external influences acting on the system component.

The expected system behaviour is determined according to the method proposed here on the basis of an upper threshold quantity and/or a lower threshold quantity. If the signal of the actual output quantity lies or runs within the range defined by the upper threshold quantity and the lower threshold quantity, then the system behaviour of the considered system component is not unexpected, whereby this range can also be unilaterally open, provided that only an upper threshold quantity or a lower threshold quantity is specified.

Thus, the method proposed here requires a list with at least one upper threshold value or at least one lower threshold value for an output quantity. Each threshold value is an individual value for each output quantity and can also preferably depend on the input quantity and the system component under consideration.

Preferably the upper threshold quantity and/or the lower threshold quantity depends on a process quantity.

If a monitored output quantity exceeds an individually associated upper threshold value or if a monitored output quantity falls below an individually associated lower threshold value, then there is a deviation that can be characterized by another output quantity if necessary.

Furthermore, it is conceivable that a resolution strategy is known from experience with which the particular deviation can be corrected, especially after the seventh and/or eighth aspect of the invention.

If the deviation of the monitored output quantity from the expected output quantity and/or the characterisation of the deviating system behaviour results in a known pattern of behaviour, this can be associated with a recommendation for action. Such a recommendation for action is also based on empirical values, whereby these empirical values can also be largely systematized.

With regard to systematized empirical values, it should be specifically considered that, depending on the type and severity of the deviation of the monitored output quantity from the expected output quantity, a certain error can be inferred. Preferably this conclusion is valid or at least transferable for a plurality of different system components and a plurality of different cleaning systems.

For example, it should be considered here that an increased power consumption of a cleaning fluid pump and thus a deviation of the system behaviour leads to the conclusion that there is an error in the cleaning system. It is especially conceivable here that the cleaning fluid pump will age, whereby it is particularly conceivable in concrete terms that a higher energy requirement will have to be used for a controlled pump pressure of the cleaning fluid pump.

Alternatively, it is conceivable in this case that there is a blockage in the flow channel downstream of the cleaning fluid pump which causes an increased back pressure which influences the system behaviour of the cleaning fluid pump. Depending on the situation, a differentiation to localize the cause of the diagnosed deviation can be made by comparing a different output quantity. For this, experience values are necessary, which can be available in a list in particular.

This also shows that a deviation between an expected output quantity and an actual output quantity of a system behaviour of a system component does not have to be caused by the monitored system component itself.

In case of a blockage in front of the pump, a possible resolution strategy to correct the deviation with on-board means can be to increase the pump pressure in a targeted way, whereby the blockage can be released and washed out of the cleaning system. In particular, a selection of a resolution strategy according to the seventh aspect of the invention could be considered.

When implementing a resolution strategy, particular consideration should be given to implementing the resolution strategy according to the eighth aspect of the invention.

If a selected and implemented resolution strategy is successful, a system behaviour of the system component will result which corresponds to the expected system behaviour.

It should be expressly pointed out that the diagnostic method described here can be applied to any system component. If a sufficient number of sensors or measuring devices, a sufficient number of experience values regarding the expected system behaviour of one or more system components and a list of potentially successful resolution strategies are available, a large number of occurring deviations can be corrected with on-board devices. Deviations of the system behaviour which cannot be repaired with on-board resources can also be detected at an early stage and repaired within the scope of regular or early maintenance, whereby a possible extension of possible damage in the other case can be prevented advantageously.

It goes without saying that the input quantity, the output quantity, the lower threshold quantity and/or the upper threshold quantity and/or the deviation can be scalar or vector quantities.

Furthermore, it is optionally suggested that a diagnostic signal be stored or passed on to an electronic control unit of the motor vehicle.

Preferably it is proposed to calculate a deviation between the actual output quantity and the upper threshold quantity if the actual output quantity exceeds the upper threshold quantity, and/or to calculate a deviation between the actual output quantity and the lower threshold quantity if the actual output quantity falls below the lower threshold quantity.

The above quantities are scalar if only a single parameter is to be evaluated without a temporal course of this parameter. In all other cases, in particular when considering several parameters of the cleaning system and/or when considering at least one temporal course of a parameter, the above quantities are to be understood as vector quantities.

The preferably proposed calculation of the deviation between the actual output quantity and the upper threshold quantity and/or the lower threshold quantity therefore also depends on whether the output quantities are scalar or vectorial. It is proposed that the upper threshold quantity and/or the lower threshold quantity be adjusted to the dimensional characteristic of the actual output quantity, unless this is already the case, whereby it must be ensured that the upper threshold quantity and/or the lower threshold quantity and the actual output quantity each have corresponding values.

In the case of a vectorial actual output quantity, the calculation of the deviation takes place separately for each component, i.e. dimension for dimension.

A deviation can occur for some or all components of the actual output quantity, whereby at the same time a deviation is conceivable for a component because the corresponding component of the lower threshold quantity is undershot and a deviation for a component because the corresponding component of the upper threshold quantity is overshot.

If a deviation is determined with regard to at least one component between the upper threshold quantity and/or the lower threshold quantity and the actual output quantity, a further investigation of this deviation is proposed.

This diagnostic signal may include that no deviation of the actual system behaviour from the expected system behaviour has been detected.

Furthermore, the diagnostic signal may include that a deviation of the actual system behaviour from the expected system behaviour has been detected, whereby the type and expression of the deviation may also be stored in the diagnostic signal.

Preferably it is suggested that the diagnostic signal exhibits a deviation.

Preferably the diagnostic signal exhibits an output quantity and/or a course of an output quantity over time, wherein the course of the output quantity over time exhibits at least two points in time, preferably at least ten points in time and particularly preferably at least 20 points in time.

It should be pointed out that the above values for the amount of values over time should not be understood as sharp limits, but rather should be able to be exceeded or fallen below on an engineering scale without leaving the described aspect of the invention. In simple terms, the values are intended to provide an indication of the size of the amount of values over time range proposed here.

In particular, it should also be remembered that the diagnostic signal exhibits a plurality of temporal curves of the output quantity over time, in particular together with the input quantity and/or the process quantity.

This makes it advantageously possible to observe and evaluate a change in the system behaviour of a system component, especially with regard to possible ageing effects and/or a remaining life expectancy of the system component, preferably depending on an input quantity and/or a process quantity.

Thus, an at least partially automated error detection regarding the system behaviour of a system component of a cleaning system for a motor vehicle can be made possible in an advantageous way, where possible errors can be detected autonomously at an early stage.

This also makes it possible to identify possible sources of follow-up errors at an early stage, which can advantageously limit the spread of an error.

In this way, the interval at which an optical inspection should be carried out by trained specialists can also be advantageously extended, thus reducing the overall maintenance costs for the cleaning system and the expected availability of the cleaning system.

According to a second alternative of a sixth aspect of the invention, the task is solved by a method for diagnosing a deviation between an actual system behaviour and an expected system behaviour of a system component of a cleaning system of a motor vehicle, wherein an output quantity depends on an input quantity by means of a system behaviour of the system component of the cleaning system, wherein the actual system behaviour depending on the input quantity is represented by an actual output quantity and the expected system behaviour depending on the input quantity is represented by an expected output quantity, wherein the expected system behaviour is represented by at least one data set of a dependency table or a systematic dependence, preferably a systematic dependence derived by a method according to the fifth aspect of the invention, exhibiting the following steps:
Preferably determine the input quantity;
Determine the actual output quantity;
Determine the expected output quantity by:
Select the data set from the dependency table that best matches the input quantity, read the output quantity stored in the selected data set and take it as the expected output quantity; or
Select the two data sets from the dependency table that best matches the input quantity an determine the expected output quantity using linear interpolation based on the two selected data sets; or
Calculate the expected output quantity by inserting the input quantity into the systematic dependence;
Calculate the deviation between the actual output quantity and the expected output quantity; and
Preferably store a diagnostic signal if the deviation is greater than 10% of the expected output quantity, preferably 5% greater than the expected output quantity, particularly preferably 2% greater than the expected output quantity.

Parallel to the first alternative of the sixth aspect of the invention, this second alternative of the sixth aspect of the invention also proposes a procedure for the monitoring and diagnosis of a system component of a cleaning system of a motor vehicle.

It should be expressly pointed out that the unrestricted description of the first alternative of the sixth aspect of the invention described above is also valid for the second alternative of the sixth aspect and vice versa, whereby the actual output quantity is compared differently not with a lower threshold quantity and/or an upper threshold quantity but with an expected output quantity.

In contrast to the first alternative, according to the second alternative of the sixth aspect of the invention, it is proposed that the actual output quantity is compared with an expected output quantity, whereby a deviation between the actual output quantity and the expected output quantity is determined.

The diagnosis proposed here compares the expected system behaviour of a system component of a cleaning system with an expected system behaviour. This comparison is performed on the basis of at least one value of an actual output quantity in comparison to the corresponding value of the expected output quantity.

The expected system behaviour is based in particular on empirical values for the system component diagnosed with the proposed method. These empirical values can be based on observations in regular operation of the motor vehicle or in the laboratory or be the result of a numerical model suitable for mapping the regular system behaviour of the cleaning system.

Preferably the expected system behaviour and thus also the expected output quantity depends on an input quantity by which the cleaning system is operated.

Preferably the expected system behaviour and thus the expected output quantity depends on a process quantity.

According to this second alternative of the sixth aspect of the invention further three in each case deviating variants are suggested, by means of which the expected output quantity can be determined on the basis of empirical values.

According to a first and second variant it is conceivable that an expected system behaviour of a system component is described by a dependency table, especially a dependency table, which has been created according to the first steps of the method according to the fifth aspect of the invention.

It should be explicitly mentioned that the dependency table may depend on the system component to be diagnosed, an input quantity and/or a process quantity.

Such a dependency table describes discrete empirical values for the expected system behaviour of one system component at a time, so that an empirical value must first be selected from the dependency table before comparison with the actual output quantity.

With regard to the evaluation of the dependency table, the first and second variants for determining the expected output quantity differ from each other.

According to the first variant for the selection of an expected output quantity, it is proposed to select from the dependency table the experience value in the form of a data set which is best suited by comparing the actual input quantity and/or the actual process quantity with the input quantity and/or the process quantity of the respective data set, in particular best suited defined by the shortest Euclidean distance with regard to the input quantity and/or the process quantity between a data set stored in the dependency table and the actual input quantity and/or the actual process quantity.

According to the second variant for the selection of an expected output quantity, it is proposed to select the two best fitting and adjacent empirical values according to the description of the first variant in the form of two data sets from the dependency table and to interpolate between these two empirical values according to the actual input quantity and/or the actual process quantity.

According to a third variant for the selection of an expected output quantity, it is proposed that an expected system behaviour of a system component is mapped by means of a systematic dependence, in particular by means of a systematic dependence derived according to the fifth aspect of the invention.

A systematic dependence can describe the expected system behaviour continuously as a function of the actual input quantity and/or the actual process quantity, so that a selection or interpolation between empirical values, as described above for the second variant, is no longer necessary.

Just like the dependency table according to variants one and two, the systematic dependence could be only valid for one system component, so that for a consideration of a deviating system component a deviating systematic dependence or a deviating dependency table can or should be selected.

It is understood that the input quantity, the actual output quantity, the expected output quantity and/or the deviation can be scalar or vectorial quantities. The above quantities are scalar if only a single parameter describing the system behavior of the system component is to be evaluated without a temporal course of this parameter. In all other cases, in particular when considering several parameters of the cleaning system and/or when considering at least one temporal course of a parameter, the above variables are to be understood as vectorial quantities.

The calculation of the deviation between the actual output quantity and the expected output quantity therefore also depends on whether the output quantities are scalar or vectorial. It is preferably suggested that the expected output quantity is adjusted to the dimensional characteristic of the actual output quantity, if this is not already the case, whereby in each case it must be ensured that the expected output quantity and the actual output quantity each have quantities corresponding to each other.

In the case of a vectorial actual output quantity, the calculation of the deviation takes place separately for each component, i.e. dimension for dimension.

If a deviation is determined with regard to at least one component between the expected output quantity and the actual output quantity, a further investigation of this deviation is proposed.

According to the discussion already mentioned above, measurement errors and expected fluctuations of a respective signal can also occur in regular operation when determining measured values.

Accordingly, not every nominal deviation between an expected output quantity and an actual output quantity leads to a deviation of the actual system behaviour of a system component from its expected system behaviour.

In order to quantify when it is a deviation of the actual system behaviour of a system component from the expected system behaviour, it is suggested here to use a relative deviation between the actual output quantity and the expected output quantity.

This relative comparison is also performed component by component. It should also be considered that a limit value above which a deviation between the actual system behaviour of the system component and the expected system behaviour deviates could be specified for each component in different sizes according to the available empirical values.

Among other things, a limit value of a deviation of 10%, preferably of 5% and in particular of 2% is proposed.

It should be pointed out that the above values for the limit value of a deviation should not be understood as sharp limits, but rather should be able to be exceeded or fallen below on an engineering scale without leaving the described aspect of the invention. In simple terms, the values are intended to provide an indication of the size of the limit value of a deviation proposed here.

Preferably the limit value of a deviation is 15%. Furthermore preferably the limit value of a deviation is 20%. Furthermore preferably the limit value of a deviation is 25%. Furthermore preferably the limit value of a deviation is 30%.

If the ratio between the actual output quantity and the expected output quantity exceeds the limit value in at least one component, the actual system behaviour differs from the expected system behaviour of the considered system component.

Otherwise the actual system behaviour corresponds to the expected system behaviour and it can be concluded that the considered system component of the cleaning system has no defect and/or no malfunction and/or the system component is not impaired by external influences acting on the system component.

In particular, a deviation between an expected output quantity and an actual output quantity of a system behaviour of a system component need not be caused by the monitored system component itself.

Rather it can be part of the further diagnosis which system component of the cleaning system shows or could show a possible error depending on the deviation determined.

Please note that the diagnostic method described here can be used for any system component. If a sufficient number of sensors or measuring devices, a sufficient number of experience values regarding the expected system behaviour of one or more system components and a list of potentially successful resolution strategies are available, a large number of occurring deviations can be corrected with on-board devices. Deviations of the system behaviour which cannot be repaired with on-board resources can also be detected at an early stage and repaired within the scope of regular or early maintenance, whereby a possible extension of possible damage in the other case can be prevented advantageously.

Furthermore, it is optionally suggested that a diagnostic signal be stored or passed on to an electronic control unit of the motor vehicle.

This diagnostic signal may include that no deviation of the actual system behaviour from the expected system behaviour has been detected.

Furthermore, the diagnostic signal may include that a deviation of the actual system behaviour from the expected system behaviour has been detected, whereby the type and expression of the deviation may also be stored in the diagnostic signal.

Preferably the diagnostic signal exhibits an output quantity and/or a course of an output quantity over time, wherein the course of the output quantity over time exhibits at least two points in time, preferably at least ten points in time and particularly preferably at least 20 points in time.

It should be pointed out that the above values for the amount of values over time should not be understood as sharp limits, but rather should be able to be exceeded or fallen below on an engineering scale without leaving the described aspect of the invention. In simple terms, the values are intended to provide an indication of the size of the amount of values over time range proposed here.

In particular, it should also be remembered that the diagnostic signal exhibits a plurality of temporal curves of the output quantity over time, in particular together with the input quantity and/or the process quantity.

This makes it advantageously possible to observe and evaluate a change in the system behaviour of a system component, especially with regard to possible ageing effects and/or a remaining life expectancy of the system component, preferably depending on an input quantity and/or a process quantity.

If the comparison between the actual output quantity and the expected output quantity is completed, the diagnostic method can be stopped or alternatively continued with the same system component again or with a different system component.

Thus, an at least partially automated error detection regarding the system behaviour of a system component of a cleaning system for a motor vehicle can be made possible in an advantageous way, where possible errors can be detected autonomously at an early stage.

This also makes it possible to detect possible sources of follow-up errors at an early stage, which can advantageously limit the propagation of an error.

In this way, the interval at which an optical inspection should be carried out by trained specialists can also be advantageously extended, thus reducing the overall maintenance costs for the cleaning system.

In a preferred embodiment, the deviation exhibits a temporal course, preferably the temporal course exhibits at least two points in time in the process, preferably at least 10 points in time, particularly preferably at least 20 points in time.

Here it is concretely proposed to consider the previously discussed deviation now also as course of the deviation over time.

Preferably, the course of deviation over time can also be stored, preferably in a database.

Preferably, the temporal course is stored with the diagnostic signal.

In particular, it is suggested that the time course of the deviation begins shortly before a planned change of an input quantity. Preferably, the time course of the deviation ends after the next planned change of time.

In particular, it should be remembered that the output quantity is diagnosed over a period of time which at least slightly exceeds two planned changes of an input quantity on both sides. In particular, the diagnosis of a time course of an output quantity starts before the switching on of a cleaning fluid pump and ends after the switching off of the cleaning fluid pump.

Based on the time course of an output quantity, a systematic error of a system component can be evaluated, in particular a systematic error that exhibits a dependency on the damping of the system behaviour of the system component.

Furthermore, it is advantageous to consider that a temporal course does not run continuously, but rather records a certain output quantity after each activation of a system component.

In particular, it should be remembered that a fluid pressure downstream of the cleaning fluid pump and/or a current and/or a fluid velocity downstream of the cleaning fluid pump are recorded after each switch-on process in a defined time unit after the switch-on process and the individual values recorded in each case are recorded and diagnosed as a time series.

In this way, a performance degrading of the cleaning fluid pump over lifetime can be advantageously evaluated so that a warning can be provided if the cleaning fluid pump is expected to be replaced.

It should be pointed out that the above values for the amount of data points in time should not be understood as sharp limits, but rather should be able to be exceeded or fallen below on an engineering scale without leaving the described aspect of the invention. In simple terms, the values are intended to provide an indication of the size of the amount of data points in time range proposed here.

The system behaviour of a system component can be evaluated advantageously on the basis of a temporal course of the output quantity, whereby a multiplicity of further analysis possibilities is offered, in particular such analysis possibilities, which stand with the transmission behaviour of the system component in relation.

In particular, the temporal course of the deviation could be evaluated as a function of the input quantity and/or the output quantity, whereby data which have the same or a very similar input quantity and/or process quantity is compared with one another.

Preferably, the temporal course exhibits at least 30 points in time. Preferably, the temporal course exhibits at least 40 points in time. Preferably, the temporal course exhibits at least 50 points in time.

Preferably, the findings of the analysis of the temporal course of the deviation are stored together with the diagnostic signal and/or in the diagnostic signal.

Preferably, the temporal course of the deviation is examined for a step response.

Here it is proposed to evaluate the temporal course of the output quantity with regard to a step response, in particular with regard to a step response as a reaction to a change in an input quantity.

In particular, the value of the output quantity or the changed change of the output quantity could be examined for the change of the input quantity.

Furthermore, it is proposed that the temporal course of the output quantity be examined preferably with regard to the transmission behavior as part of the system behavior of the system component, whereby the damping that affects the output quantity can be determined.

Preferably it can be diagnosed whether a nozzle is 'partially or completely clogged for the cleaning fluid'. For example, a spike in the pressure behind the cleaning fluid pump indicates that a nozzle is blocked. The shape of the spike can provide an advantageous indication of whether the flow channel behind the pump is completely or partially blocked.

The comparison of the characteristic characteristics may require a comparison of the course of the spike with one or more benchmark courses of the pressure.

If a blockage of the nozzle is detected, a resolution strategy can be used according to the seventh and/or eighth aspect of the invention.

Alternatively, a warning can be generated requesting manual cleaning of the nozzle.

By monitoring the inrush current of a cleaning fluid pump over time, it is also possible to diagnose whether it is blocked, especially in frozen conditions.

In particular, a blocked cleaning fluid pump has a higher damping with regard to the inrush current.

If a blocked cleaning fluid pump is detected, it can in particular be switched off, which has the advantage of preventing the cleaning fluid pump from burning out.

The system behaviour of a system component can be evaluated advantageously on the basis of a temporal course of the output quantity, whereby a multiplicity of further analysis possibilities is offered, in particular such analysis possibilities, which stand with the transmission behaviour of the system component in relation.

In particular, the step response could be evaluated as a function of the input quantity and/or the output quantity, whereby data which have the same or a very similar input quantity and/or process quantity is compared with each other.

Preferably, the findings of the analysis of the temporal course of the deviation are stored together with the diagnostic signal and/or in the diagnostic signal.

Expediently, at least two temporal courses of the deviation are examined for the presence of a drift of the deviation over time, preferably at least five courses of the deviation, preferably at least 10 courses of the deviation.

Here it is suggested to evaluate the temporal course of the output quantity with regard to a drift of the output quantity over time.

A drift is a systematic change of the output quantity as a reaction to an input quantity over the lifetime of the system component.

The temporal course of the output quantity can be compared with previously observed temporal courses of the output quantity over time, especially with a plurality of temporal courses of the output quantity over time.

If the deviation with time is continuously moving in one direction starting from the expected system behaviour of the system component, a drift is present. According to the characteristic, it can be advantageously determined how in particular an age-related change of the system behaviour of the system component develops.

Furthermore, it is advantageous to consider that a temporal course does not run continuously, but rather records a certain output quantity after each activation of a system component.

In particular, it should be remembered that a fluid pressure downstream of the cleaning fluid pump and/or a current and/or a fluid velocity downstream of the cleaning fluid pump are recorded after each switch-on process in a defined time unit after the switch-on process and the individual values recorded in each case are recorded and diagnosed as a time series.

In this way, a performance degrading of the cleaning fluid pump over lifetime can be advantageously evaluated so that a warning can be provided if the cleaning fluid pump is expected to be replaced.

In particular, the temporal course of the deviation could be evaluated for the presence of a drift as a function of the input quantity and/or the output quantity, whereby data which have the same or a very similar input quantity and/or process quantity is compared with one another.

Preferably, at least 20 temporal courses of the deviation are examined for the presence of a drift of the deviation over time. Preferably, at least 30 temporal courses of the deviation are examined for the presence of a drift of the deviation over time. Preferably, at least 40 temporal courses of the deviation are examined for the presence of a drift of the deviation over time.

It should be pointed out that the above values for the amount of temporal courses of the deviation should not be understood as sharp limits, but rather should be able to be exceeded or fallen below on an engineering scale without leaving the described aspect of the invention. In simple terms, the values are intended to provide an indication of the size of the amount of temporal courses of the deviation range proposed here.

Preferably, the findings of the analysis of the temporal course of the deviation are stored together with the diagnostic signal and/or in the diagnostic signal.

The cause for an actual system behaviour deviating from the expected system behaviour may be based on the currently diagnosed system component or may have a cause which is based on a deviating system component, but which is transferred to the actually diagnosed system component according to a system-dependent transfer function between the components.

If a corresponding transfer function is not known, it is suggested to diagnose further system components to limit the cause.

The diagnostic signal preferentially exhibits information about the input quantity, which has an effect on the cleaning system and/or the system component during the diagnosis of the system component.

The diagnostic signal preferentially exhibits information about the process quantity, which has affected the cleaning system and/or the system component during the diagnosis of the system component.

It goes without saying that the advantages of systematic dependence, in particular systematic dependence according to the fifth aspect of the invention, also apply to the use of systematic dependence, in particular the use of systematic dependence proposed here according to the sixth aspect of the invention.

It should be noted that the subject-matter of the sixth aspect can be advantageously combined with the subject-matter of the preceding aspects of the invention, either individually or cumulatively in any combination.

According to a seventh aspect of the invention, the task is solved by a method for selecting a resolution strategy from a list of resolution strategies contained in a database depending on a present diagnostic signal, preferably depending on a present diagnostic signal received according to the sixth aspect of the invention, whereby the list of resolution strategies contains at least one resolution strategy associated with a diagnostic signal, whereby the resolution strategy is selected from the list of resolution strategies whose associated diagnostic signal best matches the present diagnostic signal.

If the actual system behaviour of a system component of a cleaning system for a motor vehicle does not correspond to the expected system behaviour, the deviation between the actual system behaviour and the expected system behaviour can have several causes.

In particular, the cause for an actual system behaviour deviating from the expected system behaviour may be due to the currently diagnosed system component or may have a cause which is due to a deviating system component but which is transferred to the actually diagnosed system component according to a system-dependent transfer function between the system components.

Preferably the category of a cause for a deviation between the actual system behaviour and the expected system behaviour can be determined by a diagnostic signal, especially by a present diagnostic signal according to the sixth aspect of the invention.

A present diagnostic signal means the diagnostic signal which is subject to a resolution strategy within the scope of this method. In particular, a present diagnostic signal may have been created using a method according to the sixth aspect of the invention. In particular, a present diagnostic signal indicates that there is a deviation between the actual system behaviour and the expected system behaviour.

When determining the cause of a deviation between the actual system behaviour and the expected system behaviour by means of the diagnostic signal, the input quantity and/or the process quantity which has an effect on the system component and/or the cleaning system when determining the diagnostic signal is particularly preferred.

It should be specifically considered that a present diagnostic signal can be associated with causes for a deviation for the system behaviour of a system component on the basis of existing empirical values, and preferably can be unambiguously associated.

Furthermore, it could be specifically considered that these empirical values are systematised to such an extent that they are valid for a plurality of different system components and/or a plurality of different cleaning systems or at least transferable.

In this way, it can be advantageously achieved that on the basis of existing experience with different system components of different cleaning systems, in particular different cleaning systems of different manufacturers or suppliers, an unambiguous assignment can be made between a present diagnostic signal and a cause for the deviation of the system behaviour, in particular an unambiguous manufacturer-independent and type-independent assignment for the cleaning system and/or the specific system component.

In particular, four different categories of causes of a deviation between the actual system behaviour and the expected system behaviour are proposed, which preferably can be distinguished by means of a diagnostic signal, especially preferred by means of a present diagnostic signal according to the sixth aspect of the invention.

Specifically, it is proposed here to determine a category of a cause in the presence of a present diagnostic signal.

According to a first category for a cause of a deviation between the actual system behaviour and the expected system behaviour there is a defect of a system component. In this respect, a multitude of different defects is conceivable.

In particular, it is conceivable that a cleaning fluid line has detached itself from a system component of the cleaning system if a defect is present. Such a defect could also be repaired by an untrained person.

Furthermore it is conceivable that a leakage in a cleaning fluid line is present. In this case, a spare part is needed at least in the medium term and the defect cannot be repaired by an untrained person alone at least in the medium term.

According to a second category for a cause of a deviation between the actual system behaviour and the expected system behaviour, there is an ageing phenomenon of a system component.

Even if the majority of the system components of a cleaning system of a motor vehicle are designed in such a way that they survive the expected lifetime of a motor vehicle, a system component still ages. In concrete terms, it is also conceivable that a system component ages faster than intended, so that the expected lifetime of this system component is shorter than the planned lifetime of the motor vehicle. In this case, the replacement of such a component is unavoidable for the further regular operation of the cleaning system.

Preferably, an ageing phenomenon can be detected and/or evaluated on the basis of a drift of the deviation over time, in particular on the basis of a drift of the deviation according to the sixth aspect of the invention.

The course of the drift of the deviation over time is a particularly preferred way of determining how big the remaining expectation is for the usability of the system component.

According to a third category for a cause of a deviation between the actual system behaviour and the expected system behaviour there is a disturbance of a system component.

It should be expressly mentioned that there may be a fault in the system component that has been subjected to a diagnostic procedure, in particular a diagnostic procedure according to the sixth aspect of the invention. Alternatively, the fault can also be caused by a deviating system component, whereby the fault is transferred to the system behaviour of the system component inferior to the diagnostic procedure, in particular by means of a transfer function.

According to a fourth category for a cause of a deviation between the actual system behaviour and the expected system behaviour, there is an unknown cause for the deviation of the system behaviour of a system component.

If no cause for the deviation between the actual system behaviour and the expected system behaviour of the system component can be determined on the basis of a diagnostic signal, there is an unknown cause.

It should be kept in mind, among other things, that so far there are not enough empirical values for a conceivable cause for the deviation or an assignment of a cause would lead to an ambiguous result.

A resolution strategy is a method which, when applied to a cleaning system of a motor vehicle, is designed to trace back a deviation between the actual system behaviour and the expected system behaviour found in a system component of a cleaning system of a motor vehicle.

In other words, a resolution strategy can advantageously achieve that the deviation with regard to the system component has become smaller or that the actual system behaviour again corresponds to the expected system behaviour.

Especially preferred, the resolution strategy exhibits an input quantity, which influences the cleaning system and/or the system component on the cleaning system and/or the system component when the resolution strategy is applied.

Preferably a resolution strategy exhibits a notice to the driver of the motor vehicle and/or the manufacturer of the motor vehicle.

Preferably, a resolution strategy exhibits a measure to plan maintenance and/or repair of the motor vehicle.

A resolution strategy is preferably based on experience with the operation of a cleaning system. This experience may have been gained during the operation of the motor vehicle and/or in the laboratory and/or on the basis of a numerical model and/or may be the result of existing maintenance recommendations and/or may be based on heuristic findings.

A suitable resolution strategy depends on the deviation of the system behaviour and/or the present diagnostic signal, especially on the present diagnostic signal determined according to the sixth aspect of the invention.

Preferably a suitable resolution strategy depends on a process quantity.

Preferably, a resolution strategy depends on the input quantity that affected the cleaning system and/or the system component when the deviation of the system behaviour and/or the diagnostic signal was determined.

It can be advantageously achieved by a resolution strategy that a system component of a cleaning system behaves again as it is to be expected. This allows the functionality of a cleaning system to be returned to regular operation despite a previously existing deviation of the system behaviour.

Overall, a resolution strategy can be so advantageous that the functionality of the driver assistance systems can be maintained longer despite a diagnosed deviation of the system behaviour of a system component of the cleaning system.

Here it is specifically proposed to select a resolution strategy suitable for a present diagnostic signal from a list of known resolution strategies.

In particular, it is proposed that the list of known resolution strategies be taken from a database that can be accessed from the motor vehicle. The motor vehicle can also be wirelessly connected to a suitable database of exhibiting resolution strategies.

In addition to the resolution strategy, the database also exhibits the associated diagnostic signal, which the resolution strategy has been set up to remedy.

In addition to the resolution strategy, the database preferably exhibits the input quantity which has an effect on the system component and/or the cleaning system when determining the present diagnostic signal.

In addition to the resolution strategy, the database could preferably exhibit the process quantity that influenced the system component and/or the cleaning system in determining the present diagnostic signal.

Preferably, the resolution strategy can be determined by means of a present diagnostic signal, especially by means of a present diagnostic signal obtained according to the sixth aspect of the invention.

The resolution strategy is selected from the database whose diagnostic signal assigned to it in the database best matches the present diagnostic signal.

Preferably, the most suitable resolution strategy is selected from the database using the smallest Euclidean distance between the diagnostic signal assigned to it in the database and the present diagnostic signal.

When determining the resolution strategy by means of the present diagnostic signal, particular preference is given to the input quantity and/or the process quantity which has an effect on the system component and/or the cleaning system when determining the present diagnostic signal.

It is furthermore preferably suggested, that the database with the resolution strategies is first prefiltered with regard to the best fitting input quantity and/or the best fitting process quantity, in particular on the basis of the corresponding Euclidean distance between the input quantity and/or process quantity stored in the diagnostic signal and the input quantity and/or process quantity in the database.

It is proposed to subsequently select the resolution strategy on the basis of the present diagnostic signal according to the smallest possible Euclidean distance to the remaining resolution strategies according to the above procedure.

A resolution strategy can thus be advantageously selected which is advantageously set up to reduce a deviation of the system behaviour of a system component of the cleaning system and/or to inform the driver and/or the manufacturer of the fault and/or to bring about an upcoming maintenance and/or repair measure.

Furthermore, it should be specifically considered that the empirical values on which each resolution strategy is based are systematised to such an extent that they are valid or at least transferable for a plurality of different system components and/or a plurality of different cleaning systems.

In this way, it can be advantageously achieved that on the basis of existing experience with different system components of different cleaning systems, in particular different cleaning systems of different manufacturers or suppliers, an unambiguous assignment can be made between a present diagnostic signal and a resolution strategy, in particular an unambiguous cross-manufacturer and cross-type assignment for the cleaning system and/or the specific system component.

A conceivable resolution strategy is that if there is a deviation of the actual system behaviour from the expected system behaviour in a cleaning fluid pump, which indicates a blockage of the flow channel between the cleaning fluid reservoir and an outlet opening at a nozzle, in particular by the increased energy requirement of the cleaning fluid pump and/or by a comparatively low outlet quantity of cleaning fluid at an outlet opening of a nozzle and/or by an increased static pressure of the cleaning fluid downstream of the cleaning fluid pump and/or by a lower flow velocity of the cleaning fluid downstream of the cleaning fluid pump, an increase in the supply voltage and/or the target speed of the cleaning fluid pump is proposed as the resolution strategy. This can be advantageous in removing any blockage and flushing it out of the cleaning system.

If a cleaning fluid pump exhibits a high current flow but no impulses from a present Hall sensor, this indicates a stalled motor of the cleaning fluid pump.

If no cleaning result is achieved, in particular a gain of availability, and/or if activation of a cleaning fluid pump cannot be observed, it is suggested to check the controller of the cleaning system, in particular the electronic control unit of the cleaning system, for a phase open-circuit fault and/or a phase-ground fault and/or a short-circuit fault. If a fault is detected, the planning of a service and maintenance measure is suggested.

It is proposed to operate a cleaning fluid pump in case of a deviation between the actual system behaviour and the expected system behaviour at different pressures and/or engine speeds. Since a cycle of different pressures and/or engine speeds does not result in the actual system behaviour again corresponding to the expected system behaviour, it is proposed to send a corresponding warning to the driver and/or the manufacturer of the motor vehicle and to signal that the cleaning fluid pump should be replaced and/or to cause the cleaning system to stop using the cleaning fluid pump and/or the whole cleaning system until the cleaning fluid pump has been replaced.

If the outside temperature is above a defined temperature, especially above 45° C., especially preferred above 55° C., and/or if the outside temperature is below a defined temperature, especially below 0° C., especially preferred below minus 15° C., it is proposed not to operate the cleaning fluid pump anymore, whereby the remaining life expectancy of the cleaning fluid pump can be advantageously increased.

With regard to a cleaning fluid pump, it is proposed to monitor the life expectancy of the cleaning fluid pump, in particular by means of monitoring the flow velocity in conjunction with the cleaning fluid pump and/or the static pressure in conjunction with the cleaning fluid pump and/or the flow rate through the cleaning fluid pump and/or by means of monitoring the number of already existing operating cycles of the cleaning fluid pump and/or by means of monitoring the time of use of the cleaning fluid pump to date, and if it is foreseeable that the life expectancy of the cleaning fluid pump is approaching its end, it is proposed to send a corresponding warning to the driver and/or the manufacturer of the motor vehicle and to signal that the cleaning fluid pump is to be replaced within the expected remaining life, and/or to cause the cleaning system to stop using the cleaning fluid pump and/or the entire cleaning system until the cleaning fluid pump has been replaced.

If a cleaning fluid pump has an excessive energy requirement, which can be detected in particular by a current sensor, it is proposed to warn the driver and/or the manufacturer of the motor vehicle accordingly and to signal that the cleaning fluid pump is to be replaced and/or to cause the cleaning system to stop using the cleaning fluid pump and/or the entire cleaning system until the cleaning fluid pump has been replaced.

If a cleaning fluid pump has an excessive temperature, which can in particular be detected with a temperature sensor, it is proposed to warn the driver and/or the manufacturer of the motor vehicle accordingly and to signal that the cleaning fluid pump is to be replaced and/or to cause the cleaning system to stop using the cleaning fluid pump and/or the entire cleaning system until the cleaning fluid pump has been replaced.

With regard to a cleaning fluid pump, it is proposed to monitor the performance of the pump, in particular by means of a deviation of the actual system behaviour from the expected system behaviour, in particular preferably by means of a flow sensor in an operative connection to the cleaning fluid pump and/or by means of a pressure sensor flow sensor in an operative connection to the cleaning fluid pump and/or a current meter flow sensor in an operative connection to the cleaning fluid pump. If a deviation occurs, it is proposed to warn the driver and/or the manufacturer of the motor vehicle accordingly and to signal that the cleaning fluid pump is to be replaced and/or to cause the cleaning system to stop using the cleaning fluid pump and/or the entire cleaning system until the cleaning fluid pump has been replaced.

In particular, it is proposed to monitor the system behaviour of a cleaning fluid pump by means of a flow sensor in an active connection to the cleaning fluid pump and/or by means of a pressure sensor flow sensor in an active connection to the cleaning fluid pump and/or a flow meter flow sensor in an active connection to the cleaning fluid pump. If the deviation indicates that the cleaning fluid pump is stalled, especially in frozen condition, and/or that the cleaning fluid pump is blocked with debris, it is suggested to switch off the cleaning fluid pump and to warn the driver and/or the manufacturer of the motor vehicle and to signal that the cleaning fluid pump should be replaced.

A conceivable resolution strategy consists in the fact that in the presence of a deviation of the actual system behaviour from the expected system behaviour in a cleaning fluid reservoir, which indicates a cleaning fluid reservoir split, in particular as a result of frost, and/or a cleaning fluid reservoir leak, in particular by an irregularly decreasing static pressure in an operative connection with the bottom of the cleaning fluid reservoir and/or by an irregularly decreasing filling level of the cleaning fluid reservoir determined by means of a level sensor, a planning of a maintenance and/or repair measure is proposed as a resolution strategy. In this way, the cleaning system can be made operational again in an advantageous way.

With regard to a level sensor, in particular a level sensor which is in operative connection with a cleaning fluid reservoir, it is proposed to monitor the functionality and if it indicates that a functionality no longer exists, in particular by no longer emitting a signal and/or if the emitted signal does not match the expected system behaviour, it is proposed to subject the level sensor to a maintenance measure and to replace it if necessary.

If a level sensor has an excessive energy demand, which can be detected with a current sensor in particular, it is proposed to warn the driver and/or the manufacturer of the motor vehicle accordingly and to signal that the level sensor should be replaced and/or to cause the cleaning system to stop using the cleaning fluid pump and/or the entire cleaning system until the level sensor has been replaced.

If a level sensor has an excessive temperature, which can in particular be detected by a temperature sensor, it is proposed to warn the driver and/or the manufacturer of the motor vehicle accordingly and to signal that the level sensor should be replaced and/or to cause the cleaning system to stop using the cleaning fluid pump and/or the whole cleaning system until the level sensor has been replaced.

A conceivable resolution strategy for a level sensor is to propose a replacement of the level sensor in case of an increased reaction time or sensing time.

A conceivable resolution strategy for a level sensor is to use a leaking through sensor, in particular at the interface to the cleaning fluid reservoir, particularly preferably at the interface between the cleaning fluid reservoir and the level sensor, to monitor whether there is any leakage, in particular between the cleaning fluid reservoir and the level sensor, whereby a maintenance and/or repair measure is planned if there is a leak.

A conceivable resolution strategy consists in the fact that in the presence of a deviation of the actual system behaviour from the expected system behaviour in a cleaning fluid line, which indicates a blockage of the cleaning fluid line, in particular as a result of frost, and/or a cleaning fluid line leak, in particular by an irregularly decreasing static pressure in an operative connection with the cleaning fluid line and/or by a blockage in a cleaning fluid line determined by means of a flow gauge, planning of a maintenance and/or repair measure and/or heating of the cleaning fluid line is proposed as a resolution strategy. This is an advantageous way to make the cleaning system operational again.

With regard to a telescopic wash nozzle, it is proposed to monitor the life expectancy of the telescopic wash nozzle, in particular by monitoring the number of already existing operating cycles of the telescopic wash nozzle, and if it is foreseeable that the life expectancy of the telescopic wash nozzle is approaching its end, it is proposed to send a corresponding warning to the driver and/or the manufacturer of the motor vehicle and to signal that the telescopic wash nozzle should be replaced within the expected remaining life expectancy.

Furthermore, with regard to a telescopic wash nozzle, it is proposed to monitor the number of already existing operating cycles of the telescopic wash nozzle and, if a predefined number of operating cycles is reached, to send a warning to the driver and/or the manufacturer of the motor vehicle and signal that the telescopic wash nozzle should be checked within the next 1000 operating cycles.

A possible resolution strategy for a heated wash nozzle is to suggest switching off the heater for the wash nozzle if there is an increased energy demand.

A conceivable resolution strategy for a heated wash nozzle is to switch on the heater for the wash nozzle when there is a low temperature, especially a temperature above freezing and below.

It is proposed to review the system behaviour of a wash nozzle, in particular with regard to cleaning performance, particularly preferred by means of a gain in availability, and to replace the wash nozzle if the actual system behaviour of the wash nozzle differs from the expected system behaviour.

Furthermore, it is proposed to monitor the distribution of the spray pattern by means of the optical sensor, in particular whether the spray pattern covers the surface to be cleaned, and if a deviation occurs to plan a maintenance and/or repair measure for the wash nozzle.

It is proposed to monitor the heating of a wash nozzle by means of an optical sensor, especially in a referenced area, and if a deviation occurs to plan a maintenance and/or repair measure for the wash nozzle.

It is proposed to check the flow velocity in an active connection with the wash nozzle and/or the pressure of the flow in an active connection with the wash nozzle and to replace the wash nozzle if a deviation is detected.

In connection with a wash nozzle, it is proposed to check whether the wash nozzle is frozen and/or otherwise blocked by means of a flow velocity of the cleaning fluid in an effective connection with the wash nozzle and/or a pressure of the cleaning fluid in an effective connection with the wash nozzle. If the wash nozzle is frozen, it is suggested to switch on the heater of the wash nozzle. If there is a different problem with the wash nozzle, it is suggested to send a corresponding warning to the driver and/or the manufacturer of the motor vehicle and to signal that the wash nozzle should be replaced.

For a wash nozzle, it is proposed to check the wash nozzle for any leakage, in particular with a drip sensor, preferably by means of an optical sensor, which checks whether the wash nozzle has dripping, in particular if the cleaning fluid pump is switched off. If dripping is detected on the wash nozzle, it is suggested to replace the wash nozzle.

With regard to a wash valve, it is proposed to monitor the life expectancy of the wash valve, in particular by monitoring the number of existing operating cycles of the wash valve, and if it can be foreseen that the life expectancy of the wash valve is approaching its end, it is proposed to send a corresponding warning to the driver and/or the manufacturer of the motor vehicle and to signal that the wash valve should be replaced within the expected residual life.

Furthermore, with regard to a wash valve, it is proposed to monitor the number of already existing operating cycles of the wash valve and, if a predefined number of operating cycles is reached, to send a corresponding warning to the driver and/or the manufacturer of the motor vehicle and to signal that the wash valve should be checked within the next 1000 operating cycles.

If a solenoid actuating a wash valve has an excessive energy requirement, which can be measured with a current sensor in particular, it is proposed to warn the driver and/or the manufacturer of the motor vehicle accordingly and to signal that the wash valve is to be replaced and/or to cause the cleaning system to stop using the cleaning fluid pump and/or the entire cleaning system until the wash valve has been replaced.

If a solenoid actuating a wash valve has an excessive temperature, which can in particular be detected with a temperature sensor, it is proposed to warn the driver and/or the manufacturer of the motor vehicle accordingly and to signal that the wash valve is to be replaced and/or to cause the cleaning system to stop using the cleaning fluid pump and/or the entire cleaning system until the wash valve has been replaced.

With regard to a wash valve, it is proposed to monitor the flow conditions in an interaction with the wash valve, in particular the static pressure and/or the flow velocity downstream of the wash valve, and if the actual system behaviour differs from the expected system behaviour, to plan a maintenance and/or repair measure.

Furthermore, for a wash valve it is proposed to check by means of a force sensor and/or a distance gauge whether the solenoid is travelling sufficiently, and if the actual system behaviour deviates from the expected system behaviour to plan a maintenance and/or repair measure.

With regard to a solenoid operated air valve, it is proposed to monitor the life expectancy of the solenoid operated air valve, in particular by monitoring the number of already existing operating cycles of the solenoid operated air valve, and if it is foreseeable that the life expectancy of the solenoid operated air valve is approaching its end, it is proposed to send a corresponding warning to the driver and/or the manufacturer of the motor vehicle and to signal that the solenoid operated air valve is to be replaced within the expected residual life.

Furthermore, with regard to a solenoid operated air valve, it is proposed to monitor the number of already existing operating cycles of the solenoid operated air valve and, if a predefined number of operating cycles is reached, to send a corresponding warning to the driver and/or the manufacturer of the motor vehicle and to signal that the solenoid operated air valve should be checked within the next 1000 operating cycles.

If a solenoid actuating an air valve has an excessive energy requirement, which can in particular be detected with a current sensor, it is proposed to warn the driver and/or the manufacturer of the motor vehicle accordingly and to signal that the air valve is to be replaced and/or to cause the cleaning system to stop using the cleaning fluid pump and/or the entire cleaning system until the air valve has been replaced.

If a solenoid actuating an air valve has an excessive temperature, which can in particular be detected by a temperature sensor, it is proposed to warn the driver and/or the manufacturer of the motor vehicle accordingly and to signal that the air valve is to be replaced and/or to cause the cleaning system to stop using the cleaning fluid pump and/or the entire cleaning system until the air valve has been replaced.

A conceivable resolution strategy for a heated air nozzle is to suggest switching off the heater for the air nozzle if there is an increased energy requirement.

A possible resolution strategy for a heated air nozzle is to switch on the heater for the air nozzle when there is a low temperature, especially a temperature above freezing and below.

It is proposed to check the system behaviour of an air nozzle, in particular with regard to cleaning performance, particularly preferred by means of a gain in availability, and to replace the air nozzle if the actual system behaviour of the wash nozzle deviates from the expected system behaviour.

It is proposed to monitor the heating of an air nozzle by means of an optical sensor, especially in a referenced area, and if a deviation occurs to plan a maintenance and/or repair measure for the air nozzle.

It is proposed to check the flow velocity in an active connection with the air nozzle and/or the pressure of the cleaning fluid flow in an active connection with the air nozzle and to replace the air nozzle if a deviation is detected.

In connection with an air nozzle, it is proposed to check whether the air nozzle is frozen and/or otherwise blocked by means of a flow velocity of the cleaning fluid in an effective connection with the air nozzle and/or a pressure of the cleaning fluid in an effective connection with the air nozzle. If the air nozzle is frozen, it is suggested to switch on the heating of the air nozzle. If there is a deviating problem with the air nozzle, it is suggested to send a corresponding warning to the driver and/or the manufacturer of the motor vehicle and to signal that the air nozzle should be replaced.

When implementing a resolution strategy selected here, particular consideration should be given to implementing the resolution strategy according to the eighth aspect of the invention.

If a selected and implemented resolution strategy is successful, then an actual system behaviour of the system component of the cleaning system of a motor vehicle, which corresponds to the expected system behaviour for this system component, is advantageous.

If an implementation of a resolution strategy chosen here, in particular an implementation of a resolution strategy according to the eighth aspect of the invention, does not lead to the success that the actual system behaviour again corresponds to the expected system behaviour and it can be assumed that the cause of the deviation is not a defect or an aging phenomenon, it is proposed to select a deviating resolution strategy, in particular the resolution strategy which fits best in each case, and to implement this newly selected resolution strategy, in particular according to the eighth aspect of the invention.

It should be noted that the subject-matter of the seventh aspect can be advantageously combined with the subject-matter of the preceding aspects of the invention, either individually or cumulatively in any combination.

According to an eighth aspect of the invention, the task is solved by using of a selected resolution strategy, preferably a resolution strategy selected according to the seventh aspect of the invention, by sending a signal to the driver and/or the manufacturer of the motor vehicle, and/or improve the system behavior by applying the selected resolution strategy with the cleaning system, and/or planning maintenance or repair of the cleaning system.

With regard to the implementation of a resolution strategy, in particular a resolution strategy which has been selected according to the seventh aspect of the invention, it is proposed to proceed depending on the identified or at least suspected cause.

If the cause of a deviation between an actual system behaviour and an expected system behaviour is unknown for a system component and if consequently no resolution strategy is known, it is proposed to send a signal to the driver of the motor vehicle and/or the manufacturer of the motor vehicle.

In this way, the driver can be warned advantageously of a possible malfunction of the cleaning system and thus possibly also of an impending malfunction of a driver assistance system.

It is also proposed that the signal to the manufacturer of the motor vehicle should preferably include a diagnostic signal, in particular a diagnostic signal according to the sixth aspect of the invention. In addition, it is proposed that the signal to the manufacturer of the motor vehicle preferably has a deviation and/or the actual output quantity and/or the expected output quantity, preferably depending on the associated input quantity and/or the associated process quantity, in particular the above quantities according to the sixth aspect of the invention.

In this way, the manufacturer of the motor vehicle can further expand his experiences with a system component of a cleaning system and provide a resolution strategy for this case, so that a fault of the same or at least similar type can soon be remedied advantageously by means of a suitable resolution strategy.

If the cause of a deviation between an actual system behaviour and an expected system behaviour for a system component is a fault, in particular a fault for which a resolution strategy is known, in particular a resolution strategy according to the seventh aspect of the invention is known, the application of the resolution strategy is proposed, in particular the application of a resolution strategy with the input quantity known to the resolution strategy.

In this way, the disturbance can be remedied in an advantageous way.

If an application of resolution strategy is not successful and there is still a deviation between the actual system behaviour and the expected system behaviour for the system component, it is proposed to select the next best resolution strategy to remedy the disorder, especially according to the seventh aspect of the invention, and to apply this resolution strategy. Alternatively, it is proposed to repeat the application of the selected resolution strategy or strategies.

If a failure cannot be resolved after multiple use of a selected resolution strategy, it is proposed to reclassify the cause of the deviation between the actual system behaviour and the expected system behaviour as unknown and to proceed according to the above proposed course of action for unknown causes.

If the cause of a deviation between an actual system behaviour and an expected system behaviour for a system component is an ageing phenomenon, it is proposed to determine a residual life for the affected system component and to plan a maintenance operation to replace or repair the affected system component within the residual life.

It is advantageous to repair or replace an aging system component, preferably without risking a failure of the cleaning system.

If the cause for a deviation between an actual system behaviour and an expected system behaviour for a system component is a defect, it is suggested to have a defect repairable by untrained personnel repairable by a message to the driver of the motor vehicle by the driver of the motor vehicle. If the driver does not want to carry out this action or if it is not successful, the planning of a corresponding maintenance action is proposed.

If the cause for an untrained personnel cannot be rectified, the planning of a maintenance task is proposed.

It is therefore advantageous to return the cleaning system to a fully functional state.

It is proposed to use an adaptive learning approach when applying a resolution strategy where the system sends an error message to the driver and/or the manufacturer of the motor vehicle if a surface to be cleaned is not sufficiently cleaned after a number of attempts.

It is understood that the advantages of a resolution strategy, preferably a resolution strategy according to the seventh aspect of the invention, as described above, directly extend to the use of a resolution strategy, preferably the use of a resolution strategy according to the eighth aspect of the invention.

It should be noted that the subject-matter of the eighth aspect can be advantageously combined with the subject-matter of the preceding aspects of the invention, either individually or cumulatively in any combination.

According to a ninth aspect of the invention, the task is solved by a method for indirectly deriving a systematic dependence for a system behaviour of a soiling process of a surface of a motor vehicle, wherein a sensor is operatively connected to the surface, wherein a soiling condition of the surface can be evaluated by means of an availability of the sensor, wherein the soiling process is evaluated between a first availability of the sensor and a second availability of the sensor, wherein the motor vehicle has travelled a distance travelled by the motor vehicle between the first availability and the second availability, wherein the motor vehicle exhibits an increase in an operating time by covering the distance travelled by the motor vehicle between the first availability and the second availability, wherein no cleaning process is performed between the first availability and the second availability, wherein the second availability is preferably less than the first availability by a change of availability of the sensor due to soiling of the surface, whereby the change of availability depends on an input quantity by means of the system behaviour of the soiling process, exhibiting the following steps:

Determine the input quantity as a first parameter of the method by means of at least one sensor;

Determine the change of availability as a second parameter of the method by means of the sensor, wherein the change of availability is calculated by the difference between the second availability and the first availability;

Digitalize where necessary and record the determined first and second parameters by a data processing system, whereby the data processing system exhibits an electronic data processing and evaluation system and a database;

Store the determined first and second parameters in an ordered manner with reference to one another in the database as a data set of a dependency table;

Derive the systematic dependence between the first and second parameters by means of the electronic data processing and evaluation system from at least two data sets of the dependency table stored in the database, preferably from at least 50 data sets of the dependency table, particularly preferably from at least 200 data sets of the dependency table, whereby the electronic data processing and evaluation unit accesses the data sets of the dependency table and determines the systematic dependence from the data sets of the dependency table by means of an algorithm; and Preferably store the derived systematic dependence in the database and/or the electronic data processing and evaluation unit and/or an electronic control unit.

Sensors installed on a motor vehicle, in particular optical sensors, are predominantly protected by an external surface that can shield the respective sensor from the external environmental conditions and thus protect it from any damaging influence from the external environmental conditions.

In particular, it is conceivable that a windscreen or a rear window of the motor vehicle against the effects of external environmental conditions could protect a sensor.

A surface shielding the sensor is often also part of the outer surface of the entire motor vehicle and is therefore also exposed to a soiling process due to the external environmental conditions. The deposited dirt can impair the functionality of the sensor. This impairment can go so far that a sensor can no longer provide information or the information provided is no longer reliable, so that it can no longer be used in the original sense.

In this case, the soiling condition of a surface shielding a sensor is evaluated by means of an availability of the corresponding sensor. High availability values are to be interpreted in such a way that there is no or only minor contamination on the surface covering the sensor. Low availability values, on the other hand, are to be interpreted as an indicator of increased contamination.

In the case of a sensor that is operatively connected to a windshield or a rear window, the position of the sensor is often determined so that the part of the windshield or the rear window that is operatively connected to the sensor can be cleaned with a windshield wiper using a cleaning fluid if necessary. However, all other positions of a sensor are also expressly conceivable, which can be cleaned using separate cleaning means if necessary.

The availability of a sensor can be advantageously increased if the surface that is connected to a sensor and is already dirty is cleaned.

The dirt deposited on the surface of a motor vehicle is subject to a contamination process. A contamination process is subject to an inherent system behaviour.

The system behaviour of a soiling process depends on at least one input parameter, whereby a plurality of input parameters is conceivable which significantly influence the soiling process.

The number and selection of input parameters that significantly influence the soiling process may depend in particular on the climatic conditions at the operating location of the motor vehicle. The climatic conditions can be understood as the season and/or the region in which the motor vehicle is operated on the planet.

If the system behaviour of the soiling process is known, it can be used in particular to make a statement about the expected future availability of a sensor depending on the pre-planned and/or known future input parameters. In particular, with the help of a corresponding system behaviour and the pre-planned and/or known future input parameter, it can be determined after which distance to be covered and/or after which active operating time still to be completed an availability corresponding to a threshold of availability is expected to be reached.

This is precisely what can contribute to saving cleaning resources when planning a cleaning process, preferably when planning a resource-efficient cleaning process, in particular when planning a resource-efficient cleaning process after the third and/or fourth aspect of the invention, in particular while maintaining a cleaning mode in the sense of the fourth aspect of the invention.

Here a concrete method for indirectly deriving a systematic dependence for a system behaviour of a soiling process of a surface of a motor vehicle is proposed, in which a soiling process between a first availability of the sensor and a second availability of the sensor is first evaluated and the empirical values collected are transferred into a systematic dependence, which describes the system behaviour of a soiling process of a surface.

The first availability marks the starting point of the evaluation process, at which an empirical value regarding the system behaviour is collected.

Among other things, it is conceivable that this starting point falls on the starting time of the motor vehicle, i.e. the time at which the respective active use of the motor vehicle begins. Furthermore, it is conceivable that the starting point will fall at the point in time at which the motor vehicle begins to roll. It is also conceivable that the starting time, i.e. the determination of the first availability, falls at the time when the environmental conditions, in particular the weather conditions, of the motor vehicle change.

The second availability marks the end time of the time window by determining an empirical value for the soiling process between the start time and the end time.

In particular, this end time can coincide with the time at which the active usage time of the motor vehicle ends, in particular with the time at which the motor vehicle is parked. Furthermore, it is conceivable that the end time may fall at the point in time at which the motor vehicle comes to a standstill. And it is also conceivable for the end time to fall at the point in time at which the environmental conditions, in particular the weather conditions, change.

It should be expressly mentioned that a start time can also be assigned to a plurality of end times. Thus, among other things, a continuous observation period is conceivable, which is characterized by a single discrete start time, to which several observation periods are assigned by allocation of several end times, so that a separate experience value can be collected for each end time.

Furthermore, it should be expressly pointed out that an observation period can also be characterized by a given time unit, so that experience values with different start times and different end times can be collected continuously. Alternatively, it is conceivable that these observation periods also overlap.

It should also be expressly pointed out that empirical values on the soiling behaviour of a surface can also result from observation periods which each have a different start time and a common end time.

All of the above variants for the observation of empirical values have in common that they include an active operation of the motor vehicle, i.e. a period of time in which the motor vehicle is at least designated to cover a distance between the determination of the first and the second availability, whereby it is also conditional, as it were, that the active operating time of the motor vehicle has increased between the time of the determination of the first availability and the time of the determination of the second availability.

It goes without saying that empirical values about the soiling behaviour of a surface are invalid if a cleaning process of the relevant surface was carried out between the determination of the first availability and the second availability, since in this way the second availability would not only be influenced by the pollution but also by the cleaning process. In other words, it is suggested that only empirical values are used to derive the systematic dependence, where no cleaning process was carried out on the respective surface between the determination of the first availability and the determination of the second availability.

Thus, it should be considered that a second availability is determined at the latest with the initiation or shortly before the initiation of a cleaning process, at least at a time at which a cleaning process has not yet exerted any influence on the second availability.

Furthermore, it is specifically pointed out that through the influence of environmental conditions the soiling condition and thus also the availability of a surface can be improved, especially through the influence of rain and/or snowfall on the surface. Such a systematic influence on the soiling process shall also be considered separately, but can also be taken into account for the derivation of a systematic dependence with regard to a system behaviour of a soiling process, provided that the corresponding input quantity characterising the improvement of availability is taken into account within the framework of the systematic dependence, in particular the amount of precipitation and/or the amount of snowfall. In this special case with consideration of the corresponding characterizing input quantity the first availability is smaller than the second availability.

The difference between the first availability and the second availability can therefore also be called a change of availability, which can be understood as a gain of availability or a loss of availability, depending on the case under consideration.

If between the time of the determination of the first availability and the time of the determination of the second availability the same value is determined for the availability of a surface in an active connection with a defined sensor, the data set can usually be discarded. This can be justified by the fact that in the case that no change of the availability takes place as a reaction to an input quantity, no unambiguous assignment of the recorded data to the system behaviour of the soiling process can be made.

There are exceptions in which a certain range of the input quantity is accompanied by a certain gain in availability. This allows an equivalent loss of availability to be assigned to the deviating range of the input quantity, so that the data set as a whole can be considered for the system behaviour of the soiling process.

This enables, among other things, that an expected precipitation quantity and/or an expected snowfall quantity can be taken into account with regard to the expected availability during the preliminary planning of a cleaning process. This can enable a further resource optimisation of the cleaning of a surface that is in an active connection with a sensor, in particular within the framework of preliminary planning within the framework of the third and/or fourth aspect of the invention.

Furthermore, it should be pointed out that the discussed empirical values about the soiling behaviour of a surface of a motor vehicle can be derived not only from the active use of a motor vehicle but also from the laboratory and/or from a numerical model.

The following steps first serve to collect empirical values on the system behaviour of the soiling process, whereby the empirical values are first stored in a dependency table:

Determine the input quantity as a first parameter of the method by means of at least one sensor;

Determine the change of availability as a second parameter of the method by means of the sensor, wherein the change of availability is calculated by the difference between the second availability and the first availability;

Digitalize where necessary and record the determined first and second parameters by a data processing system, whereby the data processing system exhibits an electronic data processing and evaluation system and a database;

Store the determined first and second parameters in an ordered manner with reference to one another in the database as a data set of a dependency table.

As soon as a sufficient number of empirical values or data sets is available, at least 50 data sets are preferred, especially at least 200 data sets are preferred, the systematic dependence can be derived in the following process step by means of an algorithm:

Derive the systematic dependence between the first and second parameters by means of the electronic data processing and evaluation system from at least two data sets of the dependency table stored in the database, preferably from at least 50 data sets of the dependency table, particularly preferably from at least 200 data sets of the dependency table, whereby the electronic data processing and evaluation unit accesses the data sets of the dependency table and determines the systematic dependence from the data sets of the dependency table by means of an algorithm.

It should be pointed out that the above values for the number of data sets should not be understood as sharp limits, but rather should be able to be exceeded or fallen below on an engineering scale without leaving the described aspect of the invention. In simple terms, the values are intended to provide an indication of the size of the number of data sets proposed here.

It is expressly pointed out that the data sets necessary for deriving the systematic dependence can also be loaded from a database containing corresponding data sets before deriving the systematic dependence.

Preferably it should also be considered to store the derived systematic dependence, in particular in the database and/or the electronic data processing and evaluation unit and/or an electronic control unit.

The systematic dependence derived from this ninth aspect of the invention describes in an advantageous way the soiling process of a surface, especially of a surface which is in an active connection to a sensor. The resulting systematic dependence can be used advantageously in the resource-optimal planning of a cleaning process, especially in the pre-planning of a cleaning process according to the third and/or fourth aspect of the invention.

Preferably, the input quantity exhibits the distance travelled by the motor vehicle between the first availability and the second availability.

Here it is suggested that the input quantity exhibits the distance that is covered by the motor vehicle between the determination of the first availability and the second availability.

In particular, a soiling process should be considered in which a spray of water and/or dirt hits and deposits on the surface in active contact with the sensor while the distance is being covered. If this type of soiling is stimulated by the active use of the vehicle, the related soiling process may depend on the distance travelled. Now that it is proposed here to consider the distance as input quantity, this influencing quantity can be advantageously taken into account when determining the systematic dependence.

Optionally, the input quantity exhibits the increase in the operating time by covering the distance travelled by the motor vehicle between the first availability and the second availability.

The contamination of a surface of a motor vehicle can depend on the operating time. In particular, a form of contamination should be considered, in which dirt particles transported by the air are deposited on the respective surface.

As a consequence of the suggestion made here to consider the operating time as input quantity, it can be advantageously achieved that the operating time can also be considered as influencing factor of the soiling process.

Expediently, the input quantity exhibits a driving speed of the motor vehicle, preferably a course of the driving speed along the route between the first availability and the second availability.

The driving speed of a motor vehicle can also influence the soiling of a surface of the motor vehicle. In particular, the deposition of residues of insects, which collide with the surface of the motor vehicle while driving with the motor vehicle, could be considered. In particular, insects are more likely to be able to evade the vehicle at a lower speed or to be guided around the vehicle by the air flow surrounding the vehicle. It is conceivable that insects or other microorganisms are more likely to collide with the vehicle at increasing vehicle speeds than at slow speeds.

The proposal presented here to use the driving speed as input quantity can also be advantageous for the systematic dependence derived with the method, since it could then take the driving speed into account.

In a preferred embodiment, the input quantity exhibits a process quantity, preferably a humidity, particularly preferably a course of the humidity along the route between the first availability and the second availability, and/or a temperature in the vicinity of the motor vehicle, particularly preferably a course of the temperature along the route between the first availability and the second availability, and/or a rainfall, particularly preferably a course of the rainfall along the route between the first availability and the second availability, and/or a snowfall quantity, particularly preferably a course of the snowfall quantity along the route between the first availability and the second availability.

A multitude of different process quantities can influence the soiling process and so it is suggested to consider at least one process quantity as input quantity. In particular, it is suggested to consider humidity, temperature, rainfall, snow and/or the like as input quantity.

Furthermore, it is conceivable to consider the process quantity by means of different values along sections of the route of the motor vehicle, so that it is advantageously possible for the process quantity to change during the route. This can also be accompanied by a change in process quantity, especially humidity, temperature, rainfall and/or snowfall, along the route within the framework of systematic dependence.

In an optional embodiment, the input quantity exhibits a vehicle type.

The vehicle type provides information about the characteristics of the motor vehicle in detail, in particular the type and quantity of sensors installed, the placement of the sensors, the geometry and the position of the surfaces that are operatively connected to the individual sensors, as well as the overall geometry of the vehicle, which influences the flow around the motor vehicle and thus indirectly also the soiling process.

The at least one influencing variable related to the vehicle type shall be considered as input quantity, whereby also the systematic dependence derived from empirical values can advantageously show a dependence to the at least one influencing variable related to the vehicle type.

Preferably, the input quantity exhibits a current coordinate of the motor vehicle, preferably the coordinate of the motor vehicle along the route between the first availability and the second availability.

Among other things, the current coordinate over which a vehicle will move during active use can also have an influence on the soiling process.

In particular, the soiling process can be influenced by changing road surfaces which are dependent on the current coordinate of the vehicle.

Furthermore, different vegetation forms changing with the coordinate are thought of, whereby some vegetation forms are accompanied in particular with a higher occurrence of insects and the like.

Thus, the current coordinate can also provide information about the type and manner of pollution. A motor vehicle which is moved over a roadway covered with ice and snow pollutes in particular differently to a motor vehicle which is moved over a sandy and/or dusty roadway and differently to a motor vehicle which is moved over a rain-wet roadway.

It can thus be advantageously achieved in such a way that the influencing variables in an effective connection with a current coordinate over which a motor vehicle is moved can also be taken into account for systematic dependence and thus indirectly also for the designated use of the systematic dependence.

Expediently, the input quantity exhibits the first availability of the sensor.

In particular, it should be considered here that a contamination state in a soiling process may not behave linearly to its influencing variable. In this respect, the initial state can then also be decisive for the development of the contamination state, whereby the initial state can be evaluated with the first availability.

In particular, this way, on the one hand, an initial state of contamination of the surface and, on the other hand, an absolute change in availability between the times of first availability and second availability can be taken into account.

In this respect, it is concretely proposed here, among other things, to consider the initial state of contamination of the surface as input quantity. As a consequence, it can be advantageously achieved that the mapping accuracy of the systematic dependence can be improved, especially with regard to nonlinearly developing contamination states in a soiling process.

Optionally, the systematic dependence is determined by means of a regression analysis.

Here it is suggested to use a regression algorithm as algorithm for the indirect derivation of a systematic dependence.

An algorithm which has already been tested in a large number of applications and which can be optimally selected and/or adapted according to the system behaviour considered here can thus be advantageously applied so that a systematic dependence of high quality can be determined.

Preferably, the systematic dependence is determined in form of a curve, preferably a curve and a coefficient of determination of the curve.

The advantage of this is that the systematic dependence is indicated by a curve as a function of at least one input quantity of the soiling process; in particular, this curve has no gaps, so that a clear assignment between an input quantity and a difference in availability due to soiling can be achieved, in particular a continuous and differentiable dependency between an input quantity and a difference in availability due to soiling, so that the systematic dependency is ideally adapted for any mathematical methods for the use of the same.

The evaluation of a coefficient of determination from the determined data and the curve determined by means of a regression model provides an indication for the precision of the systematic dependence, assuming that a sufficient number of data sets is available. It can be advantageously evaluated how meaningful a correlation between an input quantity of the soiling process and a difference in availability due to soiling is and how well existing or recorded data can be reproduced. In addition, in the case of a large coefficient of determination, the curve also allows statements to be made about the margins of existing data. It is conceivable, for example, that data can be supplemented numerically and/or extrapolated at the margins of existing data.

In an expedient embodiment, the systematic dependence is determined by means of an optimization process.

Here it is suggested that the parameters of a systematic dependence are determined by means of an optimization procedure, especially by means of a minimization procedure, which minimizes the cumulated deviation of the empirical values considered by data sets from the systematic dependence. In this way, it is advantageously possible to determine a systematic dependence which can be derived in an optimal way, in particular with a minimum cumulated deviation from the initial experience values.

Preferably, the parameters of the systematic dependence are determined by maximizing the resulting coefficient of determination.

Preferably, the systematic dependence is determined by means of a self-learning optimization method.

Among other things, it is proposed to use an algorithm that exhibits the characteristics of an algorithm from the class of machine learning. Thus, the algorithm is able to derive a systematic dependence between the input quantity and a difference in availability due to soiling.

The advantage of this is that the complex task of indirectly deriving a systematic dependence by using self-learning optimization methods does not have to be laboriously adapted by humans to new conditions. Thus, time and money can be saved in the indirect derivation of systematic dependence.

The quality of the derived systematic dependence can be improved by the aspect proposed here, since an optimization procedure endeavors to determine the optimal systematic dependence even in a multi-criteria environment and under a variety of boundary conditions.

In this way, it is also conceivable that an optimization can be carried out under a plurality of equal objectives and/or boundary conditions (multi criteria optimization). In particular, a class of algorithms is considered which can determine a Paretooptimum and/or a Paretofront. In particular, a class of algorithms in the area of simplex methods and/or evolutionary strategies and/or evolutionary optimization algorithms and/or the like are suggested here for deriving the systematic dependence.

In an optional embodiment, the systematic dependence is derived using data sets of the dependency table from an already existing database, preferably data sets of an already existing database are accessed previously.

The advantage of this is that data from an existing database can also be used to derive the systematic dependence. Thus, it can be achieved that empirical values do not have to be collected at a specific motor vehicle first and transferred into data of a database and later into a systematic dependence. In this way, existing data and empirical values can be used to derive a systematic dependence on the soiling process without first having to collect empirical values representing the systematic dependence of the soiling process.

In an expedient embodiment, the already existing database is continuously expanded.

Advantageously, it can be achieved that the number of derivable systematic dependencies increases over time.

Furthermore, it can be advantageously achieved that the accuracy of a systematic dependence can increase due to the larger number of empirical values known by means of data sets.

Preferably, a new data set replaces the data set in the dependency table which deviates most from the derived systematic dependence.

In particular, the fact that the experience value is exchanged with the largest Euclidean distance to systematic dependence should be taken into account.

Advantageously, it can be achieved that the systematic dependence becomes more and more precise over time, which can be expressed by an increase in the coefficient of determination.

Furthermore, this can have the advantage that even weakly correlating systematic dependencies can be better identified over time.

It should be noted that the subject-matter of the ninth aspect can be advantageously combined with the subject-matter of the preceding aspects of the invention, either individually or cumulatively in any combination.

According to a tenth aspect of the invention, the task is solved by a use of
a dependency table exhibiting at least two data sets, preferably exhibiting at least 50 data sets, particularly preferably exhibiting at least 200 data sets, wherein each data set exhibits at least one input quantity of the soiling process, in particular the distance travelled by the motor vehicle between the first availability and the second availability and/or the operating time by covering the distance travelled by the motor vehicle between the first availability and the second availability, and/or a driving speed of the motor vehicle, preferably a course of the driving speed along the route between the first availability and the second availability, and/or a process quantity, preferably a humidity, particularly preferably a course of the humidity along the route between the first availability and the second availability, and/or a temperature in the vicinity of the motor vehicle, particularly preferably a course of the temperature along the route between the first availability and the second availability, and/or a rainfall, particularly preferably a course of the rainfall along the route between the first availability and the second availability, and/or a snowfall quantity, particularly preferably a course of the snowfall quantity along the route between the first availability and the second availability, and/or a vehicle type and/or a coordinate of the motor vehicle, preferably the coordinate of the motor vehicle along the route between the first availability and the second availability, and/or the first availability of the sensor, and the evaluated change of availability, stored in an ordered manner with reference to one another, and/or a systematic dependence for a system behaviour of a soiling process of a surface of a motor vehicle, preferably derived by a method for indirectly deriving a systematic dependence according to one of the claims 1 to 14, for a resource efficient cleaning, preferably resource-saving cleaning, of at least one surface of a motor vehicle, to determine an expected availability at a distance or an operating time of the motor vehicle yet to be covered by insertion of the input quantity into the systematic dependence, in particular the distance or the operating time of the motor vehicle yet to be covered, and dissolution according to the expected availability starting from an actual availability, or selection of the data set from the dependency table that best matches the input quantity, in particular the distance or the operating time of the motor vehicle yet to be covered, and determination of the expected availability starting from the actual availability, or means of linear interpolation between the adjacent data sets of the dependency table that best match the input quantity, in particular the distance or the operating time of the motor vehicle yet to be covered, and determination of the expected availability starting from the actual availability.

In accordance with this tenth aspect of the invention, it is now proposed to use a dependency table, in particular a dependency table which was created with the first steps of the procedure according to the ninth aspect of the invention, and/or a systematic dependency, in particular a systematic dependency derived according to the ninth aspect of the invention, for the determination of an expected availability depending on a distance still to be covered by the motor vehicle or an operating time still to be driven.

Whereby the dependency table exhibits at least one input quantity of the soiling process, in particular at least one input quantity according to the ninth aspect of the invention. In particular, it is conceivable, among other things, that the dependency table may exhibit at least the distance travelled by the motor vehicle between the first availability and the second availability and/or the operating time by covering the distance travelled by the motor vehicle between the first availability and the second availability and/or a driving speed of the motor vehicle, preferably a course of the driving speed along the route between the first availability and the second availability, and/or a process quantity, preferably a humidity, particularly preferably a course of the humidity along the route between the first availability and the second availability, and/or a temperature in the vicinity of the motor vehicle, particularly preferably a course of the temperature along the route between the first availability and the second availability, and/or a rainfall, particularly preferably a course of the rainfall along the route between the first availability and the second availability, and/or a snowfall quantity, particularly preferably a course of the snowfall quantity along the route between the first availability and the second availability, and/or a vehicle type and/or a coordinate of the motor vehicle, preferably the coordinate of the motor vehicle along the route between the first availability and the second availability, and/or the first availability of the sensor, and the evaluated change of availability. It should preferably be considered that the dependency table shows the input quantity and the evaluated change of availability in an ordered way to each other.

When using the systematic dependence proposed here for use to determine an expected availability of the sensor, a systematic dependence which exhibits at least one input quantity according to the systematic dependence derived with the ninth aspect of the invention could in particular be considered.

The method proposed here results in an expected availability for each individual sensor considered and must be repeated for evaluating the expected availability for another sensor. It should be noted that a systematic dependence and/or a dependency table is only valid for more than one sensor in exceptional cases, so that as a rule a different dependency table and/or a different systematic dependence must be used to determine the actual availability for each sensor.

Under real conditions, this often results in a different expected availability for each sensor considered, which can partly be explained by the different soiling status and the deviating system behaviour of the respective soiling process.

The procedure proposed here can be described in particular by the following variants of characterizing procedure steps:

According to a first variant it is suggested here that the input quantity is used in the systematic dependence. In particular, it is proposed to insert the selected distance or the operating time of the motor vehicle yet to be covered into the systematic dependency, resulting in the expected change of availability as the function value of the systematic dependence.

Furthermore, it is proposed to additionally determine the actual availability. The sum of the expected change of availability and the actual availability gives the target value of the procedure, namely the expected availability for the respective sensor for the selected distance or operating time of the motor vehicle yet to be covered.

According to a second variant of the procedure it is proposed to select a data set with empirical values from the dependency table, which fits best to the input quantity with the selected distance or operating time of the motor vehicle yet to be covered. In particular, it should be considered to select the best matching data set over the smallest Euclidean distance of all data sets of the dependency table between the data set under consideration and the input quantity.

The data set selected from the dependency table contains an expected change of availability corresponding to the input quantity. The expected availability for the selected distance or operating time of the motor vehicle yet to be covered is the sum of the actual availability to be determined with the expected change of availability according to the selected data set of the dependency table associated with the sensor.

According to a third variant, two data sets are selected from the dependency table whose Euclidean distance to the selected input quantity is smallest. In this case, the expected change of availability is determined by linear interpolation, whereby the equalization line is supported by the two data points of the data sets. Here it is conceivable that the selected input quantity lies between the two selected data points or on one side of the two selected data points.

Also according to this third variant, the expected availability results from the sum of the expected change of availability and the actual availability to be determined.

It goes without saying that here the determination of the change of availability as a function of the selected distance or operating time of the motor vehicle yet to be covered is also explicitly suggested by means of a regression curve over a plurality of selected data sets from the dependency table, especially by means of a systematic dependence, especially by means of a systematic dependence according to the ninth aspect of the invention.

It should be expressly pointed out that the actual availability is supplied by the sensor or can otherwise be derived from the data provided by the corresponding sensor.

This makes it advantageously possible to determine an expected value for the development of the availability in the future, in particular depending on the distance still to be covered by the motor vehicle or the operating time still to be driven.

After it had already been described in the third and fourth aspects of the invention that a resource-optimal cleaning process with regard to the consumption of cleaning resources often does not start immediately at the time of the decision about the cleaning process, but should rather only be carried out in the future, preferably depending on the occurrence of a defined soiling state, the planning of the availability characterising the soiling state is an advantageous possibility for the planning of a resource-optimal cleaning process.

Furthermore, by the determination of an expected value of an availability, a statement about the expected value of the remaining range of the motor vehicle with the available cleaning resources can be made advantageously.

This also enables a planning of the necessary cleaning mode according to the fourth aspect of the invention, with which the pre-planned route can still be managed with the existing cleaning resources without a maintenance stop becoming necessary to replenish cleaning resources.

The navigation system, depending on the expected range of the vehicle with regard to the cleaning resources, in particular evaluated with the tenth aspect of the invention proposed here, can plan an optimal maintenance stop to replenish cleaning resources on the pre-planned route, in particular a maintenance stop where the planned time over target deviates as little as possible from the time over target without maintenance stop, taking into account a corresponding maintenance stop.

The operating time that can be determined here, among other things, can be of particular interest to professional drivers. In particular, the operation of a taxi should be considered, which is in active use until a certain time of day and during this time should make as many journeys as possible and as few maintenance stops as possible. In this respect, a statement with a possible remaining operating time for this type of motor vehicle operation may be more relevant than a statement linked to a distance that can still be covered.

It should be pointed out that the above values for the number of data sets should not be understood as sharp limits, but rather should be able to be exceeded or fallen below on an engineering scale without leaving the described aspect of the invention. In simple terms, the values are intended to provide an indication of the size of the number of data sets proposed here.

It goes without saying that the advantages of systematic dependence, in particular systematic dependence according to the ninth aspect of the invention, also apply to the use of systematic dependence, in particular the use of systematic dependence proposed here according to the tenth aspect of the invention.

It should be noted that the subject-matter of the tenth aspect can be advantageously combined with the subject-matter of the preceding aspects of the invention, either individually or cumulatively in any combination.

According to an eleventh aspect of the invention, the task is solved by a use of
- a dependency table exhibiting at least two data sets, preferably exhibiting at least 50 data sets, particularly preferably exhibiting at least 200 data sets,
- wherein each data set exhibits at least one input quantity of the soiling process, in particular the distance travelled by the motor vehicle between the first availability and the second availability and/or the operating time by covering the distance travelled by the motor vehicle between the first availability and the second availability, and/or a driving speed of the motor vehicle, preferably a course of the driving speed along the route between the first availability and the second availability, and/or a process quantity, preferably a humidity, particularly preferably a course of the humidity along the route between the first availability and the second availability, and/or a temperature in the vicinity of the motor vehicle, particularly preferably a course of the temperature along the route between the first availability and the second availability, and/or a rainfall, particularly preferably a course of the rainfall along the route between the first availability and the second availability, and/or a snowfall quantity, particularly preferably a course of the snowfall quantity along the route between the first availability and the second availability, and/or a vehicle type and/or a coordinate of the motor vehicle, preferably the coordinate of the motor vehicle along the route between the first availability and the second availability, and/or the first availability of the sensor, and the evaluated change of availability, stored in an ordered manner with reference to one another, and/or
- a systematic dependence for a system behaviour of a soiling process of a surface of a motor vehicle, preferably derived by a method for indirectly deriving a systematic dependence according to one of the claims 1 to 14, for a resource efficient cleaning, preferably resource-saving cleaning, of at least one surface of a motor vehicle, to determine an expected distance or an expected operating time of the motor vehicle yet to be covered when reaching a threshold of availability by calculation of the intersection between the threshold of availability and the systematic dependence as a function of the input quantity and derivation of the expected distance or the operating time of the motor vehicle yet to be covered when reaching the threshold of availability starting from the actual availability, or selection of the data set from the dependency table that best matches the threshold of availability starting from the actual availability and determination of the expected distance or the operating time of the motor vehicle yet to be covered when reaching the threshold of availability, or means of linear interpolation between the adjacent data sets of the dependency table that best match the threshold of availability starting from the actual availability and determination of the expected distance or the operating time of the motor vehicle yet to be covered when reaching the threshold of availability.

While the tenth aspect of the invention consists of determining an expected availability for a selected distance or operating time of the motor vehicle yet to be covered, here an expected distance or operating time is to be determined until the expected availability reaches a threshold of availability.

In this context, a threshold of availability can be understood as a target value for expected availability, in particular to indirectly determine an event upon whose occurrence a cleaning process is to be started, whereby the distance or operating time of the motor vehicle yet to be covered can be determined directly until the event is reached.

Furthermore, a threshold of availability can also be understood literally as a limit value for the availability, which should not be fallen below. In this case, a safety margin can be planned to prevent a threshold of availability from being exceeded.

In accordance with this eleventh aspect of the invention, it is proposed here to use a dependency table, in particular a dependency table which was created with the first steps of the procedure according to the ninth aspect of the invention, and/or a systematic dependency, in particular a systematic dependency derived according to the ninth aspect of the invention, for the determination of an expected distance and/or an expected operating time, whereby the expected availability as a dependency of the expected distance and/or the expected operating time should then correspond to a threshold of availability.

With regard to the dependency table and/or the systematic distance, what has already been done under the tenth aspect to the dependency table and/or the systematic distance applies with the necessary adjustments.

Whereby the dependency table exhibits at least one input quantity of the soiling process, in particular at least one input quantity according to the ninth aspect of the invention. In particular, it is conceivable, among other things, that the dependency table may exhibit at least the distance travelled by the motor vehicle between the first availability and the second availability and/or the operating time by covering the distance travelled by the motor vehicle between the first availability and the second availability and/or a driving speed of the motor vehicle, preferably a course of the driving speed along the route between the first availability and the second availability, and/or a process quantity, preferably a humidity, particularly preferably a course of the humidity along the route between the first availability and the second availability, and/or a temperature in the vicinity of the motor vehicle, particularly preferably a course of the temperature along the route between the first availability and the second availability, and/or a rainfall, particularly preferably a course of the rainfall along the route between the first availability and the second availability, and/or a snowfall quantity, particularly preferably a course of the snowfall quantity along the route between the first availability and the second availability, and/or a vehicle type and/or a coordinate of the motor vehicle, preferably the coordinate of the motor vehicle along the route between the first availability and the second availability, and/or the first availability of the sensor, and the evaluated change of availability. It should preferably be considered that the dependency table shows the input quantity and the evaluated change of availability in an ordered way to each other.

When using the systematic dependence proposed here for use to determine an expected availability of the sensor, a systematic dependence which exhibits at least one input quantity according to the systematic dependence derived with the ninth aspect of the invention could in particular be considered.

The method proposed here provides an expected distance and/or an expected operating time until the expected achievement of a threshold of availability for each sensor considered individually and must be repeated to achieve an expected distance and/or an expected operating time for another sensor.

It should be noted that a systematic dependence and/or a dependency table is only valid for more than one sensor in exceptional cases, so that as a rule a different dependency table and/or a different systematic dependence must be used to determine the actual availability for each sensor.

Under real conditions this often results in a deviating expected distance and/or a deviating expected operating time for each considered sensor, which can partly be explained by the deviating soiling status and the deviating system behaviour of the respective soiling process.

The procedure proposed here can be described in particular by the following variants of characterizing procedural steps:

According to a first variant, it is proposed here to calculate the permitted change of availability on the basis of the actual availability to be determined first and the selected threshold of availability by means of difference formation between the actual availability and the selected threshold of availability.

Furthermore, it is proposed to insert the known range of the input quantity into the systematic dependence associated with the sensor and to vary the range of the input quantity concerning the distance and/or the operating time in such a way that the function value of the systematic dependence indicates the permitted change of availability. The corresponding value for the distance and/or operating time thus obtained then corresponds to the expected distance and/or expected operating time until the selected threshold of availability is expected to be reached.

In particular, a fixed point iteration procedure can be applied for the variation of the distance and/or the operating time to achieve the permitted change of availability. By contrast, the expected distance and/or the expected operating time can also be calculated directly by resolving the systematic dependence with its function value, in particular the permitted change of availability, according to the distance and/or the operating time. The result of the equation thus obtained then corresponds to the expected distance and/or the expected operating time until the selected threshold of availability is expected to be reached.

According to a second variant of the method it is also proposed to calculate the allowed change of availability based on the data sets of the dependency table, whereby the actual availability is to be determined first and the allowed change of availability is to be determined by means of difference formation between the actual availability and the selected threshold of availability.

Furthermore, it is proposed to select a data set with empirical values from the dependency table whose expected change of availability best matches the allowed change of availability, preferably by taking into account those data sets which best match the already known range of the input quantity.

In particular, the best matching data set could be selected over the smallest euclidean distance of all data sets of the dependency table between the expected change of availability corresponding to the data set and the allowed change of availability.

The data set selected from the dependency table then contains the expected distance and/or the expected operating time, especially the expected distance and/or the expected operating time until the expected threshold of availability is reached.

According to a third variant, two data sets are selected from the dependency table whose euclidean distance between the expected change of availability and the allowed change of availability is smallest, preferably by taking into account those data sets which best fit the already known range of the input quantity.

In this case, the expected distance and/or the expected operating time until the expected threshold of availability is reached is determined by linear interpolation, whereby the equalization line is supported by the two data points of the data sets. Here, among other things, it is conceivable that the input quantity to be selected lies between the two selected data points or on one side of the two selected data points.

Also according to this third variant, the permitted change of availability results from the difference between the actual availability and the selected threshold of availability.

It goes without saying that here the determination of the expected distance and/or the expected operating time until the expected threshold of availability is reached is explicitly suggested by means of a regression curve over a number of selected data sets from the dependency table, in particular by a systematic dependence, in particular by a systematic dependence according to the ninth aspect of the invention.

It should be expressly noted that actual availability is supplied by the sensor or otherwise derived from the data provided by the corresponding sensor.

This makes it advantageously possible to determine an expected distance that can still be covered by the vehicle until a threshold of availability is reached for a sensor.

After it had already been described in the third and fourth aspects of the invention that a resource-optimal cleaning process with regard to the consumption of cleaning resources often does not start immediately at the time of the decision about the cleaning process, but should rather only be carried out in the future, preferably depending on the occurrence of a defined state, the planning of the availability characterizing the soiling state is an advantageous possibility for the planning of a resource-optimal cleaning process.

In this case, it is particularly important to remember that a surface connected to a sensor is not cleaned until a threshold of availability is reached for the sensor. Thus, using this eleventh aspect of the invention, it is advantageous to determine a distance or an active operating time for the vehicle that the vehicle can, as expected, cover until the surface needs to be cleaned or until it is preplanned to be cleaned.

This enables a more precise planning of a cleaning process for a surface as well as an optimal planning of a cleaning process, especially after a third aspect of the invention.

Furthermore, with this eleventh aspect of the invention, it is advantageously possible to plan a cleaning strategy with optimum cleaning resources, in particular to determine a cleaning strategy according to the fourth aspect of the invention.

Furthermore, it should be specifically considered that information that can be determined with the method proposed here can also be used by other systems of a motor vehicle in an advantageous manner, in particular by a navigation system, which plans the route also depending on the optimum cleaning strategy and a necessary maintenance stop for replenishing cleaning resources that may be connected with it, whereby the remaining range is decisive, which can still be achieved with the available resources and taking into account the fact that no sensor with its individual availability should fall under an individual threshold of availability.

The operating time that can be determined here, among other things, can be of particular interest to professional drivers. In particular, the operation of a taxi should be considered, which is in active use until a certain time of day and during this time should make as many journeys as possible and as few maintenance stops as possible. In this respect, a statement with a possible remaining operating time for this type of motor vehicle operation may be more relevant than a statement linked to a distance that can still be covered.

It should be pointed out that the above values for the number of data sets should not be understood as sharp limits, but rather should be able to be exceeded or fallen below on an engineering scale without leaving the described aspect of the invention. In simple terms, the values are intended to provide an indication of the size of the number of data sets proposed here.

It goes without saying that the advantages of systematic dependence, in particular systematic dependence according to the ninth aspect of the invention, also apply to the use of systematic dependence, in particular the use of systematic dependence proposed here according to the eleventh aspect of the invention.

It should be noted that the subject-matter of the eleventh aspect can be advantageously combined with the subject-matter of the preceding aspects of the invention, either individually or cumulatively in any combination.

According to a twelfth aspect of the invention, the task is solved by a use of
  a dependency table exhibiting at least two data sets, preferably exhibiting at least 50 data sets, particularly preferably exhibiting at least 200 data sets,
  wherein each data set exhibits at least one input quantity of the soiling process, in particular the distance travelled by the motor vehicle between the first availability and the second availability and/or the operating time by covering the distance travelled by the motor vehicle between the first availability and the second availability, and/or a driving speed of the motor vehicle, preferably a course of the driving speed along the route between the first availability and the second availability, and/or a process quantity, preferably a humidity, particularly preferably a course of the humidity along the route between the first availability and the second availability, and/or a temperature in the vicinity of the motor vehicle, particularly preferably a course of the temperature along the route between the first availability and the second availability, and/or a rainfall, particularly preferably a course of the rainfall along the route between the first availability and the second availability, and/or a snowfall quantity, particularly preferably a course of the snowfall quantity along the route between the first availability and the second availability, and/or a vehicle type and/or a coordinate of the motor vehicle, preferably the coordinate of the motor vehicle along the route between the first availability and the second availability, and/or the first availability of the sensor, and the evaluated change of availability, stored in an ordered manner with reference to one another, and/or a systematic dependence for a system behaviour of a soiling process of a surface of a motor vehicle, preferably derived by a method for indirectly deriving a systematic dependence according to one of the claims 1 to 14, for a resource efficient cleaning, preferably resource-saving cleaning, of at least one surface of a motor vehicle, for optimizing a resource requirement for a cleaning process of a surface of a motor vehicle, in particular by applying a method for optimizing a resource requirement for a cleaning process of a surface of a motor vehicle, preferably by applying a method according to the third aspect of the invention.

Here the use of a dependency table, preferably a dependency table, which was created with the first steps of the procedure according to the ninth aspect of the invention and which describes the system behaviour of a soiling process of a surface of a motor vehicle, is proposed for the optimization of a resource requirement of a cleaning process for cleaning the surface, in particular by applying a method according to the third aspect of the invention.

Furthermore, the use of a systematic dependence describing the system behaviour of the soiling process of the surface of the motor vehicle, preferably a systematic dependence according to the ninth aspect of the invention, for the optimisation of the resource requirements of a cleaning process for cleaning the surface is proposed here, in particular by applying a method according to the third aspect of the invention.

With regard to the dependency table and/or the systematic distance, what has already been carried out under the tenth to eleventh aspect of the dependency table and/or the systematic distance applies with the necessary adjustments.

Whereby the dependency table exhibits at least one input quantity of the soiling process, in particular at least one input quantity according to the ninth aspect of the invention. In particular, it is conceivable, among other things, that the dependency table may exhibit at least the distance travelled by the motor vehicle between the first availability and the second availability and/or the operating time by covering the distance travelled by the motor vehicle between the first availability and the second availability and/or a driving speed of the motor vehicle, preferably a course of the driving speed along the route between the first availability and the second availability, and/or a process quantity, preferably a humidity, particularly preferably a course of the humidity along the route between the first availability and the second availability, and/or a temperature in the vicinity of the motor vehicle, particularly preferably a course of the temperature along the route between the first availability and the second availability, and/or a rainfall, particularly preferably a course of the rainfall along the route between the first availability and the second availability, and/or a snowfall quantity, particularly preferably a course of the snowfall quantity along the route between the first availability and the second availability, and/or a vehicle type and/or a coordinate of the motor vehicle, preferably the coordinate of the motor vehicle along the route between the first availability and the second availability, and/or the first availability of the sensor, and the evaluated change of availability. It should preferably be considered that the dependency table shows the input quantity and the evaluated change of availability in an ordered way to each other.

When using the systematic dependence proposed here for use to determine an expected availability of the sensor, a systematic dependence which exhibits at least one input quantity according to the systematic dependence derived with the ninth aspect of the invention could in particular be considered.

It is understood that the advantages of a dependency table as described above and/or a systematic dependence as described above, in particular the advantages of a dependency table created with the first steps of the method after the ninth aspect of the invention and/or a systematic dependence according to the ninth aspect of the invention, as described above, directly extend to the use of a dependency table, preferably the use of a dependency table created with the first steps of the method after the ninth aspect of the invention, and/or the use of a systematic dependence, preferably a systematic dependence according to the ninth aspect of the invention, for optimizing a resource requirement for a cleaning process of a surface of a motor vehicle.

It should be pointed out that the above values for the number of data sets should not be understood as sharp limits, but rather should be able to be exceeded or fallen below on an engineering scale without leaving the described aspect of the invention. In simple terms, the values are intended to provide an indication of the size of the number of data sets proposed here.

It goes without saying that the advantages of systematic dependence, in particular systematic dependence according to the ninth aspect of the invention, also apply to the use of systematic dependence, in particular the use of systematic dependence proposed here according to the twelfth aspect of the invention.

It should be noted that the subject-matter of the twelfth aspect can be advantageously combined with the subject-matter of the preceding aspects of the invention, either individually or cumulatively in any combination.

According to a thirteenth aspect of the invention, the task is solved by a use of a dependency table exhibiting at least two data sets, preferably exhibiting at least 50 data sets, particularly preferably exhibiting at least 200 data sets, wherein each data set exhibits at least one input quantity of the soiling process, in particular the distance travelled by the motor vehicle between the first availability and the second availability and/or the operating time by covering the distance travelled by the motor vehicle between the first availability and the second availability, and/or a driving speed of the motor vehicle, preferably a course of the driving speed along the route between the first availability and the second availability, and/or a process quantity, preferably a humidity, particularly preferably a course of the humidity along the route between the first availability and the second availability, and/or a temperature in the vicinity of the motor vehicle, particularly preferably a course of the temperature along the route between the first availability and the second availability, and/or a rainfall, particularly preferably a course of the rainfall along the route between the first availability and the second availability, and/or a snowfall quantity, particularly preferably a course of the snowfall quantity along the route between the first availability and the second availability, and/or a vehicle type and/or a coordinate of the motor vehicle, preferably the coordinate of the motor vehicle along the route between the first availability and the second availability, and/or the first availability of the sensor, and the evaluated change of availability, stored in an ordered manner with reference to one another, and/or a systematic dependence for a system behaviour of a soiling process of a surface of a motor vehicle, preferably derived by a method for indirectly deriving a systematic dependence according to one of the claims 1 to 14, for a resource efficient cleaning, preferably resource-saving cleaning, of at least one surface of a motor vehicle, to determine a cleaning strategy for cleaning a surface to be cleaned of a motor vehicle, in particular by applying a method for determining a cleaning strategy for cleaning a surface to be cleaned of a motor vehicle, preferably by applying a method to determine a cleaning strategy according to the fourth aspect of the invention.

Here the use of a dependency table, preferably a dependency table, which was created with the first steps of the procedure according to the ninth aspect of the invention and which describes the system behaviour of a soiling process of a surface of a motor vehicle, is proposed to determine a cleaning strategy for cleaning the surface of the motor vehicle, in particular by applying a method according to the fourth aspect of the invention.

Furthermore, the use of a systematic dependence describing the system behaviour of the soiling process of the surface of the motor vehicle, preferably a systematic dependence according to the ninth aspect of the invention, is proposed here for the determination of the cleaning strategy for cleaning the surface, in particular by applying a method according to the fourth aspect of the invention.

With regard to the dependency table and/or the systematic distance, what has already been carried out under the tenth to twelfth aspect of the dependency table and/or the systematic distance applies with the necessary adjustments.

Whereby the dependency table exhibits at least one input quantity of the soiling process, in particular at least one input quantity according to the ninth aspect of the invention. In particular, it is conceivable, among other things, that the dependency table may exhibit at least the distance travelled by the motor vehicle between the first availability and the second availability and/or the operating time by covering the distance travelled by the motor vehicle between the first availability and the second availability and/or a driving speed of the motor vehicle, preferably a course of the driving speed along the route between the first availability and the second availability, and/or a process quantity, preferably a humidity, particularly preferably a course of the humidity along the route between the first availability and the second availability, and/or a temperature in the vicinity of the motor vehicle, particularly preferably a course of the temperature along the route between the first availability and the second availability, and/or a rainfall, particularly preferably a course of the rainfall along the route between the first availability and the second availability, and/or a snowfall quantity, particularly preferably a course of the snowfall quantity along the route between the first availability and the second availability, and/or a vehicle type and/or a coordinate of the motor vehicle, preferably the coordinate of the motor vehicle along the route between the first availability and the second availability, and/or the first availability of the sensor, and the evaluated change of availability. It should preferably be considered that the dependency table shows the input quantity and the evaluated change of availability in an ordered way to each other.

When using the systematic dependence proposed here for use to determine an expected availability of the sensor, a systematic dependence which exhibits at least one input quantity according to the systematic dependence derived with the ninth aspect of the invention could in particular be considered.

It is understood that the advantages of a dependency table as described above and/or a systematic dependence as described above, in particular the advantages of a dependency table created with the first steps of the method after the ninth aspect of the invention and/or a systematic dependence according to the ninth aspect of the invention, as described above, directly extend to the use of a dependency table, preferably the use of a dependency table created with the first steps of the method after the ninth aspect of the invention, and/or the use of a systematic dependence, preferably a systematic dependence according to the ninth aspect of the invention, to determine a cleaning strategy for cleaning a surface to be cleaned of a motor vehicle.

It should be pointed out that the above values for the number of data sets should not be understood as sharp limits, but rather should be able to be exceeded or fallen below on an engineering scale without leaving the described aspect of the invention. In simple terms, the values are intended to provide an indication of the size of the number of data sets proposed here.

It goes without saying that the advantages of systematic dependence, in particular systematic dependence according to the ninth aspect of the invention, also apply to the use of systematic dependence, in particular the use of systematic dependence proposed here according to the thirteenth aspect of the invention.

It should be noted that the subject-matter of the thirteenth aspect can be advantageously combined with the subject-matter of the preceding aspects of the invention, either individually or cumulatively in any combination.

According to a fourteenth aspect of the invention, the task is solved by a use of a dependency table exhibiting at least two data sets, preferably exhibiting at least 50 data sets, particularly preferably exhibiting at least 200 data sets, wherein each data set exhibits at least one input quantity of the soiling process, in particular the distance travelled by the motor vehicle between the first availability and the second availability and/or the operating time by covering the distance travelled by the motor vehicle between the first availability and the second availability, and/or a driving speed of the motor vehicle, preferably a course of the driving speed along the route between the first availability and the second availability, and/or a process quantity, preferably a humidity, particularly preferably a course of the humidity along the route between the first availability and the second availability, and/or a temperature in the vicinity of the motor vehicle, particularly preferably a course of the temperature along the route between the first availability and the second availability, and/or a rainfall, particularly preferably a course of the rainfall along the route between the first availability and the second availability, and/or a snowfall quantity, particularly preferably a course of the snowfall quantity along the route between the first availability and the second availability, and/or a vehicle type and/or a coordinate of the motor vehicle, preferably the coordinate of the motor vehicle along the route between the first availability and the second availability, and/or the first availability of the sensor, and the evaluated change of availability, stored in an ordered manner with reference to one another, and/or a systematic dependence for a system behaviour of a soiling process of a surface of a motor vehicle, preferably derived by a method for indirectly deriving a systematic dependence according to one of the claims 1 to 14, for a resource efficient cleaning, preferably resource-saving cleaning, of at least one surface of a motor vehicle, to determine a necessary expected gain in availability, whereby the sum of the actual availability and the necessary expected gain in availability is sufficient to achieve a distance or an operating time yet to be covered by the motor vehicle in such a way that a threshold of availability is not exceeded, by parallel displacement of the systematic dependence in the direction of the dimension of the distance or the operating time until the intersection between the threshold of availability and the displaced systematic dependence reaches the distance or the operating time yet to be covered by the motor vehicle and determination of the necessary expected gain in availability starting from the actual availability, or parallel displacement of the data sets from the dependency table in the direction of the dimension of the distance or the operating time until the data set from the dependency table that best matches the intersection between the threshold of availability and the distance or the operating time yet to be covered by the motor vehicle has exceeded the intersection point in direction of the distance or the operating time and determination of the necessary expected gain in availability between the data set from the dependency table that best matches the actual point in time and the actual availability starting from the actual availability or parallel displacement of the data sets from the dependency table in the direction of the dimension of the distance or the operating time until the linear interpolation between the adjacent data sets of the dependency table that best match the intersection between the threshold of availability and the distance or the operating time yet to be covered by the motor vehicle has exceeded the intersection point in direction of the distance or the operating time and determination of the necessary expected gain in availability the linear interpolation between the adjacent data sets of the dependency table that best match the actual point in time and the actual availability starting from the actual availability.

In accordance with the fourteenth aspect of the invention, a method for determining a necessary expected gain in availability is proposed here, whereby the sum of the actual availability and the necessary expected gain in availability is sufficient to achieve a distance or an operating time yet to be covered by the motor vehicle.

In other words, the objective of the method proposed here is to determine the amount by which the availability of a sensor is expected to be improved, in particular by means of an appropriate cleaning process to clean the surface in active contact with the sensor so that the pre-planned route or operating time of the vehicle can still be covered without reaching a threshold of availability associated with the sensor.

If a sensor falls below its associated threshold of availability, it is apparent that the sensor can no longer provide data or that the data provided by the sensor is no longer of sufficient quality for further processing in certain driver assistance systems, so that the relevant driver assistance systems can no longer be used until the availability associated with the sensor is again above the corresponding threshold of availability.

In this context, a threshold of availability can be understood as a target value for expected availability, in particular to indirectly determine an event which should not occur until the end of the pre-planned operating time or route, i.e. a fall below a threshold of availability.

In accordance with the fourteenth aspect of the invention, it is concretely proposed here to use a dependency table, in particular a dependency table which has arisen with the first steps of the procedure according to the ninth aspect of the invention, and/or a systematic dependency, in particular a systematic dependency derived according to the ninth aspect of the invention, for the determination of a necessary gain in availability which is sufficient to ensure as expected that an availability of a sensor until the end of the pre-planned route and/or until the end of the pre-planned operating time does not assume a value which is smaller than the threshold of availability associated with the sensor. In particular, it could be considered that a necessary gain in availability based on the actual availability is sufficient so that an expected availability at the end of the pre-planned route and/or the pre-planned operating time is greater than or equal to the threshold of availability.

With regard to the dependency table and/or the systematic distance, what has already been carried out under the tenth to thirteenth aspect of the dependency table and/or the systematic distance applies with the necessary adjustments.

Whereby the dependency table exhibits at least one input quantity of the soiling process, in particular at least one input quantity according to the ninth aspect of the invention. In particular, it is conceivable, among other things, that the dependency table may exhibit at least the distance travelled by the motor vehicle between the first availability and the second availability and/or the operating time by covering the distance travelled by the motor vehicle between the first availability and the second availability and/or a driving speed of the motor vehicle, preferably a course of the driving speed along the route between the first availability and the second availability, and/or a process quantity, preferably a humidity, particularly preferably a course of the humidity along the route between the first availability and the second availability, and/or a temperature in the vicinity of the motor vehicle, particularly preferably a course of the temperature along the route between the first availability and the second availability, and/or a rainfall, particularly preferably a course of the rainfall along the route between the first availability and the second availability, and/or a snowfall quantity, particularly preferably a course of the snowfall quantity along the route between the first availability and the second availability, and/or a vehicle type and/or a coordinate of the motor vehicle, preferably the coordinate of the motor vehicle along the route between the first availability and the second availability, and/or the first availability of the sensor, and the evaluated change of availability. It should preferably be considered that the dependency table shows the input quantity and the evaluated change of availability in an ordered way to each other.

When using the systematic dependence proposed here for use to determine an expected availability of the sensor, a systematic dependence which exhibits at least one input quantity according to the systematic dependence derived with the ninth aspect of the invention could in particular be considered.

The method proposed here provides a necessary expected gain in availability for each individually considered sensor, which is sufficient according to the experience values made to ensure that an availability of the respective sensor until the end of the pre-planned route and/or until the end of the pre-planned operating time does not assume a value which is smaller than the threshold of availability associated with the sensor, and must be executed again in order to obtain a necessary expected gain in availability for another sensor.

Under real conditions, a different necessary expected gain in availability often results for each sensor considered, which can partly be explained by the different soiling status and the different system behaviour of the respective soiling process.

The procedure proposed here can be described in particular by the following variants of characterizing procedural steps:

According to a first variant, it is proposed here to determine the expected gain in availability, which is necessarily still required, on the basis of the already known pre-planned distance to be covered by the motor vehicle and/or on the basis of the already known pre-planned operating time on the basis of the systematic dependence, whereby the systematic dependence describes the system behaviour of the soiling process.

For this purpose the input quantity, which also includes the pre-planned distance to be covered and/or the pre-planned operating time to be covered, is used in the systematic dependence. The function value of systematic dependence is a change of availability.

The change in availability thus obtained is summed up with the threshold of availability. The sum of the threshold of availability and the change of availability is the necessary expected availability.

If the necessary expected availability is greater than the actual availability, the necessary expected gain in availability is zero.

If the necessary expected availability is less than the actual availability, the necessary expected gain in availability is the difference between the necessary expected availability and the actual availability.

It should be expressly pointed out that the variant of the procedure described above corresponds to a parallel displacement of the systematic dependence in the direction of the dimension of the distance or the operating time until the intersection between the threshold of availability and the displaced systematic dependence reaches the distance or the operating time yet to be covered by the motor vehicle and determination of the necessary expected gain in availability starting from the actual availability if the necessary expected gain in availability is determined graphically.

According to a second variant of the procedure, it is also proposed to plan the expected gain in availability, which is necessarily still required, on the basis of experience values in the form of data sets of a dependency table, based on the already known pre-planned distance to be covered by the motor vehicle and/or based on the already known pre-planned operating time, whereby the data sets from the dependency table describe the system behaviour of the soiling process.

It is suggested to select a data set with empirical values from the dependency table. For this, the data set is selected whose input quantity best matches the case considered here, in particular whose input quantity best matches the pre-planned distance and/or operating time to be covered and the other variables recorded in the input quantity. The corresponding change of availability can then be taken from this data set.

In particular, it is suggested to select the most suitable data set over the smallest Euclidean distance of all data sets of the dependency table.

The resulting change in availability is summed with the threshold of availability. The sum of the threshold of availability and the change of availability is the necessary expected availability.

If the necessary expected availability is greater than the actual availability, the necessary expected gain in availability is zero.

If the necessary expected availability is less than the actual availability, the necessary expected gain in availability is the difference between the necessary expected availability and the actual availability.

It should be expressly pointed out that the variant of the procedure described above corresponds to a parallel displacement of the data sets from the dependency table in the direction of the dimension of the distance or the operating time until the data set from the dependency table that best matches the intersection between the threshold of availability and the distance or the operating time yet to be covered by the motor vehicle has exceeded the intersection point in direction of the distance or the operating time and determination of the necessary expected gain in availability between the data set from the dependency table that best matches the actual point in time and the actual availability starting from the actual availability if the necessary expected gain in availability is determined graphically.

According to a third variant, it is proposed to modify the variant according to the second variant to select the two most suitable data sets from the dependency table instead of one data set, whereby the change of availability is determined by linear interpolation between the two selected data sets. Further components of the procedure can be taken from the second variant.

It should be expressly pointed out that the variant of the procedure described above corresponds to a parallel displacement of the data sets from the dependency table in the direction of the dimension of the distance or the operating time until the linear interpolation between the adjacent data sets of the dependency table that best match the intersection between the threshold of availability and the distance or the operating time yet to be covered by the motor vehicle has exceeded the intersection point in direction of the distance or the operating time and determination of the necessary expected gain in availability the linear interpolation between the adjacent data sets of the dependency table that best match the actual point in time and the actual availability starting from the actual availability if the necessary expected gain in availability is determined graphically.

It should be expressly pointed out that the point of valuation for the determination of the necessary expected gain in availability according to the above variants can also lie in the future, which can be relevant in particular for the advance planning of a cleaning resource-optimal cleaning process of the surface in an effective connection with the sensor, in particular for the planning of a cleaning resource-optimal cleaning process according to the third aspect of the invention. If the valuation date is in the future, the above variants of the method must only be modified in such a way that the actual availability corresponds to an expected availability at the planning time. The corresponding expected availability at the planning time can be determined in particular with a method according to the tenth aspect of the invention.

It should be expressly pointed out that the actual availability in all three variants is supplied by the sensor or can otherwise be derived from the data provided by the corresponding sensor.

This makes it advantageously possible to determine whether a surface that is in an active connection with a sensor still needs to be cleaned in order to maintain the currently selected driver assistance systems in order to cover the planned distance and/or the planned operating time, or whether the planned goal can still be achieved even without the associated cleaning process, without the associated threshold of availability being undercut.

Furthermore, in the case where a cleaning process is necessary, the necessary gain of availability can be determined directly, which is required to ensure that the availability of the sensor does not fall below the corresponding threshold of availability according to the preplanned objective.

This enables a more precise planning of a cleaning process for a surface as well as an optimal planning of a cleaning process, especially after a third aspect of the invention.

Furthermore, with this fourteenth aspect of the invention a planning of a cleaning resource-optimal cleaning strategy is advantageously made possible, in particular the determination of a cleaning strategy after the fourth aspect of the invention.

It can also be achieved so advantageously that by means of the necessary cleaning process that can be determined, the resource requirement of cleaning resources can be determined that is still required when the pre-planned distance to travel and/or the pre-planned operating time to travel is covered. If this resource requirement can no longer be covered by the stock of cleaning resources carried in the motor vehicle, a corresponding maintenance stop can be planned to replenish cleaning resources, especially advantageously by means of a navigation system set up accordingly.

In particular, the aspect presented here can be used to advantage to ensure that the cleaning of a surface that is operatively connected to a sensor can always be carried out in such a way that the motor vehicle achieves the goal of active motor vehicle use with the cleaning effort that is just necessary without losing the functionality of driver assistance systems.

As a rule, a phase with active vehicle operation is followed by a phase of passive vehicle operation in which the vehicle is parked and waiting for its next active vehicle operation.

In this phase of passive vehicle operation, the availability of a sensor usually also changes, especially due to weather-related influences on the vehicle. This change in availability can lead to both a decrease and an increase in availability, especially if the parked vehicle is exposed to rain and/or snow.

This change in the availability of a motor vehicle during passive motor vehicle operation is initially not relevant for passive motor vehicle operation, since the use of sensors is generally only conditional on active motor vehicle operation. In this respect, the question of the availability of a sensor only arises again when active vehicle operation is resumed.

It turned out unexpectedly that a cleaning strategy in which the availability of each sensor is just above the respective thresholds of availability can save the most cleaning resources overall. This can be advantageously achieved by the aspect presented here, particularly in combination with the third and fourth aspects of the invention.

The operating time that can be determined here, among other things, can be of particular interest to professional drivers. In particular, the operation of a taxi should be considered, which is in active use until a certain time of day and during this time should make as many journeys as possible and as few maintenance stops as possible. In this respect, a statement with a possible remaining operating time for this type of motor vehicle operation may be more relevant than a statement linked to a distance that can still be covered.

It should be pointed out that the above values for the number of data sets should not be understood as sharp limits, but rather should be able to be exceeded or fallen below on an engineering scale without leaving the described aspect of the invention. In simple terms, the values are intended to provide an indication of the size of the number of data sets proposed here.

It goes without saying that the advantages of systematic dependence, in particular systematic dependence according to the ninth aspect of the invention, also apply to the use of systematic dependence, in particular the use of systematic dependence proposed here according to the fourteenth aspect of the invention.

It should be noted that the subject-matter of the fourteenth aspect can be advantageously combined with the subject-matter of the preceding aspects of the invention, either individually or cumulatively in any combination.

According to a fifteenth aspect of the invention, the task is solved by a use of a systematic dependence derived by a method for indirectly deriving a systematic dependence for a system behavior of a cleaning system of a motor vehicle according to the second aspect of the invention for a resource efficient cleaning, preferably resource-saving cleaning, of at least one surface of a motor vehicle, and/or a use of a control quantity setpoint derived by a method for optimizing a resource requirement for a cleaning process of a surface of a motor vehicle according to the third aspect of the invention for a resource efficient cleaning, preferably resource-saving cleaning, of at least one surface of a motor vehicle, and/or a use of a cleaning strategy derived by a method according to the fourth aspect of the invention for a resource efficient cleaning, preferably resource-saving cleaning, of at least one surface of a motor vehicle.

It is understood that the advantages of a systematic dependence derived by a method for indirectly deriving a systematic dependence for a system behavior of a cleaning system of a motor vehicle according to the second aspect of the invention for a resource efficient cleaning, preferably resource-saving cleaning, of at least one surface of a motor vehicle, and/or the advantages of a control quantity setpoint derived by a method for optimizing a resource requirement for a cleaning process of a surface of a motor vehicle according to the third aspect of the invention for a resource efficient cleaning, preferably resource-saving cleaning, of at least one surface of a motor vehicle, and/or the advantages of a cleaning strategy derived by a method according to the fourth aspect of the invention for a resource efficient cleaning, preferably resource-saving cleaning, of at least one surface of a motor vehicle, as described above, directly extend to a use of a systematic dependence derived by a method for indirectly deriving a systematic dependence for a system behavior of a cleaning system of a motor vehicle according to the second aspect of the invention for a resource efficient cleaning, preferably resource-saving cleaning, of at least one surface of a motor vehicle, and/or a use of a control quantity setpoint derived by a method for optimizing a resource requirement for a cleaning process of a surface of a motor vehicle according to the third aspect of the invention for a resource efficient cleaning, preferably resource-saving cleaning, of at least one surface of a motor vehicle, and/or a use of a cleaning strategy derived by a method according to the fourth aspect of the invention for a resource efficient cleaning, preferably resource-saving cleaning, of at least one surface of a motor vehicle.

It should be noted that the subject-matter of the fifteenth aspect of the invention can be advantageously combined with the subject-matter of the preceding aspects of the invention, either individually or cumulatively in any combination.

According to a sixteenth aspect of the invention, the task is solved by a cleaning system exhibiting an electronic control unit, a cleaning fluid distribution system, wherein the cleaning fluid distribution system comprises at least one fluid reservoir, at least one nozzle, and at least one cleaning fluid line, wherein the cleaning system is adapted to execute a cleaning method for a resource efficient cleaning, preferably resource-saving cleaning, of at least one surface of a motor vehicle according to the first aspect of the invention, and/or wherein the cleaning system is adapted to execute a method for indirectly deriving a systematic dependence for a system behaviour of a cleaning system of a motor vehicle, particularly for a system behaviour of a cleaning process of a surface of the motor vehicle, according to the second aspect of the invention, and/or wherein the cleaning system is adapted to execute a method for optimizing a resource requirement for a cleaning process of a surface of a motor vehicle, wherein a sensor is operatively connected to the surface according to the third aspect of the invention, and/or wherein the cleaning system is adapted to execute a method for determining a cleaning strategy for cleaning a surface to be cleaned of a motor vehicle according to the fourth aspect of the invention, and/or wherein the cleaning system is adapted to execute a method for indirectly deriving a systematic dependence for a system behaviour of a system component of a cleaning system of a motor vehicle according to the fifth aspect of the invention, and/or adapted to execute a method for diagnosing a deviation between an actual system behaviour of a system component of a cleaning system of a motor vehicle according to the sixth aspect of the invention, and/or adapted to execute a method for selecting a resolution strategy from a list of resolution strategies contained in a database according to the seventh aspect of the invention, and/or adapted to use a selected resolution strategy according to the eighth aspect of the invention, and/or wherein the cleaning system is adapted to execute a method for indirectly deriving a systematic dependence for a system behaviour of a soiling process of a surface of a motor vehicle according to the ninth aspect of the invention, and/or whereby the motor vehicle is adapted to use a dependency table and/or a systematic dependence according to the tenth and/or the eleventh and/or the twelfth and/or the thirteens and/or the fourteenth aspect of the invention.

It is understood that the advantages of a cleaning method for a resource efficient cleaning, preferably resource-saving cleaning, of at least one surface of a motor vehicle according to the first aspect of the invention, and/or the advantages of a method for indirectly deriving a systematic dependence for a system behaviour of a cleaning system of a motor vehicle, particularly for a system behaviour of a cleaning process of a surface of the motor vehicle, according to the second aspect of the invention, and/or the advantages of a method for optimizing a resource requirement for a cleaning process of a surface of a motor vehicle, wherein a sensor is operatively connected to the surface according to the third aspect of the invention, and/or the advantages of a method for determining a cleaning strategy for cleaning a surface to be cleaned of a motor vehicle according to the fourth aspect of the invention, and/or the advantages of a method for indirectly deriving a systematic dependence for a system behaviour of a system component of a cleaning system of a motor vehicle according to the fifth aspect of the invention, and/or the advantages of a method for diagnosing a deviation between an actual system behaviour of a system component of a cleaning system of a motor vehicle according to the sixth aspect of the invention, and/or the advantages of a method for selecting a resolution strategy from a list of resolution strategies contained in a database according to the seventh aspect of the invention, and/or the advantages of a selected resolution strategy according to the eighth aspect of the invention, and/or the advantages of a method for indirectly deriving a systematic dependence for a system behaviour of a soiling process of a surface of a motor vehicle according to the ninth aspect of the invention, and/or the advantages of a use of a dependency table and/or a systematic dependence according to the tenth and/or the eleventh and/or the twelfth and/or the thirteens and/or the fourteenth aspect of the invention, as described above, directly extend to a cleaning system exhibiting an electronic control unit, a cleaning fluid distribution system, wherein the cleaning fluid distribution system comprises at least one fluid reservoir, at least one nozzle, and at least one cleaning fluid line, wherein the cleaning system is adapted to execute a cleaning method for a resource efficient cleaning, preferably resource-saving cleaning, of at least one surface of a motor vehicle according to the first aspect of the invention, and/or wherein the cleaning system is adapted to execute a method for indirectly deriving a systematic dependence for a system behaviour of a cleaning system of a motor vehicle, particularly for a system behaviour of a cleaning process of a surface of the motor vehicle, according to the second aspect of the invention, and/or wherein the cleaning system is adapted to execute a method for optimizing a resource requirement for a cleaning process of a surface of a motor vehicle, wherein a sensor is operatively connected to the surface according to the third aspect of the invention, and/or wherein the cleaning system is adapted to execute a method for determining a cleaning strategy for cleaning a surface to be cleaned of a motor vehicle according to the fourth aspect of the invention, and/or wherein the cleaning system is adapted to execute a method for indirectly deriving a systematic dependence for a system behaviour of a system component of a cleaning system of a motor vehicle according to the fifth aspect of the invention, and/or adapted to execute a method for diagnosing a deviation between an actual system behaviour of a system component of a cleaning system of a motor vehicle according to the sixth aspect of the invention, and/or adapted to execute a method for selecting a resolution strategy from a list of resolution strategies contained in a database according to the seventh aspect of the invention, and/or adapted to use a selected resolution strategy according to the eighth aspect of the invention, and/or wherein the cleaning system is adapted to execute a method for indirectly deriving a systematic dependence for a system behaviour of a soiling process of a surface of a motor vehicle according to the ninth aspect of the invention, and/or whereby the motor vehicle is adapted to use a dependency table and/or a systematic dependence according to the tenth and/or the eleventh and/or the twelfth and/or the thirteens and/or the fourteenth aspect of the invention.

It should be noted that the subject-matter of the sixteenth aspect of the invention can be advantageously combined with the subject-matter of the preceding aspects of the invention, either individually or cumulatively in any combination.

According to a seventeenth aspect of the invention, the task is solved by a motor vehicle, whereby the motor vehicle exhibits a cleaning system according to the sixteenth aspect of the invention, and/or whereby the motor vehicle is adapted to execute a cleaning method for a resource efficient cleaning, preferably resource-saving cleaning, of at least one surface of the motor vehicle according to the first aspect of the invention, and/or whereby the motor vehicle is adapted to execute a method for indirectly deriving s systematic dependence for a system behavior of a cleaning system of a motor vehicle according to the second aspect of the invention, and/or adapted to use a systematic dependence derived according to the second aspect of the invention for a resource efficient cleaning, preferably resource-saving cleaning, of at least one surface of the motor vehicle, and/or whereby the motor vehicle is adapted to execute a method for optimizing a resource requirement for a cleaning process of a surface of a motor vehicle according to the third aspect of the invention, and/or adapted to use a control quantity setpoint derived by a method for optimizing a resource requirement for a cleaning process of a surface of a motor vehicle according to the third aspect of the invention for a resource efficient cleaning, preferably resource-saving cleaning, of at least one surface of the motor vehicle, and/or whereby the motor vehicle is adapted to execute a method for determining a cleaning strategy for cleaning a surface to be cleaned of a motor vehicle according to the fourth aspect of the invention, and/or adapted to use a cleaning strategy derived by a method for determining a cleaning strategy for cleaning a surface to be cleaned of a motor vehicle according to the fourth aspect of the invention for a resource efficient cleaning, preferably resource-saving cleaning, of at least one surface of the motor vehicle, and/or whereby the motor vehicle is adapted to execute a method for indirectly deriving a systematic dependence for a system behaviour of a system component of a cleaning system of a motor vehicle according to the fifth aspect of the invention, and/or adapted to execute a method for diagnosing a deviation between an actual system behaviour of a system component of a cleaning system of a motor vehicle according to the sixth aspect of the invention, and/or adapted to execute a method for selecting a resolution strategy from a list of resolution strategies contained in a database according to the seventh aspect of the invention, and/or adapted to use a selected resolution strategy according to the eighth aspect of the invention, and/or whereby the motor vehicle is adapted to execute a method for indirectly deriving a systematic dependence for a system behaviour of a soiling process of a surface of a motor vehicle according to the ninth aspect of the invention, and/or whereby the motor vehicle is adapted to use a dependency table and/or a systematic dependence according to the tenth and/or the eleventh and/or the twelfth and/or the thirteens and/or the fourteenth aspect of the invention.

It is understood that the advantages of a cleaning system according to the sixteenth aspect of the invention and/or the advantages of a cleaning method for a resource efficient cleaning, preferably resource-saving cleaning, of at least one surface of a motor vehicle according to the first aspect of the invention, and/or the advantages of a systematic dependence according to the second aspect of the invention for a resource efficient cleaning, preferably resource-saving cleaning, of at least one surface of the motor vehicle, and/or the advantages using a systematic dependence derived according to the second aspect of the invention for a resource efficient cleaning, preferably resource-saving cleaning, of at least one surface of the motor vehicle, and/or the advantages of a method for optimizing a resource requirement for a cleaning process of a surface of a motor vehicle according to the third aspect of the invention, and/or the advantages of a control quantity setpoint derived by a method for optimizing a resource requirement for a cleaning process of a surface of a motor vehicle according to the third aspect of the invention for a resource efficient cleaning, preferably resource-saving cleaning, of at least one surface of the motor vehicle, and/or the advantages of a method for determining a cleaning strategy for cleaning a surface to be cleaned of a motor vehicle according to the fourth aspect of the invention, and/or the advantages of a use of a cleaning strategy derived by a method for determining a cleaning strategy for cleaning a surface to be cleaned of a motor vehicle according to the fourth aspect of the invention for a resource efficient cleaning, preferably resource-saving cleaning, of at least one surface of the motor vehicle, and/or the advantages of a method for indirectly deriving a systematic dependence for a system behaviour of a system component of a cleaning system of a motor vehicle according to the fifth aspect of the invention, and/or the advantages of a method for diagnosing a deviation between an actual system behaviour of a system component of a cleaning system of a motor vehicle according to the sixth aspect of the invention, and/or the advantages of a method for selecting a resolution strategy from a list of resolution strategies contained in a database according to the seventh aspect of the invention, and/or the advantages of a use of a selected resolution strategy according to the eighth aspect of the invention, and/or the advantages of a method for indirectly deriving a systematic dependence for a system behaviour of a soiling process of a surface of a motor vehicle according to the ninth aspect of the invention, and/or the advantages of a use of a dependency table and/or a systematic dependence according to the tenth and/or the eleventh and/or the twelfth and/or the thirteens and/or the fourteenth aspect of the invention, as described above, directly extend to a motor vehicle, whereby the motor vehicle exhibits a cleaning system according to the sixteenth aspect of the invention, and/or whereby the motor vehicle is adapted to execute a cleaning method for a resource efficient cleaning, preferably resource-saving cleaning, of at least one surface of the motor vehicle according to the first aspect of the invention, and/or whereby the motor vehicle is adapted to execute a method for indirectly deriving s systematic dependence for a system behavior of a cleaning system of a motor vehicle according to the second aspect of the invention, and/or adapted to use a systematic dependence derived according to the second aspect of the invention for a resource efficient cleaning, preferably resource-saving cleaning, of at least one surface of the motor vehicle, and/or whereby the motor vehicle is adapted to execute a method for optimizing a resource requirement for a cleaning process of a surface of a motor vehicle according to the third aspect of the invention, and/or adapted to use a control quantity setpoint derived by a method for optimizing a resource requirement for a cleaning process of a surface of a motor vehicle according to the third aspect of the invention for a resource efficient cleaning, preferably resource-saving cleaning, of at least one surface of the motor vehicle, and/or whereby the motor vehicle is adapted to execute a method for determining a cleaning strategy for cleaning a surface to be cleaned of a motor vehicle according to the fourth aspect of the invention, and/or adapted to use a cleaning strategy derived by a method for determining a cleaning strategy for cleaning a surface to be cleaned of a motor vehicle according to the fourth aspect of the invention for a resource efficient cleaning, preferably resource-saving cleaning, of at least one surface of the motor vehicle, and/or whereby the motor vehicle is adapted to execute a method for indirectly deriving a systematic dependence for a system behaviour of a system component of a cleaning system of a motor vehicle according to the fifth aspect of the invention, and/or adapted to execute a method for diagnosing a deviation between an actual system behaviour of a system component of a cleaning system of a motor vehicle according to the sixth aspect of the invention, and/or adapted to execute a method for selecting a resolution strategy from a list of resolution strategies contained in a database according to the seventh aspect of the invention, and/or adapted to use a selected resolution strategy according to the eighth aspect of the invention, and/or whereby the motor vehicle is adapted to execute a method for indirectly deriving a systematic dependence for a system behaviour of a soiling process of a surface of a motor vehicle according to the ninth aspect of the invention, and/or whereby the motor vehicle is adapted to use a dependency table and/or a systematic dependence according to the tenth and/or the eleventh and/or the twelfth and/or the thirteens and/or the fourteenth aspect of the invention.

It should be noted that the subject-matter of the seventeenth aspect of the invention can be advantageously combined with the subject-matter of the preceding aspects of the invention, either individually or cumulatively in any combination.

Figure 2:
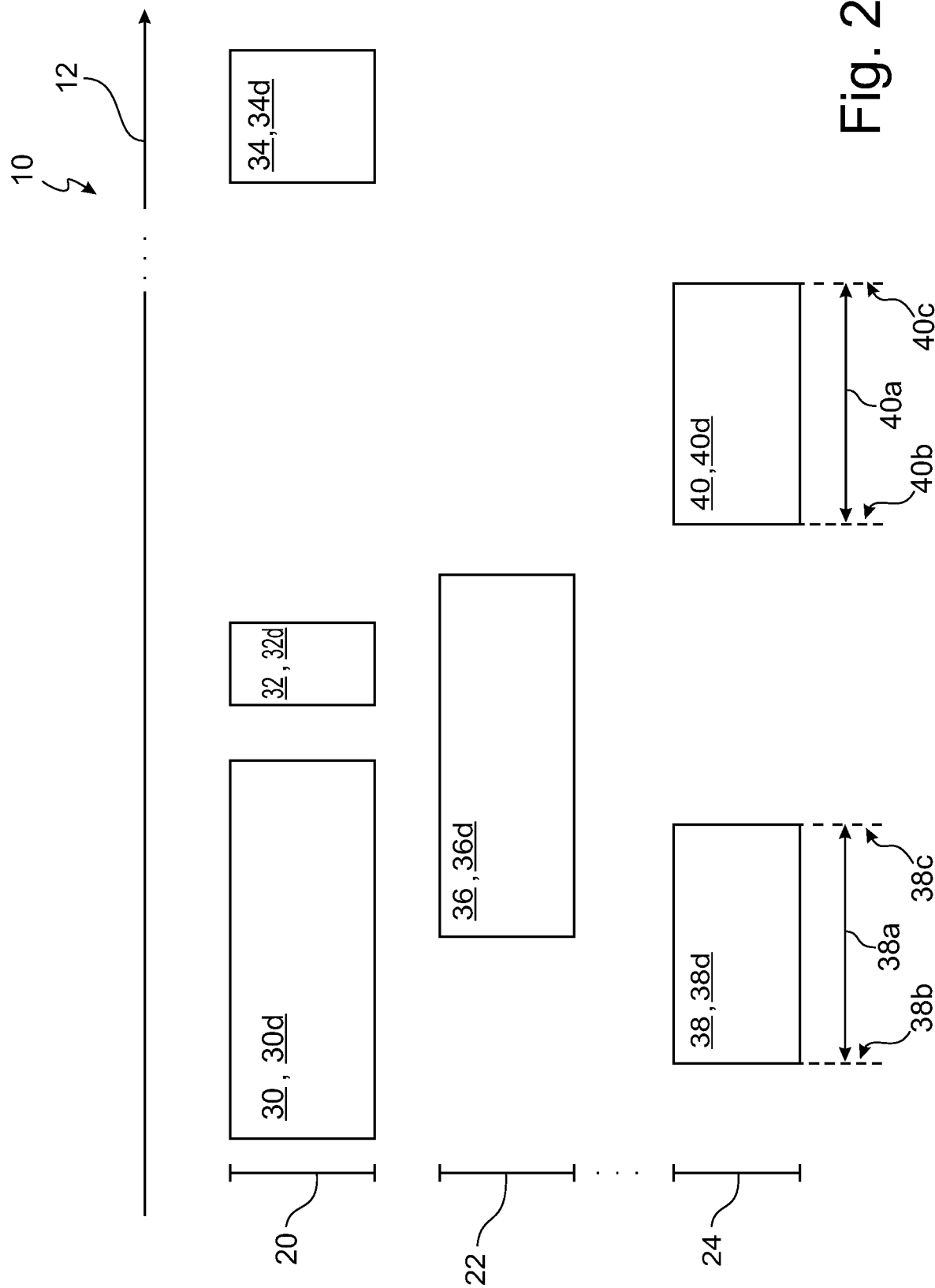
Figure 3:
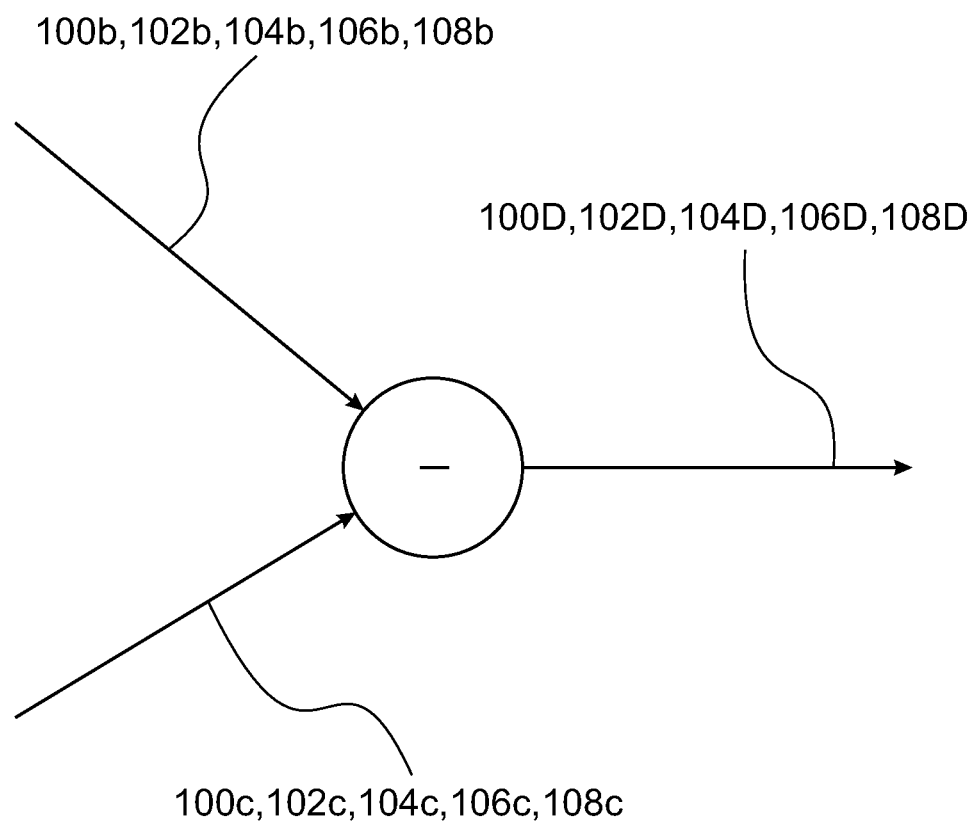
Figure 4:
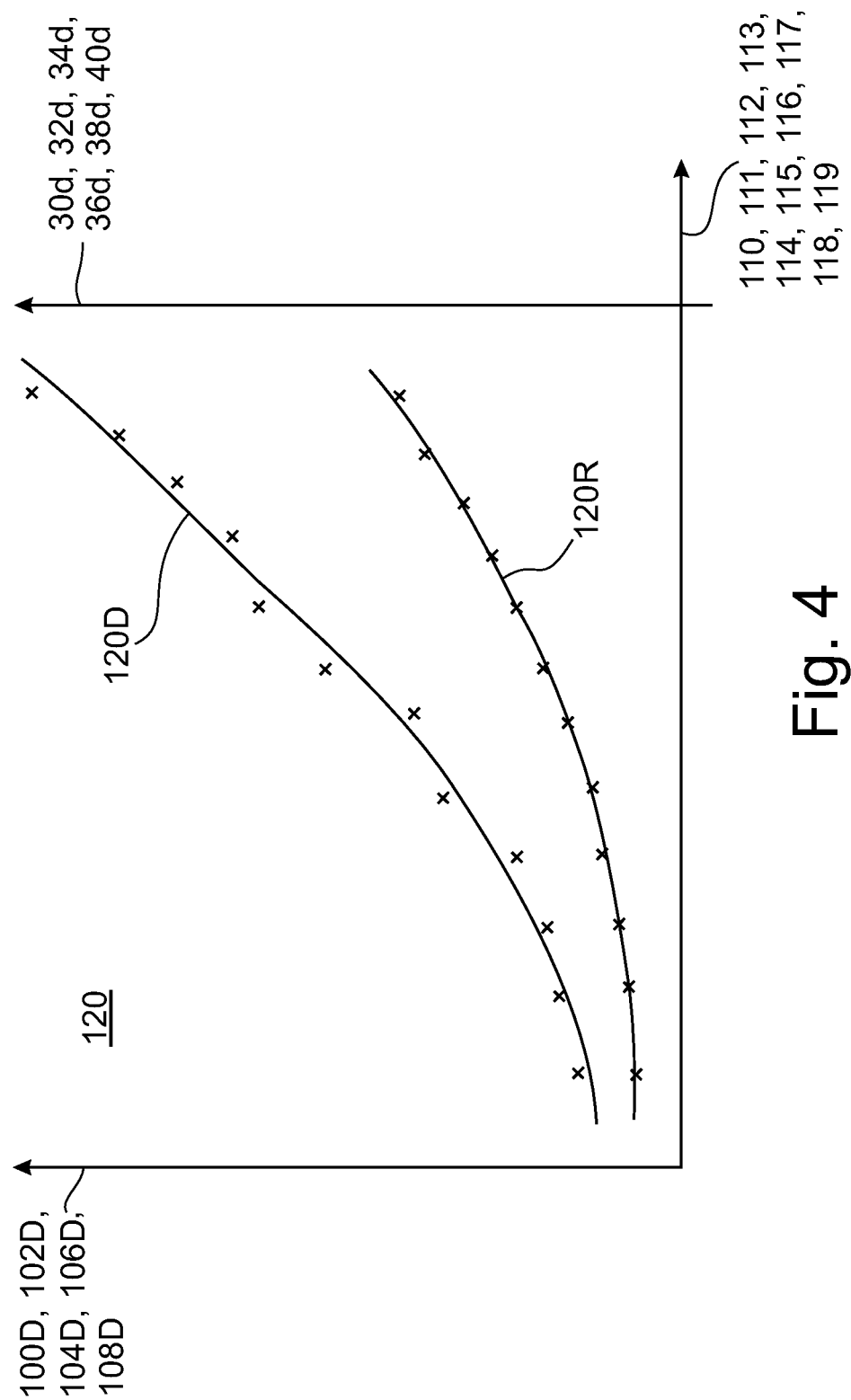
Figure 5:
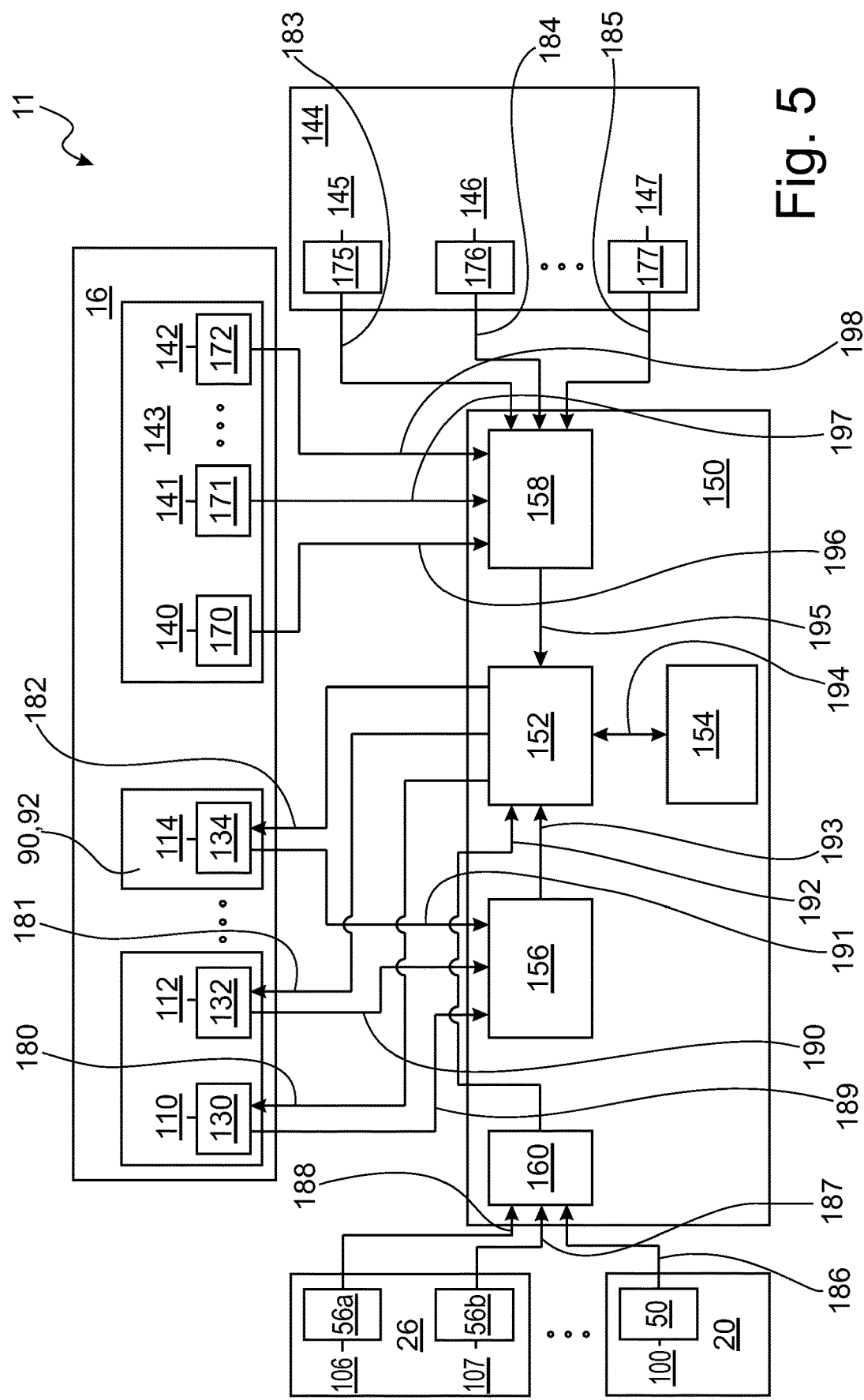
Figure 6:
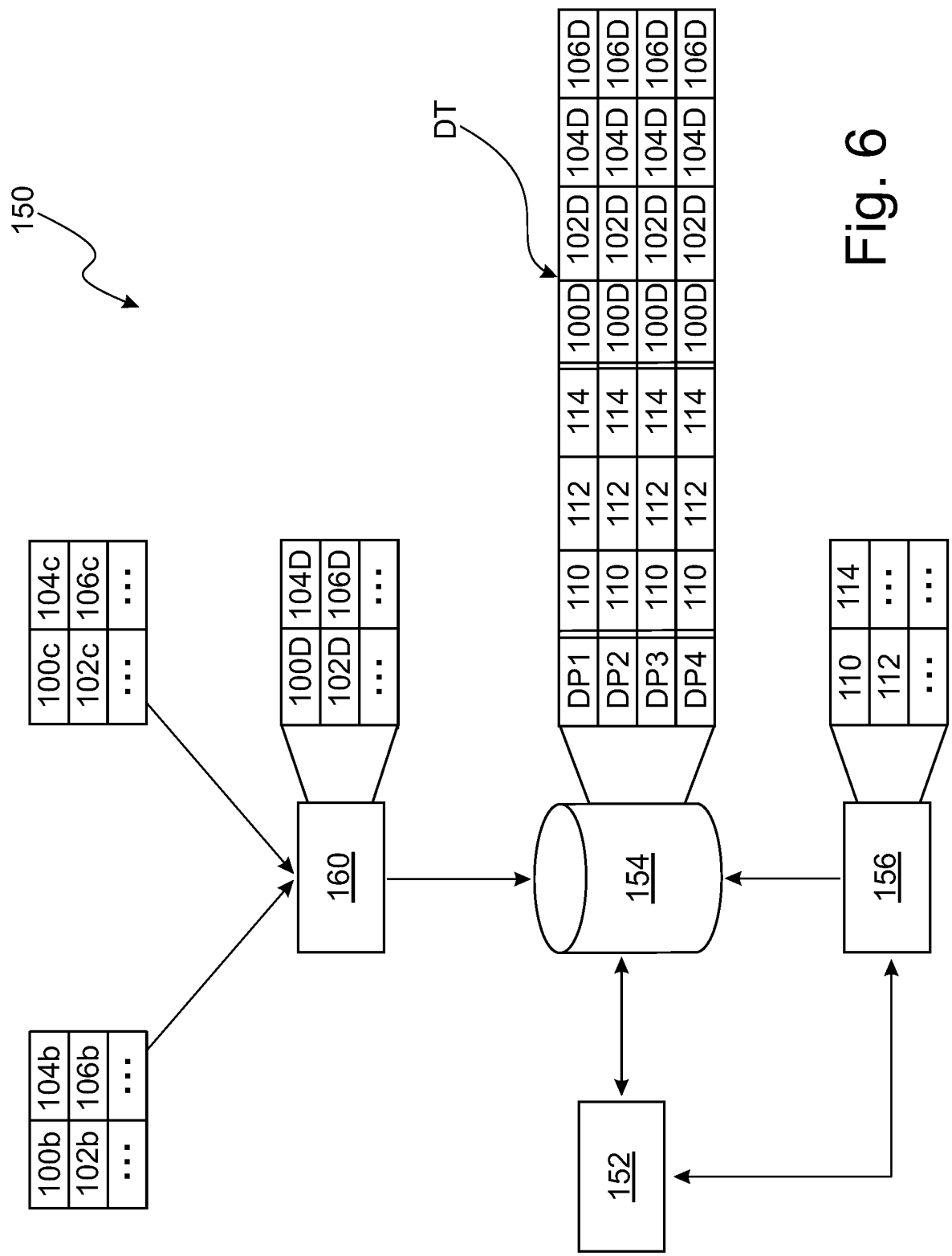
Figure 7:
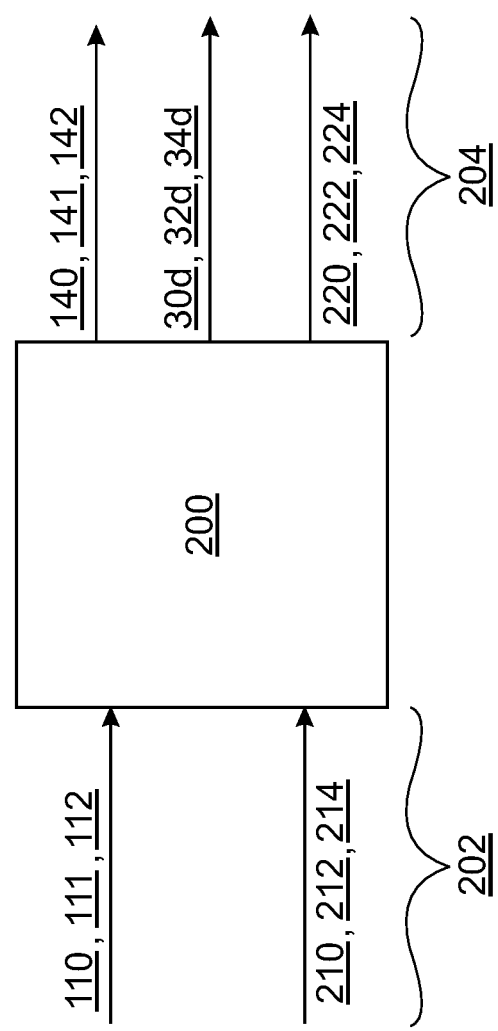
Figure 8:
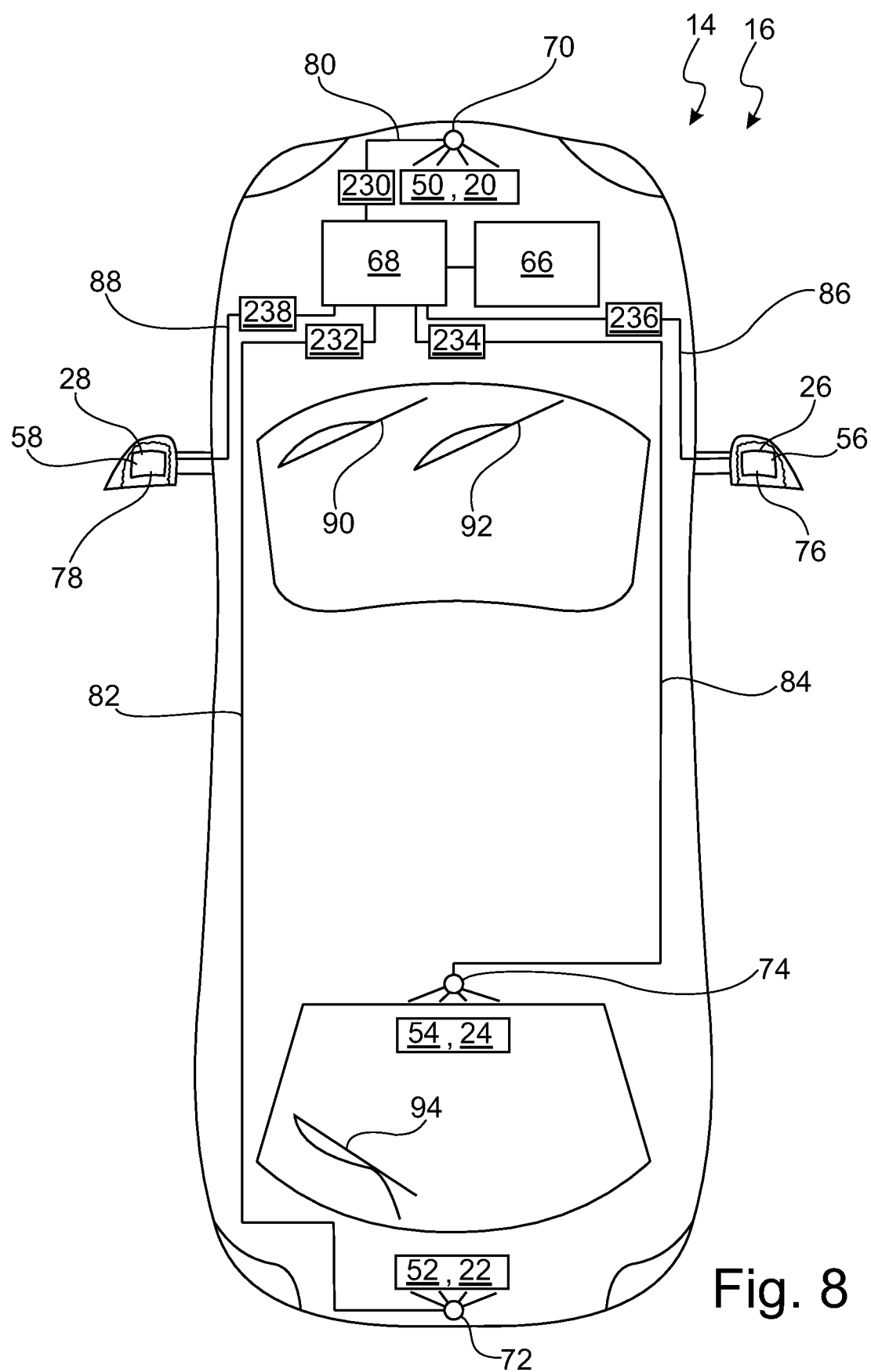
Figure 9:
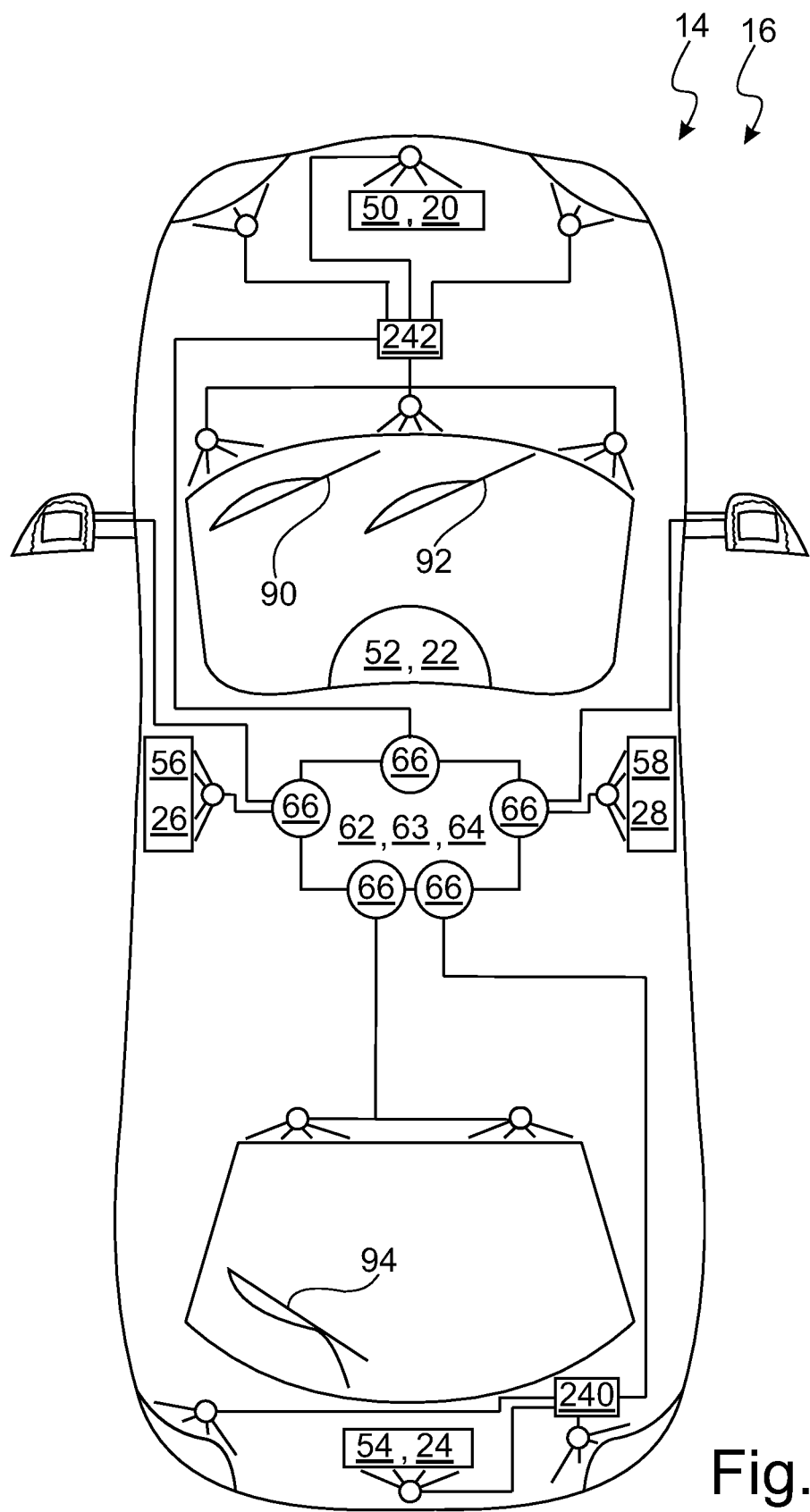
Figure 10:
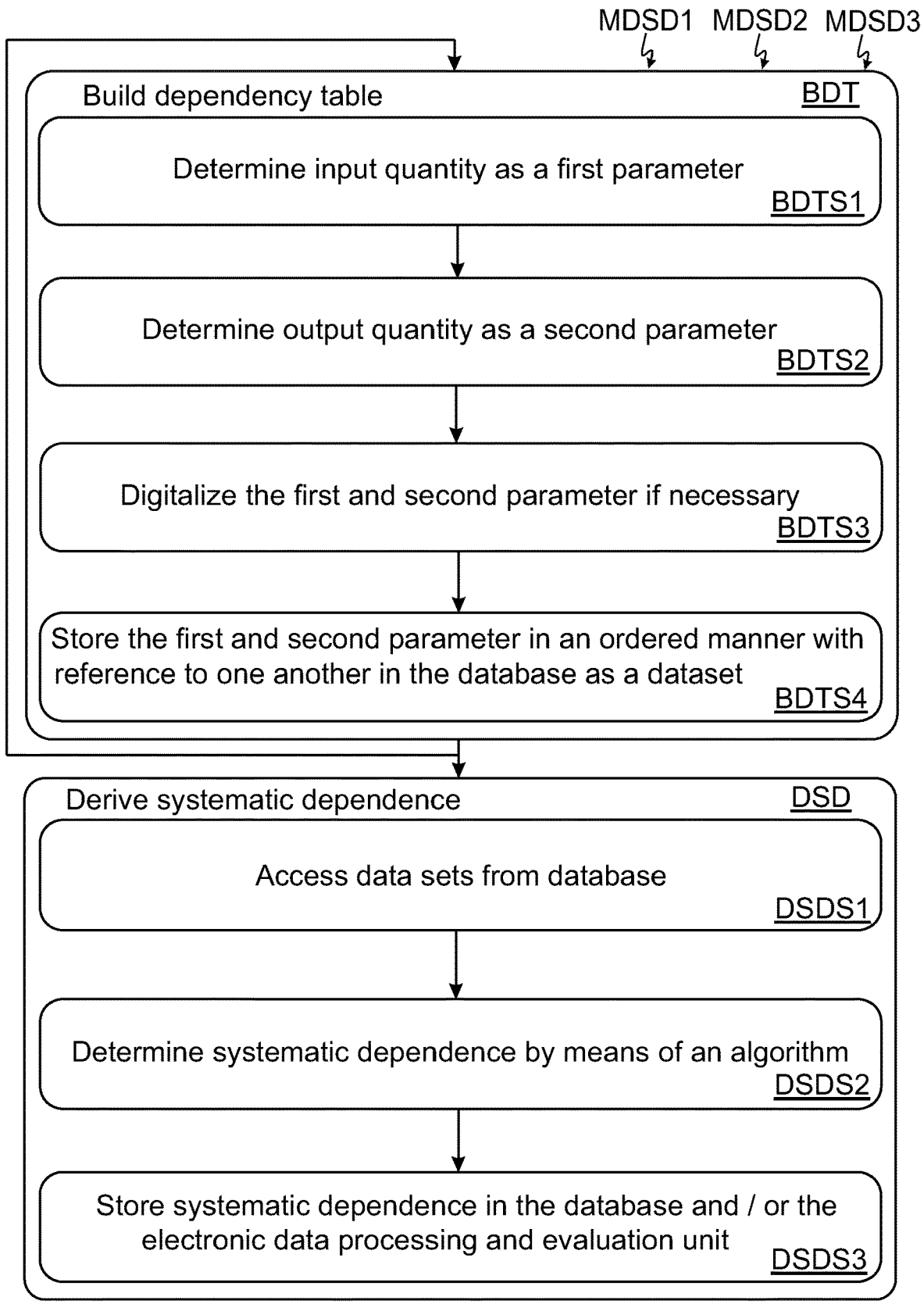
Figure 11:
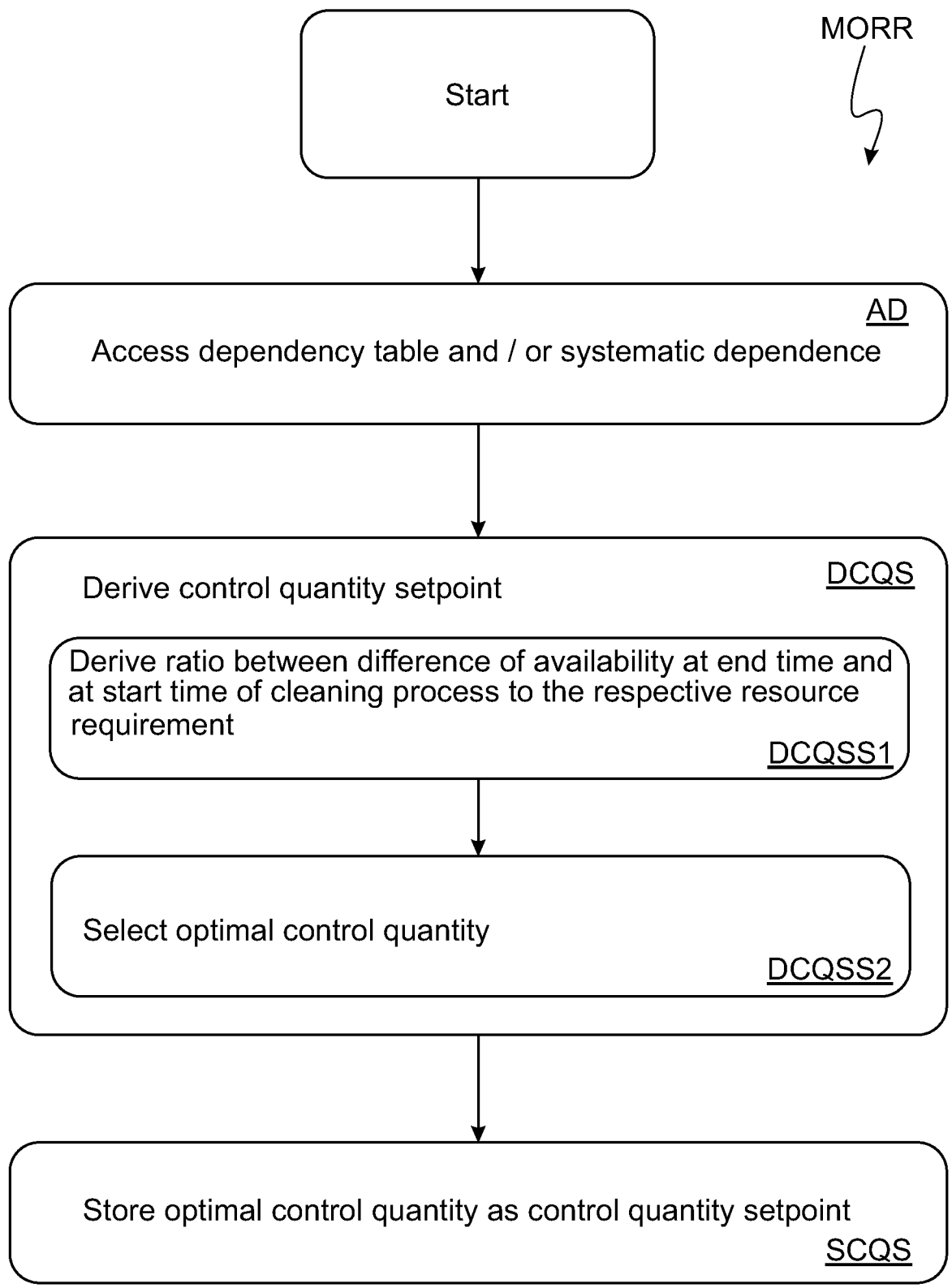
Figure 12:
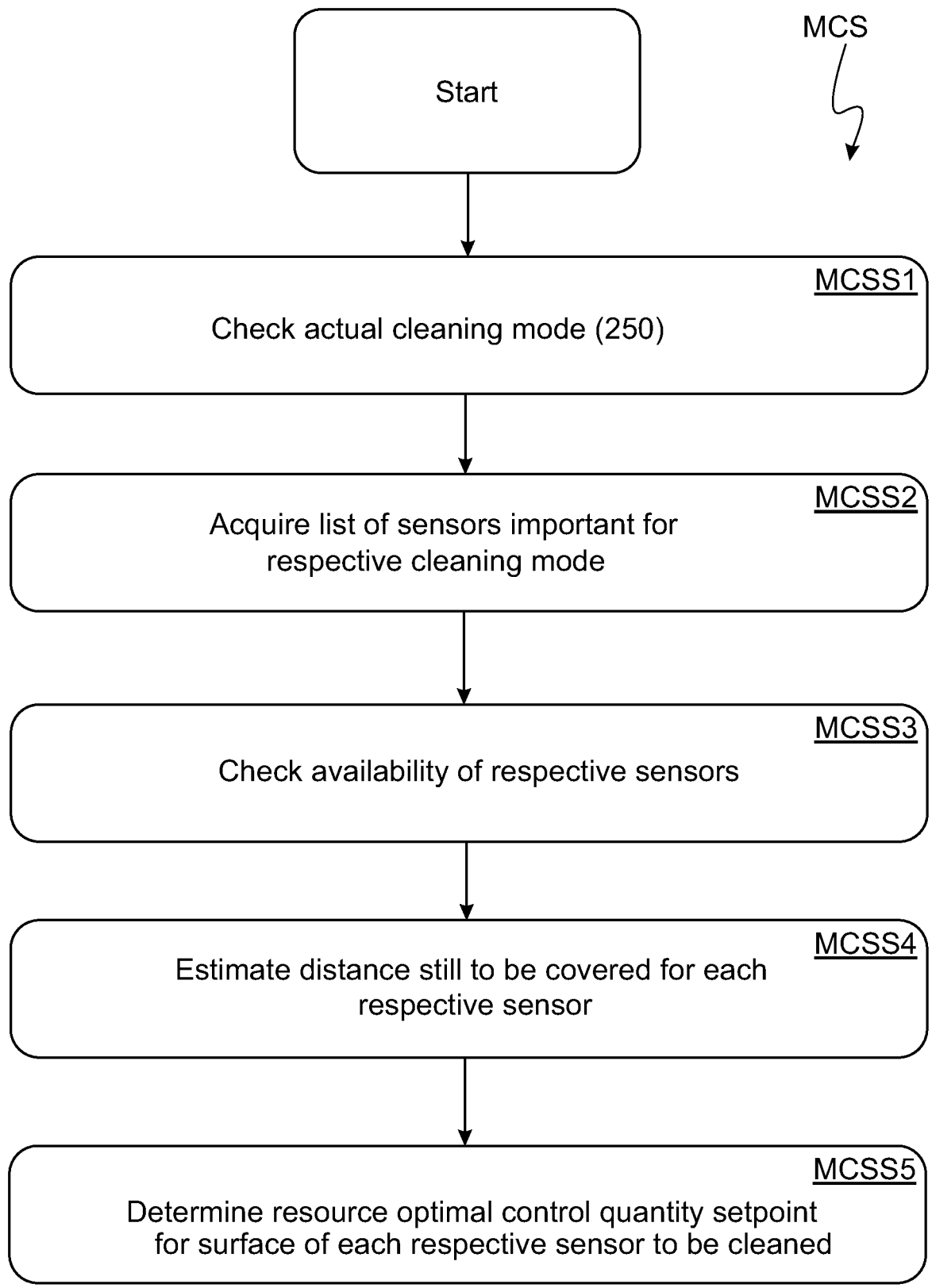
Figure 13:
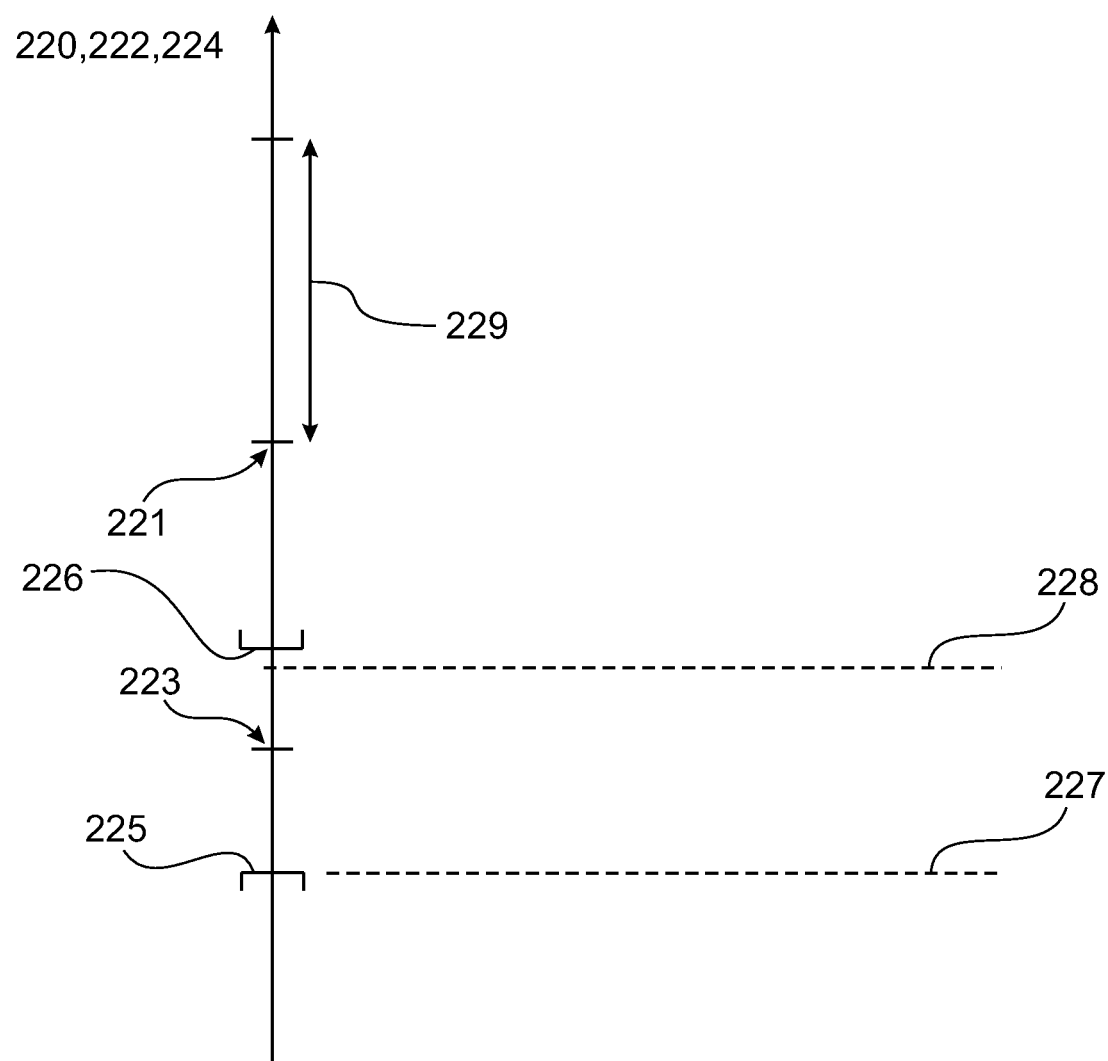
Figure 14:
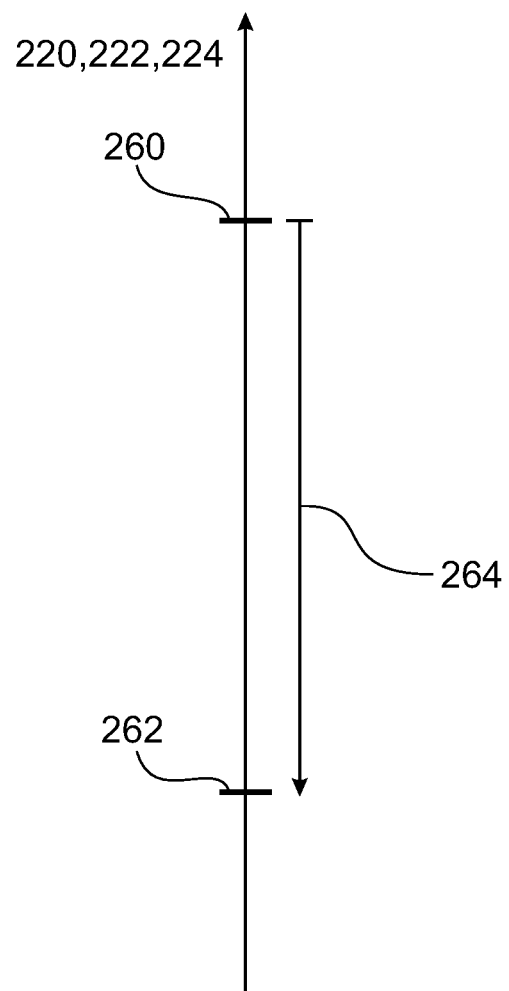
Figure 15:
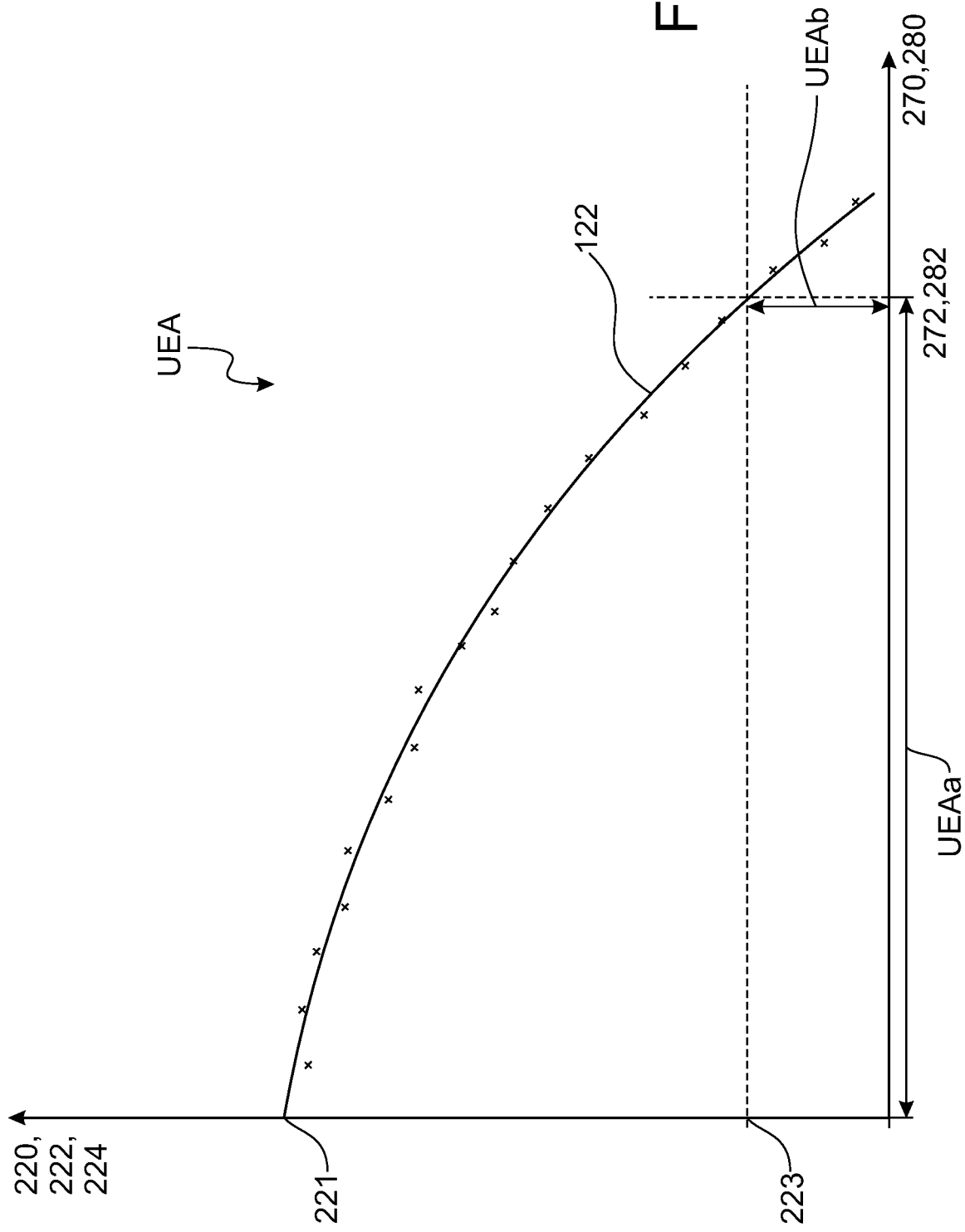
Figure 16:
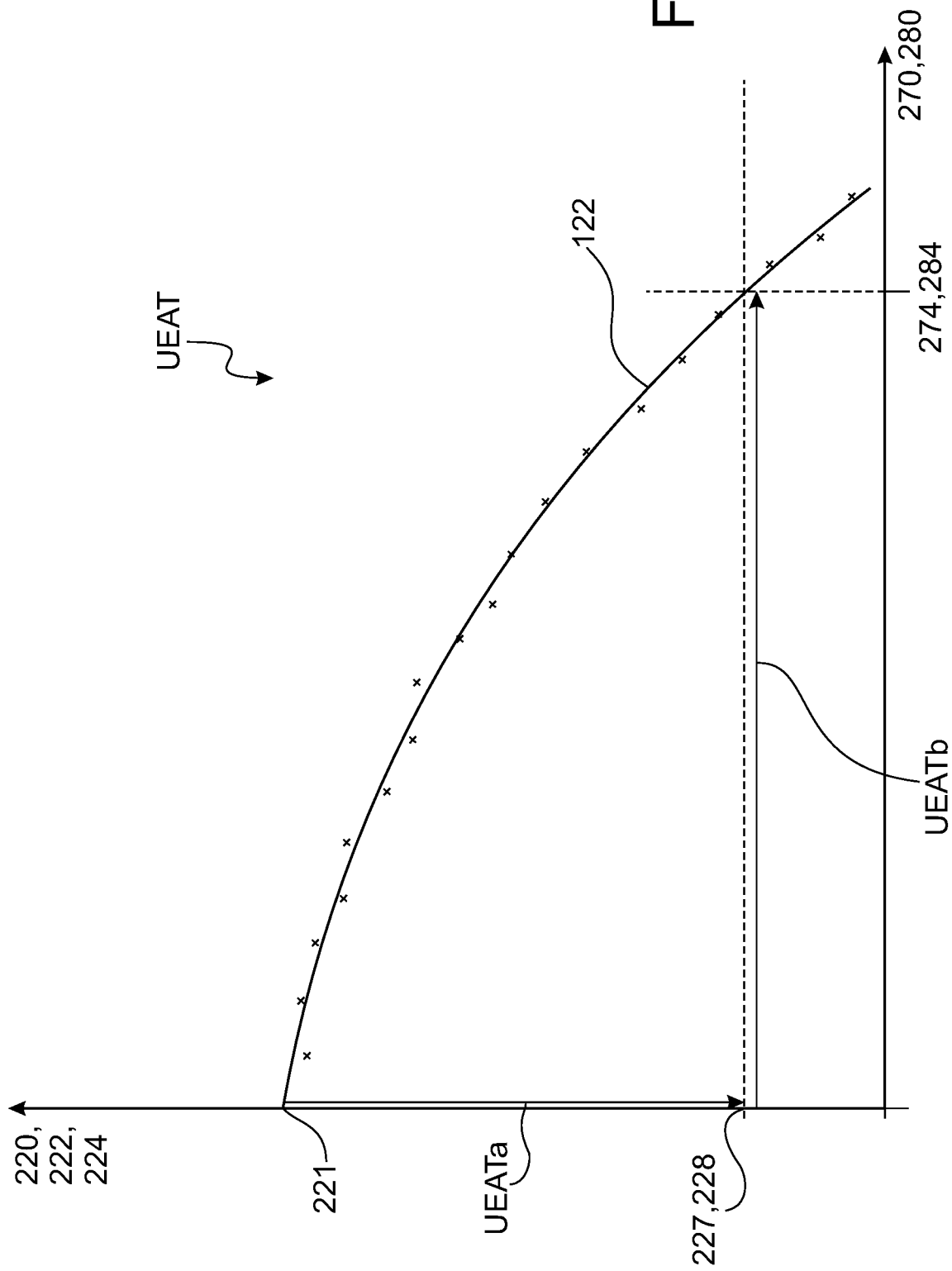
Figure 17:
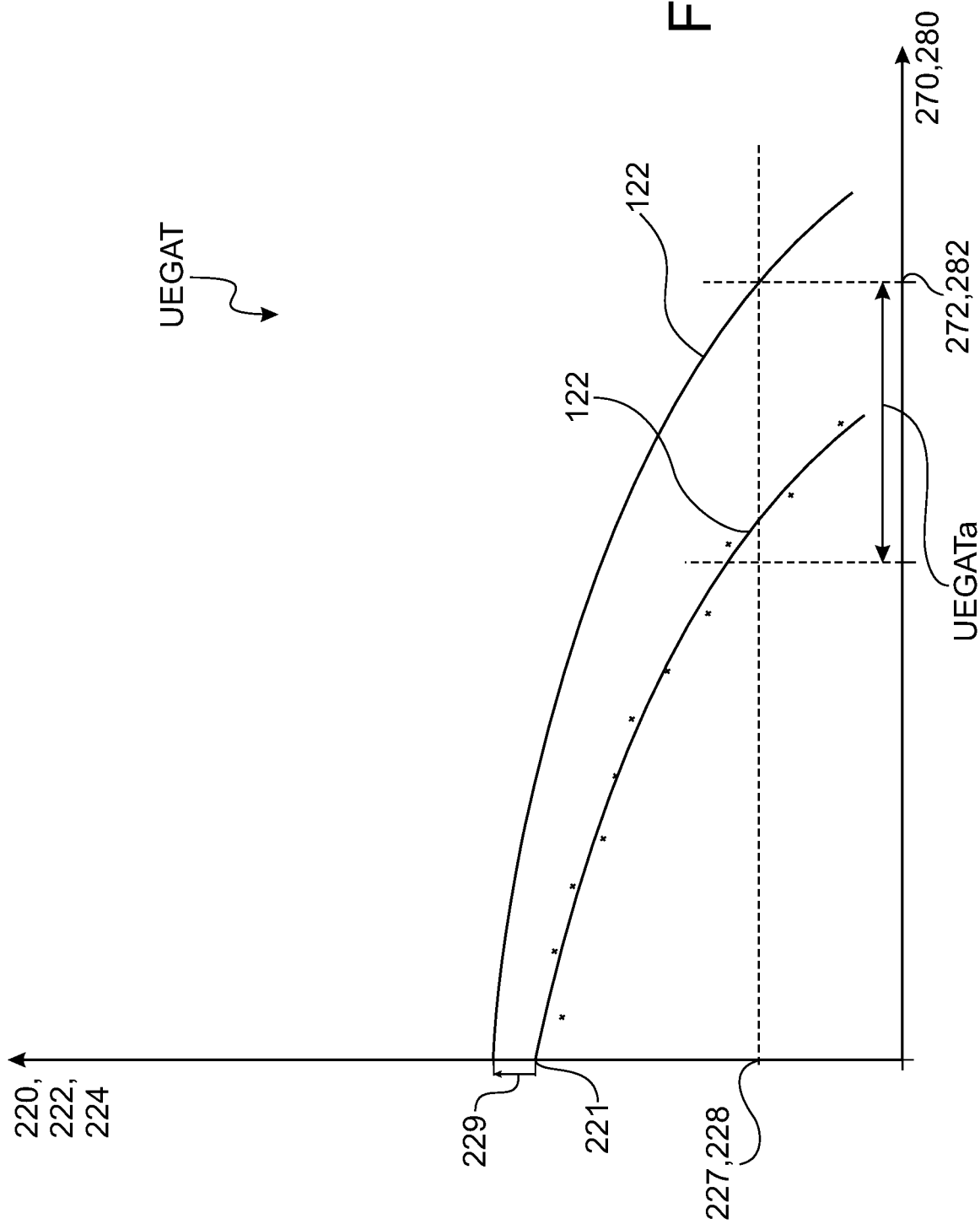
Figure 18:
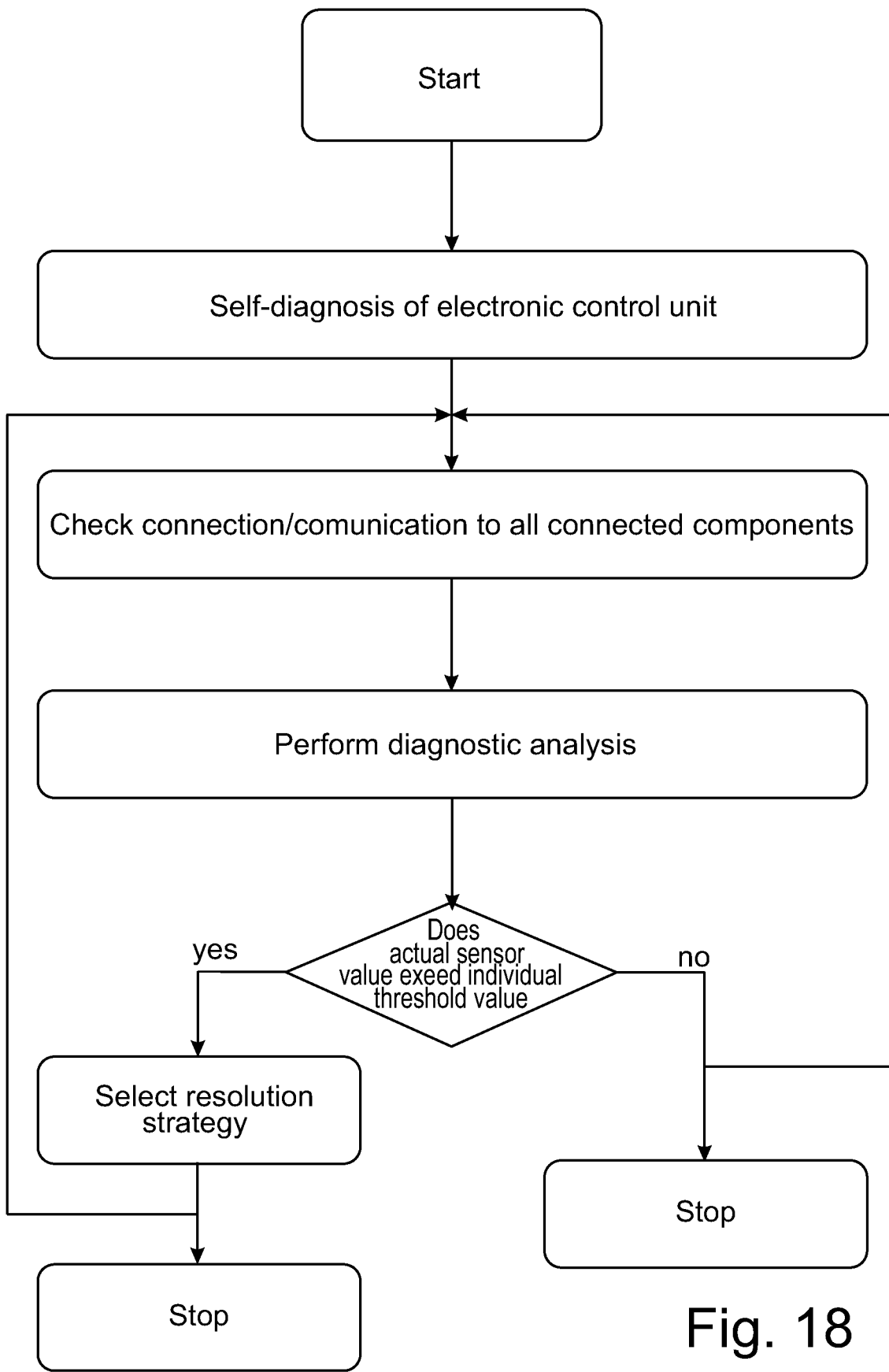
Figure 19:
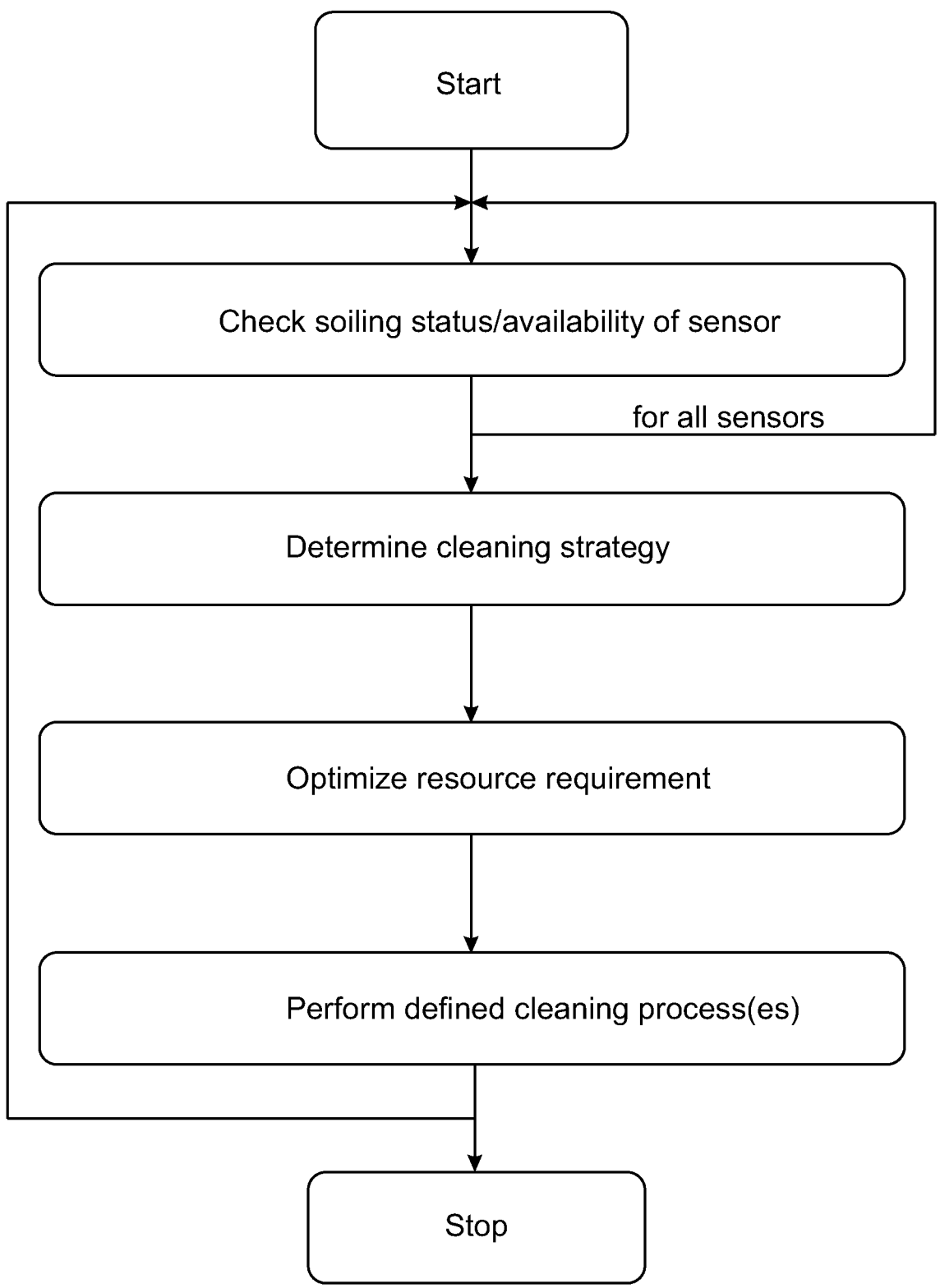

Further advantages, details and features of the present invention are explained in the description of the following embodiments, thereby:

FIG. 1: shows a schematic view of a motor vehicle exhibiting a cleaning system;

FIG. 2: shows a schematic view of a cleaning method exhibiting a sequence of multiple cleaning processes for a plurality of surfaces to be cleaned as a function of a course of time;

FIG. 3: shows a schematic view of a subtraction procedure to determine a difference from the measured values of a measured quantity;

FIG. 4: shows a schematic view of systematic dependencies between values of quantities;

FIG. 5: shows a schematic view of a cleaning device;

FIG. 6: shows a schematic view of a data processing system;

FIG. 7: shows a schematic view of a system, preferably a cleaning system;

FIG. 8: shows a schematic view of a motor vehicle with an air jet cleaning system;

FIG. 9: shows a schematic view of a motor vehicle exhibiting a cleaning system with a plurality of cleaning fluid pumps and cleaning fluid multi way valves;

FIG. 10: shows a schematic view of a flowchart of a method for indirectly deriving a systematic dependence for a system behaviour of a cleaning system of a motor vehicle, particularly for a system behaviour of a cleaning process of a surface of the motor vehicle;

FIG. 11: shows a schematic view of a flowchart of a method for optimizing a resource requirement for a cleaning process of a surface of a motor vehicle;

FIG. 12: shows a schematic view of a flowchart of a method for determining a cleaning strategy for cleaning a surface to be cleaned of a motor vehicle;

FIG. 13: shows a schematic representation of an availability history;

FIG. 14: shows a schematic representation of an availability history;

FIG. 15: shows a procedure in schematic view to determine an expected availability at a distance or operating time of the motor vehicle yet to be covered;

FIG. 16: shows a procedure in schematic view to determine an expected distance or operating time of the motor vehicle yet to be covered when reaching a threshold of availability;

FIG. 17: shows a procedure in schematic view to determine an expected gain in availability, whereby the sum of the current availability and the expected gain in availability is sufficient to achieve a distance or operating time to be covered by the motor vehicle in such a way that a threshold of availability is not exceeded;

FIG. 18: shows a schematic of a flow chart for a diagnostic method for a cleaning system; and FIG. 19: shows a schematic view of a flow chart of a cleaning method.

In the following description same reference numerals describe same elements and same features, respectively, so that a description of one element conducted with reference to one figure is also valid for the other figures, so that repetition of the respective feature is omitted.

The motor vehicle 14 in FIG. 1 is equipped with a cleaning system 16, which provides structural elements 18, 60, 62, 70, 72, 74, 76*a*, 76*b*, 78*a*, 78*b*, 80, 82, 84, 86, 88, 90, 92, 94 required for a physical cleaning process (not depicted) to clean a surface 20, 22, 24, 26, 28 of a motor vehicle 14 to be cleaned.

These structural elements 18, 60, 62, 70, 72, 74, 76*a*, 76*b*, 78*a*, 78*b*, 80, 82, 84, 86, 88, 90, 92, 94 of the cleaning system 16 are preferably a cleaning fluid distribution system 60 and other electrical (not depicted) and/or electronic components, preferably an electronic control unit 18.

The cleaning fluid distribution system 60 is preferably understood as a system designed to provide a designated cleaning fluid 64 from a cleaning fluid reservoir 62, which is designed to store the designated cleaning fluid 64, preferably by means of a cleaning fluid line 80, 82, 84, 86, 88, designed to guide the designated cleaning fluid 64, and a nozzle 70, 72, 74, 76a, 76b, 78a, 78b on a surface 20, 22, 24, 26, 28 of a motor vehicle 14 to be cleaned.

Preferably a cleaning fluid distribution system 60 is equipped with an electric pump (not depicted), which is designed to pump the designated cleaning fluid 64, and which is preferably integrated into the cleaning fluid reservoir 62.

The nozzle 70, 72, 74, 76a, 76b, 78a, 78b is a device through which the designated cleaning fluid 64 can leave the cleaning system 16 and which is designed to bring the designated cleaning fluid 64 into an interaction, preferably an operative connection, with the surface 20, 22, 24, 26, 28 to be cleaned.

Preferably the nozzle 70, 72, 74, 76a, 76b, 78a, 78b is a device designed to control a direction (unmarked) or a characteristics (not depicted) of the designated cleaning fluid 64 as it exits the cleaning fluid distribution system 60.

Preferably, the nozzle 70, 72, 74, 76a, 76b, 78a, 78b exhibits actuating means (not depicted), designed to influence the direction (unmarked) in which the designated cleaning fluid 64 leaves the cleaning fluid distribution system 60.

Preferably, the nozzle 70, 72, 74, 76a, 76b, 78a, 78b exhibits further actuating means (not depicted), designed to influence the characteristic (not depicted) with which the designated cleaning fluid 64 leaves the cleaning fluid distribution system 60, preferably the speed of the designated cleaning fluid (not depicted).

The electronic components of a cleaning system 16 preferably include an electronic control unit 18 and/or a data processing system (not depicted), whereby a preferentially included data processing system (not depicted) is preferably integrated into the electronic control unit 18.

Preferably, the electronic control unit 18 is equipped with all structural electronic elements (not depicted) required for the completion of the cleaning method (not depicted) presented here.

Preferably, the electronic control unit 18 is electronically connected to the cleaning fluid distribution system 60 by means of an electrical connection (not depicted).

The electronic control unit 18 is preferably set up to control and/or regulate a cleaning process (not depicted) using the cleaning system 16 for surface 20, 22, 24, 26, 28 to be cleaned.

The motor vehicle 14 preferably exhibits one or more sensors 50, 52 in the front apron of the motor vehicle 14 whose one or more associated surfaces 20, 22 to be cleaned preferably represent a surface section (unmarked) of the motor vehicle 14. For cleaning the corresponding surfaces 20, 22, the cleaning system 16 is preferably arranged so that the designated cleaning fluid 64 is conveyed during the cleaning process (not depicted) through the associated nozzles 70, 72 onto the surfaces 20, 22 to be cleaned of the sensors 50, 52, whereby the designated cleaning fluid 64 can be brought into operative connection with the surfaces 20, 22 to be cleaned. The cleaning fluid 64 is preferably pumped from the cleaning fluid reservoir 62 through the corresponding cleaning fluid line 80 to the nozzles 70, 72, whereby a plurality of nozzles 70, 72 can be supplied with the designated cleaning fluid 64 preferentially through a single cleaning fluid line 80.

Also preferred is a plurality of nozzles 74, 76a, 76b which can also be supplied by a plurality of corresponding cleaning fluid lines 86, 84, 82.

In addition, the motor vehicle 14 preferably exhibits one or more sensors 54 in the rear apron of the motor vehicle 14. To clean the corresponding surface 24, the cleaning system 16 is designed so that the designated cleaning fluid 64 is conveyed during the cleaning process (not depicted) through the associated nozzle 74 to the surface to be cleaned 24 of the sensor 54, whereby the designated cleaning fluid 64 can be brought into an effective connection with the surface to be cleaned 24.

Other surfaces 26, 28 to be cleaned are preferably a windscreen (unmarked) and a rear window (unmarked) of the motor vehicle 14.

Preferably, a sensor 56 is arranged behind the windscreen (unmarked) and/or a sensor 58 behind the rear window (unmarked) of the motor vehicle 14, so that the respective windscreens (unmarked) can also represent the surfaces 26, 28 to be cleaned associated with the respective sensors 56, 58.

A sensor 50, 52, 54, 56, 58, preferably the sensor 56, can preferably have several different partial sensors (not depicted), whose common surface to be cleaned 26 is the windscreen (unmarked).

In addition to the nozzles 76a, 76b, which are connected to the cleaning fluid reservoir 62 by means of the corresponding cleaning fluid lines 84, 82, the cleaning system 16 is equipped with the wiping elements 90, 92 for cleaning the surface 26.

The wiping elements 90, 92 are preferably equipped to remove a designated cleaning fluid 64 and any dirt (not depicted) from the windscreen (unmarked) by means of a wiping movement (not depicted).

With the cleaning means 76a, 76b, 64, 62, 82, 84, 90, 92 of the cleaning system 16 the surface 26 of the windscreen (unmarked) can be cleaned, which partly also represents the surface to be cleaned for the sensor 56.

Preferably, the rear window (unmarked) also exhibits a wiping element 94 next to the nozzles 78a, 78b, which are preferably connected to the cleaning fluid reservoir 62 together by means of the cleaning fluid line 88.

The sensors 50, 52, 54, 56, 58 are electronically connected to the electronic control unit 18, to transmit the respective values (not depicted) of the measured quantities 100, 102, 104, 106, 108 from the sensors 50, 52, 54, 56, 58 to the electronic control unit 18.

Among other things, it is conceivable that the electronic control unit 18 is an electronic control unit of the cleaning system 16.

The electronic connection between a sensor 50, 52, 54, 56, 58 and the electronic control unit 18 can also preferably be wireless.

The electronic control unit 18 is preferably set up to carry out the cleaning method (not depicted), particularly preferably a cleaning method (not depicted) according to the first aspect of the invention.

The electronic control unit 18 is preferably set up to carry out a method for indirectly des riving a systematic dependence (not depicted), preferably a systematic dependence (not depicted) for a system behaviour (not depicted) of a cleaning system 16 of a motor vehicle 14, particularly preferably for a system behaviour (not depicted) of a cleaning process (not depicted) of a surface 20, 22, 24, 26, 28 of the motor vehicle 14, particularly preferably a method for indirectly deriving a systematic dependence (not depicted) according to the second aspect of the invention.

The electronic control unit 18 is preferably set up to carry out a method for indirectly deriving a systematic dependence (not depicted) for a system behaviour (not depicted)

of a system component (not depicted) of a cleaning system 16 of a motor vehicle 14, particularly preferably a method for indirectly deriving a systematic dependence (not depicted) according to the fifth aspect of the invention.

The electronic control unit 18 is preferably set up to carry out a method for indirectly deriving a systematic dependence (not depicted) for a system behaviour (not depicted) of a soiling process (not depicted) of a surface 20, 22, 24, 26, 28 of a motor vehicle 14, particularly preferably a method for indirectly deriving a systematic dependence (not depicted) according to the ninth aspect of the invention.

The electronic control unit 18 is preferably set up to carry out a method for optimizing a resource requirement (not depicted) for a cleaning process (not depicted) of a surface 20, 22, 24, 26, 28 of a motor vehicle 14, particularly preferably a method for optimizing a resource requirement (not depicted) according to a first and/or second alternative of the third aspect of the invention.

The electronic control unit 18 is preferably set up to carry out a method for determining a cleaning strategy (not depicted) for cleaning a surface 20, 22, 24, 26, 28 to be cleaned of a motor vehicle 14, particularly preferably a method for determining a cleaning strategy (not depicted) according to the fourth aspect of the invention.

The electronic control unit 18 is preferably set up to carry out a method for diagnosing a deviation (not depicted) between an actual system behaviour (not depicted) and an expected system behaviour (not depicted) of a system component (not depicted) of a cleaning system 16 of a motor vehicle 14, particularly preferably a method for diagnosing a deviation (not depicted) between an actual system behaviour (not depicted) and an expected system behaviour (not depicted) according to a sixth aspect of the invention.

The electronic control unit 18 is preferably set up to carry out a method for selecting a resolution strategy (not depicted), particularly preferably a method for selecting a resolution strategy (not depicted) according to the seventh aspect of the invention.

The electronic control unit 18 is preferably set up to use a selected resolution strategy (not depicted), particularly preferably to use a selected resolution strategy (not depicted) according to the eighth aspect of the invention.

The electronic control unit 18 is preferably set up to use a dependency table (not depicted) and/or a systematic dependence (not depicted) to determine an expected availability (not depicted) at a distance (not depicted) or an operating time (not depicted) of the motor vehicle 14 yet to be covered, particularly preferably to use a dependency table (not depicted) and/or a systematic dependence (not depicted) according to the tenth aspect of the invention.

The electronic control unit 18 is preferably set up to use a dependency table (not depicted) and/or a systematic dependence (not depicted) to determine an expected distance (not depicted) or an operating time (not depicted) of the motor vehicle 14 yet to be covered when reaching a threshold of availability (not depicted), particularly preferably to use a dependency table (not depicted) and/or a systematic dependence (not depicted) according to the eleventh aspect of the invention.

The electronic control unit 18 is preferably set up to use a dependency table (not depicted) and/or a systematic dependence (not depicted) for optimizing a resource requirement (not depicted) for a cleaning process (not depicted) of a surface 20, 22, 24, 26, 28 of a motor vehicle 14, particularly preferably to use a dependency table (not depicted) and/or a systematic dependence (not depicted) according to the twelfth aspect of the invention.

The electronic control unit 18 is preferably set up to use a dependency table (not depicted) and/or a systematic dependence (not depicted) to determine a cleaning strategy (not depicted) for cleaning a surface 20, 22, 24, 26, 28 to be cleaned of a motor vehicle 14, particularly preferably to use a dependency table (not depicted) and/or a systematic dependence (not depicted) according to the thirteenth aspect of the invention.

The electronic control unit 18 is preferably set up to use a dependency table (not depicted) and/or a systematic dependence (not depicted) to determine a necessary expected gain in availability (not depicted), particularly preferably to use a dependency table (not depicted) and/or a systematic dependence (not depicted) according to the fourteenth aspect of the invention.

The electronic control unit 18 is preferably set up to use a systematic dependence (not depicted) derived by a method for indirectly deriving a systematic dependence (not depicted) for a resource efficient cleaning of at least one surface 20, 22, 24, 26, 28 of a motor vehicle 14, particularly preferably to use a systematic dependence (not depicted) according to the fifteenth aspect of the invention.

The electronic control unit 18 is preferably set up to use a control quantity setpoint (not depicted) derived by a method for optimizing a resource requirement (not depicted) for a cleaning process (not depicted) of a surface 20, 22, 24, 26, 28 of a motor vehicle 14 for a resource efficient cleaning (not depicted) of at least one surface 20, 22, 24, 26, 28 of a motor vehicle 14, particularly preferably to use a control quantity setpoint (not depicted) according to the fifteenth aspect of the invention, described here.

The electronic control unit 18 is preferably set up to use a cleaning strategy (not depicted) derived by a method for determining a cleaning strategy (not depicted) for cleaning a surface 20, 22, 24, 26, 28 to be cleaned of a motor vehicle 14, for a resource efficient cleaning of at least one surface 20, 22, 24, 26, 28 of a motor vehicle 14, particularly preferably to use a cleaning strategy (not depicted) according to the fifteenth aspect of the invention, described here.

The electronic control unit 18 is preferably set up to be part of a cleaning system 16 according to the sixteenth aspect of the invention, and/or to be part of a motor vehicle 14 according to the seventeenth aspect of the invention, described here.

It should be expressly pointed out that the cleaning system 16 in FIG. 1, which works with a cleaning fluid 64 in the liquid state, can be combined without restriction and advantageously with a cleaning system 16 in FIG. 8, which uses an air jet cleaning.

The cleaning method 10 in FIG. 2 exhibits a sequence of multiple cleaning processes 30, 32, 34, 36, 38, 40 for a plurality of surfaces 20, 22, 24 to be cleaned as a function of a course of time 12.

Each cleaning operation 30, 32, 34, 36, 38, 40 necessitates a resource requirement 30*d*, 32*d*, 34*d*, 36*d*, 38*d*, 40*d*.

A resource requirement 30*d*, 32*d*, 34*d*, 36*d*, 38*d*, 40*d* may preferably include a required amount of cleaning fluid (not depicted) and/or a required amount of energy (not depicted) and/or a required amount of detergent (not depicted) and/or the like.

Each cleaning process 30, 32, 34, 36, 38, 40 exhibits a cleaning period 38*a*, 40*a* in which at least one cleaning means (not depicted) is brought into operative connection with the corresponding surface 20, 22, 24, whereby each cleaning period 38*a*, 40*a* exhibits a start time 38*b*, 40*b* and an end time 38*c*, 40*c*.

In the course of time 12 of a cleaning method 10 a surface 20, 22, 24, 26, 28 can be cleaned by a number of cleaning processes 30, 32, 34, 36, 38, 40.

Preferably a surface 20, 22, 24, 26, 28, preferably surface 22, is cleaned once during the course of time 12 in the course of a cleaning process 30, 32, 34, 36, 38, 40, preferably cleaning process 36.

It is also conceivable that a surface 20, 22, 24, 26, 28, preferably surface 24, may be cleaned twice during the course of time 12 within the framework of a cleaning process 30, 32, 34, 36, 38, 40, preferably cleaning process 38, 40.

Furthermore, it is also conceivable that a surface 20, 22, 24, 26, 28, preferably surface 20, is cleaned three times during the course of time 12 within the scope of a cleaning process 30, 32, 34, 36, 38, 40, preferably cleaning process 30, 32, 34.

In concrete terms, it is conceivable, among other things, that the cleaning process 30 should achieve a certain target value (not depicted) within the scope of the cleaning method 10, that an availability (not depicted) of a sensor (not depicted) influenced by the surface 20 should reach a certain target value (not depicted), and after completion of the cleaning process 30 it was determined that the desired availability (not depicted) was not achieved, whereupon a further cleaning process 30, 32, 34, 36, 38, 40, preferably the cleaning process 32, was started shortly after the end (unmarked) of the cleaning process 30.

Furthermore, a further cleaning of surface 20 may be necessary after a certain period (not depicted) of use of the vehicle (not depicted). This cleaning requirement (not depicted) is preferably met by means of the cleaning process 34.

The subtraction procedure (unmarked) in FIG. 3 determines a difference 100D, 102D, 104D, 106D, 108D from the measured values 100b, 100c, 102b, 102c, 104b, 104c, 106b, 106c, 108b, 108c of a measured quantity (unmarked) at end time 100c, 102c, 104c, 106c, 108c and at start time 100b, 102b, 104b, 106b, 108b of cleaning period (not depicted).

Preferred is the measured quantity (unmarked) an availability (not depicted) of a sensor (not depicted), whereby from a value of availability 100c, 102c, 104c, 106c, 108c at the end of a cleaning process a value of availability 100b, 102b, 104b, 106b, 108b at the beginning of this cleaning process (not depicted) is subtracted in order to arrive at the difference in availability 100D, 102D, 104D, 106D, 108D, preferred the value of availability 100b of one sensor (not depicted) at the beginning of the cleaning process (not depicted) for this sensor (not depicted) is subtracted from the value of availability 100c of a sensor (not depicted) at the end of a cleaning process (not depicted) in order to arrive at the difference in availability 100D of this sensor (not depicted).

A systematic dependence 120, 120D, 120R between values (unmarked) of quantities 100D, 102D, 104D, 106D, 108D, 110, 111, 112, 112, 114, 115, 116, 117, 118, 119, 30d, 32d, 34d, 36d, 38d, 40d in FIG. 4 is a systematic dependence 120, 120D, 120R between values (unmarked) of an input quantity 110, 111, 112, 112, 114, 115, 116, 117, 118, 119 of a system (not depicted) and values (unmarked) of an output quantity 100D, 102D, 104D, 106D, 108D, 30d, 32d, 34d, 36d, 38d, 40d of a system (not depicted).

Preferred is the input quantity 110, 111, 112, 112, 114, 115, 116, 117, 118, 119 of the system (not depicted) a measured quantity, preferred a control quantity 110, 111, 112, 112, 114, 115, 116, 117, 118, 119 of the system, especially preferred a single control quantity 110 of the system.

Preferred is the output quantity 100D, 102D, 104D, 106D, 108D, 30d, 32d, 34d, 36d, 38d, 40d of the system (not depicted) a measured quantity, preferred an availability of a sensor, especially preferred the difference of the availability of a sensor 100D, 102D, 104D, 106D, 108D, which is determined by subtraction of the availability of the sensor (not depicted) at the beginning of the cleaning process (not depicted) from the value of availability of a sensor (not depicted) at the end of a cleaning process (not depicted).

Furthermore preferred, the output quantity 100D, 102D, 104D, 106D, 108D, 30d, 32d, 34d, 36d, 38d, 40d of the system (not depicted) is as a resource requirement 30d, 32d, 34d, 36d, 38d, 40d for the accomplishment of a cleaning process (not depicted).

A preferred systematic dependence 120D is a systematic dependence between the measured values (unmarked) of a control quantity 110, 111, 112, 112, 114, 115, 116, 117, 118, 119 of the system (not depicted), preferably one control quantity 110 of the system (not depicted), and the difference between measured values of a measured quantity at end time and at start time of a cleaning process 100D, 102D, 104D, 106D, 108D, preferably the difference between measured values of one measured quantity at end time and at start time of a cleaning process 100D.

A preferred systematic dependence 120R is a systematic dependence between the measured values (unmarked) of a control quantity 110, 111, 112, 112, 114, 115, 116, 117, 118, 119 of the system (not depicted), preferably one control quantity 110 of the system (not depicted), and the a resource requirement 30d, 32d, 34d, 36d, 38d, 40d, preferably the resource requirement 30d for the accomplishment of one cleaning process (not depicted).

A cleaning device 11 in FIG. 5 for a cleaning, preferably a resource efficient cleaning, particularly preferred a resource-saving cleaning, of at least one surface (not depicted) of a motor vehicle (not depicted) consists of a plurality of sensors 50, 56a, 56b, a cleaning system 16, an electronic data processing and evaluation system 152, a database 154, a control quantity acquisition and setting system 156, a process quantity acquisition system 158 and a measured quantity acquisition system 160, among other components (not depicted).

The electronic data processing and evaluation system 152 is connected to the database 154 via the data link 194 for data exchange.

Furthermore, the electronic data processing and evaluation system 152 is connected for data exchange to the process quantity acquisition system 158 via the data link 195, to the control quantity acquisition and setting system 156 via the data link 193, and to the measured quantity acquisition system 160 via the data link 192.

Preferably, the electronic data processing and evaluation system 152, the database 154, the control quantity acquisition and setting system 156, the process quantity acquisition system 158 and the measured quantity acquisition system 160 together form the data processing system 150.

The electronic data processing and evaluation system 152 is set up for carrying out a procedure according to the first, second, third, fourth, fifth, sixth, seventh and/or eighth aspect of the invention.

The cleaning system 16 exhibits the control quantities 110, 112, 114 and the process quantities 140, 141, 142, which are system related process quantities 143. With the control quantity 114 the wiping element 90, 92 can be controlled and/or regulated.

It should be noted that the cleaning system 16 may also have more or less than the specified control quantities 110, 112, 114 and also more or less than the specified process quantities 140, 141, 142. The number of control quantities 110, 112, 114 and process quantities 140, 141, 142 chosen here is to be understood as a schematic example.

For the cleaning process (not depicted) with the cleaning device 11, there are also the further process quantities 145, 146, 147 relevant, whereby these are to be understood as environmental process quantities 144 and whereby their number is also to be understood in the sense of a schematic example.

For example, environmental process quantities 144 can be air temperature 145, humidity 146 and air pressure 147. It goes without saying that the number of environmental process quantities 144 selected here in the context of the cleaning system 16 is to be understood as a schematic example.

The vehicle (not depicted) has the sensors 50, 56a, 56b, whereby it is expressly pointed out that the number of sensors 50, 56a, 56b is to be understood in the sense of a schematic example.

Preferred is the surface to be cleaned with the sensors 56a, 56b corresponding to the surface 26.

Also preferred is the surface to be cleaned corresponding to sensor 50, surface 20.

The measured quantity 106, preferably the availability of the sensor 56a, is determines with the sensor 56a, which is connected to the measured quantity acquisition system 160 for data exchange via data link 188.

The measured quantity 107, preferably the availability of the sensor 56b, is determines with the sensor 56b, which is connected to the measured quantity acquisition system 160 for data exchange via data link 187.

The measured quantity 100, preferably the availability of the sensor 50, is determines with the sensor 50, which is connected to the measured quantity acquisition system 160 for data exchange via data link 186.

If required, the measured quantity acquisition system 160 controls the sensors 50, 56a, 56b, supplies them with energy if required, digitizes the data arriving via the data links 186, 187, 188 if required, determines the availability of the corresponding sensors 50, 56a, 56b at a fixed point in time if required, which is preferably preferred by the electronic data processing and evaluation system 152 and forwards this data to the electronic data processing and evaluation system 152 via the data link 192 if preferred.

The actual value of the control quantity 110 is determined with the preferred combined control quantity sensor and control quantity transmitter 130, which is connected to the control quantity acquisition and setting system 156 for data exchange via the data link 189.

The actual value of the control quantity 112 is determined with the preferred combined control quantity sensor and control quantity transmitter 132, which is connected to the control quantity acquisition and setting system 156 for data exchange via the data link 190.

The actual value of the control quantity 114 is determined with the preferred combined control quantity sensor and control quantity transmitter 134, which is connected to the control quantity acquisition and setting system 156 for data exchange via the data link 191.

If required, the control quantity acquisition and setting system 156 controls the optional combined control quantity sensors and control quantity transmitters 130, 132, 134 if required, supplies them with energy if required, digitizes the incoming data via the data connections 189, 190, 191 if required, determines the actual values of the control quantities 110, 112, 114 at a fixed point in time if required, which is preferably preferred by the electronic data processing and evaluation system 152 and forwards this data to the electronic data processing and evaluation system 152 via the data link 192 if preferred.

The actual value of the process quantity 140 is determined with the process quantity sensor 170, which is connected to the process quantity acquisition system 158 for data exchange via the data link 196.

The actual value of the process quantity 141 is determined with the process quantity sensor 171, which is connected to the process quantity acquisition system 158 for data exchange via the data link 197.

The actual value of the process quantity 142 is determined with the process quantity sensor 172, which is connected to the process quantity acquisition system 158 for data exchange via the data link 198.

The actual value of the process quantity 145 is determined with the process quantity sensor 175, which is connected to the process quantity acquisition system 158 for data exchange via the data link 183.

The actual value of the process quantity 146 is determined with the process quantity sensor 176, which is connected to the process quantity acquisition system 158 for data exchange via the data link 184.

The actual value of the process quantity 147 is determined with the process quantity sensor 177, which is connected to the process quantity acquisition system 158 for data exchange via the data link 185.

If required, the process quantity acquisition system 158 controls the process quantity sensors 170, 171, 172, 175, 176, 177, supplies them with energy if required, digitizes the data arriving via the data links 183, 184, 185, 196, 197, 198 if required, determines the actual values of the process quantities 140, 141, 142, 145, 146, 147 at a fixed point in time if required, which is preferably preferred by the electronic data processing and evaluation system 152 and forwards this data to the electronic data processing and evaluation system 152 via the data link 195 if preferred.

Among other tasks, the electronic data processing and evaluation system 152 takes over the control and/or regulation of the control quantities 110, 112, 114 of the cleaning system 16 and thus preferably the control and/or regulation of the cleaning method (not depicted). The cleaning of at least one surface 20, 26 of a motor vehicle (not depicted) preferably should be controlled and/or regulated taking into account the process quantities 140, 141, 142, 145, 146, 147 preferably resource efficient, particularly preferably resource-saving.

Such control and/or regulation of the cleaning system 16 is achieved by adjusting the setpoints of the control quantities 110, 112, 114 via the preferably combined control quantity sensors and control quantity transmitters 130, 132, 134, for which purpose the preferably combined control quantity sensors and control quantity transmitters 130, 132, 134 are connected to the electronic data processing and evaluation system 152 via the data links 180, 181, 182.

It should be noted that all data links 180, 181, 182, 183, 184, 185, 186, 187, 188, 189, 190, 191, 192, 193, 194, 195, 196, 197, 198 may preferably be wireless, whereby the corresponding data may be transmitted wirelessly from the associated sensors to the data processing system 150.

The data processing system 150 in FIG. 6 for a cleaning system (not depicted) for cleaning at least one surface (not depicted) of a motor vehicle (not depicted), comprising a database 154, a measured quantity acquisition system 160 for determining a value of a measured quantity, preferably a difference between a measured value of a measured quantity at an end time and at a start time of a cleaning period 100D, 102D, 104D 106D, particularly preferred a difference between an availability of the sensor (not depicted) at an end time and at a start time of a cleaning period 100D, 102D, 104D 106D, a control quantity acquisition and setting system 156 for monitoring, recording and adjusting a control quantity 110, 112, 114 and an electronic data processing and evaluation system 152.

The control quantity acquisition and setting system 156 is connected to the cleaning system (not depicted) and controls and/or regulates a cleaning process (not depicted) of a surface to be cleaned (not depicted) or a cleaning method (not depicted). The points shown in the data element of the control quantity acquisition and setting system 156 show that there may be a large number of control quantities (not depicted) in addition to control quantities 110, 112, 114.

The recorded data of the control quantity acquisition and setting system 156 are forwarded to the database 154.

The measured quantity acquisition system 160 determines from the measured value of the measured quantity at the start time of the cleaning period 100b, 102b, 104b, 106b and the measured value of the measured quantity at the end time of the cleaning period 100c, 102c, 104c, 106c the difference between a measured value of a measured quantity at an end time and at a start time of a cleaning period 100D, 102D, 104D 106D, particularly preferred a difference between an availability of the sensor (not depicted) at an end time and at a start time of a cleaning period 100D, 102D, 104D 106D. The points shown in the data element of the measured quantity acquisition and setting system 156 show that there may be a large number of measured quantities (not depicted) in addition to measured quantities having the values 100D, 102D, 104D 106D.

The recorded data of the measured quantity acquisition system 160 are forwarded to the database 154.

Database 154 assigns the data and assigns them to data sets DP1, DP2, DP3, DP4 with reference to each other. These data sets DP1, DP2, DP3, DP4 are stored by the database 154 in a dependency table DT, preferably stored chronologically in the dependency table DT.

The electronic data processing and evaluation system 152 can assess the data sets DP1, DP2, DP3, DP4 within the dependency table (DT) of the database 154.

The electronic data processing and evaluation system 152 uses the data sets DP1, DP2, DP3, DP4 in the dependency table (DT) of the database 154 preferably to derive a systematic dependence between the input quantities and the output quantities of the cleaning system (not depicted), preferably between the control quantities 110, 112, 114 and the difference between an availability of the sensor (not depicted) at an end time and at a start time of a cleaning period 100D, 102D, 104D 106D.

The resulting systematic dependence is also stored in database 154 (not depicted).

Preferably, the electronic data processing and evaluation system 152 is part of the data processing system 150, which is preferably a part of the electronic control unit 18.

The system 200 in FIG. 7, preferably the cleaning system (unmarked), exhibits at least one input quantity 202 and at least one output quantity 204, whereby the output quantity 204 depends on the input quantity 202 by means of the system behaviour (not depicted) of the system 200.

Preferably the system 200, preferably the cleaning system (unmarked), exhibits as an input quantity 202 at least one control quantity 110, 111, 112 and/or at least one data representing measured quantity 210, 212, 214.

Preferably the system 200, preferably the cleaning system (unmarked), exhibits as an output quantity 204 at least one system related measured quantity 140, 141, 142 and/or at least one resource requirement 30d, 32d, 34d of a cleaning process (not depicted) of a surface to be cleaned (not depicted) and/or at least one availability 220, 222, 224 of a sensor (not depicted).

The motor vehicle 14 in FIG. 8 is equipped with a cleaning system 16, which is based on air jet cleaning. The cleaning system 16 essentially consists of a cleaning fluid pump 66, an air pressure reservoir 68, a cleaning fluid distribution system (unmarked) and at least one nozzle 70, 72, 74, 76a, 78.

The cleaning fluid distribution system (unmarked) consists essentially of at least one fluid line 80, 82, 84, 86, 88, at least one cleaning fluid valve 230, 232, 234, 236, 238 and at least one nozzle (70, 72, 74, 76, 78).

The cleaning fluid pump 66 is designed to draw air as designated cleaning fluid (not depicted) from the environment, compress it and pump it into the air pressure reservoir 68.

If no cleaning fluid valve 230, 232, 234, 236, 238 is open, the cleaning fluid pump 66 is designed to increase the pressure (not depicted) in the air pressure reservoir 68 until a system pressure is reached.

The nozzle 70, 72, 74, 76, 78 is a device through which the pressurized air (not depicted) can leave the cleaning system 16 and which is designed to bring the pressurized air (not depicted) into an interaction, preferably an operative connection, with the surface 20, 22, 24, 26, 28 to be cleaned.

Preferably the nozzle 70, 72, 74, 76, 78 is a device designed to control a direction (unmarked) or a characteristics (not depicted) of the designated pressurized air (not depicted) as it exits the cleaning fluid distribution system 60.

Preferably, the nozzle 70, 72, 74, 76, 78 exhibits actuating means (not depicted), designed to influence the direction (unmarked) in which the designated pressurized air (not depicted) leaves the cleaning fluid distribution system 60.

Preferably, the nozzle 70, 72, 74, 76, 78 exhibits further actuating means (not depicted), designed to influence the characteristic (not depicted) with which the designated pressurized air (not depicted) leaves the cleaning fluid distribution system 60, preferably the speed of the designated pressurized air (not depicted).

The electronic components (not depicted) of a cleaning system 16 preferably include an electronic control unit (not depicted) and/or a data processing system (not depicted), whereby a preferentially included data processing system (not depicted) is preferably integrated into the electronic control unit (not depicted).

Preferably, the electronic control unit (not depicted) is equipped with all structural electronic elements (not depicted) required for the execution of the cleaning method (not depicted) presented here.

Preferably, the electronic control unit (not depicted) is electronically connected to the cleaning fluid distribution system 60 by means of an electrical connection (not depicted), preferably electronically connected to the at least one cleaning fluid valve 230, 232, 234, 236, 238.

The electronic control unit (not depicted) is preferably set up to control and/or regulate a cleaning process (not depicted) using the cleaning system 16 for surface 20, 22, 24, 26, 28 to be cleaned.

The motor vehicle 14 preferably exhibits one or more sensors 50 in the front apron of the motor vehicle 14 whose associated surface 20 to be cleaned preferably represents a surface section (unmarked) of the motor vehicle 14. For cleaning the corresponding surface 20, the cleaning system 16 is preferably arranged so that the designated pressurized air is conveyed during the cleaning process (not depicted) through the associated nozzle 70 onto the surfaces 20 to be cleaned of the sensors 50, whereby the designated pressurized air can be brought into operative connection with the surfaces 20 to be cleaned. The pressurized air (not depicted) is preferably pumped from the air pressure reservoir 68 through the corresponding cleaning fluid line 80 to the nozzle 70.

In addition, the motor vehicle 14 preferably exhibits one or more sensors 52 in the rear apron of the motor vehicle 14. To clean the corresponding surface 22, the cleaning system 16 is designed so that the designated pressurized air (not depicted) is conveyed during the cleaning process (not depicted) through the associated nozzle 72 to the surface to be cleaned 22 of the sensor 52, whereby the designated pressurized air (not depicted) can be brought into an effective connection with the surface to be cleaned 22.

Other surfaces 24, 26, 28 to be cleaned are preferably a part of the left and right exterior rear-view mirrors (unmarked) and the rear window (unmarked) of the motor vehicle 14.

The surface 26, 28 to be cleaned in an rear-view mirror (unmarked) is preferably divided into a first partial surface (not depicted), which is assigned to a camera for recording the not depicted side mirror image, and a second partial surface (not depicted), which is assigned to a camera for recording the not depicted vehicle side line.

A cleaning system 16, which is based on air jet cleaning, is preferably designed to remove impurities from the surface to be cleaned (20, 22, 24, 26, 28) with a liquid (not depicted).

It should be expressly pointed out that the cleaning system 16 in FIG. 8, which uses an air jet cleaning system, can be combined without restriction and advantageously with a cleaning system 16 in FIG. 1, which works with a cleaning fluid 64 in the liquid aggregate state.

Specifically, a combination of a conventional cleaning system 16 with a cleaning system 16 on the basis of an air jet cleaning is considered, wherein the conventional cleaning system 16 applies a cleaning liquid (not depicted) in a liquid aggregate state to the surface to be cleaned 20, 22, 24, 26, 28 and the cleaning system 16 on the basis of an air jet cleaning subsequently applies the cleaning liquid (not depicted) in a liquid aggregate state by means of a cleaning liquid (not depicted) in gaseous aggregate state, in particular by means of the pressurized air (not depicted), so that impurities are first softened by a cleaning liquid (not depicted) in a liquid state of aggregation and then removed by a cleaning liquid (not depicted) in a gaseous state of aggregation together with the cleaning liquid (not depicted) in a liquid state of aggregation from the surface 20, 22, 24, 26, 28 to be cleaned.

The motor vehicle 14 in FIG. 9 is equipped with a cleaning system 16 exhibits several nozzles (unmarked) for several surfaces to be cleaned 20, 22, 24, 26, 28 (further surfaces to be cleaned are unmarked).

The cleaning fluid distribution system (unmarked) is preferably understood as a system designed to provide a designated cleaning fluid 64 from a cleaning fluid reservoir 62, which is designed to store the designated cleaning fluid 64, preferably by means of at least one cleaning fluid line (unmarked), designed to guide the designated cleaning fluid 64, and at least one nozzle (unmarked) on a surface 20, 22, 24, 26, 28 (further surfaces to be cleaned are unmarked) of a motor vehicle 14 to be cleaned.

Preferably a cleaning fluid distribution system (unmarked) is equipped with at least one cleaning fluid pump 66, which is designed to pump the designated cleaning fluid 64, and which is preferably integrated into the cleaning fluid reservoir 62.

The cleaning fluid system 16 of them motor vehicle 14 in FIG. 9 exhibits five cleaning fluid pumps 66, of which two pieces are designed as cleaning fluid dual pumps 66 and three pieces as cleaning fluid mono pumps 66.

A cleaning fluid dual pump 66 is designed to simultaneously supply two cleaning fluid lines (unmarked) with cleaning fluid 64.

A cleaning fluid mono pump 66 is designed to supply one cleaning fluid line (unmarked) with cleaning fluid 64 at a time.

The five cleaning fluid pumps 66 are integrated into the cleaning fluid reservoir 62.

The cleaning fluid reservoir has a cleaning fluid reservoir level sensor 63, which is designed to measure the level of the cleaning fluid reservoir 62 and, if necessary, to pass it on to the electronic control unit (not depicted).

The motor vehicle 14 has a sensor 50 in the front apron of the vehicle, which is designed as a light detection and ranging sensor (lidar). The sensor 50 is functionally related to the surface 20. If the surface 20 is dirty, the functionality of the sensor 50 may be limited. If the surface 20 is particularly dirty, it is even possible that the sensor 50 is no longer functional.

The surface 20, which is in an effective connection with the sensor 50, is still in an effective connection with at least one nozzle (unmarked), which is designed to bring a cleaning fluid 64 into an effective connection with the surface 20. In other words, the at least one nozzle (unmarked) is designed to apply the cleaning fluid 64 to the surface 20 to be cleaned so that the contamination of the surface 20 can be reduced and the functionality of the associated sensor 50 can be improved.

Furthermore, the motor vehicle 14 exhibits at least one nozzle (unmarked) at each of the front headlights (unmarked), which is adapted to apply the cleaning fluid 64 to each of the front headlights (unmarked).

The nozzles (unmarked) assigned to the headlights (unmarked) and the lidar 50 are each connected to a cleaning fluid multi way valve 242 via a cleaning fluid line (unmarked).

The cleaning fluid multi way valve 242 can be controlled by the electronic control unit (not depicted) and, according to a specification, release or prevent the passing on of the cleaning fluid 64 to the nozzles (unmarked) assigned to the headlights (unmarked) and the lidar 50 by means of a control quantity setpoint (not depicted).

It is understood that with a cleaning fluid multi way valve 240, 242 it is intended that such a multi way valve is designed to supply at least two, three, four, five, six, seven, eight or more nozzles separately and/or sequentially and/or parallel and/or simultaneously with cleaning fluid 64.

In this case, the cleaning fluid multi way valve 242 is also connected to nozzles (unmarked), which are operatively connected to the windscreen of the motor vehicle 14, so that the cleaning fluid multi way valve 242 can enable or disable the supply of cleaning fluid 64 to the windscreen.

The cleaning fluid multi way valve 242 is connected via a cleaning fluid line (unmarked) to one of the cleaning fluid mono pumps 66, which is equipped to convey the cleaning fluid 64 to the cleaning fluid multi way valve 242.

It is understood that the cleaning fluid multi way valve 242 in a different embodiment could alternatively be supplied with a cleaning fluid dual pump 66.

The rear window (unmarked) of the motor vehicle 14 is supplied with cleaning fluid 64 via a cleaning fluid mono pump 66 connected to the cleaning fluid reservoir 62, a corresponding cleaning fluid line (unmarked) and two nozzles (unmarked).

Cleaning fluid 64 is thereby brought into an active connection with the rear window (unmarked) of the motor vehicle 14 when the associated cleaning fluid pump 66 is supplied with electrical energy and thus starts the delivery operation of cleaning fluid 64 from the cleaning fluid reservoir 62.

In each case one cleaning fluid dual pump 66 is operatively connected to a sensor 56, 58 and the associated surfaces 26, 28 to be cleaned. Furthermore, each of these cleaning fluid dual pumps 66 is also operatively connected to at least one nozzle (unmarked) in each case, which in turn is operatively connected to a respective side mirror (unmarked) of the motor vehicle 14. Each of the cleaning fluid dual pumps 66 supplies one side of the motor vehicle 14.

The sensors 56, 58 are preferably also designed as lidar sensors 56, 58.

In addition, the motor vehicle 14 has a sensor 54 in the rear apron of the motor vehicle 14. The associated surface 24 is in active connection with a nozzle (unmarked), which is in active connection with a cleaning fluid mono pump 66 via a cleaning fluid line (unmarked) and a cleaning fluid multi way valve 240.

The cleaning fluid multi way valve 240 is also designed to supply one nozzle (unmarked) with cleaning fluid 64 each, which is in active connection with a rear light (unmarked) of the motor vehicle 14.

It is understood that a deviating motor vehicle 14 according to an alternative embodiment can have a deviating number of cleaning fluid pumps 66 and a different constellation of cleaning fluid lines (unmarked), nozzles (unmarked) and cleaning fluid multi way valves 240, 242.

It should be expressly pointed out that the cleaning system 16 in FIG. 1, which works with a cleaning fluid 64 in the liquid state, can be combined without restriction and advantageously with a cleaning system 16 in FIG. 8, which uses an air jet cleaning.

The method for indirectly deriving a systematic dependence MDSD1 for a system behaviour of a cleaning system of a motor vehicle, particularly for a system behaviour of a cleaning process of a surface to be cleaned of the motor vehicle in FIG. 10 exhibits the steps:

Build dependency table BDT, and

Derive systematic dependence DSD

Preferably, the method for indirectly deriving a systematic dependence MDSD1 for a system behaviour of a cleaning system concerns cleaning of at least one surface of the motor vehicle, preferably a resource efficient cleaning, particularly preferably a resource-saving cleaning.

The derived systematic dependence describes the system behaviour between an input quantity of the system and an output quantity of the system.

The step build dependency table BDT exhibits the substeps:

Determine input quantity as a first parameter by means of at least one sensor BDTS1;

Determine output quantity as a second parameter by means of at least one sensor BDTS2;

Digitalize the determined first and second parameter if necessary BDTS3;

Store the determined first and second parameter in an ordered manner with reference to one another in the database as a data set of a dependency table BDTS4; and Repeat the above steps until enough data sets have been collected.

The method for indirectly deriving a systematic dependence MDSD1 is executed by means of a data processing system exhibiting an electronic data processing and evaluation system and a database.

The step build dependency table BDT is repeated until at least two data sets are present, preferably at least 50 data sets, particularly preferably at least 200 data sets.

The dependency table created by the step build dependency table BDT is now used to derive the systematic dependence by means of the step derive systematic dependence DSD.

The step derive systematic dependence DSD is executed by the electronic data processing and evaluation unit and exhibits the substeps:

Access the respective data sets from the dependency table stored in the database DSDS1; and Determine the systematic dependence from the data sets of the dependency table by means of an algorithm DSDS2.

Preferably, the derived systematic dependence is then stored by a further substeb of the step derive systematic dependence DSD in the database and/or the electronic data processing and evaluation unit and/or an electronic control unit DSDS3.

The Method for optimizing a resource requirement MORR for a cleaning process of a surface of a motor vehicle in FIG. 11 exhibits the steps:

Access AD the data of the dependency table or the systematic dependence from a database and/or an electronic data processing and evaluation unit and/or an electronic control unit;

Derive a difference between the availability of the sensor at an end time of the cleaning process and the availability of the sensor at a start time of the cleaning process for each data set of the dependency table or for a course of the systematic dependence;

Derive DCQSS1 a ratio of that difference to the respective resource requirement for each data set of the dependency table or for a course of the systematic dependence;

Select DCQSS2 the control quantity of the data set exhibiting the highest value of that ratio or which belongs to the point in the course of that ratio exhibiting the highest value of that ratio; and Store SCQS that control quantity as a control quantity setpoint in the database and/or the electronic data processing and evaluation unit and/or the electronic control unit.

It is understood that the above steps can be performed with the appropriate adjustments both for the discrete points given by each data set of a dependency table and for the courses given by a systematic dependence. In the case of a systematic dependence, the progressions for the individual variables are also determined and/or taken as a basis for consideration.

The Method for determining a cleaning strategy for cleaning a surface to be cleaned of a motor vehicle in FIG. 12 exhibits the steps:

Check MCSS1 a currently selected cleaning mode 250;
Select MCSSS2 a sensor required for the currently selected cleaning mode 250;
Check MCSS3 an actual availability of each selected sensor;
Determine MCSS4 a distance which the motor vehicle can still cover as a function of the current availability of the selected sensor until an expected availability then reaches a threshold value at which the surface which is operatively connected to the associated sensor is to be cleaned; and
Determine MCSS5 a control quantity setpoint for resource efficient, preferably resource-saving, cleaning of each surface to be cleaned operatively connected to each selected sensor.

The cleaning strategy results from the one control quantity setpoint or the plurality of control quantity setpoints determined for the one or the plurality of sensors. The control strategy provides information on the type of cleaning of each surface to be cleaned according to the selected cleaning mode 250, the sequence of the corresponding cleaning, in particular also the sequence of several sequences for a surface to be cleaned, as well as, if necessary, the start time of each individual cleaning process, in particular depending on the actual availability of the sensor, which is operatively connected to the corresponding surface.

It should be expressly noted that some of the steps mentioned above can also be performed in a different order to achieve the same result.

In particular, the step MCSS4 is not essential and only brings an advantage in the specific execution example if the cleaning strategy takes into account that the beginning of a cleaning process should not start immediately after, but waits for the achievement of a predetermined actual availability of the sensor.

The MCSS4 step can be performed in particular by applying a method (UEAT) to determine an expected distance or operating time of the motor vehicle yet to be covered when reaching a threshold of availability.

The MCSS4 step can be performed in particular by applying a method MORR for optimizing a resource requirement for a cleaning process of a surface of a motor vehicle.

The schematically represented course of an availability 220, 222, 224 in FIG. 13 exhibits an actual availability 221, an expected availability 223, and an expected gain in availability 229.

Furthermore, the course of the availability 220, 222, 224 exhibits the interval limits 225 226, which can depend on the individual design of the sensor, its installation situation in the broadest sense and other conditions.

The interval limit 225 indicates that the associated sensor can no longer fulfill its requirements when the interval limit 225 is reached. If the availability drops further, the associated sensor can also no longer fulfill its requirements. Before the sensor can at least partially meet its requirements again, a surface that is operatively connected to the sensor must be cleaned using a cleaning process.

Availability above interval limit 226 indicates that the associated sensor can fully meet its requirements.

Between the interval limits 225, 226, the associated sensor can at least partially meet its requirements.

Furthermore, the course of availability 220, 222, 224 exhibits a threshold of availability 227, 228. If the value falls below such a threshold value, the associated sensor can no longer perform a task that is related to the respective threshold of availability 227, 228.

Preferably, the threshold of availability 227 refers to a situation in which the sensors of the motor vehicle (not depicted) are cleaned according to a cleaning mode, which is set up to enable the motor vehicle to have the best possible range, wherein each surfaces which is operatively connected to the sensor relevant for motor vehicle operation with the best possible range is to be cleaned when reaching the threshold of availability 227.

Another preferred threshold of availability 228 refers to a situation in which the sensors of the motor vehicle (not depicted) are cleaned according to a cleaning mode, which is set up to enable fully autonomous motor vehicle operation.

The expected availability 223 can be estimated on the basis of the actual availability 221 and depending on the operating conditions of the motor vehicle and the weather situation along the route to be covered by the motor vehicle using an appropriate procedure, in particular by applying a method (UEAT) to determine an expected distance or operating time of the motor vehicle yet to be covered when reaching a threshold of availability.

The expected gain in availability 229 is the expected increase in availability when performing a cleaning process defined by its control quantity setpoint.

The schematically represented course of an availability 220, 222, 224 in FIG. 14 during evaluation of a system behaviour of a soiling process of a surface exhibits a first availability (260), a second availability (262) and a loss of availability (264), wherein the second availability (262) is less than the first availability by a loss of availability (264).

The schematically illustrated procedure (UEA) to determine an expected availability (223) at a distance (270) or operating time (280) of the motor vehicle (not depicted) yet to be covered in FIG. 15 is essentially illustrated by means of a diagram which shows a course of a systematic dependence (122) for a system behaviour (not depicted) of a soiling process (not depicted) in terms of an availability (220, 222, 224) against a distance (270) or operating time (280), wherein the course of the availability (220, 222, 224) starts from the actual availability (221).

According to a first step (UEAa) of the method, the course of the systematic dependence (122) for the system behaviour (not depicted) of the soiling process (not depicted) of the respective surface to be cleaned (not depicted) up to the distance yet to be covered (272) or the operating time yet to be covered (282) is tracked.

The functional value of the systematic dependence (122), in particular the expected availability (223) at the location of the distance yet to be covered (272) or the operating time yet to be covered (282), is determined by means of a second step (UEAb) of the method, in particular by insertion into the systematic dependence (122) or by selection of the nearest empirical value (unmarked) or by linear interpolation between the two nearest empirical values (unmarked).

The schematically illustrated procedure (UEAT) to determine an expected distance (274) or an expected operating time (284) of the motor vehicle (not depicted) yet to be covered when reaching a threshold of availability (227, 228) in FIG. 16 is essentially illustrated by means of a diagram which shows a course of a systematic dependence (122) for a system behaviour (not depicted) of a soiling process (not depicted) in terms of an availability (220, 222, 224) against a distance (270) or operating time (280), wherein the course of the availability (220, 222, 224) starts from the actual availability (221).

According to a first step of the method (UEATa) and a second step of the method (UEATb), the function value of the systematic dependence (122), in particular the threshold of availability (227, 228), is used to determine the expected distance (274) or the expected operating time (284) yet to be covered when reaching the threshold of availability (227, 228), in particular by equating the systematic dependence (122) with the threshold of availability (227, 228) or by selecting the nearest empirical value (unmarked) or by linear interpolation between the two nearest empirical values (unmarked).

The schematically illustrated procedure (UEGAT) to determine an expected gain in availability (229), whereby the sum of the actual availability (221) and the expected gain in availability (229) is sufficient to achieve a distance (272) or operating time (282) to be covered by the motor vehicle (not depicted) in such a way that a threshold of availability (227, 228) is not exceeded in FIG. 17 is essentially illustrated by means of a diagram which shows a course of a systematic dependence (122) for a system behaviour (not depicted) of a soiling process (not depicted) in terms of an availability (220, 222, 224) against a distance (270) or operating time (280), wherein the course of the availability (220, 222, 224) starts from the actual availability (221).

According to a first step of the method (UEGATa), the systematic dependence (122) is shifted in the direction of the distance (270) or operating time (280) until the shifted systematic dependence (122) intersects the threshold of availability (227, 228) at the distance (272) or the operating time (282) to be covered.

The expected gain in availability (229) can then be determined from the new y-axis section (unmarked) by a difference between the new y-axis section (unmarked) and the actual availability (221).

The diagnostic method in FIG. 18 essentially consists of the step perform diagnostic analysis (unmarked).

The method serves to diagnose a system component (not depicted) of a cleaning system (not depicted), in particular an autonomously executable self-diagnosis, which can be started by the cleaning system (not depicted) via the electronic control unit (not depicted) and/or by the driver of a motor vehicle (not depicted).

The system behaviour of the system component is considered and evaluated as an object of the system diagnosis.

Therefore, the expected system behaviour of a system component (not depicted) of a cleaning system (not depicted) is compared with a system behaviour measured during the monitoring of this system component (not depicted). This comparison is carried out on the basis of at least one value of an output quantity (not depicted).

If the comparison leads to the result that the monitored system behaviour of the system component (not depicted) corresponds to the expected system behaviour, it is concluded that the system component has no defect and/or no fault and/or the system component is not impaired by external influences acting on the system component (not depicted).

In other words, if the system component (not depicted) behaves as expected regarding the compared at least one output quantity, there is no deviation of the actual system behavior for this system component.

In the other case, i.e. if the monitored system behaviour of the system component does not correspond to the expected system behaviour, a deviation results which can be further characterized in a preferably downstream step (not depicted), in particular with a procedure according to the sixth aspect of the invention.

If the deviation of the monitored output quantity from the expected output quantity and/or the characterisation of the deviating system behaviour results in a known pattern of behavior (not depicted), this can be associated with a resolution strategy (not depicted). Such a resolution strategy is also based on empirical values, whereby these empirical values can also be largely systematised.

With regard to systematized empirical values, it should be specifically considered that, depending on the type and severity of the deviation of the monitored output quantity from the expected output quantity, a certain error can be inferred. Preferably this conclusion is valid or at least transferable for a plurality of different system components (not depicted) and a plurality of different cleaning systems (not depicted).

For example, an increased power consumption (not depicted) of a cleaning fluid pump (not depicted) and thus a deviation of the system behaviour may lead to the conclusion that there is an error in the cleaning system (not depicted). It is especially conceivable here that the cleaning fluid pump (not depicted) will age, whereby it is particularly conceivable in concrete terms that a higher energy requirement will have to be used for a controlled pump pressure of the cleaning fluid pump (not depicted). Alternatively, it is especially conceivable that there is a blockage (not depicted) in the flow channel (not depicted) downstream of the cleaning fluid pump (not depicted), which causes an increased back pressure which influences the system behaviour of the cleaning fluid pump (not depicted). Depending on the situation, a differentiation to localize the cause of the diagnosed deviation can be made by comparing another value of the output quantity. For this, experience values are necessary, which can be available in a list in particular.

This also shows that a deviation between an expected output quantity and a monitored output quantity of a system behaviour of a system component (not depicted) does not have to be caused by the monitored system component itself.

If there is a blockage in front of the cleaning fluid pump (not depicted), then within the scope of a conceivable resolution strategy for eliminating the deviation with on-board means, concrete consideration should be given to specifically increasing the cleaning fluid pump (not depicted) pressure, as a result of which the blockage can be released if necessary and flushed out of the cleaning system (not depicted). In particular, a selection of a resolution strategy according to the seventh aspect of the invention is being considered.

When implementing a resolution strategy, particular consideration should be given to implementing the resolution strategy according to the eighth aspect of the invention.

If a selected and implemented resolution strategy is successful, a system behaviour of the system component will result which corresponds to the expected system behaviour.

It should be expressly pointed out that the diagnostic method described here can be applied to any system component (not depicted). If a sufficient number of sensors (not depicted) or measuring devices (not depicted), a sufficient number of experience values regarding the expected system behaviour of one or more system components (not depicted) and a list (not depicted) of potentially successful resolution strategies are available, a large number of occurring deviations can be corrected with on-board means (not depicted). Deviations of the system behaviour which cannot be repaired with on-board means (not depicted) can also be detected at an early stage and repaired within the scope of regular or early maintenance, whereby a possible extension of possible damage in the other case can be prevented advantageously.

Various variants are possible for the "Perform diagnostic method" process step.

According to a first variant, the perform diagnostic method step requires a list (not depicted) with at least one threshold value (not depicted) for an output quantity. This threshold value is an individual value for each output quantity and can also depend on the input quantity and the system component considered.

If a monitored output quantity exceeds and/or falls below an individually associated threshold value, there is a deviation that can be characterized, particularly by a further output quantity if necessary. According to this first variant, whether exceeding or falling below a respective threshold value leads to a deviation depends on the individually evaluated output quantity. This can be defined together with the threshold value and stored in the list.

Furthermore, it is conceivable that a resolution strategy is known from empirical values with which the particular deviation can be eliminated again, especially after the seventh and/or eighth aspect of the invention.

According to a second variant it is conceivable that an expected system behaviour of a system component is described by a dependency table (not depicted), especially by a dependency table (not depicted), which has been created according to the first steps of a method according to the fifth aspect of the invention.

A dependency table (not depicted) describes discrete empirical values for the system behaviour of one system component (not depicted) at a time, so that an empirical value must first be selected from the dependency table (not depicted) before comparison with the monitored output quantity. In this regard, it should be specifically considered to select the experience value from the dependency table (not depicted) in the form of a data set (not depicted) which is best suited by comparing the input quantity, in particular best defined by the shortest Euclidean distance with respect to the input quantity between a data set (not depicted) stored in the dependency table (not depicted) and the observed value for the input quantity during the observation of the output quantity in the context of the diagnostic method.

Alternatively, it should be considered to select the two best fitting and adjacent experience values (not depicted) in the form of two data sets (not depicted) from the dependency table (not depicted) and to interpolate between these two experience values according to the observed input quantity.

If a difference is found between the expected and observed output quantity, a further characterisation may be carried out by means of an appropriate procedure, in particular a procedure according to the sixth aspect of the invention and the possible settlement of the deviation by means of a resolution strategy, in particular the procedures according to the seventh and/or eighth aspect of the invention.

According to a third variant, it is proposed that an expected system behaviour of a system component (not depicted) is represented by systematic dependence (not depicted), in particular by systematic dependence (not depicted) according to the fifth aspect of the invention.

A systematic dependence (not depicted) can describe the system behaviour continuously as a function of the input quantity, so that a selection or interpolation between empirical values as described above for the second variant is advantageously not necessary.

If a deviation between a monitored output quantity and an expected output quantity is detected, it is suggested to proceed according to the second variant.

Just like the dependency table (not depicted) and the threshold value (not depicted), the systematic dependence (not depicted) is in particular valid for one system component (not depicted), so that a deviating systematic dependence (not depicted) or a deviating dependency table (not depicted) or a deviating threshold value (not depicted) could necessarily be selected for a consideration of a deviating system component (not depicted).

In the diagnostic procedure shown in FIG. 18, a procedure according to the first variant is described in which an individual threshold value (not depicted) is used to decide whether or not there is a deviation of the system behaviour for the diagnosed system component (not depicted).

If there is no deviation, the diagnostic method can be stopped or alternatively continued with the same or a different system component (not depicted).

If a deviation is detected, further characterisation of the deviation may be made, in particular according to the sixth aspect of the invention and selection of a resolution strategy, in particular selection according to the seventh aspect of the invention.

Subsequently, the diagnostic method may also be stopped or alternatively continued with the same or a different system component (not depicted).

Furthermore, an implementation of the resolution strategy (not depicted) is conceivable afterwards, in particular an implementation according to the eighth aspect of the invention.

Optionally, a diagnostic method is proposed in FIG. 18, whereby a self-diagnosis of the electronic control unit (not depicted) of the cleaning system (not depicted) is carried out after the start of the diagnostic method. In particular, the following measures could be considered: read for over current (not depicted) and/or memory check (not depicted) and/or communication check (not depicted) with the electronic control unit (not depicted) of the motor vehicle (not depicted) and/or temperature check (not depicted) and/or motion sensing (not depicted) and/or pressure sensing (not depicted) and/or overvoltage protection check (not depicted) and/or short circuit check (not depicted).

Furthermore, it is optionally proposed to check all system components (not depicted) connected to the electronic control unit (not depicted) of the cleaning system (not depicted). In particular, the following measures should be considered: read for short circuit (not depicted) and/or open circuit (not depicted) and/or impedance matching (not depicted) and/or current check (not depicted) and/or bus communication check (not depicted).

The cleaning method (unmarked) in FIG. 19 consists of the procedural steps:

Check soiling status/availability of a sensor;
Determine cleaning strategy;
Optimize resource requirement; and
Perform defined cleaning process(es).

The cleaning method (unmarked) provided here can run autonomously and/or be started manually.

As a first step, an actual availability check (unmarked) is proposed, in particular an actual availability check for all sensors installed on a motor vehicle (not depicted). The actual availability gives a reference to the soiling status of an associated sensor (not depicted), so that the actual availability can also be used to quantify the soiling status of each associated sensor (not depicted).

The soiling status/availability of a sensor can preferably be checked serially or in parallel for all sensors (not depicted).

The second step refers to the determination of a cleaning strategy (unmarked), especially a cleaning strategy (not depicted) depending on a cleaning mode (not depicted), especially a cleaning strategy (not depicted), which is determined by a method according to the fourth aspect of the invention.

The cleaning strategy (not depicted) preferably specifies when, where and how to clean what, preferably with the objective of using as few cleaning resources (not depicted) as possible to achieve a defined goal. The cleaning strategy (not depicted) refers to all surfaces (not depicted) of a motor vehicle (not depicted) which are connected to at least one sensor.

After defining a cleaning strategy, it is proposed to optimize a resource requirement (not depicted) for each cleaning process (not depicted). A cleaning process (not depicted) is assigned to at least one sensor (not depicted) and set up to improve the soiling status or availability of the corresponding sensor (not depicted).

The optimization of the resource requirement (not depicted) should contribute to the definition of a cleaning process (not depicted), which is expected to improve the availability of an associated sensor (not depicted) as much as possible by using as few resources as possible. The optimization of the cleaning process (not depicted) refers to a surface (not depicted) that is in an active connection with at least one sensor (not depicted).

In particular, the optimization of the resource requirement (not depicted) according to a method according to the third aspect of the invention can be carried out.

Furthermore, the optimization of the resource requirement (not depicted) could preferably be carried out serially or in parallel for all surfaces (not depicted) that are in an active connection with at least one sensor (not depicted).

It should be expressly pointed out that the preceding procedural step of determining a cleaning strategy (unmarked) may already implicitly include the procedural step optimize resource requirement (unmarked), especially in the case where the cleaning strategy (not depicted) is determined according to the fourth aspect of the invention. However, this is not necessarily the case, so that the steps can also be carried out separately and one after the other.

Once at least one cleaning process (not depicted) has been defined by the above procedure, it is executed according to the next step (unmarked), although execution does not necessarily require it to be executed simultaneously. It is also conceivable that a defined cleaning process (not depicted) is only executed if a defined start condition (not depicted) for the cleaning process (not depicted) is fulfilled.

In particular, when implementing a cleaning process (not depicted), it is preferable to consider an implementation within the framework of a cleaning method (not depicted) according to the first aspect of the invention.

LIST OF REFERENCE NUMERALS

10 Cleaning method
11 Cleaning device
12 Course of time
14 Motor vehicle
16 Cleaning system
18 Electronic control unit
20 Surface
22 Surface
24 Surface
26 Surface
28 Surface
30 Cleaning process
30d Resource requirement
32 Cleaning process
32d Resource requirement
34 Cleaning process
34d Resource requirement
36 Cleaning process
36d Resource requirement
38 Cleaning process
38a Cleaning period of cleaning process
38b Start time of cleaning process
38c End time of cleaning process
38d Resource requirement
40 Cleaning process
40a Cleaning period of cleaning process
40b Start time of cleaning process
40c End time of cleaning process
40d Resource requirement
50 Sensor
52 Sensor
54 Sensor
56 Sensor
56a Sensor
56b Sensor
58 Sensor
60 Cleaning fluid distribution system
62 Cleaning fluid reservoir
63 Cleaning fluid reservoir level sensor
64 Cleaning fluid
66 Cleaning fluid pump
68 Air pressure reservoir
70 Nozzle
72 Nozzle
74 Nozzle
76a Nozzle
76b Nozzle
78a Nozzle
78b Nozzle
80 Cleaning fluid line
82 Cleaning fluid line
84 Cleaning fluid line
86 Cleaning fluid line
88 Cleaning fluid line
90 wiping element
92 wiping element
94 wiping element
100 Measured quantity
100b Measured value of measured quantity at start time of cleaning period
100c Measured value of measured quantity at end time of cleaning period
100D Difference between measured values of measured quantity at end time and at start time of cleaning period
102 Measured quantity
102b Measured value of measured quantity at start time of cleaning period
102c Measured value of measured quantity at end time of cleaning period
102D Difference between measured values of measured quantity at end time and at start time of cleaning period
104 Measured quantity
104b Measured value of measured quantity at start time of cleaning period 104c Measured value of measured quantity at end time of cleaning period
104D Difference between measured values of measured quantity at end time and at start time of cleaning period
106 Measured quantity
106b Measured value of measured quantity at start time of cleaning period
106c Measured value of measured quantity at end time of cleaning period
106D Difference between measured values of measured quantity at end time and at start time of cleaning period
107 Measured quantity
107b Measured value of measured quantity at start time of cleaning period
107c Measured value of measured quantity at end time of cleaning period
107D Difference between measured values of measured quantity at end time and at start time of cleaning period
108 Measured quantity
108b Measured value of measured quantity at start time of cleaning period
108c Measured value of measured quantity at end time of cleaning period
108D Difference between measured values of measured quantity at end time and at start time of cleaning period
110 Control quantity
110V Value of control quantity
111 Control quantity
111V Value of control quantity
112 Control quantity
112V Value of control quantity
113 Control quantity
113V Value of control quantity
114 Control quantity
114V Value of control quantity
115 Control quantity
115V Value of control quantity
116 Control quantity
116V Value of control quantity
117 Control quantity
117V Value of control quantity
118 Control quantity
118V Value of control quantity
119 Control quantity
119V Value of control quantity
120 Systematic dependence, preferably systematic dependence for a system behaviour of a cleaning system
120D Systematic dependence between difference between measured values of measured quantity at end time and at start time of cleaning period and measured value of control quantity
120R Systematic dependence between resource requirement and measured value of control quantity
122 Systematic dependence, preferably systematic dependence for a system behaviour of a soiling process
124 Systematic dependence, preferably systematic dependence for a system behaviour of a system component of a cleaning system
130 Control quantity sensor
132 Control quantity sensor
134 Control quantity sensor
140 Process quantity
141 Process quantity
142 Process quantity
143 System related process quantities
144 Environmental process quantities
145 Process quantity
146 Process quantity
147 Process quantity
150 Data processing system
152 Electronic data processing and evaluation system
154 Database
156 Control quantity acquisition and setting system
158 Process quantity acquisition system
160 Measured quantity acquisition system
170 Process quantity sensor
171 Process quantity sensor
172 Process quantity sensor
175 Process quantity sensor
176 Process quantity sensor
177 Process quantity sensor
180 Data link
181 Data link
182 Data link
183 Data link
184 Data link
185 Data link
186 Data link
187 Data link
188 Data link
189 Data link
190 Data link
191 Data link
192 Data link
193 Data link
194 Data link
195 Data link
196 Data link
197 Data link
198 Data link
200 System
202 Input quantity
204 Output quantity
210 Data representing measured quantity
212 Data representing measured quantity
214 Data representing measured quantity
220 Availability
221 Actual availability
222 Availability
223 Expected availability
224 Availability
225 Availability at which system/sensor can no longer fulfill its requirements
226 Availability at which system/sensor can fully fulfill its requirements
227 Threshold of availability
228 Threshold of availability
229 Expected gain in availability
230 Cleaning fluid valve
232 Cleaning fluid valve
234 Cleaning fluid valve
236 Cleaning fluid valve
238 Cleaning fluid valve
240 Cleaning fluid multi way valve
242 Cleaning fluid multi way valve
250 Cleaning mode
260 First availability
262 Second availability
264 Change of availability/loss of availability
270 Distance
272 Distance yet to be covered
274 Expected distance 280 Operating time
282 Operating time yet to be covered
284 Expected operating time
AD Access dependency table and/or systematic dependence
BDT Build dependency table
BDTS1 Build dependency table step one
BDTS2 Build dependency table step two
BDTS3 Build dependency table step three
BDTS4 Build dependency table step four
DCQS Derive control quantity setpoint
DCQSS1 Derive control quantity setpoint step one
DCQSS2 Derive control quantity setpoint step two
DP1 Data set
DP2 Data set
DP3 Data set
DP4 Data set
DSD Derive systematic dependence
DSDS1 Derive systematic dependence step one
DSDS2 Derive systematic dependence step two
DSDS3 Derive systematic dependence step three
DT Dependency table
MCS Method for selecting a surface to be cleaned
MCSS1 Method for selecting a surface to be cleaned step one
MCSS2 Method for selecting a surface to be cleaned step two
MCSS3 Method for selecting a surface to be cleaned step three
MCSS4 Method for selecting a surface to be cleaned step four
MCSS5 Method for selecting a surface to be cleaned step five
MDSD1 Method for indirectly deriving a systematic dependence
MDSD2 Method for indirectly deriving a systematic dependence
MDSD3 Method for indirectly deriving a systematic dependence
MORR Method for optimizing a resource requirement
SCQS Store control quantity setpoint
UEA Method to determine an expected availability at a distance or operating time of the motor vehicle yet to be covered
UEAa Step a of the method to determine an expected availability at a distance or operating time of the motor vehicle yet to be covered
UEAb Step b of the method to determine an expected availability at a distance or operating time of the motor vehicle yet to be covered
UEAT Method to determine an expected distance or operating time of the motor vehicle yet to be covered when reaching a threshold of availability
UEATa Step a of the method to determine an expected distance or operating time of the motor vehicle yet to be covered when reaching a threshold of availability
UEATb Step b of the method to determine an expected distance or operating time of the motor vehicle yet to be covered when reaching a threshold of availability
UEGAT Method to determine an expected gain in availability, whereby the sum of the current availability and the expected gain in availability is sufficient to achieve a distance or operating time to be covered by the motor vehicle in such a way that a threshold of availability is not exceeded
UEGATa Step a of the method to determine an expected gain in availability, whereby the sum of the current availability and the expected gain in availability is sufficient to achieve a distance or operating time to be covered by the motor vehicle in such a way that a threshold of availability is not exceeded

The invention claimed is:

1. A method for cleaning a surface of a motor vehicle, the motor vehicle comprising a sensor operatively connected to the surface, and wherein the method comprises:
receiving sensor data from the sensor;
accessing data from a dependency table for a cleaning system of the motor vehicle,
wherein the dependency table;
includes data sets that each have an input quantity of the cleaning system and an output quantity of the cleaning system that is dependent on the input quantity and,
includes data sets associated with at least one control quantity of a cleaning process performed by the cleaning system, an availability of the sensor at a start time of the cleaning process and an availability of the sensor at an end time of the cleaning process;
determining a resource requirement of the cleaning process describing resources used for the method, wherein the resource requirement depends on the at least one control quantity;
deriving a difference between the availability of the sensor at an end time of the cleaning process and the availability of the sensor at a start time of the cleaning process for each data set of the dependency table;
deriving a ratio of the difference to the respective resource requirement for each data set of the dependency table;
determining a control quantity from the at least one control quantity of the dependency table based at least in part on the ratio; and
controlling the cleaning system of the motor vehicle using the control quantity.

2. The method according to claim 1, wherein:
the dependency table includes a dependency to a process quantity including at least one of a humidity, a temperature in a vicinity of the motor vehicle, a rainfall, a snowfall quantity, or a coordinate of the motor vehicle; and
prior to the determining the control quantity, the data sets taken into account in determining the control quantity from the dependency table are first restricted to an area which deviates from the respective process quantity including at least one of: a current humidity, a forecast humidity along a planned itinerary, a current temperature in the vicinity of the motor vehicle, a forecast temperature along the planned itinerary, a current rainfall, a forecast rainfall along the planned itinerary, a current snowfall quantity, a forecast snowfall quantity along the planned itinerary, a coordinate of the motor vehicle, or a forecast coordinate of the motor vehicle along the planned itinerary, by less than 20%.

3. The method according to claim 1, wherein;
the dependency table includes a dependency to the availability of the sensor at the start time of the cleaning process; and
prior to determining the control quantity, the data sets taken into account in determining the control quantity from the dependency table are first restricted to an area which deviates from an actual availability of the sensor or an expected availability of the sensor at a point on a planned route by less than 20%,
determining the expected availability at a distance or an operating time of the motor vehicle yet to be covered.

4. The method according to claim 1, wherein:
the dependency table includes a dependency to the availability of the sensor at the start time of the cleaning process;
prior to determining the control quantity, the data sets taken into account in determining the control quantity from the dependency table are first restricted to an area where the availability of the sensor at the start time of the cleaning process is less than or equal to an actual availability of the sensor; and
wherein the availability of the sensor at the start time of the cleaning process associated with the control quantity is saved with the control quantity as a control quantity setpoint.

5. The method according to claim 1, wherein:
prior to determining the control quantity, the data sets taken into account in determining the control quantity from the dependency table are first limited to an area that an expected gain in availability is not more than 20% above the availability with which a current itinerary of the motor vehicle is carried out without at least one of unintentional impairment of sensor functionality or until a threshold of availability of not more than 10%; and
determining an expected gain in availability, whereby a sum of a current availability and the expected gain in availability achieves a distance or an operating time to be covered by the motor vehicle such that a threshold of availability is not exceeded.

6. The method according to claim 1, wherein prior to determining the control quantity, the data sets taken into account in determining the control quantity from the dependency table are first limited to an area that an expected gain in availability achieves a distance or an operating time to a subsequent cleaning process without falling below a threshold of availability and not more than 20% above the gain in availability to achieve a distance or an operating time to the subsequent cleaning process without falling below a threshold of availability, not more than 10%,
by determining an expected distance or an expected operating time of the motor vehicle yet to be covered when reaching a threshold of availability, and
by determining an expected gain in availability, whereby a sum of a current availability and the expected gain in availability achieves a distance or an operating time to be covered by the motor vehicle such that a threshold of availability is not exceeded.

7. The method according to claim 1, further comprising selecting a first control quantity and selecting a second control quantity, wherein a first control quantity setpoint defines a first cleaning process and a second control quantity setpoint defines a second cleaning process for a sequence of cleaning processes, the second cleaning process being performed after completion of the first cleaning process.

8. The method according to claim 1, wherein the method is performed in series or in parallel for at least two, three, four, or five or more surfaces to be cleaned.

9. The method according to claim 1, wherein the control quantity is selected using a multi-criteria optimization procedure.

10. The method according to claim 1 implemented in a cleaning method for a resource efficient cleaning that is a resource-saving cleaning, of at least one surface of the motor vehicle,
wherein the motor vehicle exhibits a cleaning system and at least one sensor,
wherein the sensor is operatively connected to one surface,
wherein the cleaning method exhibits at least one cleaning process,
wherein the cleaning process is adapted to clean one surface and exhibits a cleaning period comprising a start time and an end time,
wherein the cleaning system exhibits an electronic control unit, a cleaning fluid distribution system, comprising at least one fluid reservoir, at least one nozzle, and at least one cleaning fluid line,
wherein the sensor is adapted to:
detect at least one of:
a measured quantity of an availability of the sensor,
a process quantity of at least one of:
a humidity and/or a temperature in a vicinity of the motor vehicle,
a rainfall and/or a snowfall quantity, or
a coordinate of the motor vehicle, and
a control quantity, and
transmit the measured quantity to the electronic control unit,
wherein the nozzle is adapted to bring a cleaning fluid into operative connection with the surface,
wherein the electronic control unit is adapted to control and/or regulate the cleaning process by means of at least one control quantity of the cleaning process,
wherein the resource requirement of the cleaning process depends on a control quantity setpoint, and
wherein the electronic control unit controls and/or regulates the resource efficient cleaning applying the control quantity setpoint.

11. The method according to claim 10, wherein the electronic control unit controls and/or regulates the resource efficient cleaning depending on an actual measured quantity value of an actual availability of the sensor.

12. The method according to claim 10, further comprising using the control quantity setpoint for optimizing the resource requirement.

13. The method according to claim 10, the method being used in a cleaning system including an electronic control unit, and a cleaning fluid distribution system,
wherein the cleaning fluid distribution system comprises at least one fluid reservoir, at least one nozzle, and at least one cleaning fluid line, and
wherein the cleaning system is adapted to optimize the resource requirement.

14. The method according to claim 13, wherein at least one of:
the motor vehicle includes a cleaning system, or
the motor vehicle is adapted to perform at least one of:
execute a cleaning method for the resource efficient cleaning optimize the resource requirement, or
use the control quantity setpoint to optimize the resource requirement.

15. A method for cleaning a surface of a motor vehicle including a sensor operatively connected to the surface, the method comprising:
receiving sensor data from the sensor;
accessing a systematic dependence for a system behavior of a cleaning system of the motor vehicle from at least one of a database, an electronic data processing and evaluation unit, or an electronic unit, wherein the systematic dependence includes:
data sets that each have an input quantity of the cleaning system and an output quantity of the cleaning system that depends on the input quantity of the system behavior of the cleaning system, and data sets for the system behavior of the cleaning system between at least one control quantity of a cleaning process performed by the cleaning system, an availability of the sensor at a start time of the cleaning process, and an availability of the sensor at an end time of the cleaning process;

determining a resource requirement of the cleaning process describing resources used for the method, the resource requirement depending on the at least one control quantity;

deriving a course of a difference between the availability of the sensor at an end time of the cleaning process and the availability of the sensor at a start time of the cleaning process for a course of the systematic dependence;

deriving a course of a ratio of the course of the difference to a course of the respective resource requirement for the course of the systematic dependence;

determining a control quantity from the at least one control quantity of the systematic dependence;

storing the control quantity as a control quantity setpoint in the at least one of the database, the electronic data processing and evaluation unit, or the electronic control unit; and controlling the cleaning system of the motor vehicle using the control quantity.

16. The method according to claim 15, wherein the systematic dependence includes a dependency to a process quantity including at least one of a humidity, a temperature in a vicinity of the motor vehicle, a rainfall, a snowfall quantity, or a coordinate of the motor vehicle; and wherein, prior to the determining of the control quantity, an area of the systematic dependence taken into account in determining the control quantity is first restricted to an area which deviates from the respective process quantity including at least one of a current humidity, a forecast humidity along a planned itinerary, a current temperature in the vicinity of the motor vehicle, a forecast temperature along the planned itinerary, a current rainfall, a forecast rainfall along the planned itinerary, a current snowfall quantity, a forecast snowfall quantity along the planned itinerary, a coordinate of the motor vehicle, or a forecast coordinate of the motor vehicle along the planned itinerary, by less than 20%.

17. The method according to claim 15, wherein the systematic dependence includes a dependency to the availability of the sensor at the start time of the cleaning process; and wherein prior to determining the control quantity, an area of the systematic dependence taken into account in determining the control quantity is first restricted to an area which deviates from an actual availability of the sensor or an expected availability of the sensor at a point on a planned route by less than 20%, by determining the expected availability at a distance or an operating time of the motor vehicle yet to be covered.

18. The method according to claim 15, wherein the systematic dependence includes a dependency to the availability of the sensor at the start time of the cleaning process;

wherein prior to determining the control quantity an area of the systematic dependence taken into account in determining the control quantity is first restricted to an area where the availability of the sensor at the start time of the cleaning process is less than or equal to an actual availability of the sensor; and wherein the availability of the sensor at the start time of the cleaning process associated with the control quantity is saved with the control quantity as a control quantity setpoint.

19. The method according to claim 15, wherein prior to determining the control quantity an area of the systematic dependence taken into account in determining the control quantity is first limited to an area that an expected gain in availability is not more than 20% above the availability with which a current itinerary of the motor vehicle is carried out without unintentional impairment of sensor functionality or until a threshold of availability is reached, by determining an expected gain in availability, whereby a sum of a current availability and the expected gain in availability achieves a distance or an operating time to be covered by the motor vehicle such that a threshold of availability is not exceeded.

20. The method according to claim 15, wherein prior to determining the control quantity, an area of the systematic dependence taken into account in determining the control quantity are first limited to an area that an expected gain in availability achieves a distance or an operating time to a subsequent cleaning process without falling below a threshold of availability and not more than 20% above the gain in availability necessary to achieve the distance or the operating time to the subsequent cleaning process without falling below a threshold of availability not more than 10%, by determining an expected distance or an expected operating time of the motor vehicle yet to be covered when reaching a threshold of availability, and by determining an expected gain in availability, whereby a sum of a current availability and the expected gain in availability achieves a distance or an operating time to be covered by the motor vehicle in such a way that a threshold of availability is not exceeded.

* * * * *